(12) United States Patent
Karunamuni et al.

(10) Patent No.: US 10,235,035 B2
(45) Date of Patent: Mar. 19, 2019

(54) DEVICES, METHODS, AND GRAPHICAL USER INTERFACES FOR CONTENT NAVIGATION AND MANIPULATION

(71) Applicant: Apple Inc., Cupertino, CA (US)

(72) Inventors: Chanaka G. Karunamuni, San Jose, CA (US); Marcos Alonso Ruiz, San Francisco, CA (US); Nicholas V. King, San Jose, CA (US); Daniel T. Preston, San Jose, CA (US)

(73) Assignee: APPLE INC., Cupertino, CA (US)

( * ) Notice: Subject to any disclaimer, the term of this patent is extended or adjusted under 35 U.S.C. 154(b) by 205 days.

(21) Appl. No.: 15/009,688

(22) Filed: Jan. 28, 2016

(65) Prior Publication Data

US 2017/0046039 A1 Feb. 16, 2017

Related U.S. Application Data

(60) Provisional application No. 62/235,490, filed on Sep. 30, 2015, provisional application No. 62/203,387, filed on Aug. 10, 2015.

(51) Int. Cl.
*G06F 3/048* (2013.01)
*G06F 3/0488* (2013.01)
(Continued)

(52) U.S. Cl.
CPC .......... *G06F 3/0488* (2013.01); *G06F 3/0414* (2013.01); *G06F 3/0482* (2013.01);
(Continued)

(58) Field of Classification Search
CPC .... G06F 3/0488; G06F 3/0414; G06F 3/0482; G06F 3/0483; G06F 3/0485;
(Continued)

(56) References Cited

U.S. PATENT DOCUMENTS 4,864,520 A 9/1989 Setoguchi et al.
5,184,120 A 2/1993 Schultz
(Continued)

FOREIGN PATENT DOCUMENTS

AU 2016100649 A4 6/2016
CN 1808362 A 7/2006
(Continued)

OTHER PUBLICATIONS

Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.
(Continued)

*Primary Examiner* — Dino Kujundzic
(74) *Attorney, Agent, or Firm* — Morgan, Lewis & Bockius LLP

(57) ABSTRACT

An electronic device presents a first portion of structured content on a display. The structured content includes a plurality of sections and the first portion includes content from a first section of the plurality of sections. The device detects a contact on the touch-sensitive surface, detects an increase in a characteristic intensity of the contact, and detects a movement of the contact. In response to detecting the increase in the characteristic intensity of the contact and the movement of the contact: in accordance with a determination that the characteristic intensity of the contact increases above an intensity threshold, the device translates the structured content to display a start of a second section; and in accordance with a determination that the characteristic intensity of the contact does not increase above the intensity threshold, the device translates the structured content in accordance with a magnitude of the movement of the contact.

36 Claims, 75 Drawing Sheets

(51) Int. Cl.
   *G06F 3/041*    (2006.01)
   *G06F 3/0482*   (2013.01)
   *G06F 3/0483*   (2013.01)
   *G06F 3/0485*   (2013.01)

(52) U.S. Cl.
   CPC .......... *G06F 3/0483* (2013.01); *G06F 3/0485* (2013.01); *G06F 3/04855* (2013.01); *G06F 3/04883* (2013.01); *G06F 2203/04105* (2013.01)

(58) Field of Classification Search
   CPC ............. G06F 3/04855; G06F 3/04883; G06F 2203/04105
   See application file for complete search history.

(56) References Cited

U.S. PATENT DOCUMENTS

| | | |
|---|---|---|
| 5,374,787 A | 12/1994 | Miller et al. |
| 5,428,730 A | 6/1995 | Baker et al. |
| 5,463,722 A | 10/1995 | Venolia |
| 5,510,813 A | 4/1996 | Makinwa et al. |
| 5,555,354 A | 9/1996 | Strasnick et al. |
| 5,559,301 A | 9/1996 | Bryan, Jr. et al. |
| 5,710,896 A | 1/1998 | Seidl |
| 5,717,438 A | 2/1998 | Kim et al. |
| 5,793,360 A | 8/1998 | Fleck et al. |
| 5,793,377 A | 8/1998 | Moore |
| 5,801,692 A | 9/1998 | Muzio et al. |
| 5,805,144 A | 9/1998 | Scholder et al. |
| 5,805,167 A | 9/1998 | Van Cruyningen |
| 5,809,267 A | 9/1998 | Moran et al. |
| 5,819,293 A | 10/1998 | Comer et al. |
| 5,825,352 A | 10/1998 | Bisset et al. |
| 5,844,560 A | 12/1998 | Crutcher et al. |
| 5,872,922 A | 2/1999 | Hogan et al. |
| 5,946,647 A | 8/1999 | Miller et al. |
| 6,002,397 A | 12/1999 | Jaaskelainen, Jr. |
| 6,031,989 A | 2/2000 | Cordell |
| 6,088,019 A | 7/2000 | Rosenberg |
| 6,088,027 A | 7/2000 | Konar et al. |
| 6,111,575 A | 8/2000 | Martinez et al. |
| 6,121,960 A | 9/2000 | Carroll et al. |
| 6,208,329 B1 | 3/2001 | Ballare |
| 6,208,340 B1 | 3/2001 | Amin et al. |
| 6,219,034 B1 | 4/2001 | Elbing et al. |
| 6,243,080 B1 | 6/2001 | Molne |
| 6,252,594 B1 | 6/2001 | Xia et al. |
| 6,396,523 B1 | 5/2002 | Segal et al. |
| 6,429,846 B2 | 8/2002 | Rosenberg et al. |
| 6,448,977 B1 | 9/2002 | Braun et al. |
| 6,459,442 B1 | 10/2002 | Edwards et al. |
| 6,489,978 B1 | 12/2002 | Gong et al. |
| 6,512,530 B1 | 1/2003 | Rzepkowski et al. |
| 6,563,487 B2 | 5/2003 | Martin et al. |
| 6,567,102 B2 | 5/2003 | Kung |
| 6,583,798 B1 | 6/2003 | Hoek et al. |
| 6,590,568 B1 | 7/2003 | Astala et al. |
| 6,661,438 B1 | 12/2003 | Shiraishi et al. |
| 6,735,307 B1 | 5/2004 | Volckers |
| 6,750,890 B1 | 6/2004 | Sugimoto |
| 6,822,635 B2 | 11/2004 | Shahoian et al. |
| 6,906,697 B2 | 6/2005 | Rosenberg |
| 6,919,927 B1 | 7/2005 | Hyodo |
| 6,943,778 B1 | 9/2005 | Astala et al. |
| 7,138,983 B2 | 11/2006 | Wakai et al. |
| 7,312,791 B2 | 12/2007 | Hoshino et al. |
| 7,411,575 B2 | 8/2008 | Hill et al. |
| 7,471,284 B2 | 12/2008 | Bathiche et al. |
| 7,479,949 B2 | 1/2009 | Jobs et al. |
| 7,533,352 B2 | 5/2009 | Chew et al. |
| 7,552,397 B2 | 6/2009 | Holecek et al. |
| 7,577,530 B2 | 8/2009 | Vignalou-Marche |
| 7,614,008 B2 | 11/2009 | Ording |
| 7,619,616 B2 | 11/2009 | Rimas Ribikauskas et al. |
| 7,629,966 B2 | 12/2009 | Anson |
| 7,656,413 B2 | 2/2010 | Khan et al. |
| 7,683,889 B2 | 3/2010 | Rimas Ribikauskas et al. |
| 7,743,348 B2 | 6/2010 | Robbins et al. |
| 7,760,187 B2 | 7/2010 | Kennedy |
| 7,787,026 B1 | 8/2010 | Flory et al. |
| 7,797,642 B1 | 9/2010 | Karam et al. |
| 7,801,950 B2 | 9/2010 | Eisenstadt et al. |
| 7,812,826 B2 | 10/2010 | Ording et al. |
| 7,890,862 B2 | 2/2011 | Kompe et al. |
| 7,903,090 B2 | 3/2011 | Soss et al. |
| 7,952,566 B2 | 5/2011 | Poupyrev et al. |
| 7,956,847 B2 | 6/2011 | Christie |
| 7,973,778 B2 | 7/2011 | Chen |
| 8,040,142 B1 | 10/2011 | Bokma et al. |
| 8,059,104 B2 | 11/2011 | Shahoian et al. |
| 8,106,856 B2 | 1/2012 | Matas et al. |
| 8,125,440 B2 | 2/2012 | Guyot-Sionnest et al. |
| 8,125,492 B1 | 2/2012 | Wainwright et al. |
| 8,174,503 B2 | 5/2012 | Chin |
| RE43,448 E | 6/2012 | Kimoto et al. |
| 8,209,628 B1 | 6/2012 | Davidson |
| 8,271,900 B2 | 9/2012 | Wakizaka et al. |
| 8,325,398 B2 | 12/2012 | Satomi et al. |
| 8,363,020 B2 | 1/2013 | Li et al. |
| 8,390,583 B2 | 3/2013 | Forutanpour et al. |
| 8,423,089 B2 | 4/2013 | Song et al. |
| 8,446,376 B2 | 5/2013 | Levy et al. |
| 8,453,057 B2 | 5/2013 | Stallings et al. |
| 8,466,889 B2 | 6/2013 | Tong et al. |
| 8,482,535 B2 | 7/2013 | Pryor |
| 8,499,243 B2 | 7/2013 | Yuki |
| 8,508,494 B2 | 8/2013 | Moore |
| 8,542,205 B1 | 9/2013 | Keller |
| 8,553,092 B2 | 10/2013 | Tezuka et al. |
| 8,581,870 B2 | 11/2013 | Bokma et al. |
| 8,587,542 B2 | 11/2013 | Moore |
| 8,593,415 B2 | 11/2013 | Han et al. |
| 8,593,420 B1 | 11/2013 | Buuck |
| 8,625,882 B2 | 1/2014 | Backlund et al. |
| 8,638,311 B2 | 1/2014 | Kang et al. |
| 8,665,227 B2 | 3/2014 | Gunawan |
| 8,669,945 B2 | 3/2014 | Coddington |
| 8,698,765 B1 | 4/2014 | Keller |
| 8,717,305 B2 | 5/2014 | Williamson et al. |
| 8,743,069 B2 | 6/2014 | Morton et al. |
| 8,769,431 B1 | 7/2014 | Prasad |
| 8,773,389 B1 | 7/2014 | Freed |
| 8,788,964 B2 | 7/2014 | Shin et al. |
| 8,799,816 B2 | 8/2014 | Wells et al. |
| 8,816,989 B2 | 8/2014 | Nicholson et al. |
| 8,854,316 B2 | 10/2014 | Shenfield |
| 8,872,729 B2 | 10/2014 | Lyons et al. |
| 8,872,773 B2 | 10/2014 | Mak et al. |
| 8,875,044 B2 | 10/2014 | Ozawa et al. |
| 8,881,062 B2 | 11/2014 | Kim et al. |
| 8,914,732 B2 | 12/2014 | Jun et al. |
| 8,952,987 B2 | 2/2015 | Momeyer et al. |
| 8,959,430 B1 | 2/2015 | Spivak et al. |
| 8,976,128 B2 | 3/2015 | Moore |
| 9,026,932 B1 | 5/2015 | Dixon |
| 9,030,419 B1 | 5/2015 | Freed |
| 9,030,436 B2 | 5/2015 | Ikeda |
| 9,032,321 B1 | 5/2015 | Cohen et al. |
| 9,046,999 B1 | 6/2015 | Teller et al. |
| 9,063,563 B1 | 6/2015 | Gray et al. |
| 9,069,460 B2 | 6/2015 | Moore |
| 9,086,755 B2 | 7/2015 | Cho et al. |
| 9,092,058 B2 | 7/2015 | Kasahara et al. |
| 9,098,188 B2 | 8/2015 | Kim |
| 9,116,571 B2 | 8/2015 | Zeliff et al. |
| 9,122,364 B2 | 9/2015 | Kuwabara et al. |
| 9,146,914 B1 | 9/2015 | Dhaundiyal |
| 9,148,618 B2 | 9/2015 | Matas et al. |
| 9,164,779 B2 | 10/2015 | Brakensiek et al. |
| 9,170,607 B2 | 10/2015 | Bose et al. |
| 9,170,649 B2 | 10/2015 | Ronkainen |
| 9,218,105 B2 | 12/2015 | Mansson et al. |
| 9,244,562 B1 | 1/2016 | Rosenberg et al. |

(56) References Cited

U.S. PATENT DOCUMENTS

| | | |
|---|---|---|
| 9,244,576 B1 | 1/2016 | Vadagave et al. |
| 9,244,601 B2 | 1/2016 | Kim et al. |
| 9,246,487 B2 | 1/2016 | Casparian et al. |
| 9,262,002 B2 | 2/2016 | Momeyer et al. |
| 9,304,668 B2 | 4/2016 | Rezende et al. |
| 9,307,112 B2 | 4/2016 | Molgaard et al. |
| 9,349,552 B2 | 5/2016 | Huska et al. |
| 9,361,018 B2 | 6/2016 | Defazio et al. |
| 9,389,718 B1 | 7/2016 | Letourneur |
| 9,389,722 B2 | 7/2016 | Matsuki et al. |
| 9,400,581 B2 | 7/2016 | Bokma et al. |
| 9,405,367 B2 | 8/2016 | Jung et al. |
| 9,417,754 B2 | 8/2016 | Smith |
| 9,423,938 B1 | 8/2016 | Morris |
| 9,436,344 B2 | 9/2016 | Kuwabara et al. |
| 9,448,694 B2 | 9/2016 | Sharma et al. |
| 9,451,230 B1 | 9/2016 | Henderson et al. |
| 9,471,145 B2 | 10/2016 | Langlois et al. |
| 9,477,393 B2 | 10/2016 | Zambetti et al. |
| 9,542,013 B2 | 1/2017 | Dearman et al. |
| 9,547,525 B1 | 1/2017 | Trainor et al. |
| 9,569,093 B2 | 2/2017 | Lipman et al. |
| 9,600,114 B2 | 3/2017 | Milam et al. |
| 9,600,116 B2 | 3/2017 | Tao et al. |
| 9,612,741 B2 * | 4/2017 | Brown .................. G06F 3/0416 |
| 9,619,076 B2 | 4/2017 | Bernstein et al. |
| 9,671,943 B2 | 6/2017 | Van der Velden |
| 9,733,716 B2 | 8/2017 | Shaffer |
| 9,760,241 B1 | 9/2017 | Lewbel |
| 2001/0024195 A1 | 9/2001 | Hayakawa et al. |
| 2001/0045965 A1 | 11/2001 | Orbanes et al. |
| 2002/0008691 A1 | 1/2002 | Hanajima et al. |
| 2002/0015064 A1 | 2/2002 | Robotham et al. |
| 2002/0042925 A1 | 4/2002 | Ebisu et al. |
| 2002/0109678 A1 | 8/2002 | Marmolin et al. |
| 2002/0140680 A1 | 10/2002 | Lu |
| 2002/0140740 A1 | 10/2002 | Chen |
| 2002/0180763 A1 | 12/2002 | Kung |
| 2002/0186257 A1 | 12/2002 | Cadiz et al. |
| 2003/0001869 A1 | 1/2003 | Nissen |
| 2003/0086496 A1 | 5/2003 | Zhang et al. |
| 2003/0112269 A1 | 6/2003 | Lentz et al. |
| 2003/0117440 A1 | 6/2003 | Hellyar et al. |
| 2003/0122779 A1 | 7/2003 | Martin et al. |
| 2003/0151589 A1 | 8/2003 | Bensen et al. |
| 2003/0184574 A1 | 10/2003 | Phillips et al. |
| 2003/0189552 A1 | 10/2003 | Chuang et al. |
| 2003/0189647 A1 | 10/2003 | Kang |
| 2003/0206169 A1 | 11/2003 | Springer et al. |
| 2003/0222915 A1 | 12/2003 | Marion et al. |
| 2004/0015662 A1 | 1/2004 | Cummings |
| 2004/0021643 A1 | 2/2004 | Hoshino et al. |
| 2004/0056849 A1 | 3/2004 | Lohbihler et al. |
| 2004/0108995 A1 | 6/2004 | Hoshino et al. |
| 2004/0138849 A1 | 7/2004 | Schmidt et al. |
| 2004/0150631 A1 | 8/2004 | Fleck et al. |
| 2004/0150644 A1 | 8/2004 | Kincaid et al. |
| 2004/0174399 A1 | 9/2004 | Wu et al. |
| 2004/0219969 A1 | 11/2004 | Casey et al. |
| 2004/0267877 A1 | 12/2004 | Shapiro et al. |
| 2005/0012723 A1 | 1/2005 | Pallakoff |
| 2005/0039141 A1 | 2/2005 | Burke et al. |
| 2005/0091604 A1 | 4/2005 | Davis |
| 2005/0110769 A1 | 5/2005 | DaCosta et al. |
| 2005/0114785 A1 | 5/2005 | Finnigan et al. |
| 2005/0125742 A1 | 6/2005 | Grotjohn et al. |
| 2005/0132297 A1 | 6/2005 | Milic-Frayling et al. |
| 2005/0134578 A1 | 6/2005 | Chambers et al. |
| 2005/0183017 A1 | 8/2005 | Cain |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0289476 A1 | 12/2005 | Tokkonen |
| 2006/0001650 A1 | 1/2006 | Robbins et al. |
| 2006/0001657 A1 | 1/2006 | Monney et al. |
| 2006/0022955 A1 | 2/2006 | Kennedy |
| 2006/0022956 A1 | 2/2006 | Lengeling et al. |
| 2006/0026536 A1 | 2/2006 | Hotelling et al. |
| 2006/0031776 A1 | 2/2006 | Glein et al. |
| 2006/0036971 A1 | 2/2006 | Mendel et al. |
| 2006/0067677 A1 | 3/2006 | Tokiwa et al. |
| 2006/0101347 A1 | 5/2006 | Runov et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1 | 6/2006 | Rimas-Ribikauskas et al. |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0161861 A1 | 7/2006 | Holecek et al. |
| 2006/0161870 A1 | 7/2006 | Hotelling et al. |
| 2006/0190834 A1 | 8/2006 | Marcjan |
| 2006/0195438 A1 | 8/2006 | Galuten |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0224989 A1 | 10/2006 | Pettiross et al. |
| 2006/0233248 A1 | 10/2006 | Rynderman et al. |
| 2006/0274042 A1 | 12/2006 | Krah et al. |
| 2006/0274086 A1 | 12/2006 | Forstall et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0024595 A1 | 2/2007 | Baker et al. |
| 2007/0024646 A1 | 2/2007 | Saarinen et al. |
| 2007/0080953 A1 | 4/2007 | Lii |
| 2007/0113681 A1 | 5/2007 | Nishimura et al. |
| 2007/0120835 A1 | 5/2007 | Sato |
| 2007/0124699 A1 | 5/2007 | Michaels |
| 2007/0152959 A1 | 7/2007 | Peters |
| 2007/0157173 A1 | 7/2007 | Klein et al. |
| 2007/0168369 A1 | 7/2007 | Bruns |
| 2007/0168890 A1 | 7/2007 | Zhao et al. |
| 2007/0176904 A1 | 8/2007 | Russo |
| 2007/0182999 A1 | 8/2007 | Anthony et al. |
| 2007/0186178 A1 | 8/2007 | Schiller |
| 2007/0222768 A1 | 9/2007 | Geurts et al. |
| 2007/0229455 A1 | 10/2007 | Martin et al. |
| 2007/0229464 A1 | 10/2007 | Hotelling et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0257821 A1 | 11/2007 | Son et al. |
| 2007/0270182 A1 | 11/2007 | Gulliksson et al. |
| 2007/0294295 A1 | 12/2007 | Finkelstein et al. |
| 2007/0299923 A1 | 12/2007 | Skelly et al. |
| 2008/0001924 A1 | 1/2008 | de los Reyes et al. |
| 2008/0024459 A1 | 1/2008 | Poupyrev et al. |
| 2008/0034306 A1 | 2/2008 | Ording |
| 2008/0034331 A1 | 2/2008 | Josephsoon et al. |
| 2008/0036743 A1 | 2/2008 | Westerman et al. |
| 2008/0051989 A1 | 2/2008 | Welsh |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0094398 A1 | 4/2008 | Ng et al. |
| 2008/0106523 A1 | 5/2008 | Conrad |
| 2008/0109753 A1 | 5/2008 | Karstens |
| 2008/0136790 A1 | 6/2008 | Hio |
| 2008/0155415 A1 | 6/2008 | Yoon et al. |
| 2008/0163119 A1 | 7/2008 | Kim et al. |
| 2008/0168395 A1 | 7/2008 | Ording et al. |
| 2008/0168403 A1 | 7/2008 | Westerman et al. |
| 2008/0168404 A1 | 7/2008 | Ording |
| 2008/0202824 A1 | 8/2008 | Philipp et al. |
| 2008/0204427 A1 | 8/2008 | Heesemans et al. |
| 2008/0219493 A1 | 9/2008 | Tadmor |
| 2008/0222569 A1 | 9/2008 | Champion et al. |
| 2008/0244448 A1 | 10/2008 | Goering et al. |
| 2008/0259046 A1 | 10/2008 | Carsanaro |
| 2008/0263452 A1 | 10/2008 | Tomkins |

(56) References Cited

U.S. PATENT DOCUMENTS

| | | |
|---|---|---|
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303795 A1 | 12/2008 | Lowles et al. |
| 2008/0303799 A1 | 12/2008 | Schwesig et al. |
| 2008/0307335 A1 | 12/2008 | Chaudhri et al. |
| 2008/0307359 A1 | 12/2008 | Louch et al. |
| 2008/0317378 A1 | 12/2008 | Steinberg et al. |
| 2008/0320419 A1 | 12/2008 | Matas et al. |
| 2009/0007017 A1 | 1/2009 | Anzures et al. |
| 2009/0037846 A1 | 2/2009 | Spalink et al. |
| 2009/0046110 A1 | 2/2009 | Sadler et al. |
| 2009/0058828 A1 | 3/2009 | Jiang et al. |
| 2009/0061837 A1 | 3/2009 | Chaudhri et al. |
| 2009/0066668 A1 | 3/2009 | Kim et al. |
| 2009/0073118 A1 | 3/2009 | Yamaji et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0085886 A1 | 4/2009 | Huang et al. |
| 2009/0089293 A1 | 4/2009 | Garritano et al. |
| 2009/0100343 A1 | 4/2009 | Lee et al. |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0158198 A1 | 6/2009 | Hayter et al. |
| 2009/0160793 A1 | 6/2009 | Rekimoto |
| 2009/0160814 A1 | 6/2009 | Li et al. |
| 2009/0167507 A1 | 7/2009 | Maenpaa |
| 2009/0167508 A1 | 7/2009 | Fadell et al. |
| 2009/0167704 A1 | 7/2009 | Terlizzi et al. |
| 2009/0169061 A1 | 7/2009 | Anderson et al. |
| 2009/0187824 A1 | 7/2009 | Hinckley et al. |
| 2009/0198767 A1 | 8/2009 | Jakobson et al. |
| 2009/0219294 A1 | 9/2009 | Young et al. |
| 2009/0225037 A1 | 9/2009 | Williamson et al. |
| 2009/0228842 A1 | 9/2009 | Westerman et al. |
| 2009/0237374 A1 | 9/2009 | Li et al. |
| 2009/0247112 A1 | 10/2009 | Lundy et al. |
| 2009/0247230 A1 | 10/2009 | Lundy et al. |
| 2009/0256947 A1 | 10/2009 | Ciurea et al. |
| 2009/0259975 A1 | 10/2009 | Asai et al. |
| 2009/0267906 A1 | 10/2009 | Schroderus |
| 2009/0276730 A1 | 11/2009 | Aybes et al. |
| 2009/0280860 A1 | 11/2009 | Dahlke |
| 2009/0282360 A1 | 11/2009 | Park et al. |
| 2009/0288032 A1 | 11/2009 | Chang et al. |
| 2009/0293009 A1 | 11/2009 | Meserth et al. |
| 2009/0295739 A1 | 12/2009 | Nagara |
| 2009/0303187 A1 | 12/2009 | Pallakoff |
| 2009/0307633 A1 | 12/2009 | Haughay, Jr. et al. |
| 2009/0322893 A1 | 12/2009 | Stallings et al. |
| 2010/0007926 A1 | 1/2010 | Imaizumi et al. |
| 2010/0011304 A1 | 1/2010 | Van Os |
| 2010/0013613 A1 | 1/2010 | Weston |
| 2010/0013777 A1 | 1/2010 | Baudisch et al. |
| 2010/0017710 A1 | 1/2010 | Kim et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0045619 A1 | 2/2010 | Birnbaum et al. |
| 2010/0057235 A1 | 3/2010 | Wang et al. |
| 2010/0058231 A1 | 3/2010 | Duarte et al. |
| 2010/0061637 A1 | 3/2010 | Mochizuki et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0088639 A1 | 4/2010 | Yach et al. |
| 2010/0088654 A1 | 4/2010 | Henhoeffer |
| 2010/0110082 A1 | 5/2010 | Myrick et al. |
| 2010/0111434 A1 | 5/2010 | Madden |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0146507 A1 | 6/2010 | Kang et al. |
| 2010/0148999 A1 | 6/2010 | Casparian et al. |
| 2010/0149096 A1 | 6/2010 | Migos et al. |
| 2010/0153879 A1 | 6/2010 | Rimas-Ribikauskas et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0171713 A1 | 7/2010 | Kwok et al. |
| 2010/0175023 A1 | 7/2010 | Gatlin et al. |
| 2010/0180225 A1 | 7/2010 | Chiba et al. |
| 2010/0199227 A1 | 8/2010 | Xiao et al. |
| 2010/0211872 A1 | 8/2010 | Rolston et al. |
| 2010/0214239 A1 | 8/2010 | Wu |
| 2010/0225604 A1 | 9/2010 | Homma et al. |
| 2010/0231534 A1 | 9/2010 | Chaudhri et al. |
| 2010/0235726 A1 | 9/2010 | Ording et al. |
| 2010/0235746 A1 | 9/2010 | Anzures |
| 2010/0251168 A1 | 9/2010 | Fujita et al. |
| 2010/0271312 A1 | 10/2010 | Alameh et al. |
| 2010/0271500 A1 | 10/2010 | Park et al. |
| 2010/0277419 A1 | 11/2010 | Ganey et al. |
| 2010/0277496 A1 | 11/2010 | Kawanishi et al. |
| 2010/0281379 A1 | 11/2010 | Meaney et al. |
| 2010/0281385 A1 | 11/2010 | Meaney et al. |
| 2010/0289807 A1 | 11/2010 | Yu et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313124 A1 | 12/2010 | Privault et al. |
| 2010/0313156 A1 | 12/2010 | Louch et al. |
| 2010/0313158 A1 | 12/2010 | Lee et al. |
| 2010/0313166 A1 | 12/2010 | Nakayama et al. |
| 2010/0315417 A1 | 12/2010 | Cho et al. |
| 2010/0315438 A1 | 12/2010 | Horodezky et al. |
| 2010/0321301 A1 | 12/2010 | Casparian et al. |
| 2010/0325578 A1 | 12/2010 | Mital et al. |
| 2011/0010626 A1 | 1/2011 | Fino et al. |
| 2011/0012851 A1 | 1/2011 | Ciesla et al. |
| 2011/0018695 A1 | 1/2011 | Bells et al. |
| 2011/0018904 A1 | 1/2011 | Tang |
| 2011/0035145 A1 | 2/2011 | Yamasaki |
| 2011/0050576 A1 | 3/2011 | Forutanpour et al. |
| 2011/0050588 A1 | 3/2011 | Li et al. |
| 2011/0050591 A1 | 3/2011 | Kim et al. |
| 2011/0050594 A1 | 3/2011 | Kim et al. |
| 2011/0050629 A1 | 3/2011 | Homma et al. |
| 2011/0050630 A1 | 3/2011 | Ikeda |
| 2011/0050653 A1 | 3/2011 | Miyazawa et al. |
| 2011/0054837 A1 | 3/2011 | Ikeda |
| 2011/0055135 A1 | 3/2011 | Dawson et al. |
| 2011/0055741 A1 | 3/2011 | Jeon et al. |
| 2011/0057886 A1 | 3/2011 | Ng et al. |
| 2011/0057903 A1 | 3/2011 | Yamano et al. |
| 2011/0061029 A1 | 3/2011 | Yeh et al. |
| 2011/0063248 A1 | 3/2011 | Yoon |
| 2011/0069012 A1 | 3/2011 | Martensson |
| 2011/0069016 A1 | 3/2011 | Victor |
| 2011/0070342 A1 | 3/2011 | Wilkens |
| 2011/0074697 A1 | 3/2011 | Rapp et al. |
| 2011/0080350 A1 | 4/2011 | Almalki et al. |
| 2011/0084910 A1 | 4/2011 | Almalki et al. |
| 2011/0087982 A1 | 4/2011 | McCann et al. |
| 2011/0087983 A1 | 4/2011 | Shim |
| 2011/0093815 A1 | 4/2011 | Gobeil |
| 2011/0093817 A1 | 4/2011 | Song et al. |
| 2011/0102340 A1 | 5/2011 | Martin et al. |
| 2011/0102829 A1 | 5/2011 | Jourdan |
| 2011/0107272 A1 | 5/2011 | Aguilar |
| 2011/0116716 A1 | 5/2011 | Kwon et al. |
| 2011/0126139 A1 | 5/2011 | Jeong et al. |
| 2011/0138295 A1 | 6/2011 | Momchilov et al. |
| 2011/0141031 A1 | 6/2011 | McCullough et al. |

(56) References Cited

U.S. PATENT DOCUMENTS

| | | |
|---|---|---|
| 2011/0141052 A1 | 6/2011 | Bernstein et al. |
| 2011/0144777 A1 | 6/2011 | Firkins et al. |
| 2011/0145752 A1 | 6/2011 | Fagans |
| 2011/0145753 A1 | 6/2011 | Prakash |
| 2011/0145759 A1 | 6/2011 | Leffert et al. |
| 2011/0145764 A1 | 6/2011 | Higuchi et al. |
| 2011/0149138 A1 | 6/2011 | Watkins |
| 2011/0163971 A1 | 7/2011 | Wagner et al. |
| 2011/0163978 A1 | 7/2011 | Park et al. |
| 2011/0164042 A1 | 7/2011 | Chaudhri |
| 2011/0167369 A1 | 7/2011 | van Os |
| 2011/0169765 A1 | 7/2011 | Aono |
| 2011/0175826 A1 | 7/2011 | Moore et al. |
| 2011/0175830 A1 | 7/2011 | Miyazawa et al. |
| 2011/0179368 A1 | 7/2011 | King et al. |
| 2011/0179381 A1 | 7/2011 | King |
| 2011/0181538 A1 | 7/2011 | Aono |
| 2011/0181751 A1 | 7/2011 | Mizumori |
| 2011/0185299 A1 | 7/2011 | Hinckley et al. |
| 2011/0185300 A1 | 7/2011 | Hinckley et al. |
| 2011/0185316 A1 | 7/2011 | Reid et al. |
| 2011/0193788 A1 | 8/2011 | King et al. |
| 2011/0193809 A1 | 8/2011 | Walley et al. |
| 2011/0193881 A1 | 8/2011 | Rydenhag |
| 2011/0197160 A1 | 8/2011 | Kim et al. |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0202879 A1 | 8/2011 | Stovicek et al. |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209097 A1 | 8/2011 | Hinckley et al. |
| 2011/0209099 A1 | 8/2011 | Hinckley et al. |
| 2011/0209104 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0238690 A1 | 9/2011 | Arrasvouri et al. |
| 2011/0239110 A1 | 9/2011 | Garrett et al. |
| 2011/0242029 A1 | 10/2011 | Kasahara et al. |
| 2011/0246877 A1 | 10/2011 | Kwak et al. |
| 2011/0248916 A1 | 10/2011 | Griffin et al. |
| 2011/0248948 A1 | 10/2011 | Griffin et al. |
| 2011/0252346 A1 | 10/2011 | Chaudhri |
| 2011/0252357 A1 | 10/2011 | Chaudhri |
| 2011/0252362 A1 | 10/2011 | Cho et al. |
| 2011/0258537 A1 | 10/2011 | Rives et al. |
| 2011/0263298 A1 | 10/2011 | Park |
| 2011/0267530 A1 | 11/2011 | Chun |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291945 A1 | 12/2011 | Ewing, Jr. et al. |
| 2011/0291951 A1 | 12/2011 | Tong |
| 2011/0296334 A1* | 12/2011 | Ryu .................. G06F 3/0483 715/776 |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2011/0310049 A1 | 12/2011 | Homma et al. |
| 2012/0005622 A1 | 1/2012 | Park et al. |
| 2012/0011437 A1 | 1/2012 | James et al. |
| 2012/0013541 A1 | 1/2012 | Boka et al. |
| 2012/0013542 A1 | 1/2012 | Shenfield |
| 2012/0019448 A1 | 1/2012 | Pitkanen et al. |
| 2012/0026110 A1 | 2/2012 | Yamano |
| 2012/0036441 A1 | 2/2012 | Basir et al. |
| 2012/0036556 A1 | 2/2012 | LeBeau et al. |
| 2012/0038580 A1 | 2/2012 | Sasaki |
| 2012/0044153 A1 | 2/2012 | Arrasvouri et al. |
| 2012/0056837 A1 | 3/2012 | Park et al. |
| 2012/0056848 A1 | 3/2012 | Yamano et al. |
| 2012/0062564 A1 | 3/2012 | Miyashita et al. |
| 2012/0062604 A1 | 3/2012 | Lobo |
| 2012/0062732 A1 | 3/2012 | Marman et al. |
| 2012/0066630 A1 | 3/2012 | Kim et al. |
| 2012/0066648 A1 | 3/2012 | Rolleston et al. |
| 2012/0081375 A1 | 4/2012 | Robert et al. |
| 2012/0084689 A1 | 4/2012 | Ledet et al. |
| 2012/0084713 A1 | 4/2012 | Desai et al. |
| 2012/0089932 A1 | 4/2012 | Kano et al. |
| 2012/0089942 A1 | 4/2012 | Gammon |
| 2012/0089951 A1 | 4/2012 | Cassidy |
| 2012/0096393 A1 | 4/2012 | Shim et al. |
| 2012/0096400 A1 | 4/2012 | Cho |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1 | 5/2012 | Son et al. |
| 2012/0106852 A1 | 5/2012 | Khawand et al. |
| 2012/0113007 A1 | 5/2012 | Koch et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0139864 A1 | 6/2012 | Sleeman et al. |
| 2012/0144330 A1 | 6/2012 | Font |
| 2012/0146945 A1 | 6/2012 | Miyazawa et al. |
| 2012/0147052 A1 | 6/2012 | Homma et al. |
| 2012/0154328 A1 | 6/2012 | Kono |
| 2012/0159380 A1 | 6/2012 | Kocienda et al. |
| 2012/0169646 A1 | 7/2012 | Berkes et al. |
| 2012/0169716 A1 | 7/2012 | Mihara |
| 2012/0176403 A1 | 7/2012 | Cha et al. |
| 2012/0179967 A1 | 7/2012 | Hayes |
| 2012/0180001 A1 | 7/2012 | Griffin et al. |
| 2012/0182226 A1 | 7/2012 | Tuli |
| 2012/0183271 A1 | 7/2012 | Forutanpour et al. |
| 2012/0206393 A1 | 8/2012 | Hillis et al. |
| 2012/0216114 A1 | 8/2012 | Privault et al. |
| 2012/0218203 A1 | 8/2012 | Kanki |
| 2012/0235912 A1 | 9/2012 | Laubach |
| 2012/0240044 A1 | 9/2012 | Johnson et al. |
| 2012/0249575 A1 | 10/2012 | Krolczyk et al. |
| 2012/0249853 A1 | 10/2012 | Krolczyk et al. |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260220 A1 | 10/2012 | Griffin |
| 2012/0274591 A1 | 11/2012 | Rimas-Ribikauskas et al. |
| 2012/0274662 A1 | 11/2012 | Kim et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0297041 A1 | 11/2012 | Momchilov |
| 2012/0304108 A1 | 11/2012 | Jarrett et al. |
| 2012/0304132 A1 | 11/2012 | Sareen et al. |
| 2012/0304133 A1 | 11/2012 | Nan et al. |
| 2012/0306748 A1 | 12/2012 | Fleizach et al. |
| 2012/0306764 A1 | 12/2012 | Kamibeppu |
| 2012/0306765 A1 | 12/2012 | Moore |
| 2012/0306766 A1 | 12/2012 | Moore |
| 2012/0306772 A1 | 12/2012 | Tan et al. |
| 2012/0306778 A1 | 12/2012 | Wheeldreyer et al. |
| 2012/0306927 A1 | 12/2012 | Lee et al. |
| 2012/0311429 A1 | 12/2012 | Decker et al. |
| 2012/0311437 A1 | 12/2012 | Weeldreyer et al. |
| 2012/0311498 A1 | 12/2012 | Kluttz et al. |
| 2013/0002561 A1 | 1/2013 | Wakasa |
| 2013/0014057 A1 | 1/2013 | Reinpoldt et al. |
| 2013/0016042 A1 | 1/2013 | Makinen et al. |
| 2013/0016122 A1 | 1/2013 | Bhatt et al. |
| 2013/0019158 A1 | 1/2013 | Watanabe |
| 2013/0019174 A1 | 1/2013 | Gil et al. |
| 2013/0031514 A1 | 1/2013 | Gabbert |
| 2013/0036386 A1 | 2/2013 | Park et al. |
| 2013/0044062 A1 | 2/2013 | Bose et al. |
| 2013/0047100 A1 | 2/2013 | Kroeger et al. |
| 2013/0050131 A1 | 2/2013 | Lee et al. |

(56) References Cited

U.S. PATENT DOCUMENTS

| | | |
|---|---|---|
| 2013/0050143 A1 | 2/2013 | Kim et al. |
| 2013/0061172 A1 | 3/2013 | Huang et al. |
| 2013/0063364 A1* | 3/2013 | Moore .................. G06F 3/0416 345/173 |
| 2013/0063389 A1 | 3/2013 | Moore |
| 2013/0067383 A1 | 3/2013 | Kataoka et al. |
| 2013/0067513 A1 | 3/2013 | Takami |
| 2013/0067527 A1 | 3/2013 | Ashbrook et al. |
| 2013/0074003 A1 | 3/2013 | Dolenc |
| 2013/0077804 A1 | 3/2013 | Glebe et al. |
| 2013/0082824 A1 | 4/2013 | Colley |
| 2013/0086056 A1 | 4/2013 | Dyor et al. |
| 2013/0093691 A1 | 4/2013 | Moosavi |
| 2013/0093764 A1 | 4/2013 | Andersson et al. |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097556 A1 | 4/2013 | Louch |
| 2013/0097562 A1 | 4/2013 | Kermoian et al. |
| 2013/0111398 A1 | 5/2013 | Lu et al. |
| 2013/0113715 A1 | 5/2013 | Grant et al. |
| 2013/0113720 A1 | 5/2013 | Van Eerd et al. |
| 2013/0120278 A1 | 5/2013 | Cantrell |
| 2013/0120295 A1 | 5/2013 | Kim et al. |
| 2013/0120306 A1 | 5/2013 | Furukawa |
| 2013/0125039 A1 | 5/2013 | Murata |
| 2013/0135243 A1 | 5/2013 | Hirsch et al. |
| 2013/0135499 A1 | 5/2013 | Song |
| 2013/0141364 A1 | 6/2013 | Lynn et al. |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1 | 6/2013 | Dagdeviren |
| 2013/0159893 A1 | 6/2013 | Lewis et al. |
| 2013/0162603 A1 | 6/2013 | Peng et al. |
| 2013/0162667 A1 | 6/2013 | Eskolin et al. |
| 2013/0169549 A1 | 7/2013 | Seymour et al. |
| 2013/0174049 A1 | 7/2013 | Townsend et al. |
| 2013/0174089 A1 | 7/2013 | Ki |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0191791 A1 | 7/2013 | Rydenhag et al. |
| 2013/0194217 A1 | 8/2013 | Lee et al. |
| 2013/0194480 A1 | 8/2013 | Fukata et al. |
| 2013/0198690 A1 | 8/2013 | Barsoum et al. |
| 2013/0212515 A1 | 8/2013 | Eleftheriou |
| 2013/0212541 A1 | 8/2013 | Dolenc et al. |
| 2013/0215079 A1 | 8/2013 | Johnson et al. |
| 2013/0222274 A1 | 8/2013 | Mori et al. |
| 2013/0222333 A1 | 8/2013 | Miles et al. |
| 2013/0222671 A1 | 8/2013 | Tseng et al. |
| 2013/0227419 A1 | 8/2013 | Lee et al. |
| 2013/0227450 A1 | 8/2013 | Na et al. |
| 2013/0232402 A1 | 9/2013 | Lu et al. |
| 2013/0234929 A1 | 9/2013 | Libin |
| 2013/0239057 A1 | 9/2013 | Ubillos et al. |
| 2013/0249814 A1 | 9/2013 | Zeng |
| 2013/0257793 A1 | 10/2013 | Zeliff et al. |
| 2013/0257817 A1 | 10/2013 | Yliaho |
| 2013/0265246 A1 | 10/2013 | Tae |
| 2013/0268875 A1 | 10/2013 | Han et al. |
| 2013/0278520 A1 | 10/2013 | Weng et al. |
| 2013/0293496 A1 | 11/2013 | Takamoto |
| 2013/0305184 A1 | 11/2013 | Kim et al. |
| 2013/0307792 A1 | 11/2013 | Andres et al. |
| 2013/0314434 A1 | 11/2013 | Shetterly et al. |
| 2013/0321340 A1 | 12/2013 | Seo et al. |
| 2013/0321457 A1 | 12/2013 | Bauermeister et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0328770 A1 | 12/2013 | Parham |
| 2013/0332836 A1 | 12/2013 | Cho |
| 2013/0332892 A1 | 12/2013 | Matsuki |
| 2013/0335373 A1 | 12/2013 | Tomiyasu |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0026098 A1 | 1/2014 | Gilman |
| 2014/0028571 A1 | 1/2014 | St. Clair |
| 2014/0028601 A1 | 1/2014 | Moore |
| 2014/0049491 A1 | 2/2014 | Nagar et al. |
| 2014/0055367 A1 | 2/2014 | Dearman et al. |
| 2014/0055377 A1 | 2/2014 | Kim |
| 2014/0059460 A1 | 2/2014 | Ho |
| 2014/0059485 A1 | 2/2014 | Lehrian et al. |
| 2014/0062956 A1 | 3/2014 | Ishizone et al. |
| 2014/0063316 A1 | 3/2014 | Lee et al. |
| 2014/0063541 A1 | 3/2014 | Yamazaki |
| 2014/0072281 A1 | 3/2014 | Cho et al. |
| 2014/0072283 A1 | 3/2014 | Cho et al. |
| 2014/0078318 A1 | 3/2014 | Alameh |
| 2014/0078343 A1 | 3/2014 | Dai et al. |
| 2014/0082536 A1 | 3/2014 | Costa et al. |
| 2014/0092025 A1 | 4/2014 | Pala et al. |
| 2014/0092030 A1 | 4/2014 | Van der Velden |
| 2014/0108936 A1 | 4/2014 | Khosropour et al. |
| 2014/0109016 A1 | 4/2014 | Ouyang et al. |
| 2014/0111456 A1 | 4/2014 | Kashiwa et al. |
| 2014/0111480 A1 | 4/2014 | Kim et al. |
| 2014/0111670 A1 | 4/2014 | Lord et al. |
| 2014/0118268 A1 | 5/2014 | Kuscher |
| 2014/0123080 A1 | 5/2014 | Gan |
| 2014/0139456 A1 | 5/2014 | Wigdor et al. |
| 2014/0139471 A1 | 5/2014 | Matsuki |
| 2014/0152581 A1 | 6/2014 | Case et al. |
| 2014/0157203 A1 | 6/2014 | Jeon et al. |
| 2014/0160063 A1 | 6/2014 | Yairi et al. |
| 2014/0160073 A1 | 6/2014 | Matsuki |
| 2014/0164955 A1 | 6/2014 | Thiruvidam et al. |
| 2014/0164966 A1 | 6/2014 | Kim et al. |
| 2014/0165006 A1 | 6/2014 | Chaudhri et al. |
| 2014/0168093 A1 | 6/2014 | Lawrence |
| 2014/0168153 A1 | 6/2014 | Deichmann et al. |
| 2014/0173517 A1 | 6/2014 | Chaudhri |
| 2014/0179377 A1 | 6/2014 | Song et al. |
| 2014/0184526 A1 | 7/2014 | Cho |
| 2014/0201660 A1 | 7/2014 | Clausen et al. |
| 2014/0208271 A1 | 7/2014 | Bell et al. |
| 2014/0210753 A1 | 7/2014 | Lee et al. |
| 2014/0210758 A1 | 7/2014 | Park et al. |
| 2014/0210760 A1 | 7/2014 | Aberg et al. |
| 2014/0210798 A1 | 7/2014 | Wilson |
| 2014/0223376 A1 | 8/2014 | Tarvainen et al. |
| 2014/0229888 A1 | 8/2014 | Ko et al. |
| 2014/0237408 A1 | 8/2014 | Ohlsson et al. |
| 2014/0245202 A1 | 8/2014 | Yoon et al. |
| 2014/0245367 A1 | 8/2014 | Sasaki et al. |
| 2014/0267114 A1 | 9/2014 | Lisseman et al. |
| 2014/0267135 A1 | 9/2014 | Chhabra |
| 2014/0267362 A1 | 9/2014 | Kocienda et al. |
| 2014/0282084 A1 | 9/2014 | Murarka et al. |
| 2014/0282214 A1 | 9/2014 | Shirzadi et al. |
| 2014/0300569 A1 | 10/2014 | Matsuki et al. |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333551 A1 | 11/2014 | Kim et al. |
| 2014/0333561 A1 | 11/2014 | Bull et al. |
| 2014/0344765 A1 | 11/2014 | Hicks et al. |
| 2014/0354845 A1 | 12/2014 | Molgaard et al. |
| 2014/0354850 A1 | 12/2014 | Kosaka et al. |
| 2014/0359438 A1 | 12/2014 | Matsuki |
| 2014/0359528 A1 | 12/2014 | Murata |
| 2014/0365945 A1 | 12/2014 | Karunamuni et al. |
| 2014/0380247 A1 | 12/2014 | Tecarro et al. |
| 2015/0015763 A1 | 1/2015 | Lee et al. |
| 2015/0020036 A1 | 1/2015 | Kim et al. |

(56) References Cited

U.S. PATENT DOCUMENTS

| | | |
|---|---|---|
| 2015/0026584 A1 | 1/2015 | Kobayakov et al. |
| 2015/0026592 A1 | 1/2015 | Mohammed et al. |
| 2015/0029149 A1 | 1/2015 | Andersson et al. |
| 2015/0033184 A1 | 1/2015 | Kim et al. |
| 2015/0042588 A1 | 2/2015 | Park |
| 2015/0046876 A1 | 2/2015 | Goldenberg |
| 2015/0049033 A1 | 2/2015 | Kim et al. |
| 2015/0058723 A1* | 2/2015 | Cieplinski .......... G06F 3/04855 715/702 |
| 2015/0062046 A1 | 3/2015 | Cho et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067534 A1 | 3/2015 | Choi et al. |
| 2015/0067559 A1 | 3/2015 | Missig et al. |
| 2015/0067560 A1 | 3/2015 | Cieplinski et al. |
| 2015/0067596 A1* | 3/2015 | Brown ................. G06F 3/0416 715/808 |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0071547 A1 | 3/2015 | Keating et al. |
| 2015/0116205 A1 | 4/2015 | Westerman et al. |
| 2015/0121218 A1 | 4/2015 | Kim et al. |
| 2015/0121225 A1 | 4/2015 | Somasundaram et al. |
| 2015/0067563 A1 | 5/2015 | Bernstein et al. |
| 2015/0128092 A1 | 5/2015 | Lee et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0143284 A1 | 5/2015 | Bennett et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153897 A1 | 6/2015 | Huang et al. |
| 2015/0153929 A1 | 6/2015 | Bernstein et al. |
| 2015/0160729 A1 | 6/2015 | Nakagawa |
| 2015/0185840 A1 | 7/2015 | Golyshko et al. |
| 2015/0193099 A1 | 7/2015 | Murphy |
| 2015/0193951 A1 | 7/2015 | Lee et al. |
| 2015/0205495 A1 | 7/2015 | Koide et al. |
| 2015/0234446 A1 | 8/2015 | Nathan et al. |
| 2015/0234493 A1 | 8/2015 | Parivar et al. |
| 2015/0253866 A1 | 9/2015 | Amm et al. |
| 2015/0268786 A1 | 9/2015 | Kitada |
| 2015/0268813 A1 | 9/2015 | Bos |
| 2015/0321607 A1 | 11/2015 | Cho et al. |
| 2015/0332107 A1 | 11/2015 | Paniaras |
| 2015/0378519 A1 | 12/2015 | Brown et al. |
| 2015/0378982 A1 | 12/2015 | McKenzie et al. |
| 2015/0381931 A1 | 12/2015 | Uhma et al. |
| 2016/0004373 A1 | 1/2016 | Huang |
| 2016/0004393 A1 | 1/2016 | Faaborg et al. |
| 2016/0004427 A1 | 1/2016 | Zambetti et al. |
| 2016/0004429 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0019718 A1 | 1/2016 | Mukkamala et al. |
| 2016/0021511 A1 | 1/2016 | Jin et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0085385 A1 | 3/2016 | Gao et al. |
| 2016/0132139 A1 | 5/2016 | Du et al. |
| 2016/0188181 A1* | 6/2016 | Smith .................... G06F 3/048 715/765 |
| 2016/0196028 A1 | 7/2016 | Kenney et al. |
| 2016/0210025 A1 | 7/2016 | Bernstein et al. |
| 2016/0224220 A1 | 8/2016 | Ganguly |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0259548 A1 | 9/2016 | Ma |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0283054 A1 | 9/2016 | Suzuki |
| 2016/0320906 A1 | 11/2016 | Bokma et al. |
| 2016/0334960 A1 | 11/2016 | Brown et al. |
| 2016/0357305 A1 | 12/2016 | Wells et al. |
| 2016/0357368 A1 | 12/2016 | Federighi et al. |
| 2016/0357389 A1 | 12/2016 | Dakin et al. |
| 2016/0357390 A1 | 12/2016 | Federighi et al. |
| 2016/0357404 A1 | 12/2016 | Alonso Ruiz et al. |
| 2016/0360116 A1 | 12/2016 | Penha et al. |
| 2017/0045981 A1 | 2/2017 | Karunamuni et al. |
| 2017/0046058 A1 | 2/2017 | Karunamuni et al. |
| 2017/0046059 A1 | 2/2017 | Karunamuni et al. |
| 2017/0046060 A1 | 2/2017 | Karunamuni et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |
| 2017/0109011 A1 | 4/2017 | Jiang |
| 2017/0124699 A1 | 5/2017 | Lane |
| 2017/0139565 A1* | 5/2017 | Choi .................... G06F 3/0483 |
| 2018/0024681 A1 | 1/2018 | Bernstein et al. |
| 2018/0188920 A1 | 7/2018 | Bernstein et al. |
| 2018/0275862 A1 | 9/2018 | Khoe et al. |

FOREIGN PATENT DOCUMENTS

| | | |
|---|---|---|
| CN | 101118469 A | 2/2008 |
| CN | 101202866 A | 6/2008 |
| CN | 101222704 A | 7/2008 |
| CN | 101241397 A | 8/2008 |
| CN | 101320303 A | 12/2008 |
| CN | 100524183 | 8/2009 |
| CN | 101593077 A | 12/2009 |
| CN | 101650615 A | 2/2010 |
| CN | 101809526 A | 8/2010 |
| CN | 101965549 A | 2/2011 |
| CN | 101998052 A | 3/2011 |
| CN | 102004593 A | 4/2011 |
| CN | 102112946 A | 6/2011 |
| CN | 102160021 A | 8/2011 |
| CN | 102214038 A | 10/2011 |
| CN | 102349038 A | 2/2012 |
| CN | 102385478 A | 3/2012 |
| CN | 102438092 A | 5/2012 |
| CN | 102460355 A | 5/2012 |
| CN | 102483677 A | 5/2012 |
| CN | 102646013 A | 8/2012 |
| CN | 102662573 A | 9/2012 |
| CN | 102792255 A | 11/2012 |
| CN | 102841677 A | 12/2012 |
| CN | 103097992 A | 5/2013 |
| CN | 103186345 A | 7/2013 |
| CN | 103518176 A | 1/2014 |
| CN | 104331239 A | 2/2015 |
| DE | 100 59 906 A1 | 6/2002 |
| EP | 0 859 307 A1 | 3/1998 |
| EP | 0 880 090 A2 | 11/1998 |

(56) References Cited

FOREIGN PATENT DOCUMENTS

| | | |
|---|---|---|
| EP | 1 028 583 A1 | 8/2000 |
| EP | 1 406 150 A1 | 4/2004 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 299 351 A2 | 3/2011 |
| EP | 2 302 496 A1 | 3/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 420 924 A2 | 2/2012 |
| EP | 2 426 580 A2 | 3/2012 |
| EP | 2 447 818 A1 | 5/2012 |
| EP | 2 527 966 A2 | 11/2012 |
| EP | 2 530 677 A2 | 12/2012 |
| EP | 2 541 376 A1 | 1/2013 |
| EP | 2 555 500 A1 | 2/2013 |
| EP | 2 615 535 A1 | 7/2013 |
| EP | 2 631 737 A1 | 8/2013 |
| EP | 2 674 846 A2 | 12/2013 |
| EP | 2 708 985 A1 | 3/2014 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | 2 402 105 A | 12/2004 |
| JP | 58-182746 | 10/1983 |
| JP | H06-161647 A | 6/1994 |
| JP | H07-98769 A | 4/1995 |
| JP | H07-104915 | 4/1995 |
| JP | H07-151512 A | 6/1995 |
| JP | H08-227341 A | 9/1996 |
| JP | H09-269883 A | 10/1997 |
| JP | H09-330175 A | 12/1997 |
| JP | H11-203044 A | 7/1999 |
| JP | 2001-202192 A | 7/2001 |
| JP | 2001-222355 A | 8/2001 |
| JP | 2001-306207 A | 11/2001 |
| JP | 2002-044536 A | 2/2002 |
| JP | 2002-149312 A | 5/2002 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-086733 A | 3/2004 |
| JP | 2004-288208 A | 10/2004 |
| JP | 2005-031786 A | 2/2005 |
| JP | 2005-092386 A | 4/2005 |
| JP | 2005-135106 A | 5/2005 |
| JP | 2005-157842 A | 6/2005 |
| JP | 2005-196810 A | 7/2005 |
| JP | 2005-352927 A | 12/2005 |
| JP | 2006-185443 A | 7/2006 |
| JP | 2007-116384 A | 5/2007 |
| JP | 2007-264808 A | 10/2007 |
| JP | 2008-009759 A | 1/2008 |
| JP | 2008-015890 A | 1/2008 |
| JP | 2008-033739 A | 2/2008 |
| JP | 2008-516348 A | 5/2008 |
| JP | 2008-146453 A | 6/2008 |
| JP | 2008-537615 | 9/2008 |
| JP | 2008 305174 A | 12/2008 |
| JP | 2009-500761 | 1/2009 |
| JP | 2009-110243 A | 5/2009 |
| JP | 2009-129171 A | 6/2009 |
| JP | 2009-211704 A | 9/2009 |
| JP | 2009-217543 A | 9/2009 |
| JP | 2009-294688 A | 12/2009 |
| JP | 2010-009321 A | 1/2010 |
| JP | 2010-503130 A | 1/2010 |
| JP | 2010-055274 A | 3/2010 |
| JP | 2010-097353 A | 4/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-541071 A | 12/2010 |
| JP | 2011-501307 A | 1/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-053972 A | 3/2011 |
| JP | 2011-053973 A | 3/2011 |
| JP | 2011-053974 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011-192179 A | 9/2011 |
| JP | 2011-192215 A | 9/2011 |
| JP | 2011-197848 A | 10/2011 |
| JP | 2011-221640 A | 11/2011 |
| JP | 2011-232947 A | 11/2011 |
| JP | 2011-242386 A | 12/2011 |
| JP | 2011-253556 A | 12/2011 |
| JP | 2011-257941 A | 12/2011 |
| JP | 2011-530101 A | 12/2011 |
| JP | 2012-027940 A | 2/2012 |
| JP | 2012-043266 A | 3/2012 |
| JP | 2012-043267 A | 3/2012 |
| JP | 2012-053754 | 3/2012 |
| JP | 2012-053926 A | 3/2012 |
| JP | 2012-073873 A | 4/2012 |
| JP | 2012-509605 A | 4/2012 |
| JP | 2012-093820 A | 5/2012 |
| JP | 2012-118825 A | 6/2012 |
| JP | 2012-118993 A | 6/2012 |
| JP | 2012-123564 A | 6/2012 |
| JP | 2012-128825 A | 7/2012 |
| JP | 2012-527685 A | 11/2012 |
| JP | 2013-030050 A | 2/2013 |
| JP | 2013-058149 A | 3/2013 |
| JP | 2013-080521 A | 5/2013 |
| JP | 2013-105410 A | 5/2013 |
| JP | 2013-529339 A | 7/2013 |
| JP | 2013-542488 A | 11/2013 |
| JP | 2014-130567 A | 7/2014 |
| JP | 2014-140112 A | 7/2014 |
| JP | 2014-519109 A | 8/2014 |
| JP | 2014-529137 A | 10/2014 |
| JP | 2015-099555 A | 5/2015 |
| JP | 2015-153420 A | 8/2015 |
| KR | 2006-0071353 A | 6/2006 |
| KR | 2008-0045143 A | 4/2008 |
| KR | 2008-0054346 A | 6/2008 |
| KR | 2010-0014095 A | 2/2010 |
| KR | 2010 0133246 A | 12/2010 |
| KR | 2011 0086501 A | 7/2011 |
| KR | 20120103670 A | 9/2012 |
| KR | 2013 0099647 A | 9/2013 |
| KR | 2014 0016495 A | 2/2014 |
| KR | 2014 0043760 A | 4/2014 |
| KR | 2014 0079110 A | 6/2014 |
| KR | 20150021977 A | 3/2015 |
| RU | 2007145218 A | 7/2009 |
| WO | WO 2005/106637 A2 | 11/2005 |
| WO | WO 2006/013485 A2 | 2/2006 |
| WO | WO 2006/042309 A1 | 4/2006 |
| WO | WO 2006/094308 A2 | 9/2006 |
| WO | WO 2007/121557 A1 | 11/2007 |

(56) References Cited

FOREIGN PATENT DOCUMENTS

| | | | |
|---|---|---|---|
| WO | WO 2008/030976 A2 | 3/2008 | |
| WO | WO 2008/064142 A2 | 5/2008 | |
| WO | WO 2009/155981 A1 | 12/2009 | |
| WO | WO 2009/158549 A2 | 12/2009 | |
| WO | WO 2010/013876 A1 | 2/2010 | |
| WO | WO 2010/032598 A1 | 2/2010 | |
| WO | WO 2010/090010 A1 | 8/2010 | |
| WO | WO 2010/122813 A1 | 10/2010 | |
| WO | WO 2010/134729 A2 | 11/2010 | |
| WO | WO 2011/024389 A1 | 3/2011 | |
| WO | WO 2011/024465 A1 | 3/2011 | |
| WO | WO 2011/093045 A1 | 8/2011 | |
| WO | WO 2011/105009 A1 | 9/2011 | |
| WO | WO 2011/105091 A | 9/2011 | |
| WO | WO 2011/108190 A1 | 9/2011 | |
| WO | WO 2011/115187 A1 | 9/2011 | |
| WO | WO 2011/121375 A1 | 10/2011 | |
| WO | WO 2012/021417 A1 | 2/2012 | |
| WO | WO 2012/037664 | 3/2012 | |
| WO | WO 2012/096804 A2 | 7/2012 | |
| WO | WO 2012/108213 A1 | 8/2012 | |
| WO | WO 2012/114760 A1 | 8/2012 | |
| WO | WO 2012/150540 A2 | 11/2012 | |
| WO | WO 2012/153555 A1 | 11/2012 | |
| WO | WO 2013/169299 A1 | 11/2013 | |
| WO | WO 2013/169300 A1 | 11/2013 | |
| WO | WO 2013/169302 A1 | 11/2013 | |
| WO | WO 2013/169849 A2 | 11/2013 | |
| WO | WO 2013/169851 A2 | 11/2013 | |
| WO | WO 2013/169853 A1 | 11/2013 | |
| WO | WO 2013/169854 A2 | 11/2013 | |
| WO | WO 2013/169870 A1 | 11/2013 | |
| WO | WO 2013/169875 A2 | 11/2013 | |
| WO | WO 2013/169877 A2 | 11/2013 | |
| WO | WO 2013/169882 A2 | 11/2013 | |
| WO | WO 2013/173838 A2 | 11/2013 | |
| WO | WO-2013169845 A1 * | 11/2013 | ............ G06F 3/0485 |
| WO | WO 2014/105275 A1 | 7/2014 | |
| WO | WO 2014/105276 A1 | 7/2014 | |
| WO | WO 2014/105277 A1 | 7/2014 | |
| WO | WO 2014/105278 A1 | 7/2014 | |
| WO | WO 2014/105279 A1 | 7/2014 | |
| WO | WO 2014/129655 A1 | 8/2014 | |
| WO | WO 2014/149473 A1 | 9/2014 | |
| WO | WO 2014/200733 A1 | 12/2014 | |
| WO | WO 2016/200584 A2 | 12/2016 | |

OTHER PUBLICATIONS

Azundris, "A Fire in the Sky," http://web.archive.org/web/20140722062639/http://blog.azundrix.com/archives/168-A-fire-in-the-sky.html, Jul. 22, 2014, 8 pages.
B-log—betriebsraum weblog, "Extremely Efficient Menu Selection: Marking Menus for the Flash Platform," http://www.betriebsraum.de/blog/2009/12/11/extremely-efficient-menu-selection-marking-for-the-flash-platform, Dec. 11, 2009, 9 pages.
Clark, "Global Moxie, Touch Means a Renaissance for Radial Menus," http://globalmoxie.com/blog/radial-menus-for-touch-ui~print.shtml, Jul. 17, 2012, 7 pages.
CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.
Crook, "Microsoft Patenting Multi-Screen, Milti-Touch Gesures," http://techcrunch.com/2011/08/25/microsoft-awarded-patents-for-multi-screen-multi-touch-gestures/, Aug. 25, 2011, 8 pages.
Cvil.ly—a design blog, Interesting Touch Interactions on Windows 8, http://cvil.ly/2011/06/04/interesting-touch-interactions-on-windows-8/, Jun. 4, 2011, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", ip.com Journal, Aug. 1, 1990, 3 Pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.
Flixel, "Cinemagraph Pro for Mac", https://flixel.com/products/mac/cinemagraph-pro, 2014, 7 pages.
Flock, "Cinemagraphics: What It Looks Like When a Photo Moves," http://www.washingtonpost.com/blogs/blowpost/post/cinemagraphs-what-it-looks-like-when-a-photo-moves/2011/07-08/gl@AONez3H.blog.html, Jul. 12, 2011, 3 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.
Forlines, et al., "Glimpse: a Novel Input Model for Multi-level Devices", Chi '05 Extended Abstracts on Human Factors in Computing Systems, Apr. 2, 2005, 4 pages.
HTC, "HTC One (M7)," Wikipedia, the free encyclopedia, https://en.wikipedia.org/wiki/HTC_One_(M7), Mar. 2013, 20 pages.
IBM et al., "Pressure-Sensitive Icons", IBM Technical Disclosure Bulletin, vol. 33, No. 1B, Jun. 1, 1990, 3 pages.
ICIMS Recruiting Software, "Blackberry Playbook Review," http://www.tested.com/tech.tablets/5749-blackberry-playbook-review/, 2015, 11 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kronfli, "HTC Zoe Comes to Goole Play, Here's Everthing You Need to Know," Know Your Mobile, http://www.knowyourmobile.com/htc/htc-one/19550/what-htc-zoe, Aug. 14, 2014, 5 pages.
Laurie, "The Power of the Right Click," http://vlaurie.com/right-click/customize-context-menu.html, 2002-2016, 3 pages.
McRitchie, "Internet Explorer Right-Click Menus," http://web.archive.org/web-201405020/http:/dmcritchie.mvps.org/ie/rightie6.htm, May 2, 2014, 10 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Minsky, "Computational Haptics the *Sandpaper* System for Synthesizing Texture for a Force-Feedback Display," Massachusetts Institute of Technology, Jun. 1978, 217 pages.
O'Hara, et al., "Pressure-Sensitive Icons", ip.com Journal, ip.com Inc., West Henrietta, NY, US, Jun. 1, 1990, 2 Pages.
Pallenberg, "Wow, the new iPad had gestures." https://plus.google.com/+SaschaPallenberg/posts/aaJtJogu8ac, Mar. 7, 2012, 2 pages.
PoliceOne.com, "Coban Technoligies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.

(56) References Cited

OTHER PUBLICATIONS

Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.
Sony, "Intelligent Scene Recognition," https://www.sony-asia.com/article/252999/section/product/product/dsc-t77, downloaded on May 20, 2016, 5 pages.
Sony, "Sony Xperia Z1", Wikipedia, the free encyclopedia, https://en.wikipedia.org/wiki/Sony_Xperia_Z1, Sep. 2013, 10 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
Tidwell, "Designing Interfaces," O'Reilly Media, Inc., USA, Nov. 2005, 348 pages.
Wikipedia, "AirDrop,", Wikipedia, the free encyclopedia, http://en.wikipedia.org/wiki/AirDrop, May 17, 2016, 5 pages.
Wikipedia, "Cinemagraph," Wikipedia, the free encyclopedia, http://en.wikipedia.org/wiki/Cinemagraph, 2 pages.
Wikipedia, "Context Menu," Wikipedia, the free encyclopedia https://en.wikipedia.org/wiki/Context menu, Last Modified May 15, 2016, 4 pages.
Wikipedia, "Mobile Ad Hoc Network," Wikipedia, the free encyclopedia, http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick_Look, Last Modified Jan. 15, 2016, 3 pages.
YouTube, "Blackberry Playbook bezel interation," https://www.youtube.com/watch?v=YGkzFqnOwXI, Jan. 10, 2011, 2 pages.
Office Action, dated Dec. 18, 2015, received in Australian Patent Application No. 2013368440, which corresponds with U.S. Appl. No. 14/536,426, 3 pages.
Office Action, dated Apr. 5, 2016, received in Korean Patent Application No. 10-2015-7018851, which corresponds with U.S. Appl. No. 14/536,426, 7 pages.
Office Action, dated Dec. 17, 2015, received in U.S. Appl. No. 14/536,426, 28 pages.
Office Action, dated May 6, 2016, received in U.S. Appl. No. 14/536,426, 23 pages.
Office Action, dated Jul. 15, 2015, received in Australian Patent Application No. 2013259606, which corresponds with U.S. Appl. No. 14/536,426, 3 pages.
Notice of Allowance, dated May 23, 2016, received in Australian Patent Application No. 2013259606, which corresponds with U.S. Appl. No. 14/536,426, 3 pages.
Office Action, dated Nov. 18, 2015, received in Australian Patent Application No. 2015101231, which corresponds with U.S. Appl. No. 14/536,426, 3 pages.
Office Action, dated Mar. 4, 2016, received in Japanese Patent Application No. 2015-511644, which corresponds with U.S. Appl. No. 14/536,426, 3 pages.
Office Action, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.
Office Action, dated Mar. 14, 2016, received in Japanese Patent Application No. 2015-549392, which corresponds with U.S. Appl. No. 14/608,926, 4 pages.
Office Action, dated May 12, 2016, received in Korean Patent Application No. 10-2015-7018853, which corresponds with U.S. Appl. No. 14/608,926, 4 pages.
Office Action, dated Jul. 17, 2015, received in Australian Patent Application No. 2013259613, which corresponds with U.S. Appl. No. 14/536,646, 5 pages.
Office Action, dated May 31, 2016, received in Australian Patent Application No. 2013259613, which corresponds with U.S. Appl. No. 14/536,646, 4 pages.
Office Action, dated Nov. 12, 2015, received in European Patent Application No. 13724102.2, which corresponds with U.S. Appl. No. 14/536,646, 6 pages.
Office Action, dated May 31, 2016, received in European Patent Application No. 13724102.2, which corresponds with U.S. Appl. No. 14/536,646, 5 pages.
Office Action, dated Feb. 29, 2016, received in Japanese Patent Application No. 2015-511645, which corresponds with U.S. Appl. No. 14/536,646, 5 pages.
Office Action, dated Aug. 27, 2015, received in Australian Patent Application No. 2013259614, which corresponds with U.S. Appl. No. 14/536,141, 4 pages.
Office Action, dated Jan. 7, 2016, received in European Patent Application No. 13726053.5, which corresponds with U.S. Appl. No. 14/536,141, 10 pages.
Office Action, dated Feb. 29, 2016, received in Japanese Patent Application No. 2015-511646, which corresponds with U.S. Appl. No. 14/536,141, 3 pages.
Office Action, dated Jan. 29, 2016, received in Australian Patent Application No. 2013368443, which corresponds with U.S. Appl. No. 14/536,141, 3 pages.
Notice of Allowance, dated Mar. 11, 2016, received in Australian Patent Application No. 2013368443, which corresponds with U.S. Appl. No. 14/536,141, 2 pages.
Office Action, dated Apr. 5, 2016, received in Korean Patent Application No. 10-2015-7018448, which corresponds with U.S. Appl. No. 14/536,141, 6 pages.
Office Action, dated Jul. 9, 2015, received in Australian Patent Application No. 2013259630, which corresponds with U.S. Appl. No. 14/536,203, 3 pages.
Notice of Allowance, dated Jun. 15, 2016, received in Australian Patent Applicatin No. 2013259630, which corresponds with U.S. Appl. No. 14/536,203, 3 pages.
Office Action, dated Nov. 11, 2015, received in European Patent Application No. 13724104.8, which corresponds with U.S. Appl. No. 14/536,203, 5 pages.
Office Action, dated May 31, 2016, received in European Patent Application No. 13724104.8, which corresponds with U.S. Appl. No. 14/536,203, 5 pages.
Office Action, dated Feb. 15, 2016, received in Japanese Patent Application No. 2015-511650, which corresponds with U.S. Appl. No. 14/536,203, 5 pages.
Office Action, dated Dec. 4, 2015, received in Korean Patent Application No. 2014-7034520, which corresponds with U.S. Appl. No. 14/536,203, 4 pages.
Office Action, dated Aug. 10, 2015, received in Australian Patent Application No. 2013259637, which corresponds with U.S. Appl. No. 14/536,267, 3 pages.
Office Action, dated Jan. 29, 2016, received in Japanese Patent Application No. 2015-511652, which corresponds with U.S. Appl. No. 14/536,267, 3 pages.
Office Action, dated Dec. 4, 2015, received in Korean Patent Application No. 2014-7034530, which corresponds with U.S. Appl. No. 14/536,267, 3 pages.
Office Action, dated Aug. 18, 2015, received in Australian Patent Application No. 2013259642, which corresponds with U.S. Appl. No. 14/536,291, 3 pages.
Office Action, dated Jan. 7, 2016, received in European Patent Application No. 13724107.1, which corresponds with U.S. Appl. No. 14/052,515, 11 pages.

(56) References Cited

OTHER PUBLICATIONS

Office Action, dated Mar. 8, 2016, received in Japanese Patent Application No. 2015-511655, which corresponds with U.S. Appl. No. 14/536,291, 4 pages.
Office Action, dated Jan. 15, 2016, received in Australian Patent Application No. 2013368445, which corresponds with U.S. Appl. No. 14/608,985, 3 pages.
Office Action, dated Apr. 25, 2016, received in Japanese Patent Application No. 2015550384, which corresponds with U.S. Appl. No. 14/608,985, 4 pages.
Office Action, dated Mar. 31, 2016, received in U.S. Appl. No. 14/864,737, 17 pages.
Office Action, dated Apr. 5, 2016, received in Danish Patent Application No. 201500577, which corresponds with U.S. Appl. No. 14/864,737, 7 pages.
Office Action, dated Jun. 27, 2016, received in U.S. Appl. No. 14/866,981, 22 pages.
Office Action, dated May 10, 2016, received in Australian Patent Application No. 2016100254, which corresponds with U.S. Appl. No. 14/866,981, 6 pages.
Office Action, dated Mar. 18, 2016, received in Danish Patent Application No. 201500575, which corresponds with U.S. Appl. No. 14/866,981, 9 pages.
Office Action, dated May 19, 2016, received in Australian Patent Application No. 2016100251, which corresponds with U.S. Appl. No. 14/866,159, 5 pages.
Office Action, dated Mar. 9, 2016, received in Danish Patent Application No. 201500574, which corresponds with U.S. Appl. No. 14/866,159, 11 pages.
Patent Certificate, dated Jun. 9, 2016, received in Australian Patent Application No. 2016100247, which corresponds with U.S. Appl. No. 14/868,078, 1 page.
Office Action, dated Mar. 30, 2016, received in Danish Patent Application No. 201500588, which corresponds with U.S. Appl. No. 14/868,078, 9 pages.
Office Action, dated May 9, 2016, received in U.S. Appl. No. 14/863,432, 26 pages.
Office Action, dated Apr. 4, 2016, received in Danish Patent Application No. 201500582, which corresponds with U.S. Appl. No. 14/863,432, 10 pages.
Office Action, dated Mar. 22, 2016, received in Danish Patent Application No. 201500576, which corresponds with U.S. Appl. No. 14/866,989, 10 pages.
Notice of Allowance, dated Jun. 8, 2016, received in Danish Patent Application No. 201500576, which corresponds with U.S. Appl. No. 14/866,989, 2 pages.
Office Action, dated Mar. 28, 2016, received in U.S. Appl. No. 14/869,899, 17 pages.
Office Action (Interview Summary), dated Jun. 28, 2016, received in U.S. Appl. No. 14/869,899, 5 pages.
Office Action, dated Feb. 3, 2016, received in Danish Patent Application No. 201500592, which corresponds with U.S. Appl. No. 14/869,899, 9 pages.
Office Action, dated Mar. 4, 2016, received in U.S. Appl. No. 14/866,992, 30 pages.
Office Action, dated Mar. 18, 2016, received in Danish Patent Application No. 201500593, which corresponds with U.S. Appl. No. 14/866,992, 10 pages.
Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Office Action, dated Feb. 3, 2016, received in U.S. Appl. No. 14/856,517, 36 pages.
Office Action, dated Feb. 11, 2016, received in U.S. Appl. No. 14/856,519, 34 pages.
Office Action, dated Feb. 1, 2016, received in U.S. Appl. No. 14/857,645, 15 pages.
Final Office Action, dated Jun. 16, 2016, received in U.S. Appl. No. 14/857,645, 12 pages.

Office Action, dated Jan. 25, 2016, received in U.S. Appl. No. 14/864,580, 29 pages.
Notice of Allowance, dated May 17, 2016, received in U.S. Appl. No. 14/152,971, 9 pages.
Office Action, dated Apr. 8, 2016, received in Danish Patent Application No. 201500584, which corresponds with U.S. Appl. No. 14/864,580, 9 pages.
Office Action, dated Apr. 19, 2016, received in U.S. Appl. No. 14/864,627, 9 pages.
Office Action, dated Apr. 8, 2016, received in Danish Patent Application No. 201500585, which corresponds with U.S. Appl. No. 14/864,627, 9 pages.
Office Action, dated Mar. 29, 2016, received in U.S. Appl. No. 14/866,361, 22 pages.
Office Action, dated Jun. 10, 2016, received in Australian Patent Application No. 2016100292, which corresponds with U.S. Appl. No. 14/866,361, 4 pages.
Office Action, dated Apr. 7, 2016, received in Danish Patent Application No. 201500579, which corresponds with U.S. Appl. No. 14/866,361, 10 pages.
Office Action, dated Mar. 22, 2016, received in Danish Patent Application No. 201500587, which corresponds with U.S. Appl. No. 14/866,987, 8 pages.
Notice of Allowance, dated Jun. 10, 2016, received in Danish Patent Application No. 201500587, which corresponds with U.S. Appl. No. 14/866,987, 2 pages.
Office Action, dated Apr. 1, 2016, received in Danish Patent Application No. 201500589, which corresponds with U.S. Appl. No. 14/866,989, 8 pages.
Notice of Allowance, dated Jun. 10, 2016, received in Danish Patent Application No. 201500589, which corresponds with U.S. Appl. No. 14/866,989, 2 pages.
Office Action, dated Apr. 11, 2016, received in U.S. Appl. No. 14/871,236, 23 pages.
Office Action, dated Jun. 28, 2016, received in U.S. Appl. No. 14/871,236, 21 pages.
Office Action, dated Apr. 8, 2016, received in Danish Patent Application No. 201500595, which corresponds with U.S. Appl. No. 14/871,236, 12 pages.
Office Action, dated May 26, 2016, received in Danish Patent Application No. 201500595, which corresponds with U.S. Appl. No. 14/871,236, 14 pages.
Office Action, dated Apr. 6, 2016, received in Danish Patent Application No. 201500596, which corresponds with U.S. Appl. No. 14/870,882, 7 pages.
Office Action, dated Jun. 9, 2016, received in Danish Patent Application No. 201500596, which corresponds with U.S. Appl. No. 14/870,882, 9 pages.
Office Action, dated Apr. 7, 2016, received in Danish Patent Application No. 201500597, which corresponds with U.S. Appl. No. 14/871,227, 7 pages.
Notice of Allowance, dated Jun. 21, 2016, received in Danish Patent Application No. 201500597, which corresponds with U.S. Appl. No. 14/871,227, 2 pages.
Office Action, dated Apr. 18, 2016, received in Danish Patent Application No. 201500601, which corresponds with U.S. Appl. No. 14/871,336, 8 pages.
Notice of Allowance, dated Apr. 18, 2016, received in Danish Patent Application No. 201500600, which corresponds with U.S. Appl. No. 14/871,462, 7 pages.
Office Action, dated Apr. 29, 2016, received in U.S. Appl. No. 14/867,823, 28 pages.
Office Action, dated Mar. 18, 2016, received in Danish Patent Application No. 201500594, which corresponds with U.S. Appl. No. 14/867,823, 10 pages.
Office Action, dated May 10, 2016, received in U.S. Appl. No. 14/867,892, 28 pages.
Office Action, dated Mar. 21, 2016, received in Danish Patent Application No. 201500598, which corresponds with U.S. Appl. No. 14/867,892, 9 pages.
Office Action, dated May 23, 2016, received in Australian Patent Application No. 2016100253, which corresponds with U.S. Appl. No. 14/867,990, 5 pages.

(56) References Cited

OTHER PUBLICATIONS

Office Action, dated Mar. 18, 2016, received in Danish Patent Application No. 201500581, which corresponds with U.S. Appl. No. 14/867,990, 9 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
International Search Report and Written Opinion dated Apr. 7, 2014, received in International Application No. PCT/US2013/069472, which corresponds to U.S. Appl. No. 14/608,895, 24 pages.
International Preliminary Report on Patentability, dated Jun. 30, 2015, received in International Patent Application No. PCT/US2013/069472, which corresponds with U.S. Appl. No. 14/608,895, 18 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
Extended European Search Report, dated Nov. 6, 2015, received in European Patent Application No. 15183980.0, which corresponds with U.S. Appl. No. 14/536,426, 7 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.
International Search Report and Written Opinion dated Mar. 12, 2014, received in International Application No. PCT/US2013/069479, which corresponds with U.S. Appl. No. 14/608,926, 14 pages.
International Preliminary Report on Patentability, dated Jun. 30, 2015, received in International Patent Application No. PCT/US2013/069479, which corresponds with U.S. Appl. No. 14/608,926, 11 pages.
International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
International Search Report and Written Opinion dated Apr. 7, 2014, received in International Application No. PCT/US2013/069483, which corresponds with U.S. Appl. No. 14/608,942, 18 pages.
International Preliminary Report on Patentability, dated Jun. 30, 2015, received in International Application No. PCT/2013/069483, which corresponds to U.S. Appl. No. 14/608,942, 13 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14/536,203, 9 pages.
International Search Report and Written Opinion dated Jul. 9, 2014, received in International Application No. PCT/US2013/069484, which corresponds with U.S. Appl. No. 14/608,965, 17 pages.
International Preliminary Report on Patentability, dated Jun. 30, 2015, received in International Patent Application No. PCT/US2013/069484, which corresponds with U.S. Appl. No. 14/608,965, 12 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
International Search Report and Written Opinion dated Jan. 27, 2014, received in International Application No. PCT/US2013/040101, which corresponds to U.S. Appl. No. 14/536,267, 30 pages.
International Preliminary Report on Patentability dated Nov. 20, 2014, received in International Application No. PCT/2013/040101, which corresponds to U.S. Appl. No. 14/536,267, 24 pages.
International Search Report and Written Opinion dated Jan. 8, 2014, received in International Application No. PCT/US2013/040108, which corresponds to U.S. Appl. No. 14/536,291, 30 pages.
International Preliminary Report on Patentability dated Nov. 20, 2014, received in International Application No. PCT/2013/040108, which corresponds to U.S. Appl. No. 14/536,291, 25 pages.
International Search Report and Written Opinion dated Jun. 2, 2014, received in International Application No. PCT/US2013/069486, which corresponds with U.S. Appl. No. 14/608,985, 7 pages.
International Preliminary Report on Patentability, dated Jun. 30, 2015, received in International Patent Application No. PCT/US2013/069486, which corresponds with U.S. Appl. No. 14/608,985, 19 pages.
International Search Report and Written Opinion dated Mar. 6, 2014, received in International Application No. PCT/US2013/069489, which corresponds with U.S. Appl. No. 14/609,006, 12 pages.
International Preliminary Report on Patentability, dated Jun. 30, 2015, received in International Patent Application No. PCT/US2013/069489, which corresponds with U.S. Appl. No. 14/609,006, 10 pages.
International Search Report and Written Opinion, dated Apr. 25, 2016, received in International Patent Application No. PCT/US2016/018758, which corresponds with U.S. Appl. No. 14/866,159, 15 pages.
Angelov, "Sponsor Flip Wall With Jquery & CSS", Tutorialzine. N.p., Mar. 24, 2010. Web. http://tutorialzine.com/2010/03/sponsor-wall-slip-jquery-css/, Mar. 24, 2010, 8 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
Anonymous, "Notifications, Android 4.4 and Lower", Android Developers, https://developer.android.com/design/patterns/notifications_k.html, May 24, 2015, 9 pages.

(56) References Cited

OTHER PUBLICATIONS

Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Cohen, Cinemagraphs are Animated Gifs for Adults, http://www.tubefilter.com/2011/07/10/cinemagraph, Jul. 10, 2011, 3 pages.
Dzyre, "10 Android Notification Features You Can Fiddle With", http://www.hongkiat.com/blog/android-notification-features, Mar. 10, 2014, 10 pages.
Elliot, "Mac System 7", YouTube. Web. Mar. 8, 2017, http://www.youtube.com/watch?v=XLv22hfuuik, Aug. 3, 2011, 1 page.
Farshad, "SageThumbs—Preview and Convert Pictures From Windows Context Menu", https://web.addictivetips.com/windows-tips/sagethumbs-preview-and-convert-photos-from-windows-context-menu, Aug. 8, 2011, 5 pages.
Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.
Gardner, "Recenz—Recent Apps in One Tap", You Tube, https://www.youtube.com/watch?v-qailSHRgsTo, May 15, 2015, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-nofificafions, Apr. 30, 2014, 26 pages.
IPodHacks 142: "Water Ripple Effects on the Home and Lock Screen: AquaBoard Cydia Tweak Review", YouTube, https://www.youtube.comwatch?v-Auu_uRaYHJs, Sep. 24, 2012, 3 pages.
Kiener, "Force Touch on iPhone", https://www.youtube.com/watch?v=CEMmnsU5fC8, Aug. 4, 2015, 4 pages.
Kost, "LR3—Deselect All Images But One", Julieanne Kost's Blog, blogs.adobe.com/jkost/2011/12/lr3-deselect-all-images-but-one.html, Dec. 22, 2011, 1 page.
Kumar, "How to Enable Ripple Effect on Lock Screen of Galaxy S2", YouTube, http, http://www.youtube.com/watch?v+B9-4M5abLXA, Feb. 12, 2013, 3 pages.
Matthew, "How to Preview Photos and Images From Right-Click Context Menue in Windows [Tip]", https://dottech.org/159009/add-image-preview-in-windows-context-menu-tip, Jul. 4, 2014, 5 pages.
Microsoft, "Lumia—How to Personalize Your Start Screen", https://www.youtube.com/watch?v=6GI5Z3TrSEs, Nov. 11, 2014, 3 pages.
Mitroff, "Google Android 5.0 Lollipop," http://www.cnet.com/products/google-android-5-0-lollipop, Mar. 12, 2015, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY, Feb. 3, 2014, 4 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
Phonebuff, "How to Pair Bluetooth on the iPhone", https://www.youtube.com/watch?v=LudNwEar9A8, Feb. 8, 2012, 3 pages.
VGJFeliz, "How to Master Android Lollipop Notifications in Four Minutes!", https://www.youtube.com/watch?v=S-zBRG7GJgs, Feb. 8, 2015, 5 pages.
Office Action, dated Mar. 15, 2017, received in U.S. Appl. No. 14/535,671, 13 pages.
Office Action, dated Oct. 18, 2016, received in Australian Patent Application No. 2013368440, which corresponds with U.S. Appl. No. 14/536,426, 3 pages.
Notice of Allowance, dated Dec. 20, 2016, received in Australian Patent Application No. 2013368440, which corresponds with U.S. Appl. No. 14/536,426, 3 pages.
Office Action, dated Jul. 21, 2016, received in European Patent Application No. 13795391.5, which corresponds with U.S. Appl. No. 14/536,426, 9 pages.
Office Action, dated Sep. 13, 2016, received in Japanese Patent Application No. 2015-547948, which corresponds with U.S. Appl. No. 14/536,426, 5 pages.
Office Action, dated Feb. 24, 2017, received in Korean Patent Application No. 10-2015-7018851, which corresponds with U.S. Appl. No. 14/536,426, 3 pages.
Certificate of Grant, dated Sep. 15, 2016, received in Australian Patent Australian Patent Application No. 2013259606, which corresponds with U.S. Appl. No. 14/536,426, 1 page.
Decision to Grant, dated Jul. 14, 2016, received in European Patent Application No. 13724100.6, which corresponds with U.S. Appl. No. 14/536,426, 1 page.
Letters Patent, dated Aug. 10, 2016, received in European Patent Application No. 13724100.6, which corresponds with U.S. Appl. No. 14/536,426, 1 page.
Office Action, dated Jan. 20, 2017, received in European Patent Application No. 15183980.0, which corresponds with U.S. Appl. No. 14/536,426, 5 pages.
Office Action, dated Feb. 6, 2017, received in Japanese Patent Application No. 2015-511644, which corresponds with U.S. Appl. No. 14/536,426, 6 pages.
Office Action, dated Mar. 9, 2017, received in U.S. Appl. No. 14/536,464, 21 pages.
Certificate of Grant, dated Jul. 29, 2016, received in Australian Patent Application No. 2013368441, which corresponds with U.S. Appl. No. 14/608,926, 1 page.
Office Action, dated Jan. 3, 2017, received in Australian Patent Application No. 2016201451, which corresponds with U.S. Appl. No. 14/608,926, 3 pages.
Office Action, dated Nov. 11, 2016, received in European Patent Application No. 13795392.3, which corresponds with U.S. Appl. No. 14/608,926, 6 pages.
Notice of Allowance, dated Jan. 17, 2017, received in Japanese Patent Application No. 2015-549392, which corresponds with U.S. Appl. No. 14/608,926, 2 pages.
Patent, dated Feb. 17, 2017, received in Japanese Patent Application No. 2015-549392, which corresponds with U.S. Appl. No. 14/608,926, 3 pages.
Notice of Allowance, dated Mar. 31, 2017, received in Korean Patent Application No. 2015-7018853, which corresponds with U.S. Appl. No. 14/608,926, 4 pages.
Notice of Allowance, dated Jul. 5, 2016, received in Australian Patent Application No. 2013259613, which corresponds with U.S. Appl. No. 14/536,646, 3 pages.
Office Action, dated Dec. 1, 2016, received in Chinese Patent Application No. 2013800362059, which corresponds with U.S. Appl. No. 14/536,646, 3 pages.
Notice of Allowance, dated Jan. 4, 2017, received in European Patent Application No. 13724102.2, which corresponds with U.S. Appl. No. 14/536,646, 5 pages.
Notice of Allowance, dated Dec. 22, 2016, received in Japanese Patent Application No. 2015-511645, which corresponds with U.S. Appl. No. 14/536,646, 2 pages.
Office Action, dated Mar. 3, 2017, received in Chinese Patent Application No. 201380035893.7, which corresponds with U.S. Appl. No. 14/536,646, 8 pages.
Notice of Allowance, dated Aug. 15, 2016, received in Australian Patent Application No. 2013259614, which corresponds with U.S. Appl. No. 14/536,141, 1 page.
Office Action, dated Aug. 31, 2016, received in European Patent Application No. 13726053.5, which corresponds with U.S. Appl. No. 14/536,141, 10 pages.
Office Action, dated Oct. 25, 2016, received in Japanese Patent Application No. 2015-511646, which corresponds with U.S. Appl. No. 14/536,141, 6 pages.
Office Action, dated Dec. 8, 2016, received in U.S. Appl. No. 14/608,942, 9 pages.
Certificate of Grant, dated Jul. 7, 2016, received in Australian Patent Application No. 2013368443, which corresponds with U.S. Appl. No. 14/536,141, 3 pages.
Office Action, dated Oct. 7, 2016, received in European Patent Application No. 13798464.7, which corresponds with U.S. Appl. No. 14/608,942, 7 pages.

(56) References Cited

OTHER PUBLICATIONS

Office Action, dated Jul. 4, 2016, received in Japanese Patent Application No. 2015549393, which corresponds with U.S. Appl. No. 14/536,141, 4 pages.
Office Action, dated Feb. 24, 2017, received in Korean Patent Application No. 2015-7018448, which corresponds with U.S. Appl. No. 14/536,141, 4 pages.
Office Action, dated Aug. 1, 2016, received in U.S. Appl. No. 14/536,203, 14 pages.
Notice of Allowance, dated Feb. 1, 2017, received in U.S. Appl. No. 14/536,203, 9 pages.
Certificate of Grant, dated Oct. 21, 2016, received in Australian Patent Application No. 2013259630, which corresponds with U.S. Appl. No. 14/536,203, 3 pages.
Notice of Allowance, dated Aug. 5, 2016, received in Japanese Patent Application No. 2015-511650, which corresponds with U.S. Appl. No. 14/536,203, 4 pages.
Certificate of Patent, dated Sep. 9, 2016, received in Japanese Patent Application No. 2015-511650, which corresponds with U.S. Appl. No. 14/536,203, 3 pages.
Notice of Allowance, dated Sep. 1, 2016, received in Korean Patent Application No. 2014-7034520, which corresponds with U.S. Appl. No. 14/536,203, 5 pages.
Office Action, dated Feb. 6, 2017, received in Korean Patent Application No. 2016-7033834, which corresponds with U.S. Appl. No. 14/536,203, 4 pages.
Office Action, dated Jul. 22, 2016, received in European Office Action No. 13798465.4, which corresponds with U.S. Appl. No. 14/608,965, 8 pages.
Final Office Action, dated Mar. 24, 2017, received in U.S. Appl. No. 14/536,247, 14 pages.
Office Action, dated Oct. 20, 2016, received in U.S. Appl. No. 14/536,247, 10 pages.
Office Action, dated Mar. 24, 2017, received in U.S. Appl. No. 14/536,267, 12 pages.
Notice of Allowance, dated Jun. 28, 2016, received in Australian Patent Application No. 2013259637, which corresponds with U.S. Appl. No. 14/536,267, 3 pages.
Certificate of Grant, dated Oct. 21, 2016, received in Australian Patent Application No. 2013259637, which corresponds with U.S. Appl. No. 14/536,267, 3 pages.
Office Action, dated Dec. 9, 2016, received in Chinese Patent Application No. 2016120601564130, which corresponds with U.S. Appl. No. 14/536,267, 4 pages.
Notice of Allowance, dated Sep. 26, 2016, received in Japanese Patent Application No. 2015-511652, which corresponds with U.S. Appl. No. 14/536,267, 5 pages.
Office Action, dated Mar. 3, 2017, received in Japanese Paten Application No. 2016-125839, which corresponds with U.S. Appl. No. 14/536,267, 6 pages.
Notice of Allowance, dated Sep. 1, 2016, received in Korean Patent Application No. 2014-7034530, which corresponds with U.S. Appl. No. 14/536,267, 3 pages.
Office Action, dated Jan. 5, 2017, received in Korean Patent Application No. 20167029533, which corresponds with U.S. Appl. No. 14/536,267, 2 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in Australian Patent Application No. 2013259642, which corresponds with U.S. Appl. No. 14/536,291, 4 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.
Office Action, dated Aug. 22, 2016, received in European Patent Application No. 13724107.1, which corresponds with U.S. Appl. No. 14/536,291, 7 pages.
Final Office Action, dated Dec. 22, 2016, received in Japanese Patent Application No. 2015-511655, which corresponds with U.S. Appl. No. 14/536,291, 3 pages.
Notice of Allowance, dated Jan. 18, 2017, received in Australian Patent Application No. 2013368445, which corresponds with U.S. Appl. No. 14/608,985, 3 pages.
Office Action, dated Jul. 25, 2016, received in European Patent Application No. 13811032.5, which corresponds with U.S. Appl. No. 14/608,985, 8 pages.
Office Action, dated Feb. 27, 2017, received in European Patent Application No. 13811032.5, which corresponds with U.S. Appl. No. 14/608,985, 6 pages.
Notice of Allowance, dated Jan. 24, 2017, received in Japanese Patent Application No. 2015-550384, which corresponds with U.S. Appl. No. 14/608,985, 5 pages.
Patent, dated Feb. 24, 2017, received in Japanese Patent Application No. 2015550384, which corresponds with U.S. Appl. No. 14/608,985, 2 pages.
Office Action, dated Nov. 4, 2016, received in Korean Patent Application No. 10-2015-7019984, which corresponds with U.S. Appl. No. 14/608,985, 8 pages.
Office Action, dated Mar. 24, 2017, received in U.S. Appl. No. 14/609,006, 13 pages.
Office Action, dated Jan. 19, 2017, received in U.S. Appl. No. 14/609,042, 12 pages.
Notice of Allowance, dated Feb. 27, 2017, received in U.S. Appl. No. 14/864,737, 9 pages.
Notice of Allowance, dated Jul. 1, 2016, received in Chinese Patent Application No. 201620214376.7, which corresponds with U.S. Appl. No. 14/864,737, 3 pages.
Patent, dated Aug. 3, 2016, received in Chinese Patent Application No. 201620214376.7, which corresponds with U.S. Appl. No. 14/864,737, 5 pages.
Certificate of Registration, dated Jun. 20, 2016, received in German Patent Application No. 202016001845.1, which corresponds with U.S. Appl. No. 14/864,737, 3 pages.
Office Action and Search Report, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.
Notice of Allowance, dated Oct. 24, 2016, received in U.S. Appl. No. 14/866,981, 7 pages.
Notice of Allowance, dated Feb. 10, 2017, received in U.S. Appl. No. 14/866,981, 5 pages.
Patent, dated Nov. 2, 2016, received in Australian Patent Application No. 2016100254, which corresponds with U.S. Appl. No. 14/866,981, 1 page.
Notice of Allowance, dated Jul. 27, 2016, received in Chinese Patent Application No. 201620176169.7, which corresponds with U.S. Appl. No. 14/866,981, 3 pages.
Patent, dated Sep. 28, 2016, received in Chinese Patent Application No. 201620176169.7, which corresponds with U.S. Appl. No. 14/866,981, 4 pages.
Certificate of Registration, dated Jun. 20, 2016, received in German Patent Application No. 202016001514.2, which corresponds with U.S. Appl. No. 14/864,737, 3 pages.
Office Action and Search Report, dated Mar. 18, 2016, received in Danish Patent Application No. 201500575, which corresponds with U.S. Appl. No. 14/866,981, 9 pages.
Office Action, dated Dec. 5, 2016, received in Danish Patent Application No. 201500575, which corresponds with U.S. Appl. No. 14/866,981, 3 pages.
Office Action, dated Jul. 5, 2016, received in Chinese Patent Application No. 201620186008.6, which corresponds with U.S. Appl. No. 14/866,159, 3 pages.
Certificate of Registration, dated Jun. 16, 2016, received in German Patent No. 202016001483.9, which corresponds with U.S. Appl. No. 14/866,159, 3 pages.

(56) References Cited

OTHER PUBLICATIONS

Office Action (Search Report), dated Mar. 9, 2016, received in Danish Patent Application No. 201500574, which corresponds with U.S. Appl. No. 14/866,159, 11 pages.
Office Action, dated Sep. 27, 2016, received in Danish Patent Application No. 201500574, which corresponds with U.S. Appl. No. 14/866,159, 4 pages.
Office Action, dated Mar. 14, 2017, received in Danish Patent Application No. 201500574, which corresponds with U.S. Appl. No. 14/866,159, 5 pages.
Innovation (Unexamined) Patent, dated Aug. 4, 2016, received in Australian Patent Application No. 2016101201, which corresponds with U.S. Appl. No. 14/686,078, 1 page.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Certificate of Registration, dated Jun. 30, 2016, received in German Patent Application No. 20201600156.9, which corresponds with U.S. Appl. No. 14/868,078, 3 pages.
Office Action (Search Report), dated Mar. 30, 2016, received in Danish Patent Application No. 201500588, which corresponds with U.S. Appl. No. 14/868,078, 9 pages.
Office Action, dated Sep. 2, 2016, received in Danish Patent Application No. 201500588, which corresponds with U.S. Appl. No. 14/868,078, 4 pages.
Notice of Allowance, dated Jan. 30, 2017, received in received in Danish Patent Application No. 201500588, which corresponds with U.S. Appl. No. 14/868,078, 2 pages.
Notice of Allowance, dated Nov. 14, 2016, received in U.S. Appl. No. 14/863,432, 7 pages.
Office Action, dated Aug. 19, 2016, received in Australian Patent Application No. 2016100647, which corresponds with U.S. Appl. No. 14/863,432, 5 pages.
Notice of Allowance, dated Jan. 12, 2017, received in Chinese Patent Application No. 201620470063.8, which corresponds with U.S. Appl. No. 14/863,432, 1 page.
Office Action (Search Report), dated Apr. 4, 2016, received in Danish Patent Application No. 201500582, which corresponds with U.S. Appl. No. 14/863,432, 10 pages.
Office Action and Additional Search Report, dated Oct. 7, 2016, received in Danish Patent Application No. 201500582, which corresponds with U.S. Appl. No. 14/863,432, 6 pages.
Office Action, dated Oct. 13, 2016, received in U.S. Appl. No. 14/866,511, 27 pages.
Final Office Action, dated Jan. 27, 2017, received in U.S. Appl. No. 14/866,511, 26 pages.
Patent, dated Aug. 8, 2016, received in Australian Patent Application 2016100653, corresponds with U.S. Appl. No. 14/866,511, 1 page.
Notice of Allowance, dated Jan. 12, 2017, received in Chinese Patent Application No. 201620470281.1, which corresponds with U.S. Appl. No. 14/866,511, 1 page.
Office Action and Search Report, dated Mar. 22, 2016, received in Danish Patent Application No. 201500576, which corresponds with U.S. Appl. No. 14/866,511, 10 pages.
Intention to Grant, dated Jun. 8, 2016, received in Danish Patent Application No. 201500576, which corresponds with U.S. Appl. No. 14/866,511, 2 pages.
Grant, dated Aug. 26, 2016, received in Danish Patent Application No. 201500576, which corresponds with U.S. Appl. No. 14/866,511, 2 pages.
Patent, dated Jan. 23, 2017, received in Danish Patent Application No. 201500576, which corresponds with U.S. Appl. No. 14/866,511, 3 pages.
Office Action, dated May 10, 2016, received in U.S. Appl. No. 14/866,489, 15 pages.
Final Office Action, dated Sep. 16, 2016, received in U.S. Appl. No. 14/866,489, 24 pages.
Office Action, dated Jun. 28, 2016, received in U.S. Appl. No. 14/869,899, 5 pages.
Final Office Action, dated Sep. 2, 2016, received in U.S. Appl. No. 14/869,899, 22 pages.
Notice of Allowance, dated Feb. 28, 2017, received in U.S. Appl. No. 14/869,899, 9 pages.
Innovation (Unexamined) Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action (Search Report), dated Feb. 3, 2016, received in Danish Patent Application No. 201500592, which corresponds with U.S. Appl. No. 14/869,899, 9 pages.
Office Action, dated Oct. 7, 2016, received in Danish Patent Application No. 201500592, which corresponds with U.S. Appl. No. 14/869,899, 6 pages.
Office Action, dated Nov. 22, 2016, received in Danish Patent Application No. 201670594, which corresponds with U.S. Appl. No. 14/869,899, 9 pages.
Final Office Action, dated Jul. 29, 2016, received in U.S. Appl. No. 14/866,992, 35 pages.
Innovation Patent, dated Sep. 22, 2016, received in Australian Patent Application No. 2016101418, which corresponds with U.S. Appl. No. 14/866,992, 1 page.
Office Action, dated Nov. 22, 2016, received in Australian Patent Application No. 2016101418, which corresponds with U.S. Appl. No. 14/866,992, 7 pages.
Office Action, dated Feb. 7, 2017, received in Australian Patent Application No. 2016101418, which corresponds with U.S. Appl. No. 14/866,992, 5 pages.
Office Action (Search Report), dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Office Action, dated Feb. 6, 2017, received in Danish Patent Application No. 201500593, which corresponds with U.S. Appl. No. 14/866,992, 4 pages.
Notice of Allowance, dated Aug. 26, 2016, received in U.S. Appl. No. 14/845,217, 5 pages.
Notice of Allowance, dated Jan. 4, 2017, received in U.S. Appl. No. 14/845,217, 5 pages.
Final Office Action, dated Jul. 13, 2016, received in U.S. Appl. No. 14/856,517, 30 pages.
Final Office Action, dated Jul. 15, 2016, received in U.S. Appl. No. 14/856,519, 31 pages.
Notice of Allowance, dated Oct. 24, 2016, received in U.S. Appl. No. 14/857,645, 6 pages.
Office Action, dated Mar. 31, 2017, received in U.S. Appl. No. 14/857,700, 14 pages.
Notice of Allowance, dated Aug. 4, 2016, received in U.S. Appl. No. 14/864,580, 9 pages.
Notice of Allowance, dated Dec. 28, 2016, received in U.S. Appl. No. 14/864,580, 8 pages.
Office Action, dated Aug. 19, 2016, received in Australian Patent Application No. 2016100648, which corresponds with U.S. Appl. No. 14/864,580, 6 pages.
Notice of Allowance, dated Nov. 8, 2016, received in Chinese Patent Application No. 201620470247.4, which corresponds with U.S. Appl. No. 14/864,580, 7 pages.
Certificate of Registration, dated Oct. 14, 2016, received in German Patent Application No. 20201600003234.9, which corresponds with U.S. Appl. No. 14/864,580, 3 pages.
Office Action, dated Oct. 7, 2016, received in Danish Patent Application No. 201500584, which corresponds with U.S. Appl. No. 14/864,580, 3 pages.
Notice of Allowance, dated Nov. 23, 2016, received in U.S. Appl. No. 14/864,601, 12 pages.

(56) References Cited

OTHER PUBLICATIONS

Notice of Allowance, dated Jan. 31, 2017, received in U.S. Appl. No. 14/864,627, 7 pages.
Office Action, dated Oct. 7, 2016, received in Danish Patent Application No. 201500585, which corresponds with U.S. Appl. No. 14/864,627, 3 pages.
Notice of Allowance, dated Jul. 19, 2016, received in U.S. Appl. No. 14/866,361, 8 pages.
Certificate of Examination, dated Dec. 8, 2016, received in Australian Patent Application No. 2016100292, which corresponds with U.S. Appl. No. 14/866,361, 1 page.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Office Action, dated Oct. 28, 2016, received in Danish Patent Application No. 201500579, which corresponds with U.S. Appl. No. 14/866,361, 3 pages.
Patent, dated Aug. 8, 2016, received in Australian Patent Application No. 2016100649, which corresponds with U.S. Appl. No. 14/866,987, 1 page.
Office Action, dated Oct. 19, 2016, received in Chinese Patent Application No. 2016201470246.X, which corresponds with U.S. Appl. No. 14/866,987, 4 pages.
Patent, dated Sep. 19, 2016, received in German Patent Application No. 202016002908.9, which corresponds with U.S. Appl. No. 14/866,987, 3 pages.
Notice of Allowance, dated Nov. 1, 2016, received in Danish Patent Application No. 201500587, which corresponds with U.S. Appl. No. 14/866,987, 2 pages.
Office Action and Search Report, dated Sep. 9, 2016, received in Danish Patent Application No. 201670463, which corresponds with U.S. Appl. No. 14/866,987, 7 pages.
Notice of Allowance, dated Jan. 31, 2017, received in Danish Patent Application No. 201670463, which corresponds with U.S. Appl. No. 14/866,987, 3 pages.
Certificate of Exam, dated Jul. 21, 2016, received in Australian Patent Application No. 2016100652, which corresponds with U.S. Appl. No. 14/866,989, 1 page.
Notice of Allowance, dated Nov. 1, 2016, received in Danish Patent Application No. 201500589, which corresponds with U.S. Appl. No. 14/866,989, 2 pages.
Final Office Action, dated Nov. 4, 2016, received in U.S. Appl. No. 14/871,236, 24 pages.
Notice of Allowance, dated Feb. 28, 2017, received in U.S. Appl. No. 14/871,236, 9 pages.
Innovation (Unexamined) Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action and Additional Search Report, dated Sep. 30, 2016, received in Danish Patent Application No. 201500595, which corresponds with U.S. Appl. No. 14/871,236, 10 pages.
Innovation (Unexamined) Patent, dated Aug. 25, 2016, received in Australian Patent Application No. 2016101436, which corresponds with U.S. Appl. No. 14/871,236, 1 pages.
Office Action, dated Oct. 31, 2016, received in Australian Patent Application No. 2016101438, which corresponds with U.S. Appl. No. 14/871,236, 6 pages.
Office Action, dated Oct. 17, 2016, received in Australian Patent Application No. 2016203040, which corresponds with U.S. Appl. No. 14/871,227, 7 pages.
Office Action, dated Oct. 18, 2016, received in Australian Patent Application No. 2016101431, which corresponds with U.S. Appl. No. 14/871,227, 3 pages.
Patent, dated Sep. 26, 2016, received in Danish Patent Application No. 201500597, which corresponds with U.S. Appl. No. 14/871,227, 7 pages.
Office Action, dated Oct. 14, 2016, received in Australian Patent Application No. 2016101437, which corresponds with U.S. Appl. No. 14/871,336, 2 pages.
Office Action, dated Oct. 18, 2016, received in Danish Patent Application No. 201500601, which corresponds with U.S. Appl. No. 14/871,336, 3 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Grant, dated Aug. 30, 2016, received in Danish Patent Application No. 201500600, which corresponds with U.S. Appl. No. 14/871,462, 2 pages.
Office Action, dated Mar. 13, 2017, received in Japanese Patent Application No. 2016-183289, which corresponds with U.S. Appl. No. 14/871,462, 5 pages.
Final Office Action, dated Sep. 28, 2016, received in U.S. Appl. No. 14/867,823, 31 pages.
Office Action, dated Sep. 7, 2016, received in Danish Patent Application No. 201500594, which corresponds with U.S. Appl. No. 14/867,823, 4 pages.
Final Office Action, dated Nov. 2, 2016, received in U.S. Appl. No. 14/867,892, 48 pages.
Office Action, Sep. 14, 2016, received in Danish Patent Application No. 201500598, which corresponds with U.S. Appl. No. 14/867,892, 4 pages.
Office Action, dated Mar. 1, 2017, received in U.S. Appl. No. 14/869,855, 14 pages.
Office Action, dated Feb. 9, 2017, received in U.S. Appl. No. 14/869,873, 17 pages.
Office Action, dated Jul. 5, 2016, received in Chinese Patent Application No. 201620176221.9, which corresponds with U.S. Appl. No. 14/867,990, 4 pages.
Office Action, dated Oct. 25, 2016, received in Chinese Patent Application No. 201620176221.9, which corresponds with U.S. Appl. No. 14/867,990, 7 pages.
Certificate of Registration, dated Jun. 16, 2016, received in German Patent No. 202016001489.8, which corresponds with U.S. Appl. No. 14/867,990, 3 pages.
Office Action, dated Sep. 26, 2016, received in Danish Patent Application No. 201500581, which corresponds with U.S. Appl. No. 14/867,990, 5 pages.
Office Action, dated Nov. 25, 2016, received in U.S. Appl. No. 15/081,771, 17 pages.
Office Action, dated Jan. 20, 2017, received in U.S. Appl. No. 15/231,745, 21 pages.
Office Action and Search Report, dated Oct. 17, 2016, received in Danish Patent Application No. 201670587, which corresponds with U.S. Appl. No. 15/231,745, 9 pages.
Office Action (Search Report), dated Dec. 14, 2016, received in Danish Patent Application No. 201670590, which corresponds with U.S. Appl. No. 15/231,745, 9 pages.
Office Action (Search Report), dated Nov. 10, 2016, received in Danish Patent Application No. 201670591, which corresponds with U.S. Appl. No. 15/231,745, 12 pages.
Office Action and Search Report, dated Oct. 26, 2016, received in Danish Patent Application No. 201670592, which corresponds with U.S. Appl. No. 15/231,745, 8 pages.
Office Action, dated Jan. 5, 2017, received in Danish Patent Application No. 201670592, which corresponds with U.S. Appl. No. 15/231,745, 3 pages.

(56) References Cited

OTHER PUBLICATIONS

Office Action and Search Report, dated Oct. 12, 2016, received in Danish Patent Application No. 201670593, which corresponds with U.S. Appl. No. 15/231,745, 7 pages.
Extended European Search Report, dated Oct. 7, 2016, received in European Patent Application No. 16177863.4, which corresponds with U.S. Appl. No. 14/536,267, 12 pages.
Extended European Search Report, dated Mar. 15, 2017, received in European Patent Application No. 17153418.3, which corresponds with U.S. Appl. No. 14/536,648, 7 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Jul. 21, 2016, received in International Patent Application No. PCT/US2016/019913, which corresponds with U.S. Appl. No. 14/868,078, 16 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Aug. 29, 2016, received in International Patent Application No. PCT/US2016/021400, which corresponds with U.S. Appl. No. 14/869,899, 48 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
International Search Report and Written Opinion, dated Feb. 27, 2017, received in International Patent Application No. PCT/US2016/046407, which corresponds with U.S. Appl. No. 15/009,688, 30 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Brownlee, "Android 5.0 Lollipop Feature Review!", https//www.youtube.com/watch?v=pEDQ1z1-PvU, Oct. 27, 2014, 5 pages.
Google-Chrome, "Android 5.0 Lollipop", http://androidlover.net/android-os/android-5-0-lollipop/android-5-0-lollipop-recent-apps-card-google-search.html, Oct. 19, 2014, 10 pages.
IPhoneOperator, "Wasser Liveeffekt fur Homescreen & Lockscreen—Aquaboard (Cydia)", http://www.youtube.com/watch?v=fG9YMF-mB0Q, Sep. 22, 2012, 3 pages.
Sood, "MultitaskingGestures", http://cydia.saurik.com/package/org.thebigboxx.multitaskinggestures/, Mar. 3, 2014, 2 pages.
YouTube, "How to Master Android Lollipop Notifications in Four Minutes!", Video Gadgets Journal (VGJFelix), https://www.youtube.com/watch?v=S-zBRG7GGJgs, Feb. 8, 2015, 4 pages.
YouTube, "Multitasking Gestures: Zephyr Like Gestures on iOS", https://www.youtube.com/watch?v=Jcod-f7Lw0I, Jan. 27, 2014, 3 pages.
Office Action, dated Jun. 29, 2017, received in U.S. Appl. No. 14/608,895, 30 pages.
Patent, dated May 12, 2017, received in Japanese Patent Application No. 2015-547948, which corresponds with U.S. Appl. No. 14/536,426, 3 pages.
Patent, dated May 26, 2017, received in Korean Patent Application No. 2015-7018851, which corresponds with U.S. Appl. No. 14/536,426, 3 pages.
Office Action, dated May 15, 2017, received in Australian Patent Application No. 2016216580, which corresponds with U.S. Appl. No. 14/536,426, 3 pages.
Final Office Action, dated Aug. 25, 2017, received in U.S. Appl. No. 14/536,464, 30 pages.
Office Action, dated May 4, 2017, received in Chinese Patent Application No. 201380068414.1, which corresponds with U.S. Appl. No. 14/608,926, 5 pages.
Patent, dated May 26, 2017, received in European Patent Application No. 13724102.2, which corresponds with U.S. Appl. No. 14/536,646, 1 page.
Notice of Allowance, dated Jun. 30, 2017, received in Japanese Patent Application No. 2015-511646, which corresponds with U.S. Appl. No. 14/536,141, 5 pages.
Patent, dated Jul. 28, 2017, received in Japanese Patent Application No. 2015-511646, which corresponds with U.S. Appl. No. 14/536,141, 3 pages.
Notice of Allowance, dated May 12, 2017, received in U.S. Appl. No. 14/608,942, 10 pages.
Office Action, dated Jun. 16, 2017, received in Chinese Patent Application No. 201380068295.X, which corresponds with U.S. Appl. No. 14/608,942, 6 pages.
Notice of Allowance, dated May 12, 2017, received in Japanese Patent Application No. 2015-549393, which corresponds with U.S. Appl. No. 14/608,942, 5 pages.
Patent, dated Jun. 16, 2017, received in Japanese Patent Application No. 2015-549393, which corresponds with U.S. Appl. No. 14/608,942, 3 pages.
Office Action, dated Jul. 4, 2017, received in Australian Patent Application No. 2016238917, which corresponds with U.S. Appl. No. 14/536,203, 5 pages.
Office Action, dated Jun. 23, 2017, received in Japanese Patent Application No. 2016173113, which corresponds with U.S. Appl. No. 14/536,203, 5 pages.
Patent, dated May 18, 2017, received in Australian Patent Application No. 2013368445, which corresponds with U.S. Appl. No. 14/608,985, 1 page.
Office Action, dated May 19, 2017, received in Chinese Patent Application No. 201380068399.0, which corresponds with U.S. Appl. No. 14/608,985, 5 pages.
Office Action, dated Apr. 19, 2017, received in U.S. Appl. No. 14/536,296, 12 pages.
Notice of Allowance, dated Jul. 10, 2017, received in U.S. Appl. No. 14/609,042, 8 pages.
Notice of Allowance, dated Jun. 19, 2017, received in U.S. Appl. No. 14/864,737, 8 pages.
Office Action, dated May 15, 2017, received in Japanese Patent Application No. 2016-558331, which corresponds with U.S. Appl. No. 14/864,737, 5 pages.
Notice of Allowance, dated Jun. 23, 2017, received in Japanese Patent Application No. 2016-558331, which corresponds with U.S. Appl. No. 14/864,737, 5 pages.
Patent, dated Jul. 28, 2017, received in Japanese Patent Application No. 2016-558331, which corresponds with U.S. Appl. No. 14/864,737, 3 pages.
Office Action, dated Jul. 7, 2017, received in Danish Patent Application No. 201500575, 4 pages.
Office Action, dated Jul. 6, 2017, received in Danish Patent Application No. 201500574, which corresponds with U.S. Appl. No. 14/866,159, 3 pages.
Notice of Allowance, dated May 2, 2017, received in received in Danish Patent Application No. 201500588, which corresponds with U.S. Appl. No. 14/868,078, 2 pages.
Notice of Allowance, dated Apr. 27, 2017, received in U.S. Appl. No. 14/863,432, 7 pages.
Office Action, dated Jun. 12, 2017, received in Danish Patent Application No. 201500582, which corresponds with U.S. Appl. No. 14/863,432, 5 pages.

(56) References Cited

OTHER PUBLICATIONS

Office Action, dated Jun. 9, 2017, received in Japanese Patent Application No. 2016558214, which corresponds with U.S. Appl. No. 14/866,511, 6 pages.
Notice of Allowance, dated Apr. 27, 2017, received in U.S. Appl. No. 14/866,489, 27 pages.
Notice of Allowance, dated Jul. 6, 2017, received in U.S. Appl. No. 14/866,489, 12 pages.
Office Action, dated Jul. 3, 2017, received in Danish Patent Application No. 201500592, which corresponds with U.S. Appl. No. 14/869,899, 5 pages.
Office Action, dated Apr. 13, 2017, received in U.S. Appl. No. 14/866,992, 34 pages.
Office Action, dated May 2, 2017, received in U.S. Appl. No. 14/856,517, 34 pages.
Office Action, dated May 18, 2017, received in U.S. Appl. No. 14/856,519, 35 pages.
Office Action, dated Jun. 9, 2017, received in U.S. Appl. No. 14/856,520, 36 pages.
Office Action, dated Jun. 30, 2017, received in U.S. Appl. No. 14/856,522, 22 pages.
Notice of Allowance, dated Jun. 16, 2017, received in in U.S. Appl. No. 14/857,645, 5 pages.
Office Action, dated May 5, 2017, received in Danish Patent Application No. 201500584, which corresponds with U.S. Appl. No. 14/864,580, 3 pages.
Notice of Allowance, dated Apr. 20, 2017, received in U.S. Appl. No. 14/864,601, 13 pages.
Office Action, dated May 5, 2017, received in Danish Patent Application No. 201500585, which corresponds with U.S. Appl. No. 14/864,627, 4 pages.
Office Action, dated Jun. 15, 2017, received in Danish Patent Application No. 201500579, which corresponds with U.S. Appl. No. 14/866,361, 2 pages.
Patent, dated May 3, 2017, received in Chinese Patent Application No. 2016201470246.X, which corresponds with U.S. Appl. No. 14/866,987, 2 pages.
Office Action, dated Apr. 19, 2017, received in Danish Patent Application No. 201670463, which corresponds with U.S. Appl. No. 14/866,987, 3 pages.
Office Action, dated Jun. 16, 2017, received in Japanese Patent Application No. 2016-233450, which corresponds with U.S. Appl. No. 14/866,989, 6 pages.
Office Action, dated Jun. 15, 2017, received in Danish Patent Application No. 201500595, which corresponds with U.S. Appl. No. 14/871,236, 4 pages.
Office Action, dated Apr. 13, 2017, received in Australian Patent Application No. 2016101431, which corresponds with U.S. Appl. No. 14/871,227, 4 pages.
Office Action, dated Mar. 24, 2017, received in Japanese Patent Application No. 2016-533201, which corresponds with U.S. Appl. No. 14/871,227, 6 pages.
Office Action, dated Apr. 11, 2017, received in Australian Paten Application No. 2016101437, which corresponds with U.S. Appl. No. 14/871,336, 4 pages.
Office Action, dated Apr. 20, 2017, received in Chinese Patent Application No. 201621044346.2, which corresponds with U.S. Appl. No. 14/871,462, 3 pages.
Office Action, dated May 11, 2017, received in U.S. Appl. No. 14/867,823, 42 pages.
Office Action, dated May 15, 2017, received in Danish Patent Application No. 201500594, which corresponds with U.S. Appl. No. 14/867,823, 4 pages.
Office Action, dated Jul. 6, 2017, received in U.S. Appl. No. 14/867,892, 55 pages.
Office Action, dated May 4, 2017, received in Danish Patent Application No. 201500598, which corresponds with U.S. Appl. No. 14/867,892, 4 pages.
Final Office Action, dated Aug. 18, 2017, received in U.S. Appl. No. 14/869,873, 20 pages.

Office Action, dated May 3, 2017, received in Danish Patent Application No. 201500581, which corresponds with U.S. Appl. No. 14/867,990, 5 pages.
Final Office Action, dated Jun. 2, 2017, received in U.S. Appl. No. 15/081,771, 17 pages.
Final Office Action, dated May 1, 2017, received in U.S. Appl. No. 15/136,782, 18 pages.
Office Action, dated May 23, 2017, received in Danish Patent Application No. 201770190, which corresponds with U.S. Appl. No. 15/136,782, 7 pages.
Office Action, dated Jun. 29, 2017, received in Danish Patent Application No. 201670587, which corresponds with U.S. Appl. No. 15/231,745, 4 pages.
Office Action, dated Jul. 6, 2017, received in Danish Patent Application No. 201670590, which corresponds with U.S. Appl. No. 15/231,745, 3 pages.
Search Report, dated Apr. 13, 2017, received in Dutch Patent Application No. 2016452, which corresponds with U.S. Appl. No. 14/864,737, 22 pages.
Search Report, dated Jun. 19, 2017, received in Dutch Patent Application No. 2016377, which corresponds with U.S. Appl. No. 14/866,159, 13 pages.
Search Report, dated Apr. 13, 2017, received in Dutch Patent Application No. 2016376, which corresponds with U.S. Appl. No. 14/868,078, 15 pages.
Extended European Search Report, dated Jun. 22, 2017, received in European Patent Application No. 16189421.7, which corresponds with U.S. Appl. No. 14/866,987, 7 pages.
Extended European Search Report, dated Jun. 8, 2017, received in European Patent Application No. 16189425.8, which corresponds with U.S. Appl. No. 14/866,989, 8 pages.
Anonymous, "Google Android 5.0 Release Date, Specs and Editors Hands on Review—CNET", http://www.cnet.com/products/google-an-android-5-0-lollipop/, Mar. 12, 2015, 10 pages.
VisioGuy, "Getting a Handle on Selecting and Subselecting Visio Shapes", http://www.visguy.com/2009/10/13/getting-a-handle-on-selecting-and-subselecting-visio-shapes/, Oct. 13, 2009, 18 pages.
YouTube, "Recentz—Recent Apps in a Tap", https://www.youtube.com/watch?v=qailSHRgsTo, May 15, 2015, 1 page.
YouTube, "HTC One Favorite Camera Features", http://www.youtube.com/watch?v=sUYHfcjl4RU, Apr. 28, 2013, 3 pages.
Office Action, dated Nov. 30, 2017, received in U.S. Appl. No. 14/535,671, 21 pages.
Certificate of Grant, dated Apr. 29, 2017, received in Australian Patent Application No. 2013368440, which corresponds with U.S. Appl. No. 14/536,426, 3 pages.
Office Action, dated Nov. 6, 2017, received in Chinese Patent Application No. 201380068493.6, which corresponds with U.S. Appl. No. 14/608,895, 5 pages.
Office Action, dated Jul. 26, 2017, received in U.S. Appl. No. 14/536,235, 14 pages.
Notice of Allowance, dated Nov. 30, 2017, received in U.S. Appl. No. 14/536,367, 9 pages.
Office action, dated Aug. 3, 2017, received in U.S. Appl. No. 14/536,426, 10 pages.
Office Action, dated Sep. 19, 2017, received in Chinese Patent Application No. 201380035982.1, which corresponds with U.S. Appl. No. 14/536,426, 5 pages.
Office Action, dated Sep. 20, 2017, received in Chinese Patent Application No. 201510566550.4, which corresponds with U.S. Appl. No. 14/536,426, 11 pages.
Office Action, dated Aug. 21, 2017, received in European Patent Application No. 15183980.0, which corresponds with U.S. Appl. No. 14/536,426, 3 pages.
Certificate of Grant, dated Nov. 10, 2017, received in Hong Kong Patent Application No. 15107535,0, which corresponds with U.S. Appl. No. 14/536,426, 2 pages.
Notice of Allowance, dated Dec. 8, 2017, received in Japanese Patent Application No. 2015-511644, which corresponds with U.S. Appl. No. 14/536,426, 6 pages.
Office Action, dated Sep. 25, 2017, received in U.S. Appl. No. 14/536,644, 29 pages.

(56) References Cited

OTHER PUBLICATIONS

Office Action, dated Oct. 19, 2017, received in U.S. Appl. No. 14/608,926, 14 pages.
Notice of Acceptance, dated Dec. 20, 2017, received in Australian Patent Application No. 2016201451, which corresponds with U.S. Appl. No. 14/608,926, 3 pages.
Office Action, dated Jul. 4, 2017, received in European Patent Application No. 13795392.3, which corresponds with U.S. Appl. No. 14/608,926, 4 pages.
Patent, dated Jun. 30, 2017, received in Korean Patent Application No. 2015-7018853, which corresponds with U.S. Appl. No. 14/608,926, 3 pages.
Office Action, dated Aug. 22, 2017, received in Korean Patent Application No. 2017-7018250, which corresponds with U.S. Appl. No. 14/608,926, 2 pages.
Notice of Allowance, dated Dec. 29, 2017, received in Korean Patent Application No. 2017-7018250, which corresponds with U.S. Appl. No. 14/608,926, 3 pages.
Notice of Allowance, dated Oct. 9, 2017, received in Chinese Patent Application No. 2013800362059, which corresponds with U.S. Appl. No. 14/536,646, 3 pages.
Office Action, dated Oct. 19, 2017, received in U.S. Appl. No. 14/536,646, 21 pages.
Notice of Allowance, dated Sep. 20, 2017, received in U.S. Appl. No. 14/536,141, 10 pages.
Office Action, dated Jul. 21, 2017, received in Australian Patent Application No. 2016262773, which corresponds with U.S. Appl. No. 14/536,141, 3 pages.
Office Action, dated Jul. 17, 2017, received in U.S. Appl. No. 14/536,166, 19 pages.
Office Action, dated Oct. 25, 2017, received in Chinese Patent Application No. 201380035977.0, which corresponds with U.S. Appl. No. 14/536,203, 5 pages.
Notice of Allowance, dated Oct. 30, 2017, received in Korean Patent Application No. 2016-7033834, which corresponds with U.S. Appl. No. 14/536,203, 5 pages.
Office Action, dated Oct. 20, 2017, received in U.S. Appl. No. 14/608,965, 14 pages.
Office action, dated Oct. 11, 2017, received in Chinese Patent Application No. 201380074060.1, which corresponds with U.S. Appl. No. 14/608,965, 5 pages.
Notice of Allowance, dated Nov. 22, 2017, received in U.S. Appl. No. 14/536,247, 6 pages.
Notice of Allowance, dated Nov. 9, 2017, received in U.S. Appl. No. 14/536,267, 8 pages.
Office Action, dated Sep. 13, 2017, received in European Patent Application No. 16177863.4, which corresponds with U.S. Appl. No. 14/536,267, 6 pages.
Notice of Allowance, dated Nov. 17, 2017, received in Japanese Patent Application No. 2016-125839, which corresponds with U.S. Appl. No. 14/536,267, 5 pages.
Notice of Allowance, dated Sep. 1, 2017, received in Korean Application No. 2016-7029533, which corresponds with U.S. Appl. No. 14/536,267, 4 pages.
Patent, dated Dec. 1, 2017, received in Korean Patent Application No. 2016-7029533, which corresponds with U.S. Appl. No. 14/536,267, 2 pages.
Notice of Allowance, dated Dec. 1, 2017, received in U.S. Appl. No. 14/536,291, 19 pages.
Office Action, dated Jul. 21, 2017, received in Australian Patent Application No. 2016216658, which corresponds with U.S. Appl. No. 14/536,291, 3 pages.
Office Action, dated Oct. 23, 2017, received in Chinese Patent Application No. 201380035986.X, which corresponds with U.S. Appl. No. 14/536,291, 9 pages.
Office Action, dated Oct. 19, 2017, received in U.S. Appl. No. 14/608,985, 13 pages.
Notice of Allowance, dated Sep. 19, 2017, received in Chinese Patent Application No. 201380068399.0, which corresponds with U.S. Appl. No. 14/608,985, 3 pages.
Patent, dated Dec. 8, 2017, received in Chinese Patent Application No. 201380068399.0, which corresponds with U.S. Appl. No. 14/608,985, 4 pages.
Summons, dated Oct. 6, 2017, received in European Patent Application No. 13811032.5, which corresponds with U.S. Appl. No. 14/608,985, 6 pages.
Notice of Allowance, dated Sep. 19, 2017, received in Korean Patent Application No. 2015-7019984, which corresponds with U.S. Appl. No. 14/608,985, 4 pages.
Final Office Action, dated Sep. 21, 2017, received in U.S. Appl. No. 14/609,006, 17 pages.
Final Office Action, dated Nov. 2, 2017, received in U.S. Appl. No. 14/536,296, 13 pages.
Office Action, dated Nov. 1, 2017, received in U.S. Appl. No. 14/536,648, 22 pages.
Office Action, dated Jul. 21, 2017, received in Australian Patent Application No. 2016247194, which corresponds with U.S. Appl. No. 14/536,648, 3 pages.
Patent, dated Jul. 12, 2017, received in Dutch Patent Application No. 2016452, which corresponds with U.S. Appl. No. 14/864,737, 2 pages.
Office Action, dated Dec. 15, 2017, received in U.S. Appl. No. 14/866,159, 35 pages.
Office Action, dated Jan. 10, 2018, received in Danish Patent Application No. 201500574, which corresponds with U.S. Appl. No. 14/866,159, 2 pages.
Patent, dated Sep. 7, 2017, received in Dutch Patent Application No. 2016377, which corresponds with U.S. Appl. No. 14/866,159, 4 pages.
Office Action, dated Oct. 6, 2017, received in U.S. Appl. No. 14/868,078, 40 pages.
Notice of Allowance, dated Sep. 1, 2017, received in Australian Patent Application No. 2016229421, which corresponds with U.S. Appl. No. 14/868,978, 3 pages.
Patent, dated Sep. 11, 2017, received in Danish Patent Application No. 201500588, which corresponds with U.S. Appl. No. 14/868,078, 5 pages.
Patent, dated Jul. 12, 2017, received in Dutch Patent Application No. 2016376, which corresponds with U.S. Appl. No. 14/868,078, 2 pages.
Notice of Allowance, dated Sep. 18, 2017, received in U.S. Appl. No. 14/863,432, 8 pages.
Grant, dated Jul. 21, 2017, received in Dutch Patent Application No. 2016801, which corresponds with U.S. Appl. No. 14/871,227, 8 pages.
Notice of Allowance, dated Oct. 4, 2017, received in U.S. Appl. No. 14/866,511, 37 pages.
Office Action, dated Nov. 24, 2017, received in European Patent Application No. 16727900.9, which corresponds with U.S. Appl. No. 14/866,511, 5 pages.
Notice of Allowance, dated Jul. 14, 2017, received in Japanese Patent Application No. 2016558214, which corresponds with U.S. Appl. No. 14/866,511, 5 pages.
Patent, dated Aug. 18, 2017, received in Japanese Patent Application No. 2016558214, which corresponds with U.S. Appl. No. 14/866,511, 3 pages.
Office Action, dated Dec. 14, 2017, received in Danish Patent Application No. 201670594, which corresponds with U.S. Appl. No. 14/869,899, 7 pages.
Final Office Action, dated Oct. 3, 2017, received in U.S. Appl. No. 14/866,992, 37 pages.
Office Action, dated Sep. 5, 2017, received in Danish Patent Application No. 201500593, which corresponds with U.S. Appl. No. 14/866,992, 6 pages.
Final Office Action, dated Oct. 4, 2017, received in U.S. Appl. No. 14/856,517, 33 pages.
Final Office Action, dated Nov. 15, 2017, received in U.S. Appl. No. 14/856,519, 31 pages.
Office Action, dated Nov. 30, 2017, received in U.S. Appl. No. 14/857,636, 19 pages.
Office Action, dated Sep. 22, 2017, received in Japanese Patent Application No. 2017-029201, which corresponds with U.S. Appl. No. 14/857,636, 8 pages.

(56) References Cited

OTHER PUBLICATIONS

Office Action, dated Dec. 1, 2017, received in U.S. Appl. No. 14/857,663, 15 pages.
Final Office Action, dated Oct. 11, 2017, received in U.S. Appl. No. 14/857,700, 13 pages.
Office Action, dated Dec. 15, 2017, received in Danish Patent Application No. 201500584, which corresponds with U.S. Appl. No. 14/864,580, 4 pages.
Office Action, dated Dec. 15, 2017, received in Danish Patent Application No. 201500585, which corresponds with U.S. Appl. No. 14/864,627, 5 pages.
Office Action, dated Jan. 4, 2018, received in Danish Patent Application No. 201500579, which corresponds with U.S. Appl. No. 14/866,361, 2 pages.
Notice of Allowance, dated Sep. 29, 2017, received in Danish Patent Application No. 201670463, which corresponds with U.S. Appl. No. 14/866,987, 2 pages.
Patent, dated Nov. 6, 2017, received in Danish Patent Application No. 201670463, which corresponds with U.S. Appl. No. 14/866,987, 6 pages.
Notice of Allowance, dated Sep. 22, 2017, received in Japanese Patent Application No. 2016-233449, which corresponds with U.S. Appl. No. 14/866,987, 5 pages.
Patent, dated Oct. 27, 2017, received in Japanese Patent Application No. 2016-233449, which corresponds with U.S. Appl. No. 14/866,987, 3 pages.
Office Action, dated Jul. 31, 2017, received in Japanese Patent Application No. 2017126445, which corresponds with U.S. Appl. No. 14/866,987, 6 pages.
Office Action, dated Nov. 29, 2017, received in U.S. Appl. No. 14/866,989, 31 pages.
Office Action, dated Sep. 1, 2017, received in U.S. Appl. No. 14/870,754, 22 pages.
Office Action, dated Nov. 14, 2017, received in U.S. Appl. No. 14/870,882, 25 pages.
Notice of Allowance, dated Oct. 31, 2017, received in Danish Patent Application No. 201500596, which corresponds with U.S. Appl. No. 14/870,882, 2 pages.
Office Action, dated Sep. 1, 2017, received in U.S. Appl. No. 14/870,988, 14 pages.
Office Action, dated Nov. 22, 2017, received in U.S. Appl. No. 14/871,227, 24 pages.
Office Action, dated Oct. 16, 2017, received in Australian Patent Application No. 2016203040, which corresponds with U.S. Appl. No. 14/871,227, 5 pages.
Office Action, dated Aug. 4, 2017, received in Japanese Patent Application No. 2016-533201, which corresponds with U.S. Appl. No. 14/871,227, 6 pages.
Notice of Allowance, dated Jan. 4, 2018, received in Japanese Patent Application No. 2016-533201, which corresponds with U.S. Appl. No. 14/871,227, 4 pages.
Office Action, dated Oct. 26, 2017, received in U.S. Appl. No. 14/871,336, 22 pages.
Office Action, dated Oct. 16, 2017, received in U.S. Appl. No. 14/871,462, 26 pages.
Office Action, dated Sep. 29, 2017, received in Australian Patent Application No. 2016231505, which corresponds with U.S. Appl. No. 14/871,462, 5 pages.
Innovation Patent, dated Oct. 11, 2017, received in Australian Patent Application No. 2016231505, which corresponds with U.S. Appl. No. 14/871,462, 1 page.
Office Action, dated Nov. 13, 2017, received in Japanese Patent Application No. 2016-183289, which corresponds with U.S. Appl. No. 14/871,462, 5 pages.
Final Office Action, dated Nov. 26, 2017, received in U.S. Appl. No. 14/867,823, 47 pages.
Final Office Action, dated Dec. 14, 2017, received in U.S. Appl. No. 14/867,892, 53 pages.
Office Action, dated Oct. 31, 2017, received in Danish Patent Application No. 201500598, which corresponds with U.S. Appl. No. 14/867,892, 2 pages.
Final Office Action, dated Oct. 10, 2017, received in U.S. Appl. No. 14/869,855, 16 pages.
Office Action, dated Jan. 11, 2018, received in U.S. Appl. No. 14/869,997, 17 pages.
Office Action, dated Dec. 12, 2017, received in U.S. Appl. No. 15/009,668, 32 pages.
Notice of Allowance, dated Dec. 4, 2017, received in U.S. Appl. No. 15/081,771, 10 pages.
Office Action, dated Aug. 29, 2017, received in Korean Patent Application No. 2017-7014536, which corresponds with U.S. Appl. No. 15/081,771, 5 pages.
Notice of Allowance, dated Oct. 20, 2017, received in U.S. Appl. No. 15/136,782, 9 pages.
Office Action, dated Jan. 8, 2018, received in Danish Patent Application No. 201770190, which corresponds with U.S. Appl. No. 15/136,782, 2 pages.
Notice of Allowance, dated Jul. 6, 2017, received in U.S. Appl. No. 15/231,745, 18 pages.
Office Action, dated Jan. 10, 2018, received in Danish Patent Application No. 201670590, which corresponds with U.S. Appl. No. 15/231,745, 2 pages.
Patent, dated Oct. 30, 2017, received in Danish Patent Application No. 201670593, which corresponds with U.S. Appl. No. 15/231,745, 3 pages.
Office Action, dated Jul. 27, 2017, received in Australian Patent Application No. 2017100535, which corresponds with U.S. Appl. No. 15/272,341, 4 pages.
Office Action, dated Aug. 4, 2017, received in Danish Patent Application No. 201770377, 9 pages.
Office Action, dated Oct. 16, 2017, received in Danish Patent Application No. 201770710, 10 pages.
Office Action, dated Aug. 30, 2017, received in U.S. Appl. No. 15/655,749, 22 pages.
Office Action, dated Oct. 31, 2017, received in U.S. Appl. No. 15/723,069, 7 pages.
Notice of Allowance, dated Dec. 21, 2017, received in U.S. Appl. No. 15/723,069, 7 pages.
Extended European Search Report, dated Nov. 24, 2017, received in European Patent Application No. 17186744.3, which corresponds with U.S. Appl. No. 14/536,291, 10 pages.
Search Report, dated Jun. 22, 2017, received in Dutch Patent Application No. 2016375, which corresponds with U.S. Appl. No. 14/866,981, 17 pages.
Extended European Search Report, dated Oct. 17, 2017, received in European Patent Application No. 17184437.6, Which corresponds with U.S. Appl. No. 14/868,078, 8 pages.
Extended European Search Report, dated Oct. 10, 2017, received in European Patent Application No. 17188507.2, which corresponds with U.S. Appl. No. 14/866,361, 9 pages.
Extended European Search Report, dated Sep. 11, 2017, received in European Patent Application No. 17163309.2, which corresponds with U.S. Appl. No. 14/866,987, 8 pages.
Extended European Search Report, dated Jul. 25, 2017, received in European Patent Application No. 17171972.7, which corresponds with U.S. Appl. No. 14/870,882, 12 pages.
Extended European Search Report, dated Jul. 25, 2017, received in European Patent Application No. 17172266.3, which corresponds with U.S. Appl. No. 14/871,336, 9 pages.
MacKenzie et al., "The Tactile Touchpad", Chi '97 Extended Abstracts on Human Factors in Computing Systems Looking to the Future, Chi '97, Mar. 22, 1997, 5 pages.
YouTube, "Android Lollipop Lock-Screen Notification Tips", https://www.youtube.com/watch?v=LZTxHBOwzIU, Nov. 13, 2014, 3 pages.
Final Office Action, dated Feb. 22, 2018, received in U.S. Appl. No. 14/608,895, 20 pages.
Final Office Action, dated Feb. 26, 2018, received in U.S. Appl. No. 14/536,235, 13 pages.
Patent, dated Jan. 12, 2018, received in Japanese Patent Application No. 2015-511644, which corresponds with U.S. Appl. No. 14/536,426, 3 pages.

(56) References Cited

OTHER PUBLICATIONS

Office Action, dated Feb. 12, 2018, received in U.S. Appl. No. 14/536,464, 33 pages.
Notice of Allowance, dated Feb. 8, 2018, received in Chinese Patent Application No. 201380068414.1, which corresponds with U.S. Appl. No. 14/608,926, 2 pages.
Oral Summons, dated Feb. 13, 2017, received in European Patent Application No. 13795392.3, which corresponds with U.S. Appl. No. 14/608,926, 11 pages.
Office Action, dated Feb. 2, 2018, received in Chinese Patent Application No. 201380035893.7, which corresponds with U.S. Appl. No. 14/536,141, 5 pages.
Notice of Allowance, dated Feb. 28, 2018, received in U.S. Appl. No. 14/536,166, 5 pages.
Office Action, dated Dec. 6, 2017, received in European Patent Application No. 13724104.8, which corresponds with U.S. Appl. No. 14/536,203, 9 pages.
Patent, dated Jan. 23, 2018, received in Korean Patent Application No. 2016-7033834, which corresponds with U.S. Appl. No. 14/536,203, 4 pages.
Notice of Allowance, dated Jan. 29, 2018, received in Chinese Patent Application No. 201380035968.1, which corresponds with U.S. Appl. No. 14/536,267, 3 pages.
Office Action, dated Jan. 25, 2018, received in European Patent Application No. 13724106.3, which corresponds with U.S. Appl. No. 14/536,267, 5 pages.
Patent, dated Dec. 19, 2017, received in Korean Patent Application No. 2015-7019984, which corresponds with U.S. Appl. No. 14/608,985, 3 pages.
Office Action, dated Feb. 14, 2018, received in Korean Patent Application No. 2017-7030129, which corresponds with U.S. Appl. No. 14/864,737, 17 pages.
Patent, Nov. 16, 2017, received in Dutch Patent Application No. 2016375, which corresponds with U.S. Appl. No. 14/866,981, 2 pages.
Certificate of Grant, dated Jan. 3, 2018, received in Australian Patent Application No. 2016229421, which corresponds with U.S. Appl. No. 14/868,078, 1 page.
Office Action, dated Jan. 29, 2018, received in Danish Patent Application No. 201500592, which corresponds with U.S. Appl. No. 14/869,899, 2 pages.
Office Action, dated Jan. 29, 2018, received in U.S. Appl. No. 14/866,992, 44 pages.
Office Action, dated Jan. 19, 2018, received in Australian Patent Application No. 201761478, which corresponds with U.S. Appl. No. 14/866,992, 6 pages.
Office Action, dated Feb. 12, 2018, received in U.S. Appl. No. 15/009,661, 36 pages.
Office Action, dated Jan. 18, 2018, received in U.S. Appl. No. 15/009,676, 21 pages.
Notice of Allowance, dated Jan. 31, 2018, received in U.S. Appl. No. 14/856,519, 9 pages.
Notice of Allowance, dated Feb. 9, 2018, received in U.S. Appl. No. 14/856,522, 9 pages.
Office Action, dated Jan. 17, 2018, received in Australian Patent Application No. 2017202816, which corresponds with U.S. Appl. No. 14/857,636, 3 pages.
Notice of Allowance, dated Feb. 12, 2018, received in U.S. Appl. No. 14/857,700, 13 pages.
Office Action, dated Jan. 22, 2018, received in U.S. Appl. No. 14/866,987, 22 pages.
Office Action, dated Feb. 26, 2018, received in Australian Patent Application No. 2017201079, which corresponds with U.S. Appl. No. 14/866,989, 6 pages.
Notice of Allowance, dated Feb. 5, 2018, received in Japanese Patent Application No. 2016-233450, which corresponds with U.S. Appl. No. 14/866,989, 5 pages.
Office Action, dated Jan. 29, 2018, received in Danish Patent Application No. 201500595, which corresponds with U.S. Appl. No. 14/871,236, 2 pages.
Patent, dated Jan. 29, 2018, received in Danish Patent Application No. 201500596, which corresponds with U.S. Appl. No. 14/870,882, 4 pages.
Final Office Action, dated Feb. 16, 2018, received in U.S. Appl. No. 14/870,988, 18 pages.
Patent, dated Feb. 9, 2018, received in Japanese Patent Application No. 2016-533201, which corresponds with U.S. Appl. No. 14/871,227, 4 pages.
Office Action, dated Feb. 20, 2018, received in Korean Patent Application No. 2016-7019816, which corresponds with U.S. Appl. No. 14/871,227, 8 pages.
Patent, dated Oct. 30, 2017, Danish Patent Application No. 201500601, which corresponds with U.S. Appl. No. 14/871,336, 5 pages.
Office Action, dated Jan. 23, 2018, received in Danish Patent Application No. 201500594, which corresponds with U.S. Appl. No. 14/867,823, 8 pages.
Notice of Allowance, dated Jan. 26, 2018, received in Danish Patent Application No. 201500598, which corresponds with U.S. Appl. No. 14/867,892, 2 pages.
Office Action, dated Feb. 28, 2018, received in U.S. Appl. No. 14/869,261, 26 pages.
Office Action, dated Jan. 23, 2018, received in U.S. Appl. No. 14/869,855, 24 pages.
Office Action, dated Jan. 18, 2018, received in U.S. Appl. No. 14/869,873, 25 pages.
Office Action, dated Feb. 19, 2018, received in Danish Patent Application No. 201500581, which corresponds with U.S. Appl. No. 14/867,990, 4 pages.
Office Action, dated Feb. 1, 2018, received in Australian Patent Application No. 2017202058, which corresponds with U.S. Appl. No. 15/081,771, 4 pages.
Office Action, dated Jan. 26, 2018, received in Japanese Patent Application No. 2017-086460, which corresponds with U.S. Appl. No. 15/081,771, 6 pages.
Office Action, dated Feb. 22, 2018, received in Danish Patent Application No. 201670587, which corresponds with U.S. Appl. No. 15/231,745, 4 pages.
Office Action, dated Jan. 30, 2018, received in Danish Patent Application No. 201670592, which corresponds with U.S. Appl. No. 15/231,745, 2 pages.
Office Action, dated Feb. 7, 2018, received in Danish Patent Application No. 201770709, 2 pages.
Search Report, dated Feb. 15, 2018, received in Dutch Patent Application No. 2019215, which corresponds with U.S. Appl. No. 14/864,529, 13 pages.
Search Report, dated Feb. 15, 2018, received in Dutch Patent Application No. 2019214, which corresponds with U.S. Appl. No. 14/864,601, 12 pages.
Anonymous, "Android—What Should Status Bar Toggle Button Behavior Be?", https://ux.stackechange.com/questions/34814, Jan. 15, 2015, 2 pages.
Anonymous, "How Do I Add Contextual Menu to My Apple Watch App?", http://www.tech-recipes.com/rx/52578/how-do-i-add-contextual-menu-to-my-apple-watch-app, Jan. 13, 2015, 3 pages.
Kleinman, "iPhone 6s Said to Sport Force Touch Display, 2GB of RAM", https://www.technobuffalo.com/2015/01/15/iphone-6s-said-to-sport-force-touch-display-2gb-of-ram, Jan. 15, 2015, 2 pages.
Intention to Grant, dated Jul. 6, 2018, received in European Patent Application No. 13795391.5, which corresponds with U.S. Appl. No. 14/536,426, 5 pages.
Notice of Allowance, dated Aug. 15, 2018, received in U.S. Appl. No. 14/536,235, 5 pages.
Notice of Allowance, dated Aug. 8, 2018, received in Chinese Patent Application No. 201510566550.4, which corresponds with U.S. Appl. No. 14/536,426, 3 pages.
Intention to Grant, dated Aug. 14, 2018, received in European Patent Application No. 15183980.0, which corresponds with U.S. Appl. No. 14/536,426, 5 pages.
Notice of Allowance, dated Aug. 9, 2018, received in U.S. Appl. No. 14/536,646, 5 pages.
Notice of Acceptance, dated Jul. 19, 2018, received in Australian Patent Application No. 2016262773, which corresponds with U.S. Appl. No. 14/536,141, 3 pages.

(56) References Cited

OTHER PUBLICATIONS

Office Action, dated Aug. 13, 2018, received in Japanese Patent Application No. 2017-141953, which corresponds with U.S. Appl. No. 14/536,141, 6 pages.
Certificate of Grant, dated Jul. 5, 2018, received in Australian patent Application No. 2016201303, which corresponds with U.S. Appl. No. 14/608,942, 4 pages.
Notice of Acceptance, dated Jul. 19, 2018, received in Australian Patent Application No. 2016238917, which corresponds with U.S. Appl. No. 14/536,203, 3 pages.
Patent, dated Jul. 6, 2018, received in Chinese Patent Application No. 201380035977.0, which corresponds with U.S. Appl. No. 14/536,203, 4 pages.
Office action, dated Aug. 1, 2018, received in Chinese Patent Application No. 201380074060.1, which corresponds with U.S. Appl. No. 14/608,965, 5 pages.
Certificate of Grant, dated Jun. 28, 2018, received in Australian Patent Application No. 2016204411, which corresponds with U.S. Appl. No. 14/536,267, 4 pages.
Notice of Acceptance, dated Jul. 19, 2018, received in Australian Patent Application No. 2016216658, which corresponds with U.S. Appl. No. 14/536,291, 3 pages.
Certificate of Grant, dated Jun. 29, 2018, received in Hong Kong Patent Application No. 15112851.6, which corresponds with U.S. Appl. No. 14/608,985, 2 pages.
Final Office Action, dated Aug. 7, 2018, received in U.S. Appl. No. 14/536,648, 14 pages.
Notice of Acceptance, dated Jul. 19, 2018, received in Australian Patent Application No. 2016247194, which corresponds with U.S. Appl. No. 14/536,648, 3 pages.
Notice of Allowance, dated Aug. 3, 2018, received in U.S. Appl. No. 15/009,676, 6 pages.
Office Action, dated Jul. 19, 2018, received in Russian Patent Application No. 2017131408, which corresponds with U.S. Appl. No. 14/871,236, 8 pages.
Notice of Allowance, dated Jul. 12, 2018, received in U.S. Appl. No. 14/870,882, 5 pages.
Notice of Allowance, dated Aug. 7, 2018, received in U.S. Appl. No. 14/867,823, 8 pages.
Notice of Allowance, dated Jul. 30, 2018, received in U.S. Appl. No. 14/869,873, 8 pages.
Certificate of Grant, dated Jun. 28, 2018, received in Australian Patent Application No. 2018200705, which corresponds with U.S. Appl. No. 15/272,327, 4 pages.
Notice of Allowance, dated Jul. 30, 2018, received in Japanese Patent Application No. 2018-506989, which corresponds with U.S. Appl. No. 15/272,327, 4 pages.
Certificate of Grant, dated Jun. 28, 2018, received in Australian Patent Application No. 2016304832, which corresponds with U.S. Appl. No. 15/272,345, 4 pages.
Notice of Allowance, dated Aug. 15, 2018, received in U.S. Appl. No. 15/482,618, 7 pages.
Extended European Search Report, dated Jul. 30, 2018, received in European Patent Application No. 18180503.7, which corresponds with U.S. Appl. No. 14/536,426, 7 pages.
Extended European Search Report, dated Aug. 17, 2018, received in European Patent Application No. 18175195.9, which correpsponds with U.S. Appl. No. 14/869,899, 13 pages.
Extended European Search Report, dated Aug. 2, 2018, received in European Patent Application No. 18168941.5, which corresponds with U.S. Appl. No. 14/871,236, 11 pages.
Anonymous, "1-Click Installer for Windows Media Taskbar Mini-Player for Windows 7, 8, 8.1 10", http://metadataconsulting.blogspot.de/2014/05/installer-for-windows-media-taskbar.htm, May 5, 2014, 6 pages.
Anonymous, "[new] WMP12 with Taskbar Toolbar for Windows 7—Windows Customization—WinMatrix", hrrp://www.winmatrix.com/forums/index/php?/topic/25528-new-wmp12-with-taskbar-toolbar-for-windows-7, Jan. 27, 2013, 6 pages.

Anonymous, "Taskbar Extensions", https://web.archive.org/web/20141228124434/http://msdn.microsoft.com:80/en-us/library/windows/desktop/dd378460(v=vs.85).aspx, Dec. 28, 2014, 8 pages.
Easton-Ellett, "Three Free Cydia Utilities to Remove iOS Notification Badges", http://www.ijailbreak.com/cydia/three-free-cydia-utilies-to-remove-ios-notification-badges, Apr. 14, 2012, 2 pages.
IPhoneHacksTV, "Confero allows you to easily manage your Badge notifications—iPhone Hacks", youtube, https://wwwyoutube.com/watch?v=JCk61pnL4SU, Dec. 26, 2014, 3 pages.
Mandi, Confero now available in Cydia, brings a new way to manage Notification badges [Jailbreak Tweak], http://www.iphonehacks.com/2015/01/confero/tweak-manage-notification-badges.html, Jan. 1, 2015, 2 pages.
Oh, et al., "Moving Objects with 2D Input Devices in CAD Systems and Destop Virtual Environments", Proceedings of Graphics Interface 2005, 8 pages, May 2005.
Ritchie, "How to see all the unread message notifications on your iPhone, all at once, all in the same place | iMore", https://www.imore.com/how-see-all-unread-message-notifications-your-iphone-all-once-all-same-place, Feb. 22, 2014, 2 pages.
Stewart, et al., "Characteristics of Pressure-Based Input for Mobile Devices", Proceedings of the SIGCHI Conference on Human Factors in Computing Systems, Apr. 2010, 10 pages.
Notice of Allowance, dated Jun. 26, 2018, received in U.S. Appl. No. 14/608,895, 9 pages.
Office Action, dated Mar. 9, 2018, received in European Patent Application No. 13795391.5, which corresponds with U.S. Appl. No. 14/536,426, 4 pages.
Notice of Allowance, dated May 16, 2018, received in U.S. Appl. No. 14/536,367, 5 pages.
Office Action, dated May 8, 2018, received in Australian Patent Application No. 2016216580, which corresponds with U.S. Appl. No. 14/536,426, 5 pages.
Notice of Allowance, dated May 17, 2018, received in Australian Patent Application No. 2016216580, which corresponds with U.S. Appl. No. 14/536,426, 3 pages.
Notice of Allowance, dated May 10, 2018, received in Chinese Patent Application No. 201380035982.1, which corresponds with U.S. Appl. No. 14/536,426, 2 pages.
Intention to Grant, dated Mar. 9, 2018, received in European Patent Application No. 15183980.0, which corresponds with U.S. Appl. No. 14/536,426, 5 pages.
Final Office Action, dated Jun. 22, 2018, received in U.S. Appl. No. 14/536,464, 32 pages.
Final Office Action, dated May 3, 2018, received in U.S. Appl. No. 14/536,644, 28 pages.
Final Office Action, dated Jun. 6, 2018, received in U.S. Appl. No. 14/608,926, 19 pages.
Certificate of Grant, dated May 3, 2018, received in Australian Patent Application No. 2016201451, which corresponds with U.S. Appl. No. 14/608,926, 1 page.
Patent, dated May 4, 2018, received in Chinese Patent Application No. 201380068414.1, which corresponds with U.S. Appl. No. 14/608,926, 4 pages.
Patent, dated Apr. 27, 2018, received in Japanese Patent Application No. 2017024234, which corresponds with U.S. Appl. No. 14/608,926, 3 pages.
Office Action, dated Apr. 9, 2018, received in European Patent Application No. 13726053.5, which corresponds with U.S. Appl. No. 14/536,141, 9 pages.
Notice of Acceptance, dated Mar. 7, 2018, received in Australian patent Application No. 2016201303, which corresponds with U.S. Appl. No. 14/608,942, 3 pages.
Office Action, dated Mar. 28, 2018, received in Chinese Patent Application No. 201380068295.X, which corresponds with U.S. Appl. No. 14/608,942, 5 pages.
Notice of Allowance, dated Apr. 4, 2018, received in Chinese Patent Application No. 201380035977.0, which corresponds with U.S. Appl. No. 14/536,203, 3 pages.
Patent, dated Feb. 16, 2018, received in Japanese Patent Application No. 2016173113, which corresponds with U.S. Appl. No. 14/536,203, 3 pages.

(56) References Cited

OTHER PUBLICATIONS

Office Action, dated Jul. 2, 2018, received in U.S. Appl. No. 14/608,965, 16 pages.
Oral Proceedings, dated Mar. 7, 2018, received in European Office Action No. 13798465.4, which corresponds with U.S. Appl. No. 14/608,965, 5 pages.
Notice of Allowance, dated Jun. 1, 2018, received in U.S. Appl. No. 14/536,267, 5 pages.
Notice of Acceptance, dated Feb. 27, 2018, received in Australian Patent Application No. 2016204411, which corresponds with U.S. Appl. No. 14/536,267, 3 pages.
Patent, dated Apr. 20, 2018, received in Chinese Patent Application No. 201380035968.1, which corresponds with U.S. Appl. No. 14/536,267, 4 pages.
Office Action, dated Jun. 13, 2018, received in Chinese Patent Application No. 201810332044.2, which corresponds with U.S. Appl. No. 14/536,267, 2 pages.
Intention to Grant, dated Jun. 27, 2018, received in European Patent Application No. 13724106.3, which corresponds with U.S. Appl. No. 14/536,267, 5 pages.
Notice of Allowance, dated Mar. 20, 2018, received in U.S. Appl. No. 14/536,291, 5 pages.
Office Action, dated Jun. 29, 2018, received in Japanese Patent Application No. 2017-083027, which corresponds with U.S. Appl. No. 14/536,291, 5 pages.
Notice of Allowance, dated Apr. 20, 2018, received in U.S. Appl. No. 14/608,985, 5 pages.
Office Action, dated Mar. 20, 2018, received in U.S. Appl. No. 14/609,006, 13 pages.
Notice of Allowance, dated Mar. 14, 2018, received in U.S. Appl. No. 14/536,296, 8 pages.
Office Action, dated Apr. 27, 2018, received in Japanese Patent Application No. 2017-008764, which corresponds with U.S. Appl. No. 14/536,648, 5 pages.
Office Action, dated Apr. 16, 2018, received in Australian Patent Application No. 2016233792, which corresponds with U.S. Appl. No. 14/864,737, 2 pages.
Decision to grant, dated Mar. 29, 2018, received in European Patent Application No. 16710871.1, which corresponds with U.S. Appl. No. 14/864,737, 2 pages.
Grant Certificate, dated Apr. 25, 2018, received in European Patent Application No. 16710871.1, which corresponds with U.S. Appl. No. 14/864,737, 2 pages.
Notice of Allowance, dated May 18, 2018, received in U.S. Appl. No. 14/866,159, 8 pages.
Office Action, dated Jun. 5, 2018, received in Chinese Patent Application No. 201610137839.9, which corresponds with U.S. Appl. No. 14/866,159, 11 pages.
Notice of Allowance, dated Mar. 21, 2018, received in Danish Patent Application No. 201500574, which corresponds with U.S. Appl. No. 14/866,159, 2 pages.
Patent, dated May 22, 2018, received in Danish Patent Application No. 201500574, which corresponds with U.S. Appl. No. 14/866,159, 2 pages.
Notice of Allowance, dated May 24, 2018, received in U.S. Appl. No. 14/868,078, 6 pages.
Office Action, dated Apr. 25, 2018, received in European Patent Application No. 16708916.8, which corresponds with U.S. Appl. No. 14/868,078, 6 pages.
Office Action, dated May 24, 2018, received in European Patent Application No. 16727900.9, which corresponds with U.S. Appl. No. 14/866,511, 7 pages.
Notice of Allowance, dated Apr. 24, 2018, received in Danish Patent Application No. 201500592, which corresponds with U.S. Appl. No. 14/869,899, 2 pages.
Patent, dated May 28, 2018, received in Danish Patent Application No. 201500592, which corresponds with U.S. Appl. No. 14/869,899, 2 pages.
Office Action, dated May 1, 2018, received in Danish Patent Application No. 201670594, which corresponds with U.S. Appl. No. 14/869,899, 2 pages.
Office Action, dated Mar. 26, 2018, received in Australian Patent Application No. 2016304890, which corresponds with U.S. Appl. No. 14/866,992, 3 pages.
Notice of Allowance, dated Jun. 29, 2018, received in U.S. Appl. No. 14/856,517, 11 pages.
Notice of Allowance, dated May 2, 2018, received in U.S. Appl. No. 14/856,519, 10 pages.
Final Office Action, dated Nov. 16, 2017, received in U.S. Appl. No. 14/856,520, 41 pages.
Office Action, dated Jun. 25, 2018, received in Japanese Patent Application No. 2017-029201, which corresponds with U.S. Appl. No. 14/857,636, 4 pages.
Notice of Allowance, dated Apr. 9, 2018, received in U.S. Appl. No. 14/857,700, 7 pages.
Notice of Allowance, dated Apr. 19, 2018, received in U.S. Appl. No. 14/864,529, 11 pages.
Grant of Patent, dated Apr. 16, 2018, received in Dutch Patent Application No. 2019215, 2 pages.
Notice of Allowance, dated Mar. 16, 2018, received in Danish Patent Application No. 201500579, which corresponds with U.S. Appl. No. 14/866,361, 2 pages.
Patent, dated May 22, 2018, received in Danish Patent Application No. 201500579, which corresponds with U.S. Appl. No. 14/866,361, 2 pages.
Office Action, dated Jun. 11, 2018, received in European Patent Application No. 17188507.2, which corresponds with U.S. Appl. No. 14/866,361, 10 pages.
Office Action, dated May 7, 2018, received in European Patent Application No. 16189421.7, which corresponds with U.S. Appl. No. 14/866,987, 5 pages.
Notice of Allowance, dated Mar. 6, 2018, received in Japanese Patent Application No. 2017-126445, which corresponds with U.S. Appl. No. 14/866,987, 5 pages.
Patent, dated Apr. 6, 2018, received in Japanese Patent Application No. 2017-126445, which corresponds with U.S. Appl. No. 14/866,987, 3 pages.
Final Office Action, dated Jul. 3, 2018, received in U.S. Appl. No. 14/866,989, 17 pages.
Patent, dated Mar. 9, 2018, received in Japanese Patent Application No. 2016-233450, which corresponds with U.S. Appl. No. 14/866,989, 4 pages.
Notice of Allowance, dated Apr. 26, 2018, received in Danish Patent Application No. 201500595, which corresponds with U.S. Appl. No. 14/871,236, 2 pages.
Patent, dated Jun. 18, 2018, received in Danish Patent Application No. 201500595, which corresponds with U.S. Appl. No. 14/871,236, 3 pages.
Final Office Action, dated Mar. 9, 2018, received in U.S. Appl. No. 14/870,754, 19 pages.
Notice of Allowance, dated Jul. 2, 2018, received in U.S. Appl. No. 14/870,754, 9 pages.
Final Office Action, dated Apr. 20, 2018, received in U.S. Appl. No. 14/870,882, 7 pages.
Notice of Allowance, dated Jun. 11, 2018, received in U.S. Appl. No. 14/871,227, 11 pages.
Final Office Action, dated Mar. 15, 2018, received in U.S. Appl. No. 14/871,336, 23 pages.
Office Action, dated Apr. 2, 2018, received in Japanese Patent Application No. 2018-020324, which corresponds with U.S. Appl. No. 14/874,336, 4 pages.
Notice of Allowance, dated Apr. 18, 2018, received in U.S. Appl. No. 14/867,823, 10 pages.
Office Action, dated Apr. 24, 2018, received in U.S. Appl. No. 14/867,892, 63 pages.
Notice of Allowance, dated May 31, 2018, received in U.S. Appl. No. 14/869,855, 10 pages.
Final Office Action, dated May 23, 2018, received in U.S. Appl. No. 14/869,873, 18 pages.
Notice of Allowance, dated Mar. 30, 3018, received in U.S. Appl. No. 14/867,990, 5 pages.

(56) References Cited

OTHER PUBLICATIONS

Office Action, dated Apr. 19, 2018, received in U.S. Appl. No. 14/869,703, 19 pages.
Final Office Action, dated Jul. 3, 2018, received in U.S. Appl. No. 15/009,668, 19 pages.
Notice of Allowance, dated Jun. 28, 2018, received in Korean Patent Application No. 2017-7014536, which corresponds with U.S. Appl. No. 15/081,771, 4 pages.
Office Action, dated May 4, 2018, received in Australian Patent Application No. 2018202855, which corresponds with U.S. Appl. No. 15/136,782, 3 pages.
Notice of Allowance, dated Mar. 19, 2018, received in Danish Patent Application No. 201770190, which corresponds with U.S. Appl. No. 15/136,782, 2 pages.
Patent, dated May 22, 2018, received in Danish Patent Application No. 201770190, which corresponds with U.S. Appl. No. 15/136,782, 2 pages.
Office Action, dated Jun. 1, 2018, received in Japanese Patent Application No. 2018-062161, which corresponds with U.S. Appl. No. 15/136,782, 5 pages.
Patent, dated May 28, 2018, received in Danish Patent Application No. 201670590, which corresponds with U.S. Appl. No. 15/231,745, 2 pages.
Office Action, dated Apr. 11, 2018, received in Danish Patent Application No. 201670591, which corresponds with U.S. Appl. No. 15/231,745, 3 pages.
Notice of Allowance, dated Mar. 27, 2018, received in Danish Patent Application No. 201670592, which corresponds with U.S. Appl. No. 15/231,745, 2 pages.
Patent, dated May 28, 2018, received in Danish Patent Application No. 201670592, which corresponds with U.S. Appl. No. 15/231,745, 2 pages.
Notice of Acceptance, dated Mar. 2, 2018, received in Australian Patent Application No. 2018200705, which corresponds with U.S. Appl. No. 15/272,327, 3 pages.
Notice of Acceptance, dated Mar. 2, 2018, received in Australian Patent Application No. 2016304832, which corresponds with U.S. Appl. No. 15/272,345, 3 pages.
Office Action, dated Apr. 20, 2018, received in European Patent Application No. 16756862.5, which corresponds with U.S. Appl. No. 15/272,345, 15 pages.
Office Action, dated Mar. 7, 2018, received in U.S. Appl. No. 15/482,618, 7 pages.
Office Action, dated Apr. 23, 2018, received in U.S. Appl. No. 15/499,691, 29 pages.
Final Office Action, dated May 10, 2018, received in U.S. Appl. No. 15/655,749, 19 pages.
International Preliminary Report on Patentability, dated Sep. 12, 2017, received in International Patent Application No. PCT/US2016/021400, which corresponds with U.S. Appl. No. 14/869,899, 39 pages.
International Preliminary Report on Patentability, dated Feb. 13, 2018, received in International Patent Application No. PCT/US2016/046407, which corresponds with U.S. Appl. No. 15/009,688, 20 pages.
Extended European Search Report, dated May 30, 2018, received in International Patent Application No. 18155939.4, which corresponds with U.S. Appl. No. 15/272,327, 8 pages.
Extended European Search Report, dated Mar. 2, 2018, received in European Patent Application No. 17206374.5, which corresponds with U.S. Appl. No. 15/272,343, 11 pages.
Anonymous, "Event Handling Guide for iOS", https://github.com/lonfee88/iOSDevelopeLibrary/raw/master/EventHandlingiPhoneOS.pdf, Mar. 9, 2015, 74 pages.
Anonymous, "Event Handling Guide for iOS—GitHub", https://github.com/lonfee88/iOSDevelopeLibrary/blob/master/EventHandlingiPhoneOS.pdf, Apr. 15, 2015, 3 pages.
Bilibili, "Android 5.0 Lollipop", https://www.bilibili.com/video/av1636064?from=search&seid=312814023577885126, Oct. 19, 2014, 3 pages.
Dachis, "All the Awesome Things You Can Do With a Long Press on Your iPhone, iPad, or iPad Touch", www.lifehacker.com, Jan. 25, 2012, 4 pages.
McGarry, "Everything You Can Do With Force Touch on Apple Watch", Macworld, www.macworld.com, May 6, 2015, 4 pages.
YouTube, "How to Use 3D Touch Multitasking on iPhone", https://www.youtube.com/watch?v=kDq05uRdrCg, Sep. 29, 2015, 1 page.
Notice of Allowance, dated Sep. 5, 2018, received in U.S. Appl. No. 14/535,671, 5 pages.
Office Action, dated Oct. 9, 2018, received in Chinese Patent Application No. 201380068493.6, which corresponds with U.S. Appl. No. 14/608,895, 3 pages.
Office Action, dated Oct. 5, 2018, received in Korean Patent Application No. 2018-7028236, which corresponds with U.S. Appl. No. 14/608,895, 6 pages.
Certificate of Grant, dated Sep. 13, 2018, received in Australian Patent Application No. 2016216580, which corresponds with U.S. Appl. No. 14/536,426, 1 page.
Patent, dated Aug. 17, 2018, received in Chinese Patent Application No. 201380035982.1, which corresponds with U.S. Appl. No. 14/536,426, 4 pages.
Notice of Allowance, dated Aug. 31, 2018, received in Chinese Patent Application No. 201380035893.7, which corresponds with U.S. Appl. No. 14/536,141, 6 pages.
Office Action, dated Oct. 8, 2018, received in Chinese Patent Application No. 201380068295.X, which corresponds with U.S. Appl. No. 14/608,942, 3 pages.
Decision to Grant, dated Sep. 13, 2018, received in European Patent Application No. 13798464.7, which corresponds with U.S. Appl. No. 14/608,942, 2 pages.
Office Action, dated Oct. 19, 2018, received in Japanese Patent Application No. 2018-022394, which corresponds with U.S. Appl. No. 14/536,203, 4 pages.
Decision to Grant, dated Sep. 6, 2018, received in European Office Action No. 13798465.4, which corresponds with U.S. Appl. No. 14/608,965, 2 pages.
Decision to Grant, dated Oct. 18, 2018, received in European Patent Application No. 13724106.3, which corresponds with U.S. Appl. No. 14/536,267, 3 pages.
Office Action, dated Oct. 11, 2018, received in U.S. Appl. No, 14/609,006, 12 pages.
Office Action, dated Aug. 24, 2018, received in Japanese Patent Application No. 2017-113598, which corresponds with U.S. Appl. No. 14/609,042, 6 pages.
Office Action, dated Sep. 11, 2018, received in Chinese Patent Application No. 201610159295.6, which corresponds with U.S. Appl. No. 14/864,737, 6 pages.
Office Action, dated Aug. 20, 2018, received in Chinese Patent Application No. 01610130348.1, which corresponds with U.S. Appl. No. 14/868,078, 6 pages.
Notice of Acceptance, dated Aug. 23, 2018, received in Australian Patent Application No. 2018204611, which corresponds with U.S. Appl. No. 14/869,899, 3 pages.
Office Action, dated Oct. 9, 2018, received in Danish Patent Application No. 201670594, which corresponds with U.S. Appl. No. 14/869,899, 2 pages.
Office Action, dated Sep. 21, 2018, received in Japanese Patent Application No. 2018-100827, which corresponds with U.S. Appl. No. 14/869,899, 4 pages.
Office Action, dated Oct. 5, 2018, received in Korean Patent Application No. 2018-7017213, which corresponds with U.S. Appl. No. 14/869,899, 3 pages.
Final Office Action, dated Aug. 28, 2018, received in U.S. Appl. No. 14/866,992, 52 pages.
Office Action, dated Oct. 12, 2018, received in European Patent Application No. 16758008.3, which corresponds with U.S. Appl. No. 14/866,992, 11 pages.
Final Office Action, dated Sep. 19, 2018, received in U.S. Appl. No. 15/009,661, 28 pages.
Notice of Allowance, dated Aug. 16, 2018, received in U.S. Appl. No. 14/857,636, 5 pages.
Notice of Allowance, dated Aug. 16, 2018, received in U.S. Appl. No. 14/857,663, 5 pages.

(56) References Cited

OTHER PUBLICATIONS

Notice of Allowance, dated Oct. 9, 2018, received in U.S. Appl. No. 14/864,529, 11 pages.
Office Action, dated Aug. 31, 2018, received in Australian Patent Application No. 2016276030, which corresponds with U.S. Appl. No. 14/864,601, 3 pages.
Office Action, dated Oct. 12, 2018, received in Japanese Patent Application No. 2017-141962, which corresponds with U.S. Appl. No. 14/866,361, 6 pages.
Office Action, dated Sep. 14, 2018, received in Korean Patent Application No. 2018-7013039, which corresponds with U.S. Appl. No. 14/866,361, 2 pages.
Final Office Action, dated Oct. 11, 2018, received in U.S. Appl. No. 14/866,987, 20 pages.
Office Action, dated Sep. 19, 2018, received in Chinese Patent Application No. 201610342314.9, which corresponds with U.S. Appl. No. 14/866,989, 6 pages.
Notice of Allowance, dated Aug. 27, 2018, received in U.S. Appl. No. 14/870,988, 11 pages.
Office Action, dated Oct. 11, 2018, received in Australian Patent Application No. 2017245442, which corresponds with U.S. Appl. No. 14/871,227, 4 pages.
Intent to Grant, dated Sep. 17, 2018, received in European Patent No. 16711743.1, which corresponds with U.S. Appl. No. 14/871,227, 5 pages.
Notice of Allowance, dated Oct. 1, 2018, received in Korean Patent Application No. 2016-7019816, which corresponds with U.S. Appl. No. 14/871,227, 6 pages.
Notice of Allowance, dated Oct. 12, 2018, received in Japanese Patent Application No. 2018-020324, which corresponds with U.S. Appl. No. 14/871,336, 5 pages.
Final Office Action, dated Oct. 17, 2018, received in U.S. Appl. No. 14/867,892, 48 pages.
Final Office Action, dated Oct. 4, 2018, received in U.S. Appl. No. 14/869,361, 28 pages.
Office Action, dated Sep. 7, 2018, received in U.S. Appl. No. 14/869,997, 23 pages.
Notice of Allowance, dated Oct. 12, 2018, received in Japanese Patent Application No. 2017-086460, which corresponds with U.S. Appl. No. 15/081,771, 5 pages.
Patent, dated Sep. 28, 2018, received in Korean Patent Application No. 2017-7014536, which corresponds with U.S. Appl. No. 15/081,771, 3 pages.
Notice of Acceptance, dated Sep. 10, 2018, received in Australian Patent Application No. 2018202855, which corresponds with U.S. Appl. No. 15/136,782, 3 pages.
Notice of Allowance, dated Oct. 4, 2018, received in U.S. Appl. No. 15/272,327, 46 pages.
Office Action, dated Sep. 14, 2018, received in European Patent Application No. 15155939.4, which corresponds with U.S. Appl. No. 15/272,327, 5 pages.
Patent, dated Aug. 31, 2018, received in Japanese Patent Application No. 2018-506989, which corresponds with U.S. Appl. No. 15/272,327, 3 pages.
Notice of Allowance, dated Sep. 20, 2018, received in U.S. Appl. No. 15/272,343, 44 pages.

Office Action, dated Oct. 15, 2018, received in U.S. Appl. No. 15/272,345. 31 pages.
Notice of Allowance, dated Oct. 12, 2018, received in U.S. Appl. No. 15/499,693, 8 pages.
Extended European Search Report, dated Aug. 24, 2018, received in European Patent Application No. 18171453.6, which corresponds with U.S. Appl. No. 15/136,782, 9 pages.
Office Action, dated Nov. 2, 2018, received in U.S. Appl. No. 14/536,644, 24 pages.
Notice of Allowance, dated Nov. 15, 2018, received in U.S. Appl. No. 15/009,676, 6 pages.
Office Action, dated Nov. 5, 2018 received in U.S. Appl. No. 14/871,336, 24 pages.
Final Office Action, dated Oct. 26, 2018, received in U.S. Appl. No. 14/869,703, 19 pages.
Office Action, dated Oct. 26, 2018, received in U.S. Appl. No. 15/272,341, 22 pages.
Nickinson, "How to use Do Not Disturb on the HTC One M8", Android Central (Year: 2014), Apr. 7, 2014, 9 pages.
Ogino, iOS 7 Design Standard, Japan, Impress Japan Corporation, Nov. 21, 2013, 1st edition, pp. 58-059.
Office Action, dated Nov. 6, 2018, received in Japanese Patent Application No. 2018-000753, which corresponds with U.S. Appl. No. 14/536,426, 8 pages.
Certificate of Grant, dated Nov. 1, 2018, received in Australian Patent Application No. 2016238917, which corresponds with U.S. Appl. No. 14/536,203, 1 page.
Decision to Grant, dated Oct. 24, 2018, received in European Patent Application No. 13724104.8, which corresponds with U.S. Appl. No. 14/536,203, 5 pages.
Office action, dated Nov. 1, 2018, received in Chinese Patent Application No. 201380074060.1, which corresponds with U.S. Appl. No. 14/608,965, 3 pages.
Office Action, dated Nov. 5, 2018, received in Chinese Patent Application No. 201610131415.1, which corresponds with U.S. Appl. No. 14/866,981, 6 pages.
Office Action, dated Oct. 25, 2018, received in European Patent Application No. 17184437.6, which corresponds with U.S. Appl. No. 14/868,078, 6 pages.
Office Action, dated Nov. 7, 2018, received in Chinese Patent Application No. 201610342151.4, which corresponds with U.S. Appl. No. 14/864,580, 3 pages.
Office Action, dated Oct. 19, 2018, received in Chinese Patent Application No. 201610189298.4, which corresponds with U.S. Appl. No. 14/866,361, 6 pages.
Notice of Acceptance, dated Oct. 30, 2018, received in Australian Patent Application No. 2016203040, which corresponds with U.S. Appl. No. 14/871,227, 4 pages.
Office Action, dated Nov. 12, 2018, received in Japanese Patent Application No. 2018-062161, which corresponds with U.S. Appl. No. 15/136,782, 5 pages.
Office Action, dated Oct. 31, 2018, received in Korean Patent Application No. 2018-7020659, which corresponds with U.S. Appl. No. 15/136,782, 5 pages.
Extended European Search Report, dated Oct. 30, 2018, received in European Patent Application No. 18183789.9, which corresponds with U.S. Appl. No. 14/536,267, 11 pages.

\* cited by examiner

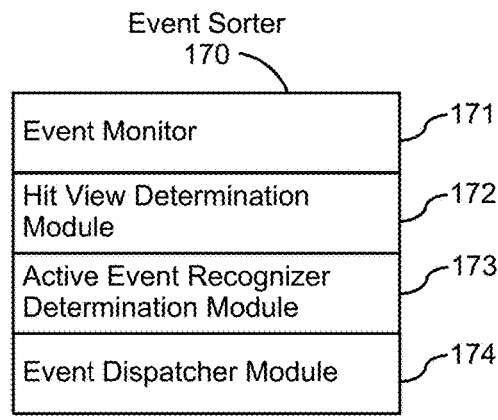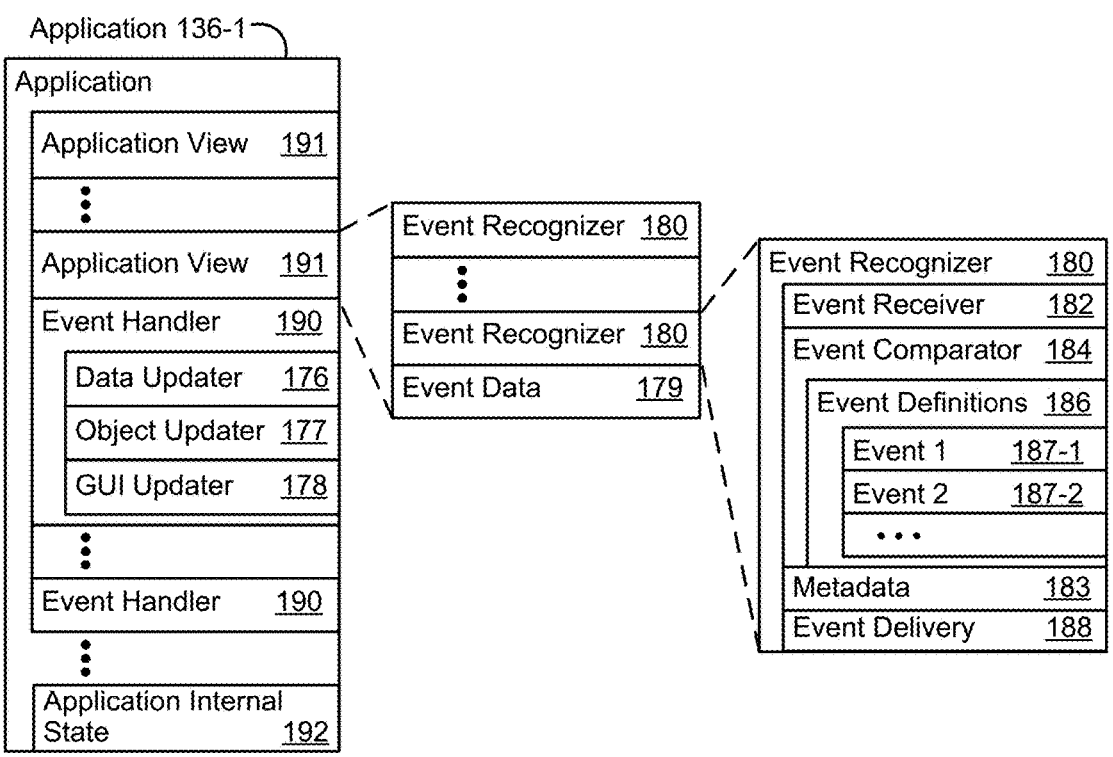
Figure 1B

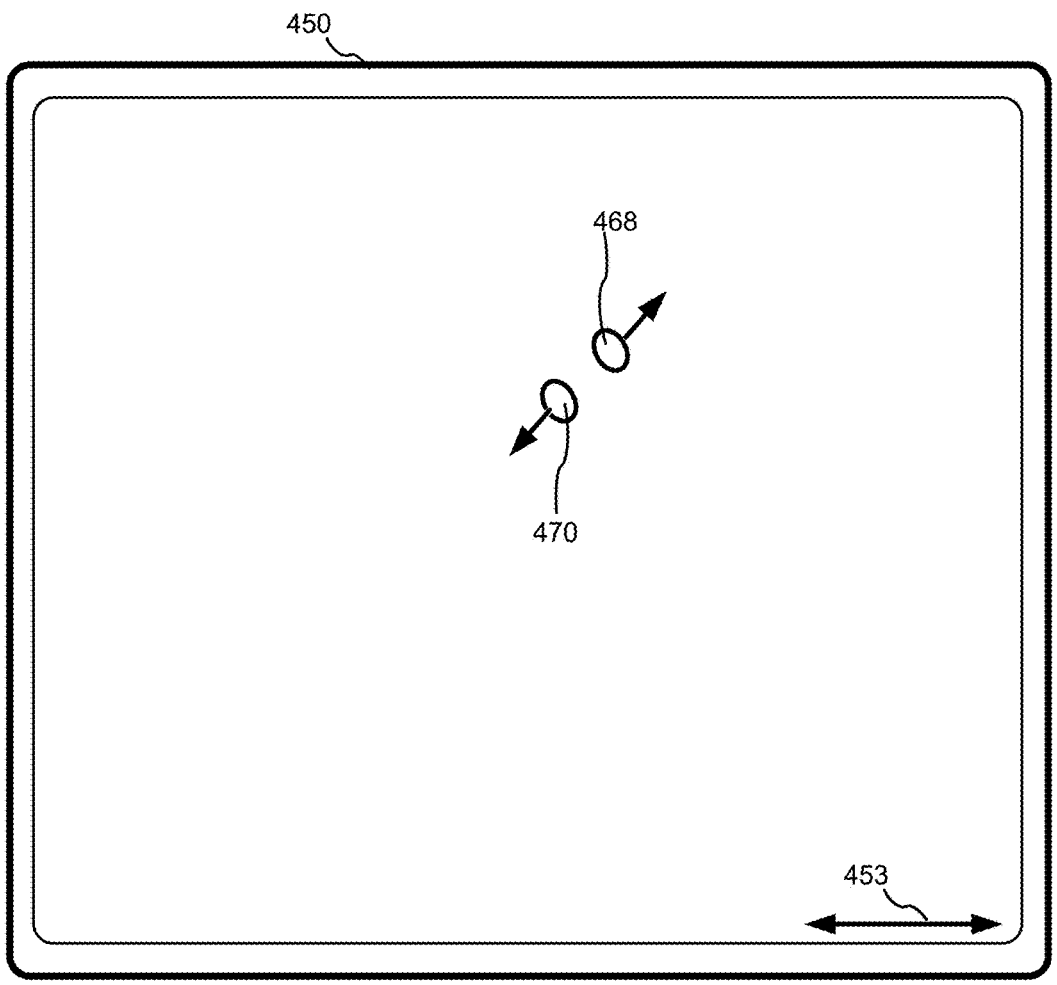
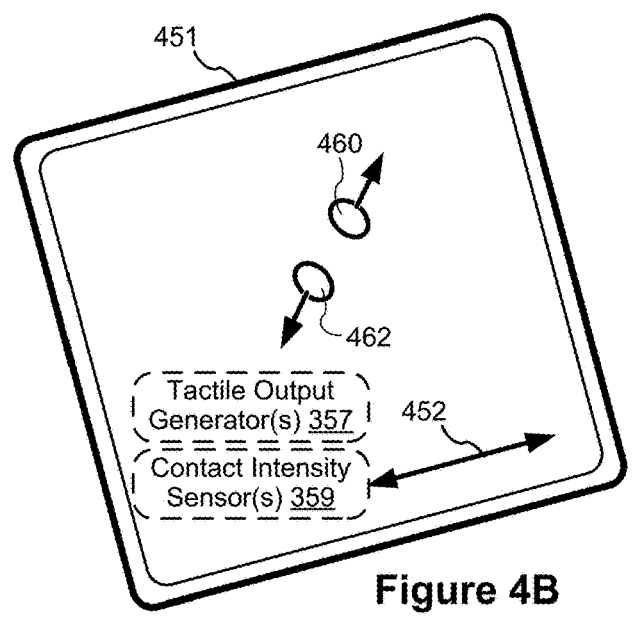
Figure 4B

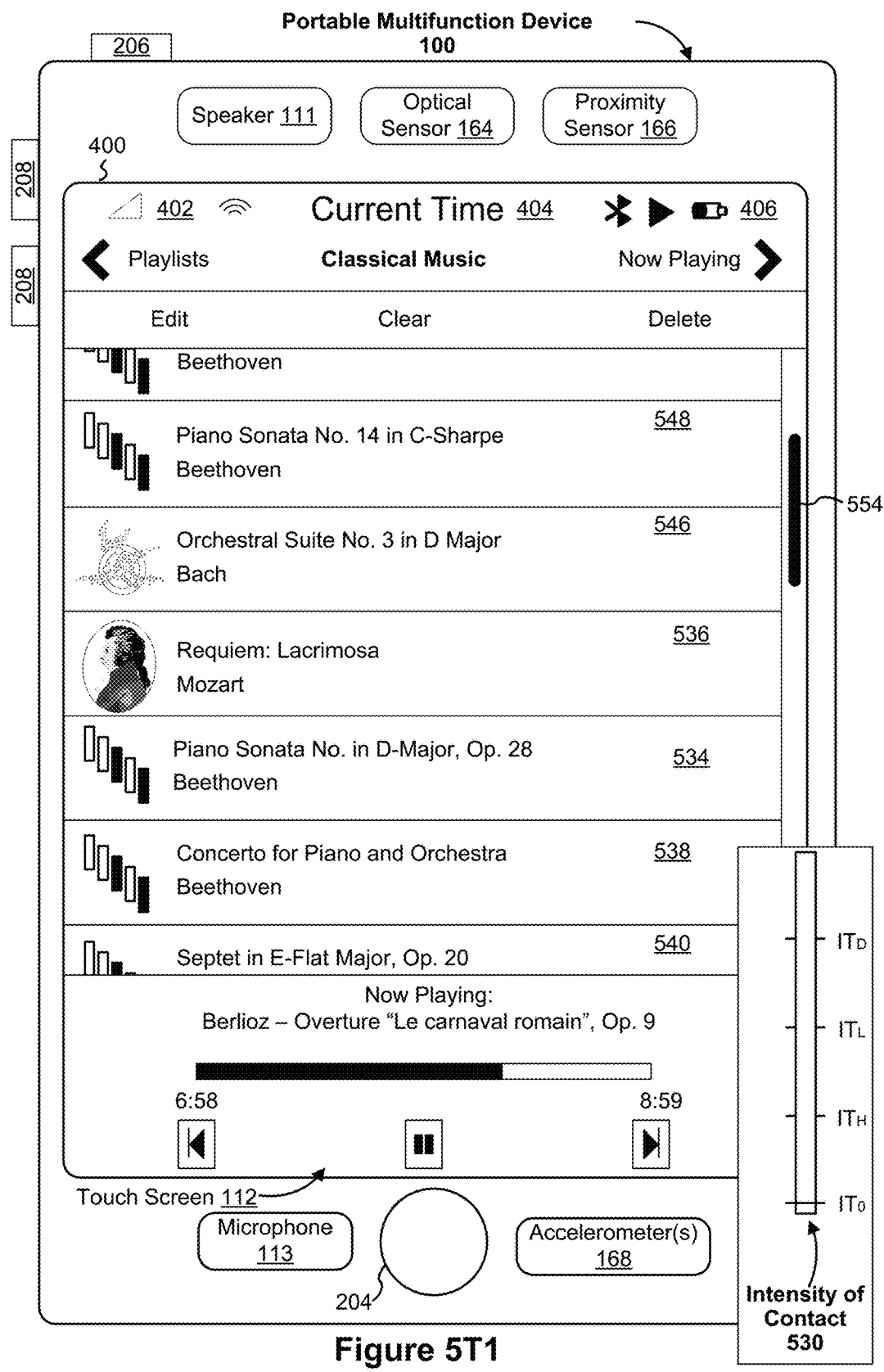
Figure 5T1

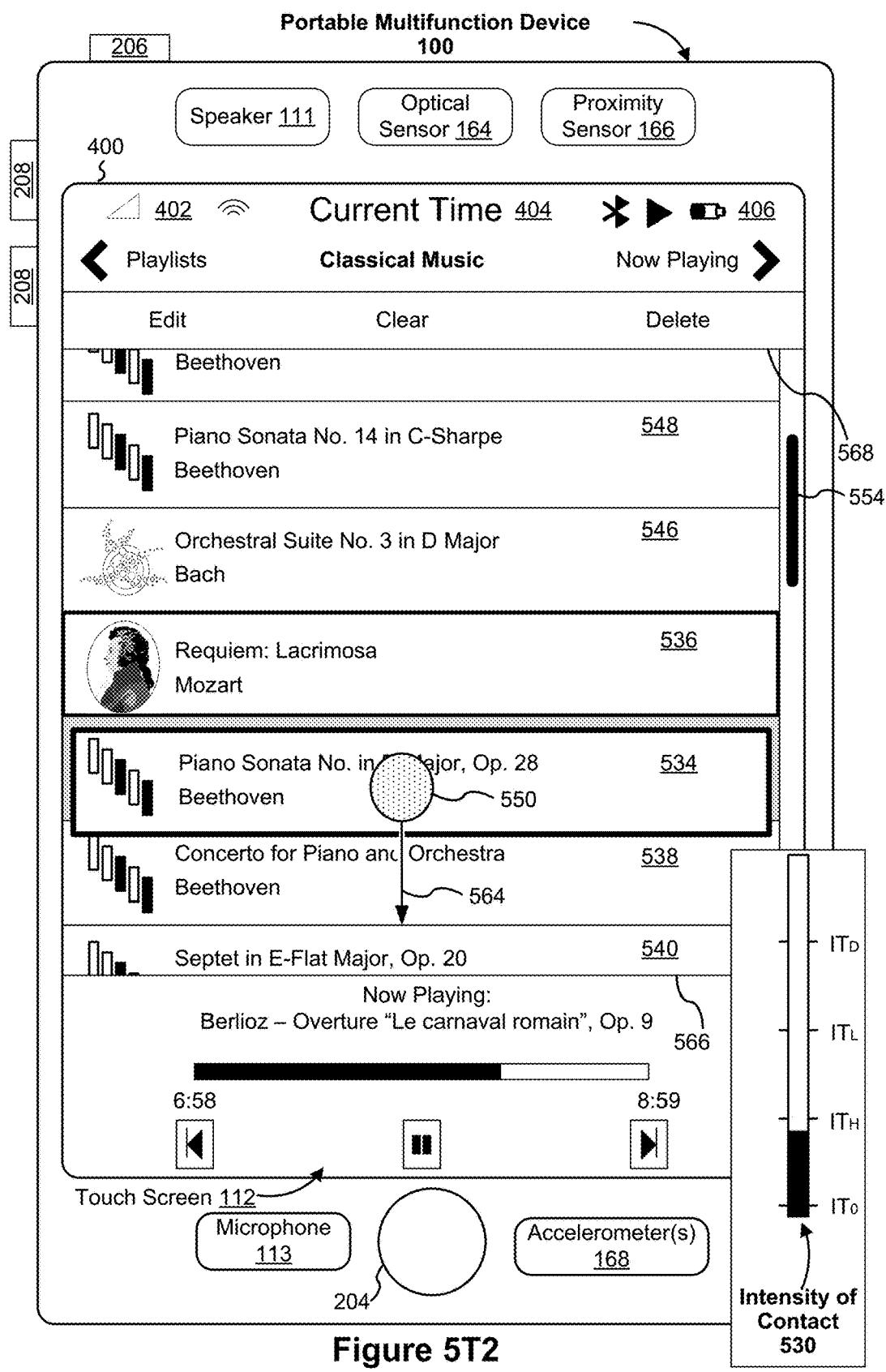
Figure 5T2

600

602 Display, on the display, content of a first content item, wherein the first content item is one of a sequence of content items

| 604 The sequence of content items corresponds to a plurality of electronic messages in an electronic messaging application, a plurality of web browser windows in a web browser, a plurality of applications, a plurality of digital images in a set of images , or a plurality of sets of digital images |

606 Detect a user input that includes movement of a contact in a respective direction on the touch-sensitive surface

608 In response to detecting the user input:
in accordance with a determination that the user input meets item-switching criteria, replace display of the first content item with display of a second content item in the sequence of content items, wherein the item-switching criteria include a criterion that is met when a characteristic intensity of the contact is above a first intensity threshold; and
in accordance with a determination that the user input does not meet the item-switching criteria, navigate through the content of the first content item in accordance with the movement of the contact

| 610 The item-switching criteria includes a criterion that is met when the characteristic intensity of the contact exceeds the first intensity threshold after detecting at least a predetermined threshold amount of movement of the contact |

| 612 The second content item is sequentially adjacent to the first content item and is selected based on the respective direction of the movement of the contact |

| 614 Navigating through the content of the first content item includes:
in accordance with a determination that the respective direction is a first direction on the touch-sensitive surface, scrolling the content in a first direction on the display; and
in accordance with a determination that the respective direction is a second direction on the touch-sensitive surface, scrolling the content in a second direction on the display that is different from the first direction on the display |

| 616 Navigating through the content of the first content item in accordance with the movement of the contact includes:
maintaining display of a first portion of the first content item in a first user interface region on the display; and
navigating through a second portion of the first content item in a second user interface region on the display |

608 In response to detecting the user input:
in accordance with a determination that the user input meets item-switching criteria, replace display of the first content item with display of a second content item in the sequence of content items, wherein the item-switching criteria include a criterion that is met when a characteristic intensity of the contact is above a first intensity threshold; and
in accordance with a determination that the user input does not meet the item-switching criteria, navigate through the content of the first content item in accordance with the movement of the contact > 618 Replacing display of the first content item with the second content item includes displaying a transition between the first content item and the second content item, and the transition includes reducing a size of the first content item > 620 Replacing display of the first content item with the second content item includes displaying a transition between the first content item and the second content item, and the transition includes increasing a size of the second content item 622 While displaying the first content item, detect a second user input at a location that corresponds to a selectable affordance, wherein the second user input includes a second contact that is stationary on the touch-sensitive surface,
in response to detecting the second user input:
in accordance with a determination that
the user input occurs while a focus selector is at a location that corresponds to a selectable affordance, and
the movement of the contact is less than a predetermined amount, display a preview area of content that corresponds to the selectable affordance overlaid on the first content item 624 In accordance with a determination that the user input begins at a first edge of the touch-sensitive surface, performing an operation that is distinct from both replacing display of the first content item with the second content item and navigating through the content of the first content item 626 After replacing display of the first content item with the second content item in the sequence of content items, detect a second user input that includes movement of a second contact on the touch-sensitive surface,
in response to detecting the second user input:
in accordance with a determination that the second user input meets the item-switching criteria, replace display of the second content item with a third content item in the sequence of content items; and
in accordance with a determination that the second user input does not meet the item-switching criteria, navigate through content of the second content item in accordance with the movement of the second contact

718: In accordance with the second movement of the contact on the touch-sensitive surface, move the first item by a first distance relative to a second item that is adjacent to the first item to at least partially reveal a first item slot associated with the first item on the display 720: Moving the first item by the first distance relative to the second item that is adjacent to the first item includes:
during an initial portion of the second movement of the contact, moving the first item at a slower speed than the focus selector to create a distance lag between the first item and the focus selector; and
during a subsequent portion of the second movement of the contact following the initial portion of the second movement of the contact, accelerating the movement of the first item to eliminate the distance lag between the first item and the focus selector 722: Detect a lift-off of the contact upon moving the first item by the first distance relative to the second item that is adjacent to the first item; and, in accordance with a determination that the first distance is smaller than a first threshold distance, restore the first item into the first item slot associated with the first item on the display.

724: In accordance with a determination that the first distance is greater than a first threshold distance, move the second item into the first item slot associated with the first item to reveal a second item slot associated with the second item 726: Detect a lift-off of the contact while the second item slot associated with the second item is revealed on the display; and
in response to detecting the lift-off of the contact the second item slot associated with the second item is revealed on the display, insert the first item into the second item slot

728: During the second movement of the contact, for a plurality of other items besides the first item in the list of items, move a respective other item to a respective new item slot and reveal a respective previous item slot for the respective other item on the display 730: Generate a respective tactile output as the respective other item moves to the respective new item slot and reveals the respective previous item slot 732: A respective movement of the respective other item changes in accordance with the characteristic intensity of the contact during the second movement of the contact

---

734: Detect that the first item has moved within a second threshold distance of a first end of the displayed second portion of the list of items in accordance with the second movement of the contact; and,
in response to detecting that the first item has moved within the second threshold distance of the first end of the displayed second portion of the list of items, scroll the list of items toward a second end of the displayed second portion of the list of items opposite the first end to display a third portion of the list of items 736: Scrolling the list of items toward the second end of the displayed second portion of the list of items opposite the first end to display the third portion of the list of items includes:
dynamically changing a scrolling speed of the scrolling toward the second end of the displayed second portion of the list of items in accordance with the characteristic intensity of the contact

---

738: Apply a transparency effect to the first item while the first item overlaps with another item in the list of items.

802 Present a first portion of structured content on the display, wherein the structured content includes a plurality of sections, and the first portion includes content from a first section of the plurality of sections

↓

804 Detect a first contact on the touch-sensitive surface while the first portion of the structured content is presented on the display

↓

806 Detect an increase in a characteristic intensity of the first contact on the touch-sensitive surface and detect a first movement of the first contact on the touch-sensitive surface

↓

808 In response to detecting the increase in the characteristic intensity of the first contact and detecting the first movement of the first contact:
    in accordance with a determination that the characteristic intensity of the contact increases above a first intensity threshold, translate the structured content to display a start of a second section adjacent to the first section of the structured content at a predefined location on the display; and
    in accordance with a determination that the characteristic intensity of the contact does not increase above the first intensity threshold, translate the structured content in accordance with a magnitude of the movement of the contact on the touch-sensitive surface

---

810 During the translating of the structured content to display the start of the second section adjacent to the first section on the display, a focus selector associated with the first contact is on the structured content

---

812 In response to detecting the increase in the characteristic intensity of the first contact and the first movement of the first contact, apply a visual effect on the first portion of the structured content on the display

---

814 Remove the applied visual effect on the first portion of the structured content on the display during the translating of the structured content

816 Prior to the determination that the characteristic intensity of the first contact has increased above the first intensity threshold:
detect an initial increase in the characteristic intensity of the first contact; and,
in response to detecting the initial increase in the characteristic intensity of the first contact, concurrently present a scroll bar with the first portion of the structured content on the display, wherein the scroll bar includes a scroll position indicator that indicates a respective position of the first portion of the structured content in the structured content; and,
in response to the determination that the characteristic intensity of the first contact has increased above the first intensity threshold, present a plurality of section indicators along with the scroll indicator, wherein a relative ordering of the section indicators to the scroll position indicator corresponds to relative positions of the sections to the first portion of the structured content in the structured content

818 Presenting the plurality of section indicators with the scroll bar includes: presenting an animation that shows the plurality of section indicators emerging from the scroll position indicator and spreading out along the scroll bar

820 When translating of the structured content to display the start of the second section adjacent to the first section of the structured content, present an animation that shows the scroll position indicator hopping over a respective section indicator in the plurality of section indicators

822 Detect a lift-off of the first contact, and,
in response to detecting the lift-off of the first contact, cease to display the scroll bar, the scroll position indicator, and the plurality of section indicators

824 In response to detecting the lift-off of the first contact, present an animation that shows the plurality of section indicators moving into the scroll position indicator before ceasing the display of the scroll position indicator

826 The structured content is translated to display the start of the second section adjacent to the first section of the structured content at the predefined location on the display in accordance with a determination that the first movement of the first contact exceeds a first threshold distance

828 The characteristic intensity of the first contact is below the first intensity threshold after the first movement of the first contact exceeds the first threshold distance

830 The sections in the structured content are mapped to a plurality of vertical positions on the display, and the first movement of the first contact from a first position of the plurality of positions to a second position of the plurality of positions results in a translation of the structured content from one section of the structured document that corresponds to the first position on the display to another section of the structured content that corresponds to the second position on the display.

914: The characteristic speed of the first movement is a first speed and moving the content on the display by the amount that is determined based on the characteristic intensity of the first contact and the characteristic speed of the first movement detected prior to the lift-off of the first contact includes:
    in accordance with a determination that the characteristic intensity is a first intensity, moving the content by a first amount; and
    in accordance with a determination that the characteristic intensity is a second intensity that is different from the first intensity, moving the content by a second amount that is different from the first amount > 916: The first intensity is greater than the second intensity and the first amount of movement is greater than the second amount of movement > 918: The first intensity is less than the second intensity and the first amount of movement is greater than the second amount of movement 920: Moving the content on the display by the amount that is determined based on the characteristic intensity of the first contact and the characteristic speed of the first movement detected prior to the lift-off of the first contact includes setting a simulated friction based on the characteristic intensity of the first contact 922: Moving the content on the display by the amount that is determined based on the characteristic intensity of the first contact and the characteristic speed of the first movement detected prior to the lift-off of the first contact includes setting a simulated inertia based on the characteristic intensity of the first contact 924: Moving the content on the display by the amount that is determined based on the characteristic intensity of the first contact and the characteristic speed of the first movement detected prior to the lift-off of the first contact includes setting an initial speed of movement for moving the content based on the characteristic intensity of the first contact

926: Moving the content on the display by the amount that is determined based on the characteristic intensity of the first contact and the characteristic speed of the first movement detected prior to the lift-off of the first contact includes:
determining an initial speed for continued scrolling after the lift-off of the first contact based on the characteristic intensity of the first contact and the characteristic speed of the first movement detected prior to the lift-off of the first contact; and
continuing the scrolling of the content after the lift-off of the first contact with the initial speed determined based on the characteristic intensity of the first contact and the characteristic speed of the first movement detected prior to the lift-off of the first contact 928: In response to detecting the increase in intensity of the first contact on the touch-sensitive surface, dynamically apply a visual effect on the first portion of content on the display in accordance with a current intensity of the first contact on the touch-sensitive surface 930: Present a scroll bar on the display, wherein the scroll bar includes a scroll position indicator that indicates a respective position of a currently displayed portion of the content in the content

932: Present a scroll enhancement indicator concurrently with the scroll position indicator, wherein an appearance of the scroll enhancement indicator varies dynamically with a current intensity of the first contact on the touch-sensitive surface.

934: While moving the content on the display by the amount that is determined based on the characteristic intensity of the first contact and the characteristic speed of the first movement detected prior to the lift-off of the first contact, dynamically change the appearance of the scroll enhancement indicator in accordance with a current scrolling speed 936: Moving the content on the display by the amount that is determined based on the characteristic intensity of the first contact and the characteristic speed of the first movement detected prior to the lift-off of the first contact includes:
applying an intensity filter to an intensity profile of the first contact, wherein the intensity filter shifts the intensity profile by a first time shift past the lift-off of the first contact; and
determining an initial speed for moving the content on the display after the lift-off of the first contact based on a selected intensity value on the filtered intensity profile.

938: Moving the content on the display by the amount that is determined based on the characteristic intensity of the first contact and the characteristic speed of the first movement detected prior to the lift-off of the first contact includes:
applying a speed filter to a speed profile of the first contact, wherein the speed filter shifts the speed profile by a second time shift past the lift-off of the first contact;
determining an initial speed for moving the content on the display after the lift-off of the first contact based on a selected speed value on the shifted speed profile; and
moving the content on the display with the determined initial speed after the lift-off of the first contact 940: Prior to detecting the first movement of the first contact, detect an earlier increase in intensity of the first contact while the first contact remains stationary on the touch-sensitive surface 942: Detecting the earlier increase in intensity of the first contact includes detecting the earlier increase in intensity of the first contact above a first intensity threshold while a focus selector is located on a first user interface element on the display, and
the device performs a predefined operation associated with the first user interface element in response to detecting the earlier increase in intensity of the first contact above the first intensity threshold while the focus selector is located on the first user interface element on the display

1018 Scrolling through the content by an amount that is determined based on a characteristic speed of the first contact during the first movement includes:
scrolling through the content by a first amount before the lift-off of the first contact; and
continuing to scroll through the content by a second amount after the lift-off of the first contact, wherein the scrolling of the content after the lift-off of the first contact is continued at an initial speed that is determined based on the characteristic speed of the first contact during the first movement

---

1020 Detect the increase in intensity of the first contact on the touch-sensitive surface above the respective intensity threshold during the first movement of the first contact on the touch-sensitive surface; and
in response to detecting the increase in intensity above the respective intensity threshold, apply a visual effect on the first portion of content on the display

---

1022 Remove the applied visual effect on the first portion of content on the display during the scrolling through the content to the predefined portion of the content.

---

1024 Apply an intensity filter to an intensity profile of the first contact, wherein the intensity filter shifts the intensity profile by a first time shift past the lift-off of the first contact; and
determine a steady state speed for the scrolling through the content to the predefined portion of the content based on a selected intensity value on the shifted intensity profile.

---

1026 Scroll through the content by an amount that is determined based on a characteristic speed of the first contact during the first movement includes scrolling through the content to display a second portion of the content, and
while displaying the second portion of the content, detect a predefined input while a focus selector is within a predefined region on the display; and
in response to detecting the predefined input while the focus selector is within the predefined region on the display, scroll through the content to the predefined portion of the content

1028 Prior to detecting the first movement of the first contact, detect an earlier increase in intensity of the first contact above the respective intensity threshold while the first contact remains stationary on the touch-sensitive surface; and determine that the first contact had a characteristic intensity below the respective intensity threshold prior to the lift-off of the first contact in accordance with a determination that the intensity of the first contact remained below the respective intensity threshold during the first movement of the first contact on the touch-sensitive surface.

1030 Detecting the earlier increase in intensity of the first contact includes detecting the earlier increase in intensity of the first contact above a first intensity threshold while a focus selector is located on a first user interface element on the display, and
the device performs a predefined operation associated with the first user interface element in response to detecting the earlier increase in intensity of the first contact above the first intensity threshold while the focus selector is located on a first user interface element on the display

Figure 10C

DEVICES, METHODS, AND GRAPHICAL USER INTERFACES FOR CONTENT NAVIGATION AND MANIPULATION

RELATED APPLICATION

This application claims priority to U. S. Provisional Application Ser. No. 62/235,490, filed Sep. 30, 2015, entitled "Devices, Methods, and Graphical User Interfaces for Content Navigation and Manipulation"; and (2) U. S. Provisional Application Ser. No. 62/203,387, filed Aug. 10, 2015, entitled "Devices, Methods, and Graphical User Interfaces for Manipulating User Interface Objects with Visual and/or Haptic Feedback," both of which are incorporated by reference herein in their entireties.

TECHNICAL FIELD

This relates generally to electronic devices with touch-sensitive surfaces, including but not limited to electronic devices with touch-sensitive surfaces used for navigating and manipulating displayed content.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to navigate and manipulate content in user interfaces on a display.

Exemplary types of navigation and manipulation include scrolling, zooming, and adjusting the position and/or size of one or more user interface objects, as well as reordering user interface objects. Exemplary user interface objects include digital images, video, text, icons, control elements such as buttons, and other graphics. A user will, in some circumstances, need to navigate and manipulate content in a reader application (e.g., iBooks from Apple Inc. of Cupertino, Calif.), a file management program (e.g., Finder from Apple Inc. of Cupertino, Calif.), an image management application (e.g., Aperture, iPhoto, Photos from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), or a spreadsheet application (e.g., Numbers from Apple Inc. of Cupertino, Calif.).

But existing methods for performing these navigations and manipulations are cumbersome and inefficient. In addition, these methods take longer than necessary, thereby wasting energy. This latter consideration is particularly important in battery-operated devices.

SUMMARY

Accordingly, there is a need for electronic devices with faster, more efficient methods and interfaces for content navigation and manipulation. Such methods and interfaces optionally complement or replace conventional methods for content navigation and manipulation. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include document reading, image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display, a touch-sensitive surface, and one or more sensors to detect intensity of contacts with the touch-sensitive surface. The method includes: displaying, on the display, content of a first content item, wherein the first content item is one of a sequence of content items. The device detects a user input that includes movement of a contact in a respective direction on the touch-sensitive surface. In response to detecting the user input: in accordance with a determination that the user input meets item-switching criteria, the device replaces display of the first content item with display of a second content item in the sequence of content items, wherein the item-switching criteria include a criterion that is met when a characteristic intensity of the contact is above a first intensity threshold; and, in accordance with a determination that the user input does not meet the item-switching criteria, the device navigates through the content of the first content item in accordance with the movement of the contact.

In accordance with some embodiments, a method is performed at an electronic device with a display, a touch-sensitive surface, and one or more sensors to detect intensity of contacts with the touch-sensitive surface. The method includes: presenting a first portion of a list of items on the display. The device detects a contact on the touch-sensitive surface while the first portion of the list of items is presented on the display and a first movement of the contact on the touch-sensitive surface while a characteristic intensity of the contact remains below a first intensity threshold. In response to detecting the first movement of the contact on the touch-sensitive surface while the characteristic intensity of the contact remains below the first intensity threshold, the device scrolls the list of items to present a second portion of the list of items on the display in accordance with the first movement of the contact on the touch-sensitive surface. While a focus selector associated with the contact is located on a first item in the second portion of the list of items presented on the display, the device detects an increase in the characteristic intensity of the contact above the first intensity threshold followed by a second movement of the contact on the touch-sensitive surface. In response to detecting the increase in the characteristic intensity of the contact above the first intensity threshold followed by the second movement of the contact on the touch-sensitive surface, the device moves the first item relative to other items in the second portion of the list of items presented on the display in accordance with the second movement of the contact.

In accordance with some embodiments, a method is performed at an electronic device with a display, a touch-sensitive surface, and one or more sensors to detect intensity of contacts with the touch-sensitive surface. The method includes: presenting a first portion of structured content on the display. The structured content includes a plurality of sections, and the first portion includes content from a first section of the plurality of sections. The device detects a first contact on the touch-sensitive surface while the first portion of the structured content is presented on the display. The device detects an increase in a characteristic intensity of the first contact on the touch-sensitive surface and detects a first movement of the first contact on the touch-sensitive surface. In response to detecting the increase in the characteristic intensity of the first contact and detecting the first movement of the first contact: in accordance with a determination that the characteristic intensity of the contact increases above a first intensity threshold, the device translates the structured content to display a start of a second section adjacent to the first section of the structured content at a predefined location on the display; and in accordance with a determination that the characteristic intensity of the contact does not increase above the first intensity threshold, the device translates the structured content in accordance with a magnitude of the movement of the contact on the touch-sensitive surface.

In accordance with some embodiments, a method is performed at an electronic device with a display, a touch-sensitive surface, and one or more sensors to detect intensity of contacts with the touch-sensitive surface. The method includes: presenting a first portion of content on the display. While presenting the first portion of the content on the display, the device detects a first contact on the touch-sensitive surface and detects a first movement of the first contact on the touch-sensitive surface. In response to detecting the first movement of the first contact, the device scrolls the content to present a second portion of the content on the display in accordance with the first movement of the first contact. The device detects an increase in intensity of the first contact on the touch-sensitive surface during the first movement of the first contact on the touch-sensitive surface. After detecting the increase in intensity of the first contact on the touch-sensitive surface during the first movement of the first contact on the touch-sensitive surface, the device detects a lift-off of the first contact following the first movement of the first contact on the touch-sensitive surface. In response to detecting the lift-off of the first contact following the first movement of the first contact on the touch-sensitive surface, the device moves the content on the display by an amount that is determined based on a characteristic intensity of the first contact and a characteristic speed of the first movement detected prior to the lift-off of the first contact.

In accordance with some embodiments, a method is performed at an electronic device with a display, a touch-sensitive surface, and one or more sensors to detect intensity of contacts with the touch-sensitive surface. The method includes: presenting a first portion of content on the display. While presenting the first portion of the content, the device detects a first contact on the touch-sensitive surface and detects a first movement of the first contact on the touch-sensitive surface. The device detects a lift-off of the first contact following the first movement of the first contact on the touch-sensitive surface. In response to detecting the lift-off of the first contact following the first movement of the first contact on the touch-sensitive surface: in accordance with a determination that the first contact had a characteristic intensity above a respective intensity threshold prior to the lift-off of the first contact, the device scrolls through the content to a predefined portion of the content; and in accordance with a determination that the first contact had a characteristic intensity below the respective intensity threshold prior to the lift-off of the first contact, the device scrolls through the content by an amount that is determined based on a characteristic speed of the first contact during the first movement.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: enable display, on the display unit, of content of a first content item, wherein the first content item is one of a sequence of content items; detect a user input that includes movement of a contact in a respective direction on the touch-sensitive surface unit; in response to detecting the user input: in accordance with a determination that the user input meets item-switching criteria, enable the display unit to replace display of the first content item with display of a second content item in the sequence of content items, wherein the item-switching criteria include a criterion that is met when a characteristic intensity of the contact is above a first intensity threshold; and, in accordance with a determination that the user input does not meet the item-switching criteria, enable the display unit to navigate through the content of the first content item in accordance with the movement of the contact.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: present a first portion of a list of items on the display unit; detect a contact on the touch-sensitive surface unit while the first portion of the list of items is presented on the display unit; detect a first movement of the contact on the touch-sensitive surface unit while a characteristic intensity of the contact remains below a first intensity threshold; in response to detecting the first movement of the contact on the touch-sensitive surface unit while the characteristic intensity of the contact remains below the first intensity threshold, scroll the list of items to present a second portion of the list of items on the display unit in accordance with the first movement of the contact on the touch-sensitive surface unit; while a focus selector associated with the contact is located on a first item in the second portion of the list of items presented on the display unit, detect an increase in the characteristic intensity of the contact above the first intensity threshold followed by a second movement of the contact on the touch-sensitive surface unit; and, in response to detecting the increase in the characteristic intensity of the contact above the first intensity threshold followed by the second movement of the contact on the touch-sensitive surface unit, move the first item relative to other items in the second portion of the list of items presented on the display unit in accordance with the second movement of the contact.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: present a first portion of structured content on the display unit, wherein the structured content includes a plurality of sections, and the first portion includes content from a first section of the plurality of sections; detect a first contact on the touch-sensitive surface unit while the first portion of the structured content is presented on the display unit; detect an increase in a characteristic intensity of the first contact on the touch-sensitive surface unit and detecting a first movement of the first contact on the touch-sensitive surface unit; and, in response to detecting the increase in the characteristic intensity of the first contact and detecting the first movement of the first contact: in accordance with a determination that the characteristic intensity of the contact increases above a first intensity threshold, translate the structured content to enable display of a start of a second section adjacent to the first section of the structured content at a predefined location on the display unit; and, in accordance with a determination that the characteristic intensity of the contact does not increase above the first intensity threshold, translate the structured content in accordance with a magnitude of the movement of the contact on the touch-sensitive surface unit.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: present a first portion of content on the display unit; while presenting the first portion of the content on the display unit: detect a first contact on the touch-sensitive surface unit; and detect a first movement of the first contact on the touch-sensitive surface unit; in response to detecting the first movement of the first contact, scroll the content to present a second portion of the content on the display unit in accordance with the first movement of the first contact; detect an increase in intensity of the first contact on the touch-sensitive surface unit during the first movement of the first contact on the touch-sensitive surface unit; after detecting the increase in intensity of the first contact on the touch-sensitive surface unit during the first movement of the first contact on the touch-sensitive surface unit, detect a lift-off of the first contact following the first movement of the first contact on the touch-sensitive surface unit; and, in response to detecting the lift-off of the first contact following the first movement of the first contact on the touch-sensitive surface unit, move the content on the display unit by an amount that is determined based on a characteristic intensity of the first contact and a characteristic speed of the first movement detected prior to the lift-off of the first contact.

In accordance with some embodiments, an electronic device includes a display unit configured to display a user interface, a touch-sensitive surface unit to receive contacts, one or more sensor units to detect intensity of contacts with the touch-sensitive surface unit; and a processing unit coupled with the display unit, the touch-sensitive surface unit, and the one or more sensor units. The processing unit is configured to: present a first portion of content on the display unit; while presenting the first portion of the content: detect a first contact on the touch-sensitive surface unit; and detect a first movement of the first contact on the touch-sensitive surface unit; detect a lift-off of the first contact following the first movement of the first contact on the touch-sensitive surface unit; and, in response to detecting the lift-off of the first contact following the first movement of the first contact on the touch-sensitive surface unit: in accordance with a determination that the first contact had a characteristic intensity above a respective intensity threshold prior to the lift-off of the first contact, scroll through the content to a predefined portion of the content; and in accordance with a determination that the first contact had a characteristic intensity below the respective intensity threshold prior to the lift-off of the first contact, scroll through the content by an amount that is determined based on a characteristic speed of the first contact during the first movement.

In accordance with some embodiments, an electronic device includes a display, a touch-sensitive surface, optionally one or more sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and optionally one or more sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, optionally one or more sensors to detect intensity of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and optionally one or more sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and optionally one or more sensors to detect intensity of contacts with the touch-sensitive surface, includes means for performing or causing performance of the operations of any of the methods described herein.

Thus, electronic devices with displays, touch-sensitive surfaces and optionally one or more sensors to detect intensity of contacts with the touch-sensitive surface are provided with faster, more efficient methods and interfaces for content navigation and manipulation, thereby increasing the effectiveness, efficiency, and user satisfaction with such devices. Such methods and interfaces may complement or replace conventional methods for content navigation and manipulation.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 1B is a block diagram illustrating exemplary components for event handling in accordance with some embodiments.

FIG. 4B illustrates an exemplary user interface for a multifunction device with a touch-sensitive surface that is separate from the display in accordance with some embodiments.

FIGS. 6A-6B are flow diagrams illustrating a method of navigating within and between content items in accordance with some embodiments.

FIGS. 7A-7C are flow diagrams illustrating a method of reordering list items in accordance with some embodiments.

FIGS. 8A-8C are flow diagrams illustrating a method of navigating structured content in accordance with some embodiments.

FIGS. 9A-9D are flow diagrams illustrating a method of variable movement of content in accordance with some embodiments.

FIGS. 10A-10C are flow diagrams illustrating a method of scrolling to a predefined portion of content in accordance with some embodiments.

DESCRIPTION OF EMBODIMENTS

Figure 1A:
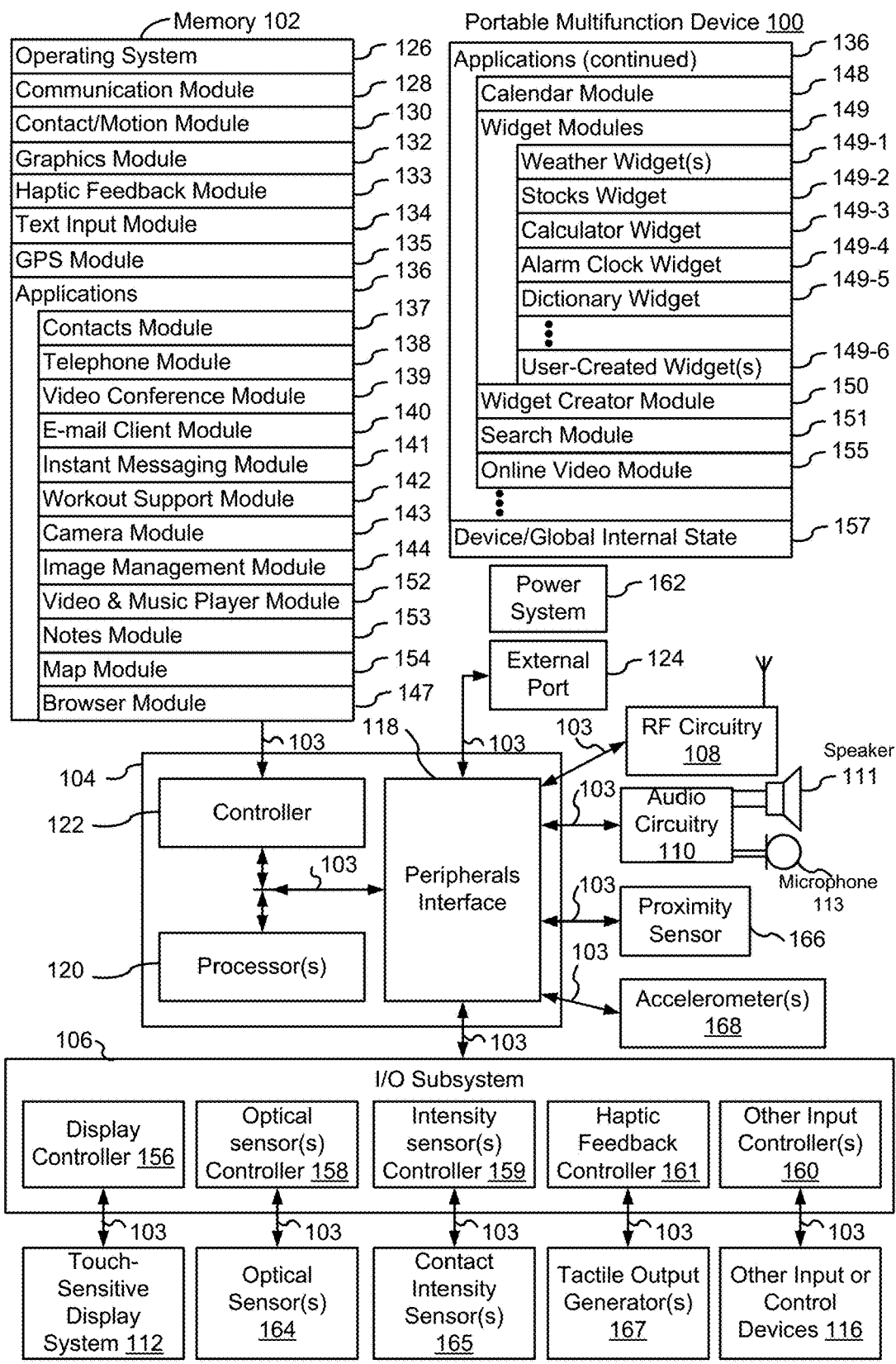
FIG. 1A is a block diagram illustrating a portable multifunction device with a touch-sensitive display in accordance with some embodiments.

Many electronic devices use graphical user interfaces to display user interface objects (e.g., content items). There is often a need to navigate the user interface objects, the position of one or more user interface objects with respect to the position of a different user interface object, or a component of the user interface object with respect to another component of the user interface object. Thus, there is a need to manipulate user interface objects in a fast, efficient, and convenient manner on an electronic device with a touch-sensitive surface.

Many electronic devices have graphical user interfaces that present lists of items such as digital content, bookmarks, locations (e.g., locations for which weather information is displayed) folders and/or other items. A user may need to move an item in a list to a different location in a list. For example, a user may reorder a playlist of digital content to change a location of a particular content item within the playlist. Here, methods are disclosed that streamline list reordering by enabling a user to use the same input gesture for list scrolling and list reordering functions. The function resulting from a gesture depends on a characteristic intensity of a contact in the gesture. Providing different functions resulting from the same input, based on an intensity component of the input, increases the range of controls available to a user.

Many electronic devices have graphical user interfaces with features for navigating structured content, such as graphical user interfaces for reader applications and other applications for displaying content. A user may need to access a start of a next section following a currently displayed section (or a prior section preceding the currently displayed section) of structured content. Some methods for accessing adjacent sections require a user to navigate using a menu or a slider control. With conventional scrolling using a slider control, the distance of the movement of the contact is closely correlated with the amount of content scrolling (e.g., lines, pages, etc.) that is performed. Here, methods are disclosed that streamline the structured content navigation process by allowing a user to translate structured content directly to an adjacent section using a defined input (regardless of the number of pages in the current section). Additionally, the user is enabled to translate either to an adjacent section or in accordance with a magnitude of movement of a contact, depending on a characteristic intensity of a contact in the input.

Many electronic devices have graphical user interfaces with features for scrolling through content, such as graphical user interfaces for reader applications and for other applications for displaying content. A user may need to scroll through content at different speeds at various times (e.g., in order to scroll through different amounts of content). With conventional scrolling, the distance of the movement of a contact is closely correlated with the movement of the contact before and after liftoff of the contact. Here, methods are disclosed that provide scrolling movement that changes in accordance with features of a contact in the input, including a characteristic intensity of the contact.

Many electronic devices have graphical user interfaces with features for scrolling through content, such as graphical user interfaces for reader applications and for other applications for displaying content. A user may need to scroll to a predefined portion of content. Some methods for accessing a portion of content require a user to continually scroll until the portion of the content is reached. Here, methods are disclosed that provide movement-based scrolling and scrolling to a predefined portion of content in accordance with a characteristic intensity of a contact in an input.

Figure 7A:
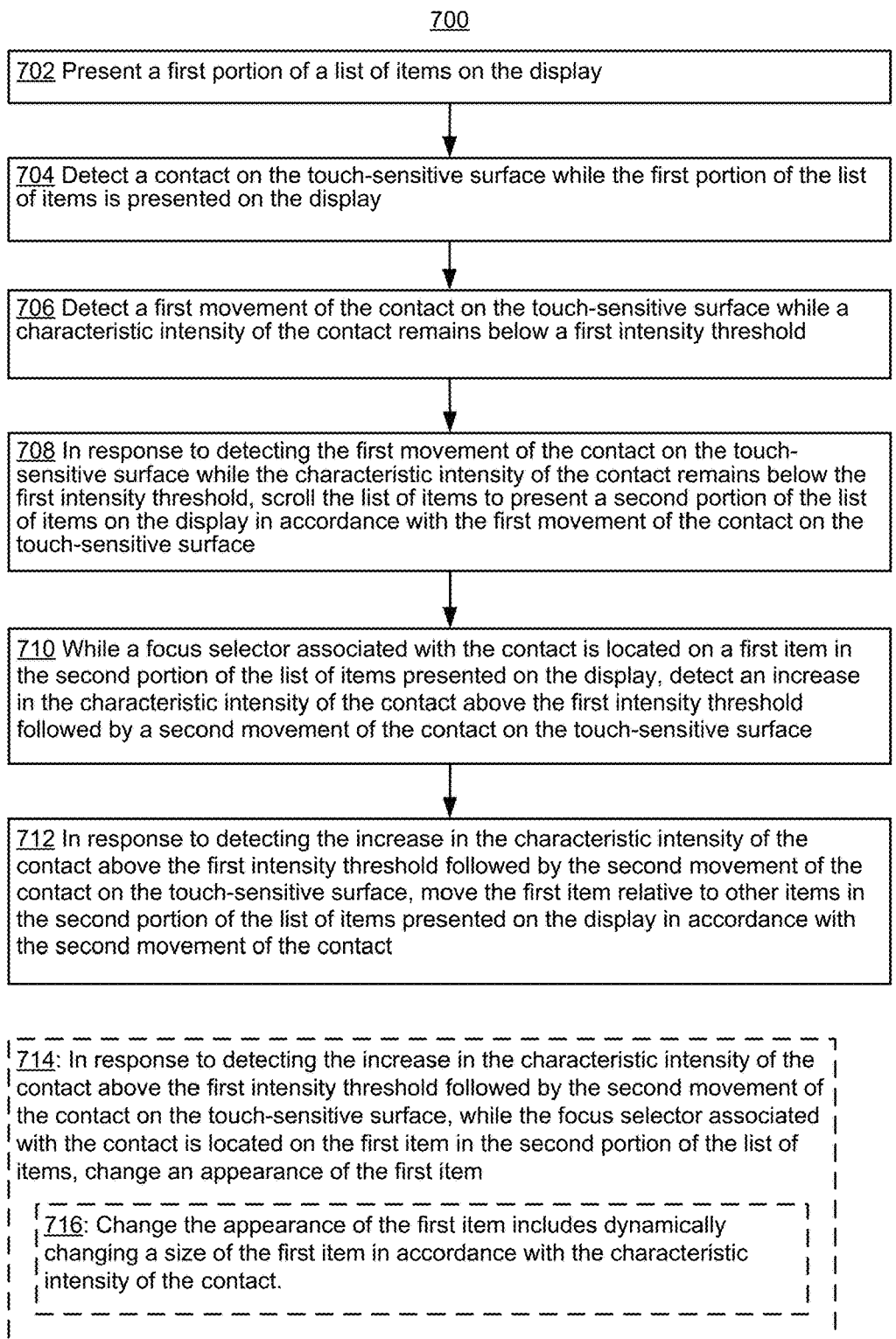
Figure 9A:
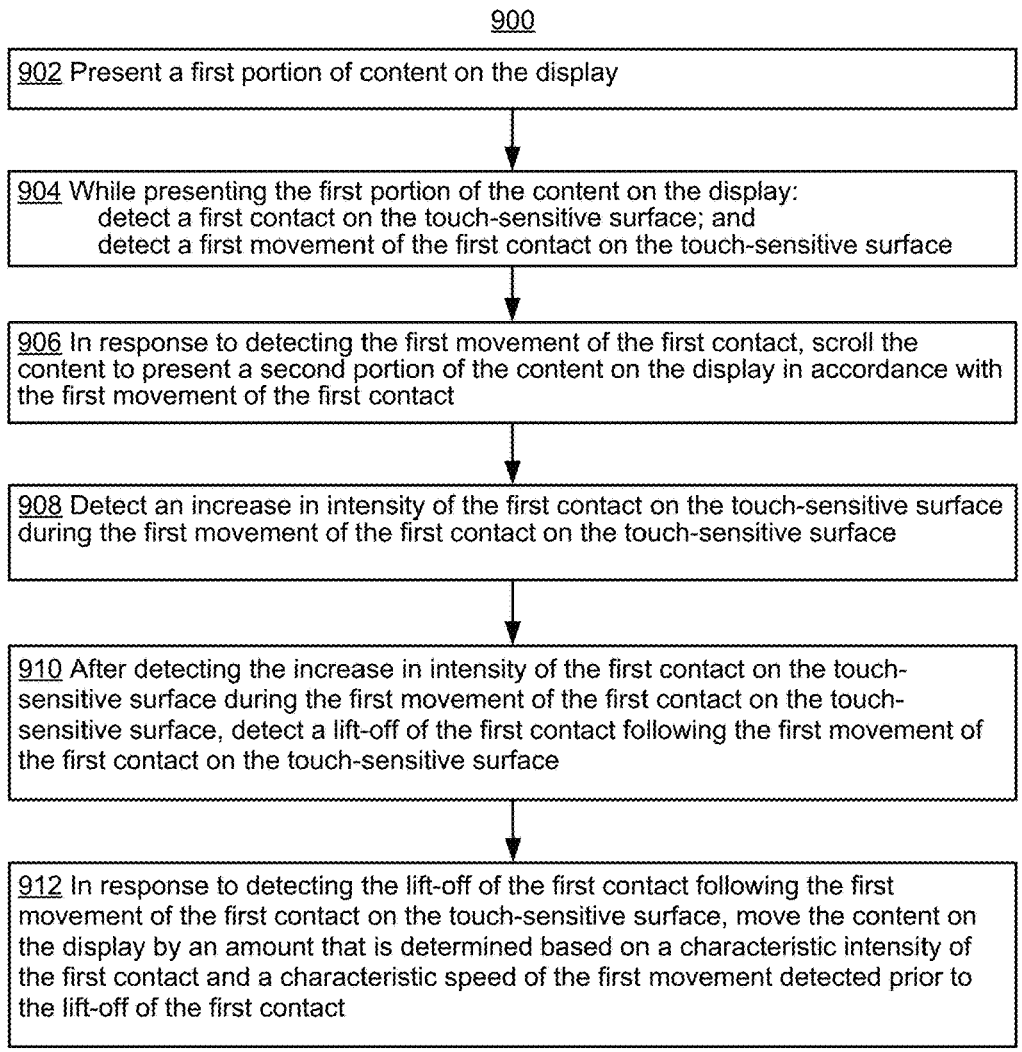
Figure 10A:
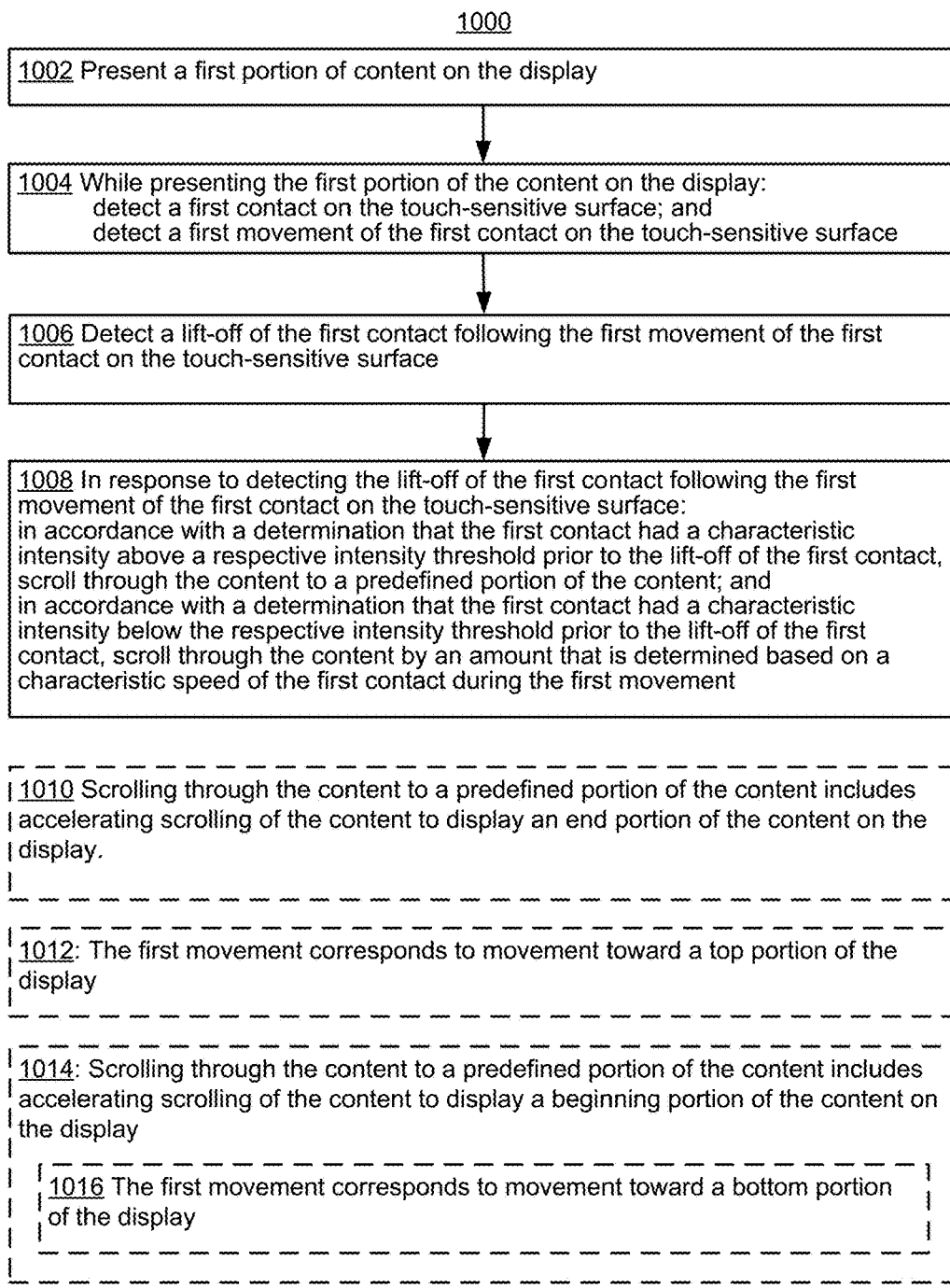

Below, FIGS. 1A-1B, 2, and 3 provide a description of exemplary devices. FIGS. 4A-4B and 5A-5TT illustrate exemplary user interfaces for content navigation and manipulation. FIGS. 6A-6B illustrate a flow diagram of a method of navigating within and between content items. FIGS. 7A-7C illustrate a flow diagram of a method of reordering list items. FIGS. 8A-8C illustrate a flow diagram of a method of navigating structured content. FIGS. 9A-9D illustrate a flow diagram of a method of variable movement of content. FIGS. 10A-10C illustrate a flow diagram of a method of scrolling to a predefined portion of content. The user interfaces in FIGS. 5A-5TT are used to illustrate the processes in FIGS. 6A-6B, 7A-7C, 8A-8C, 9A-9D, and 10A-10C.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user interactive graphical user interface object (e.g., graphical user interface object that is configured to respond to inputs directed toward the graphical user interface object). Examples of user interactive graphical user interface objects include, without limitation, a button, slider, icon, selectable menu item, switch, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an exemplary embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an exemplary embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
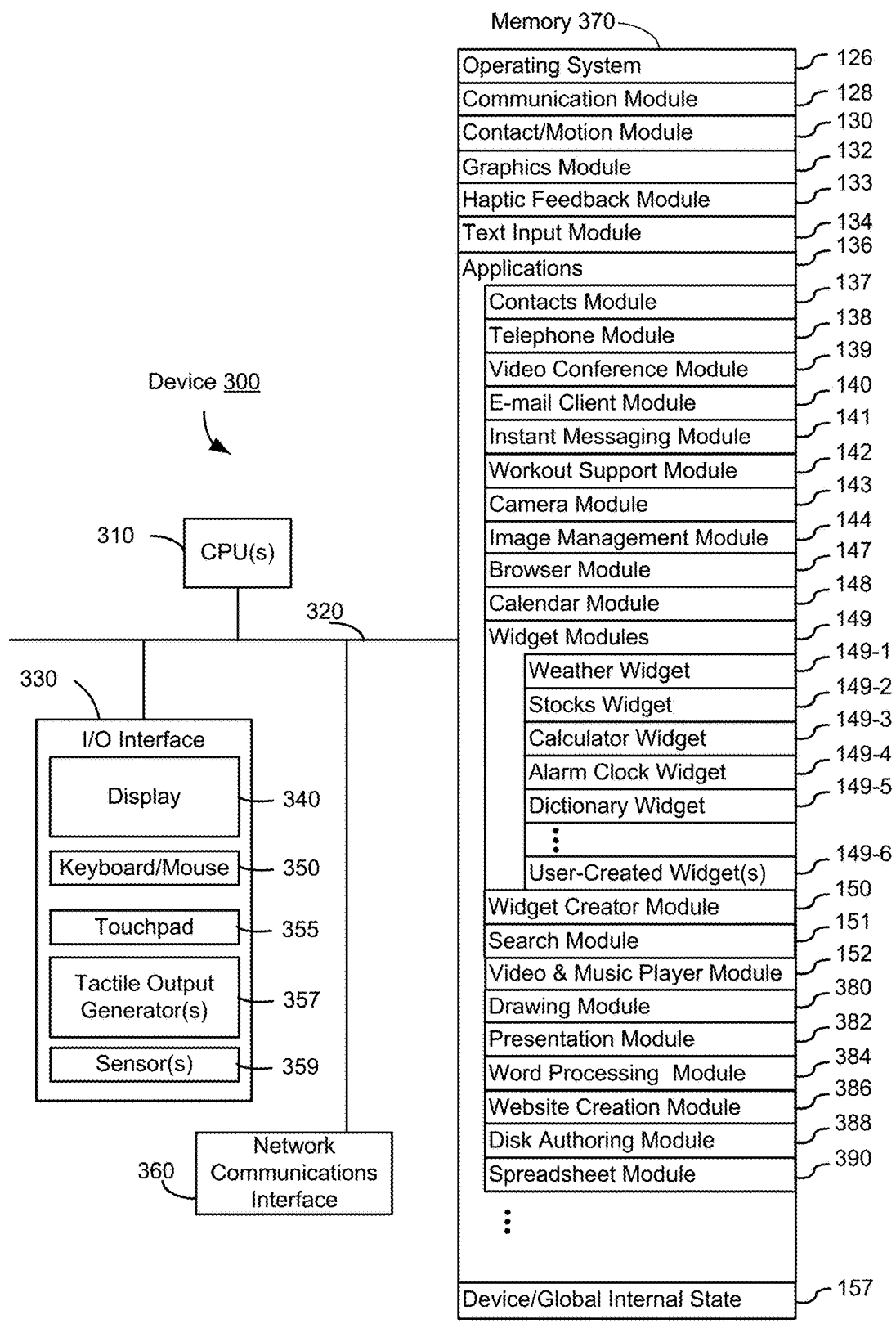
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:

contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MIMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MIMS and/or an Enhanced Messaging Service (EMS). As used herein, "instant messaging" refers to both telephony-based messages (e.g., messages sent using SMS or MIMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
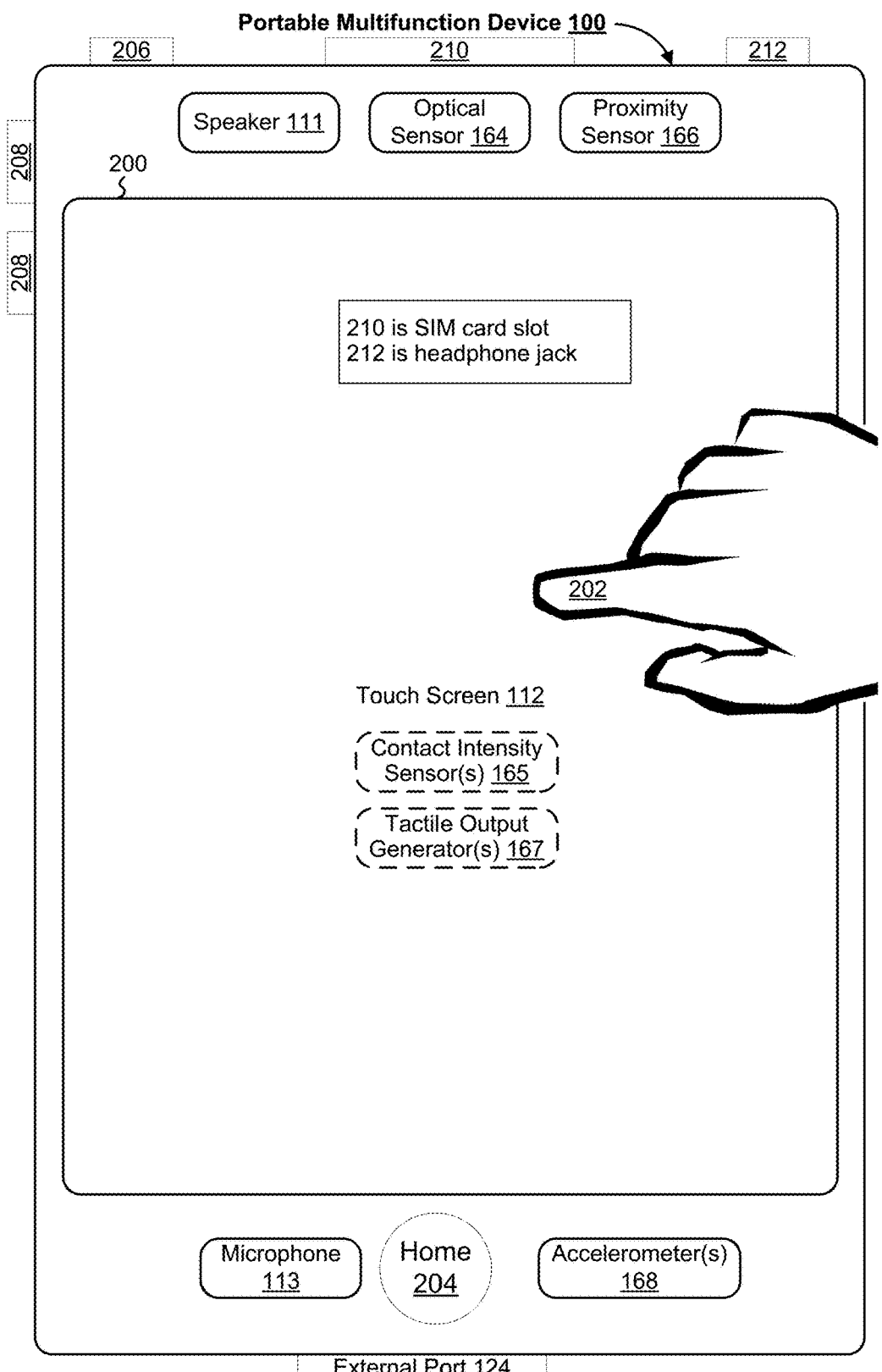
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touchscreen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, web site creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
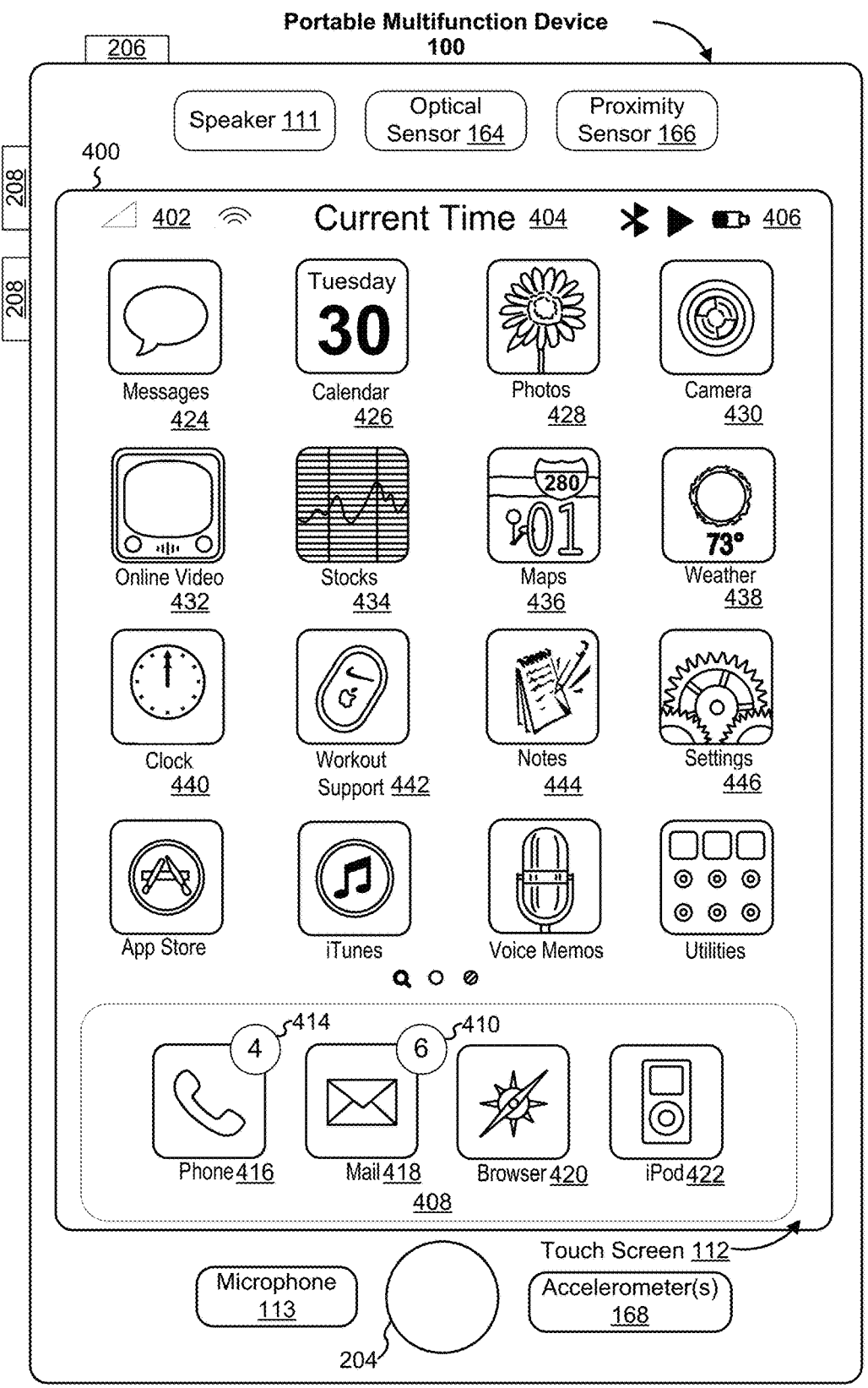
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450. Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

FIG. 4B illustrates an exemplary user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased.

This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

Figure 4C:
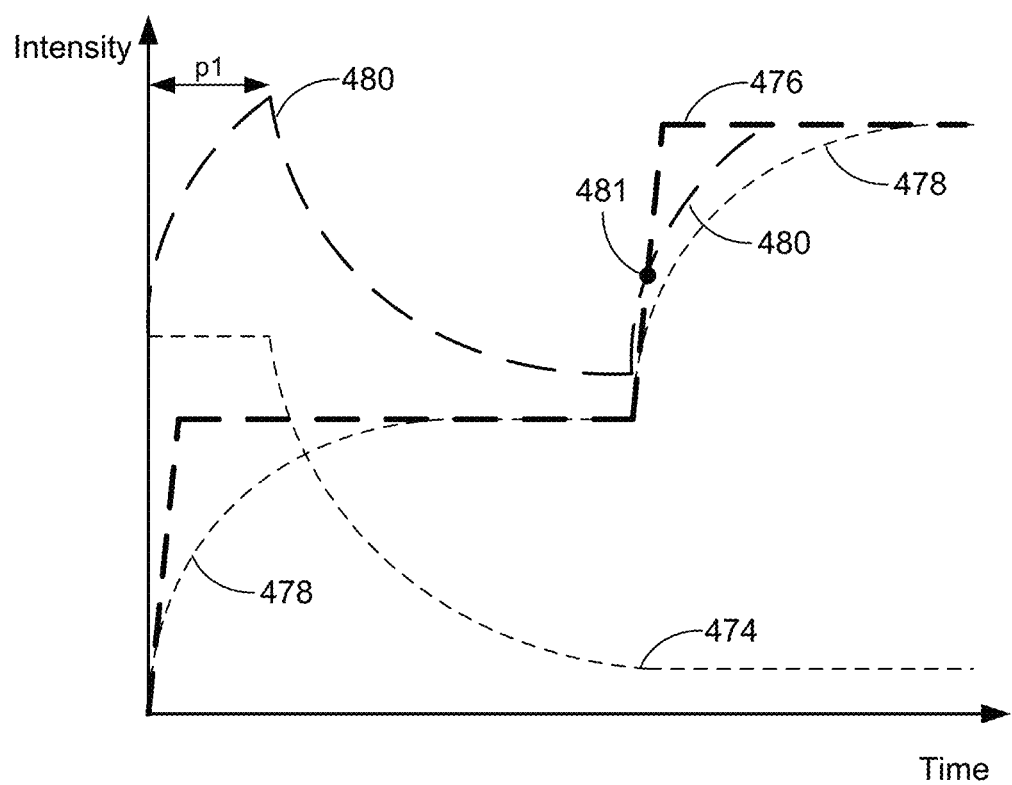
FIGS. 4C-4E illustrate exemplary dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
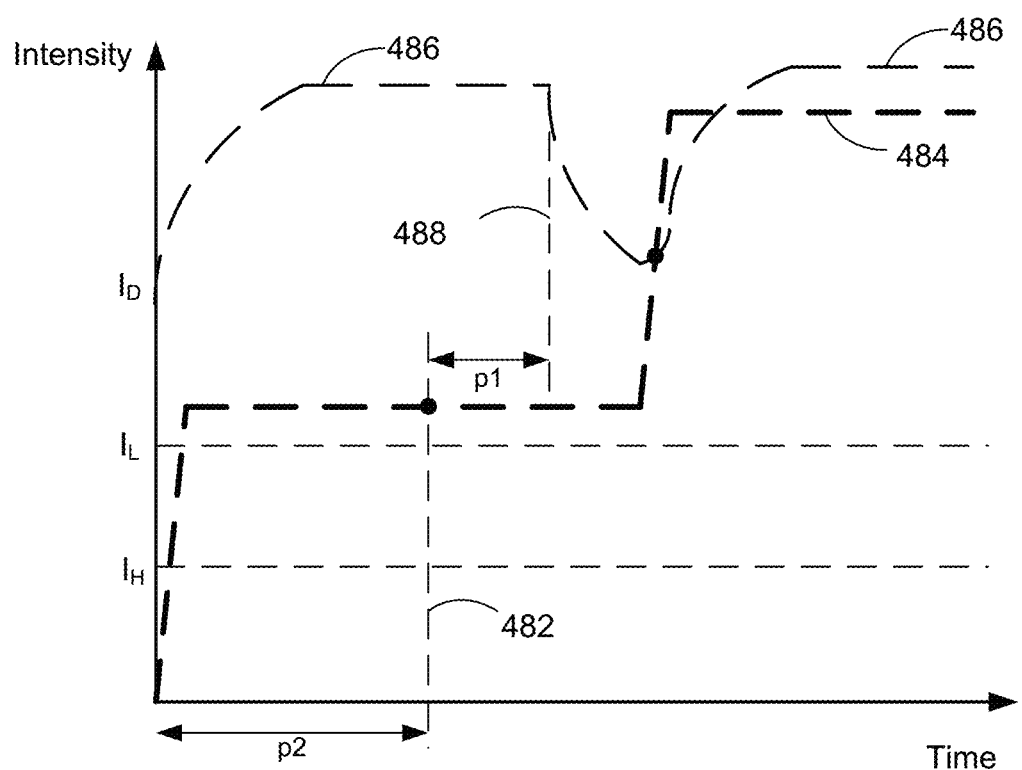

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
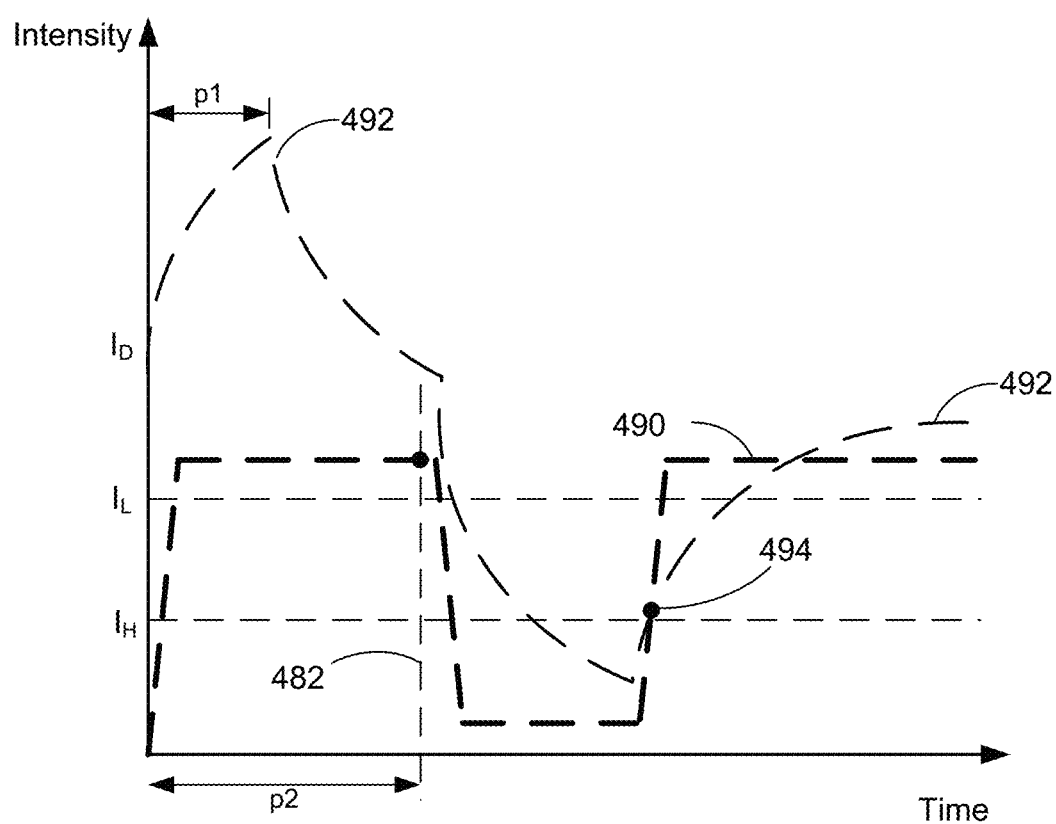

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensities of contacts with the touch-sensitive surface.

Figure 5A:
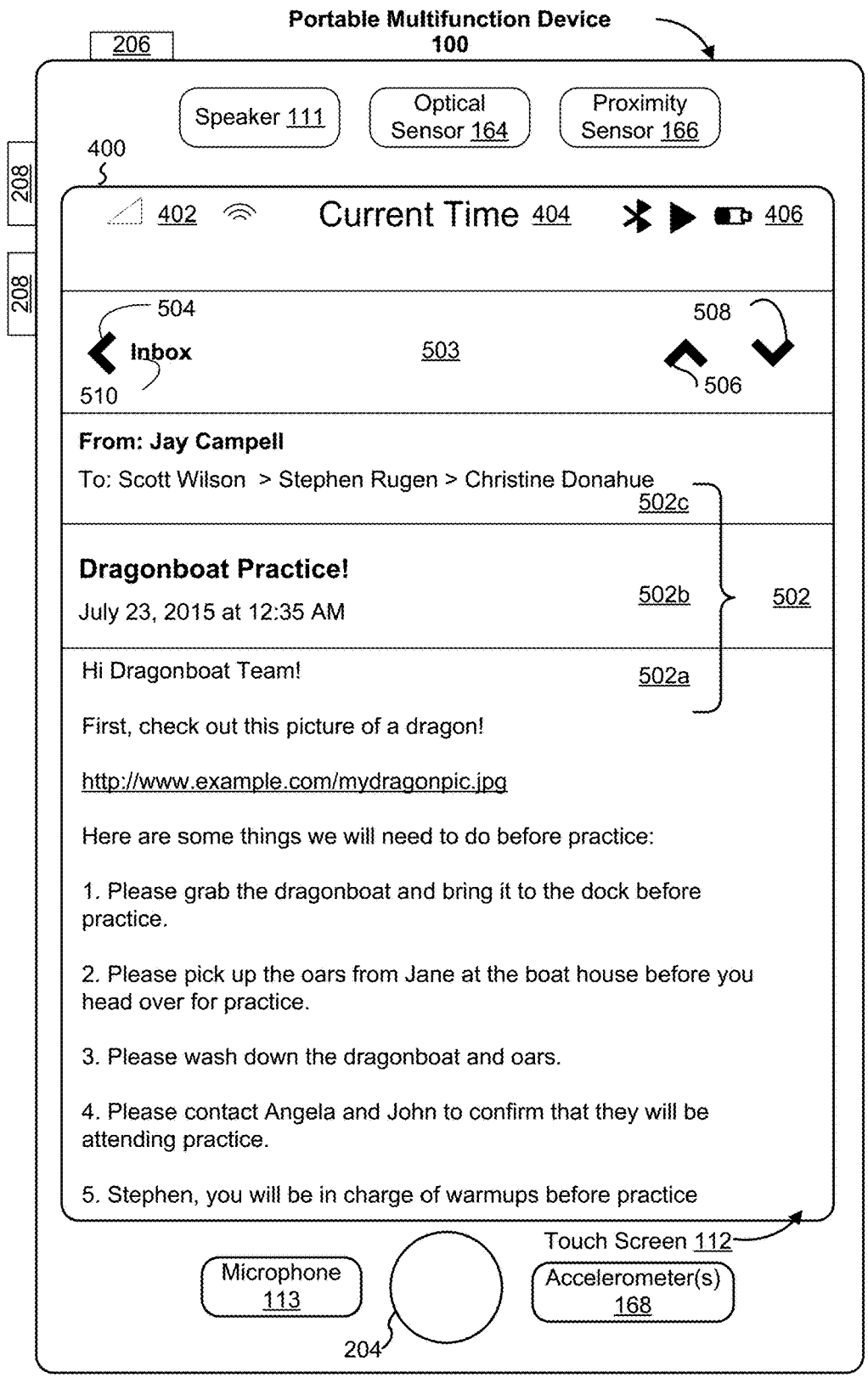
FIGS. 5A-5TT illustrate exemplary user interfaces for navigating within and between content items in accordance with some embodiments.
Figure 5B:
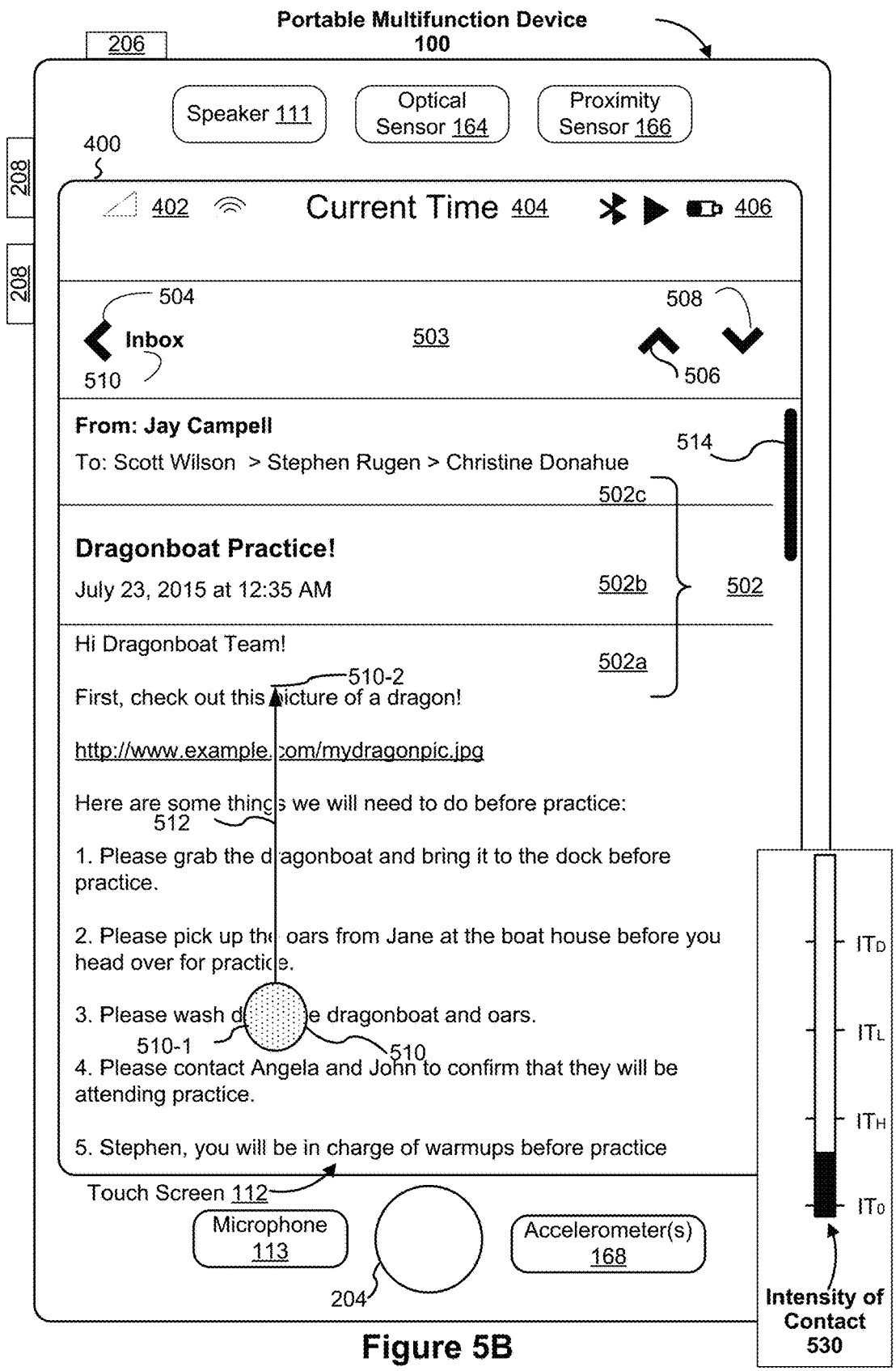
Figure 5C:
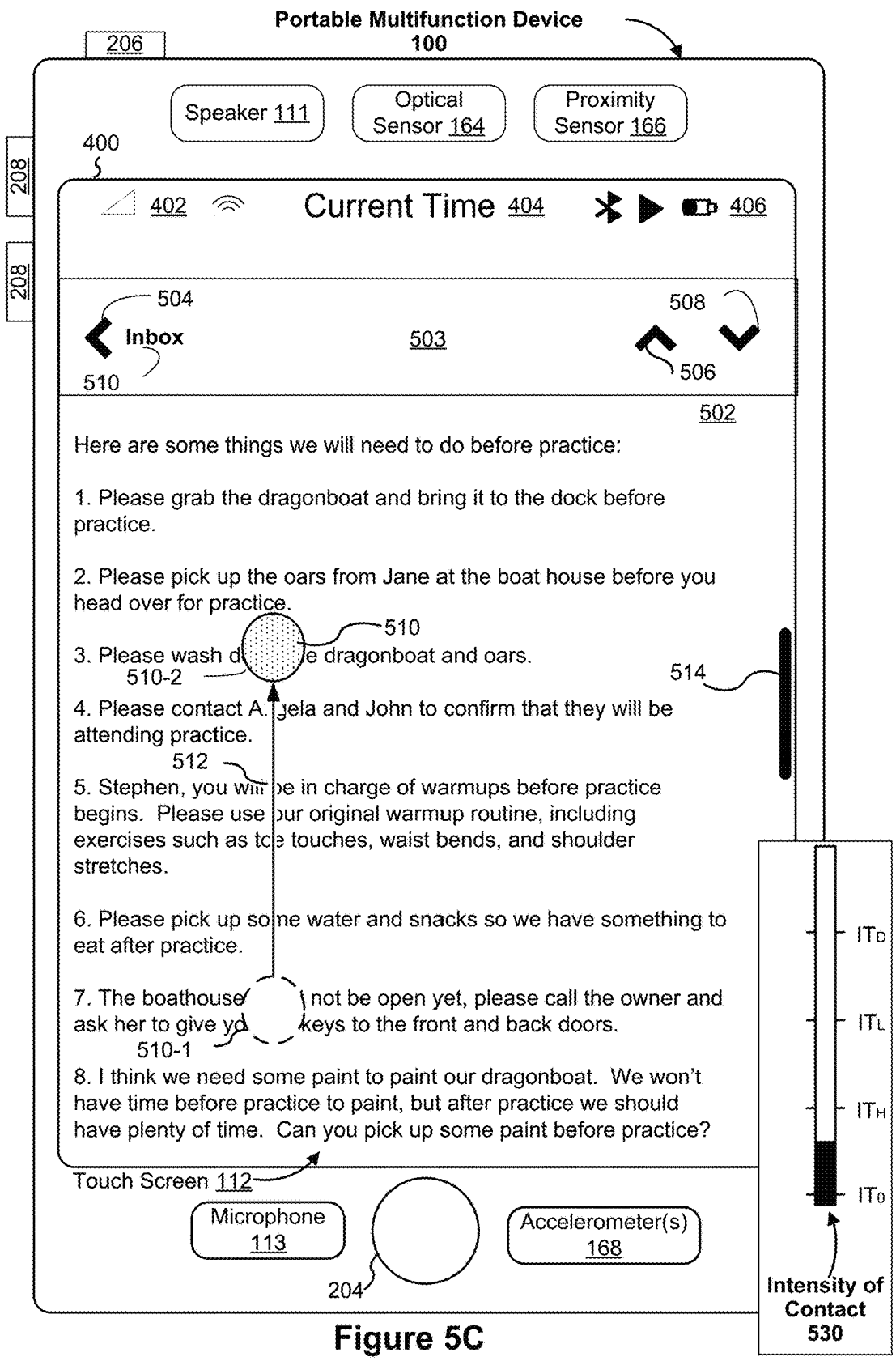
Figure 5D:
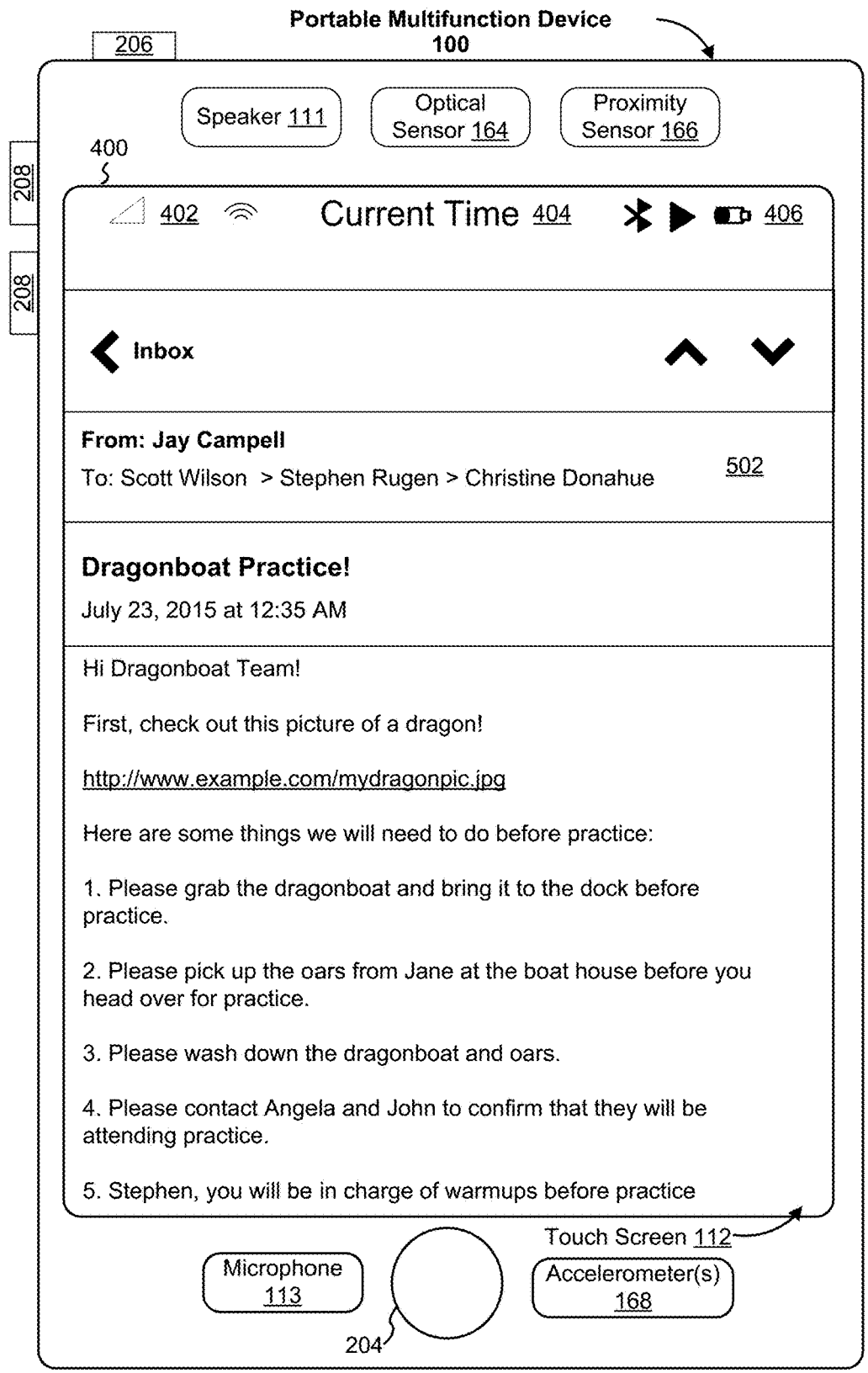
Figure 5E:
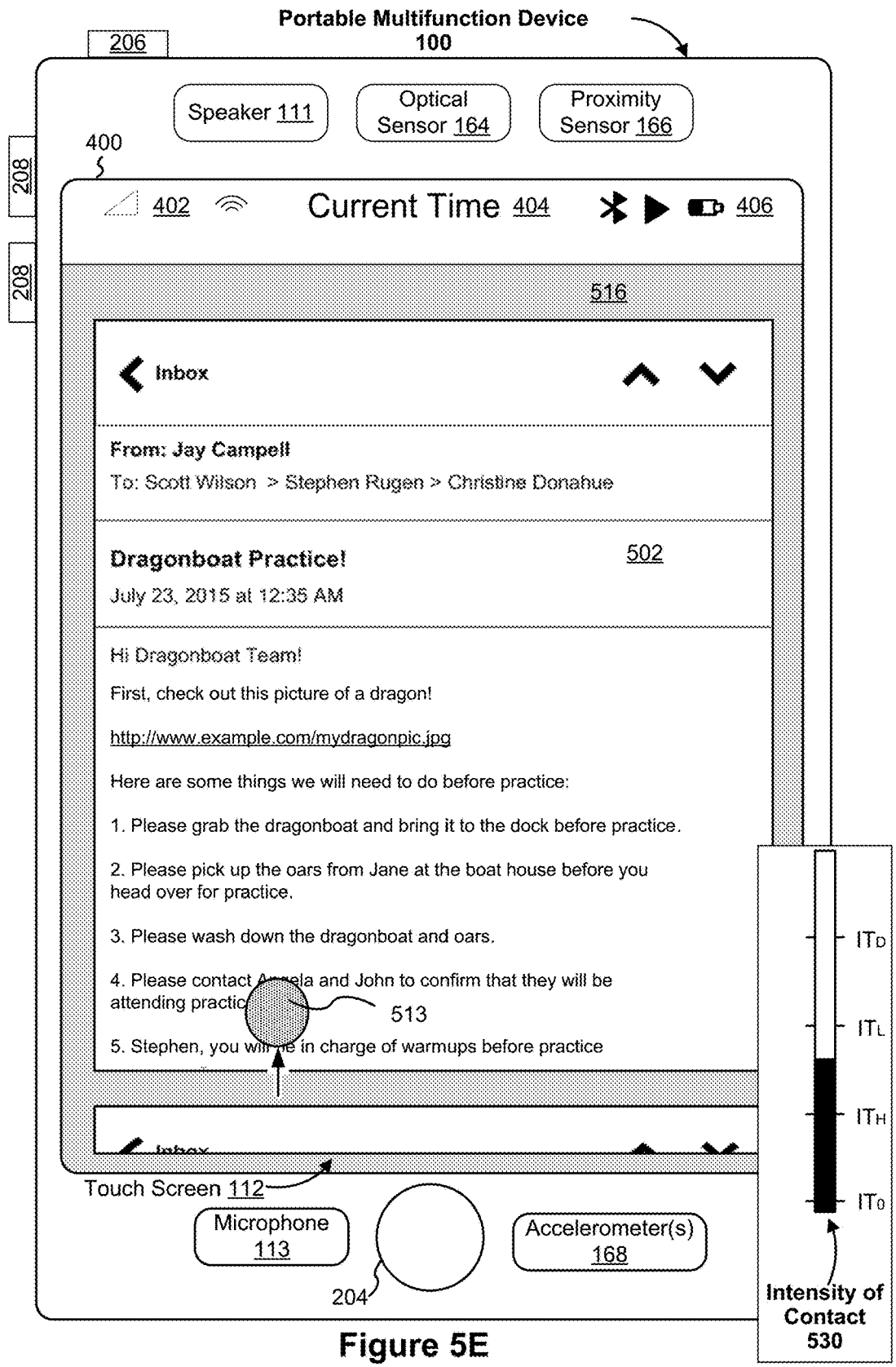
Figure 5F:
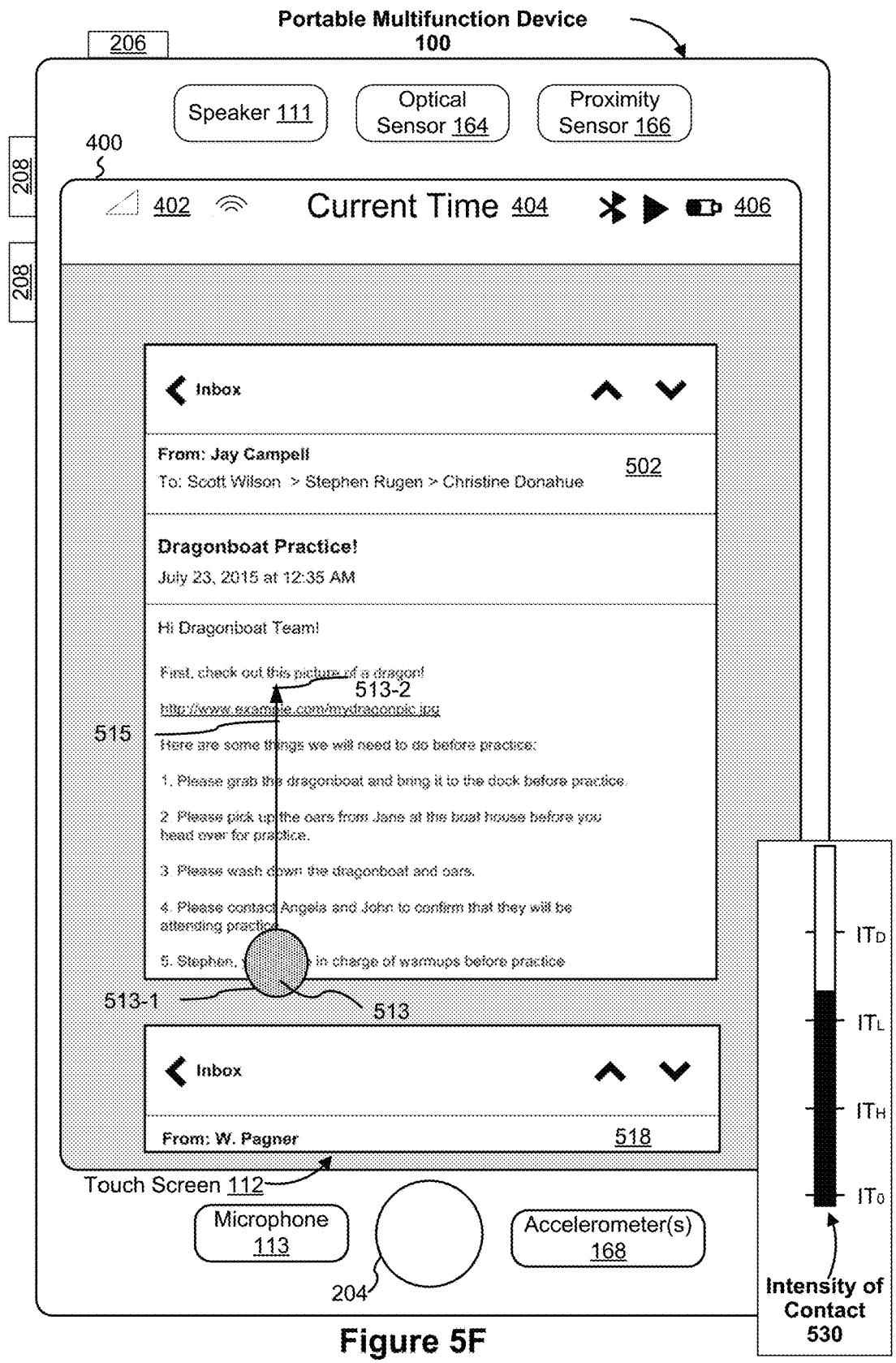
Figure 5G:
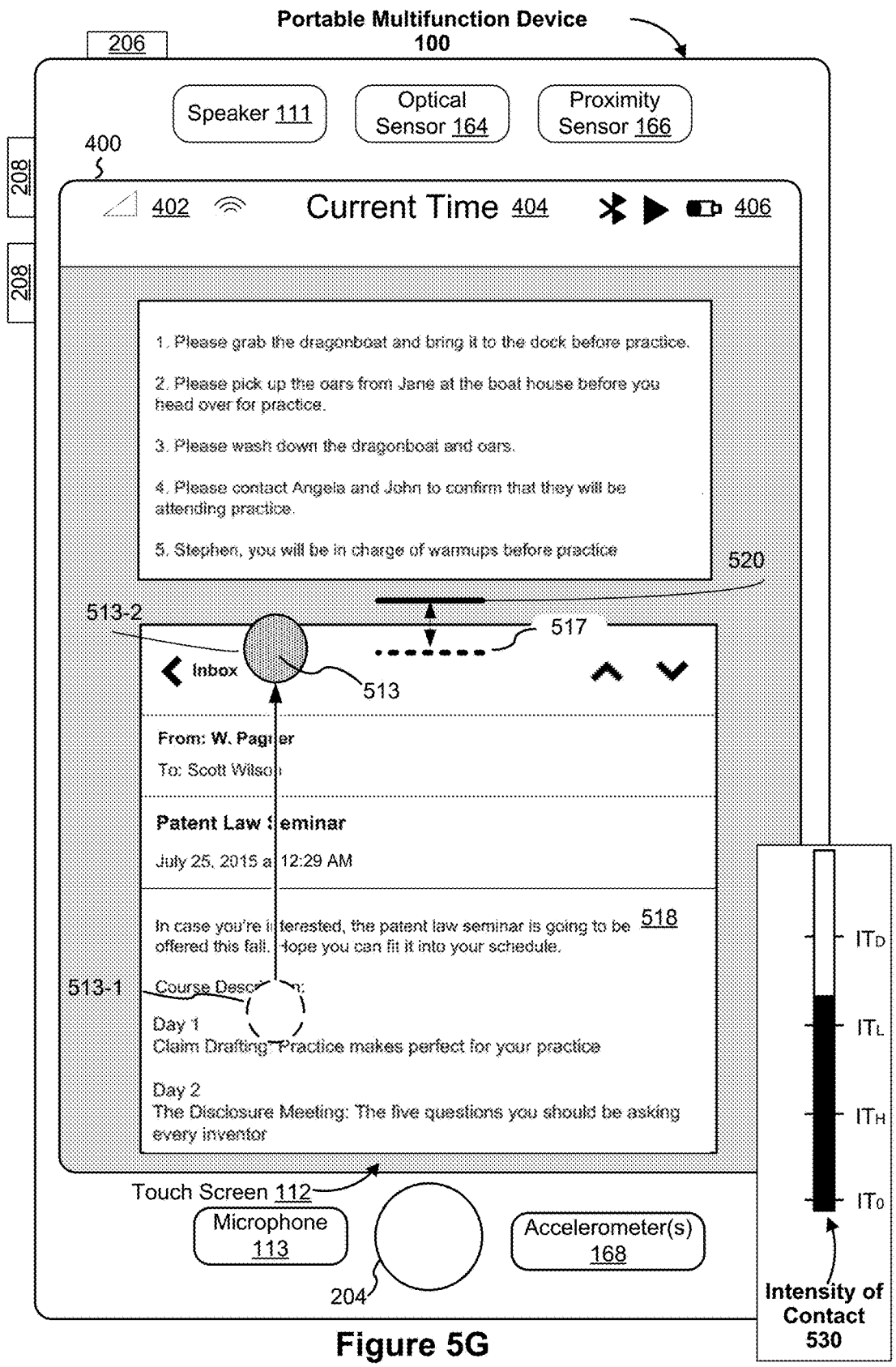
Figure 5H:
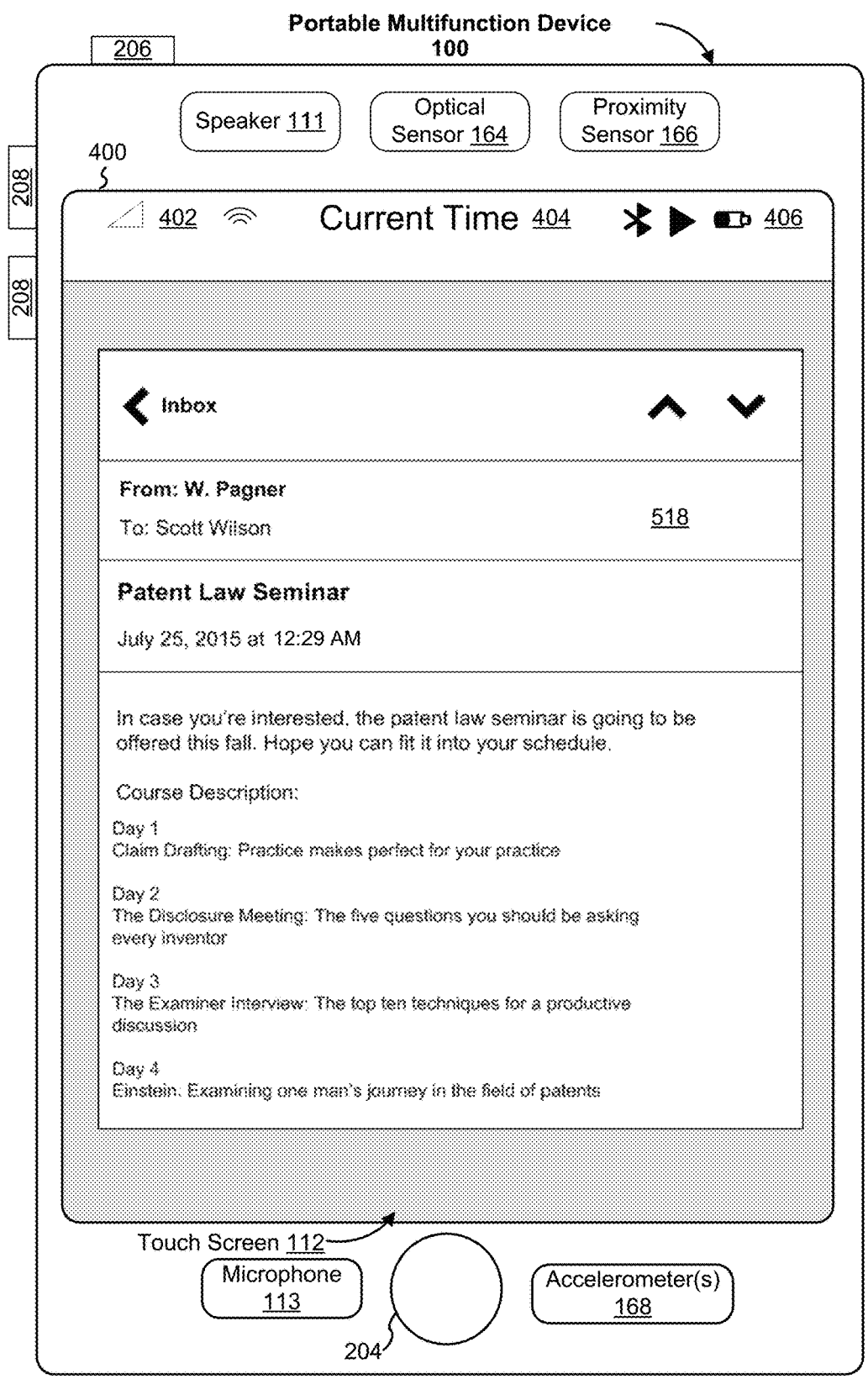
Figure 5I:
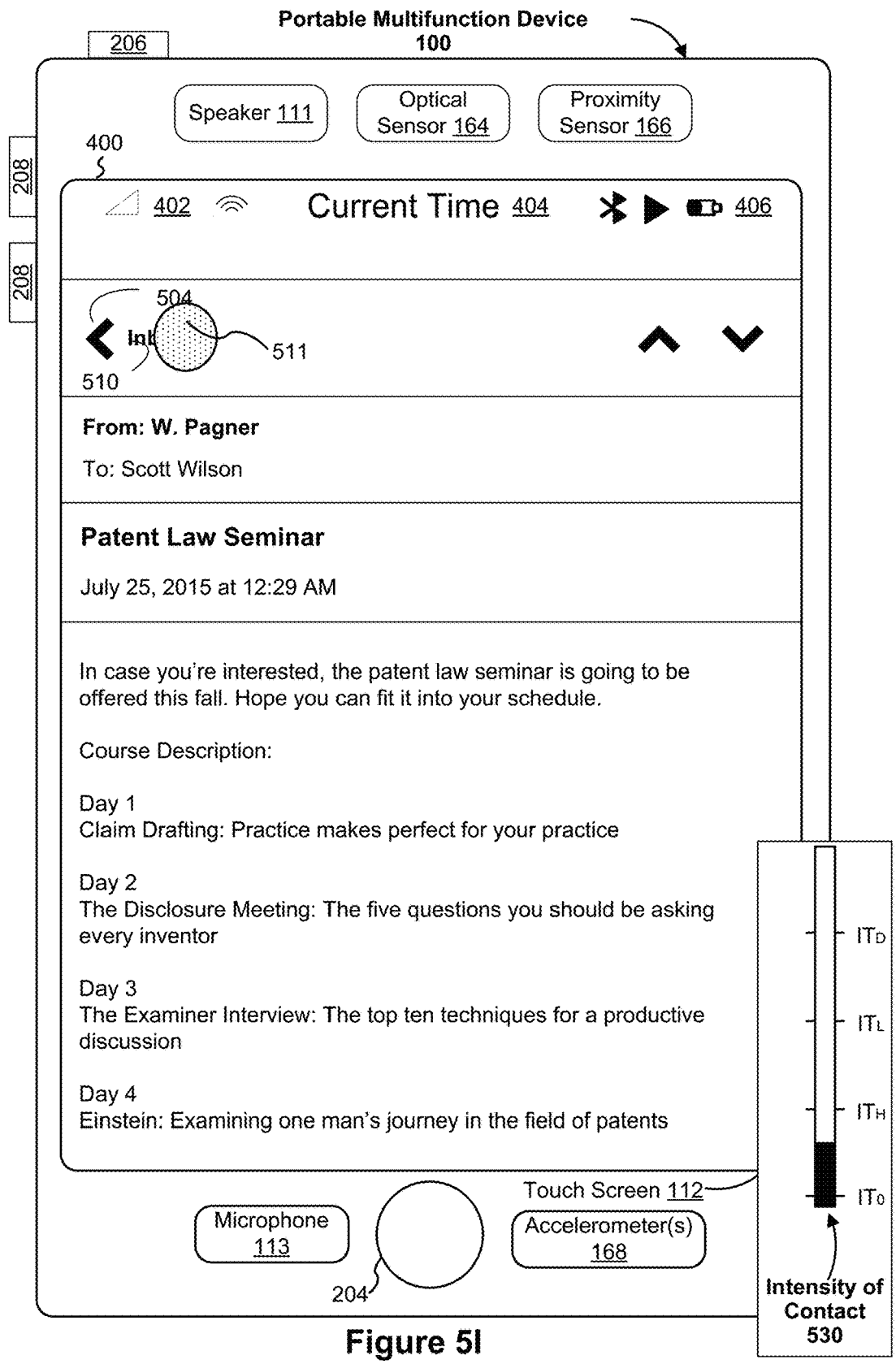
Figure 5J:
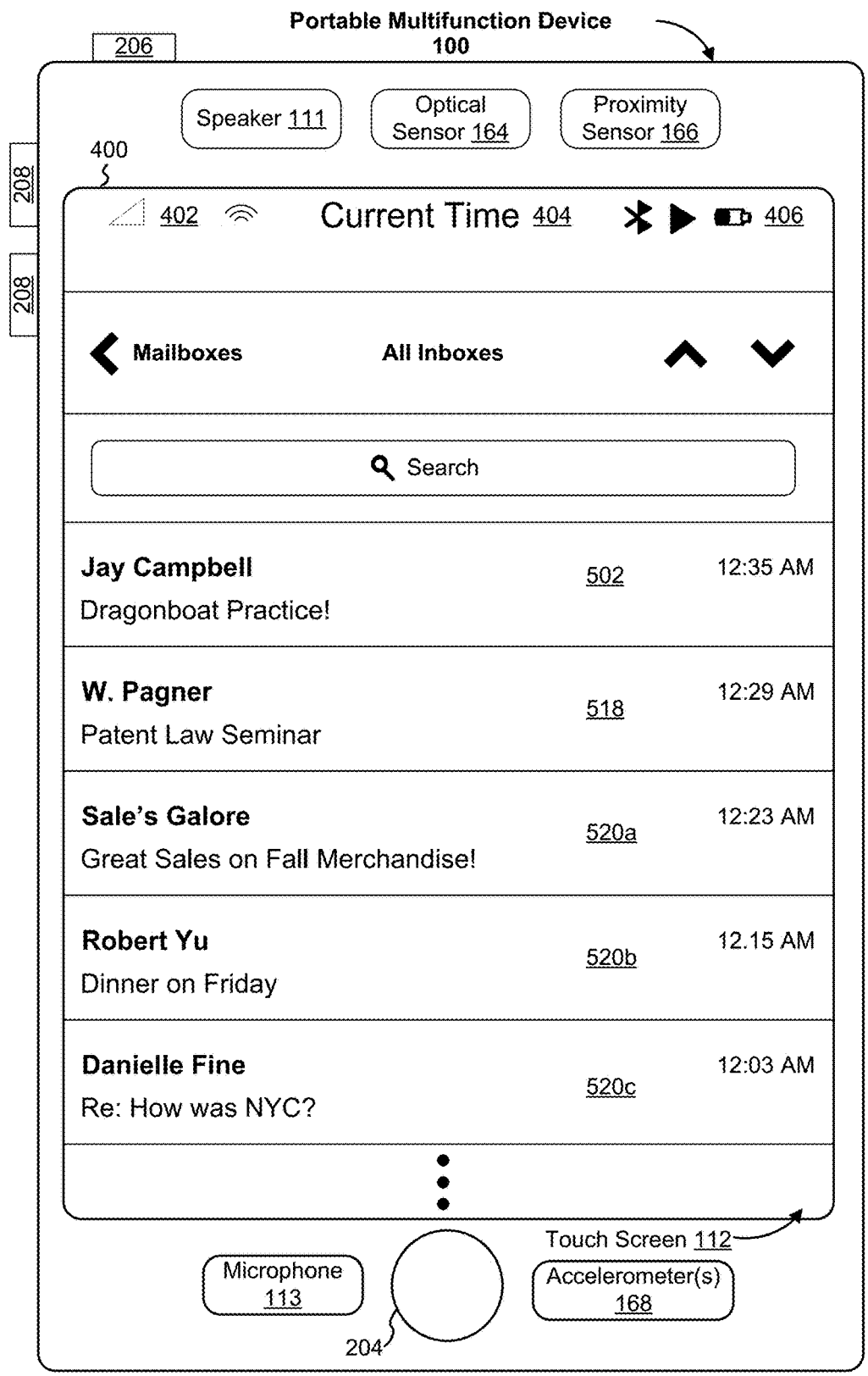
Figure 5K:
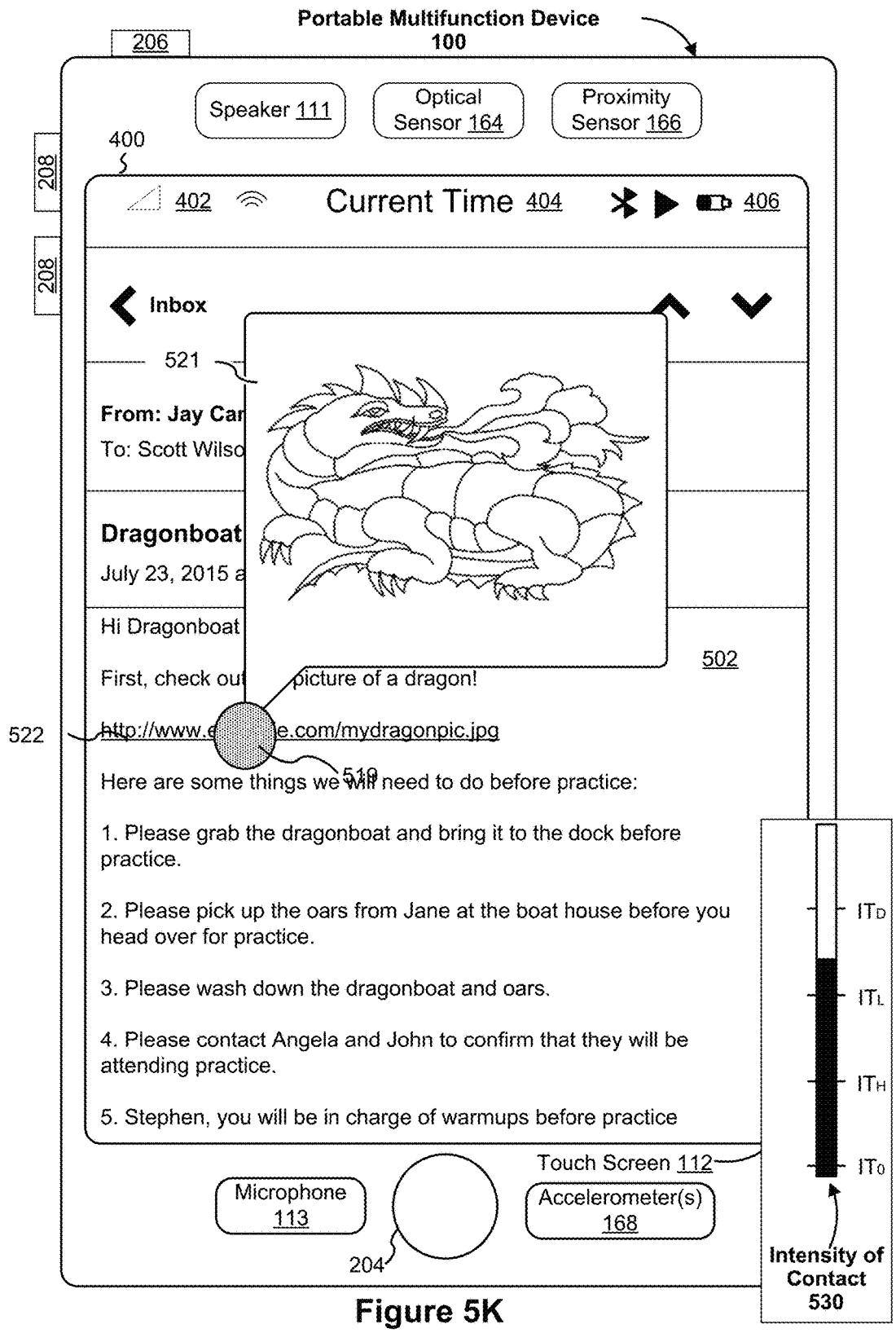
Figure 5L:
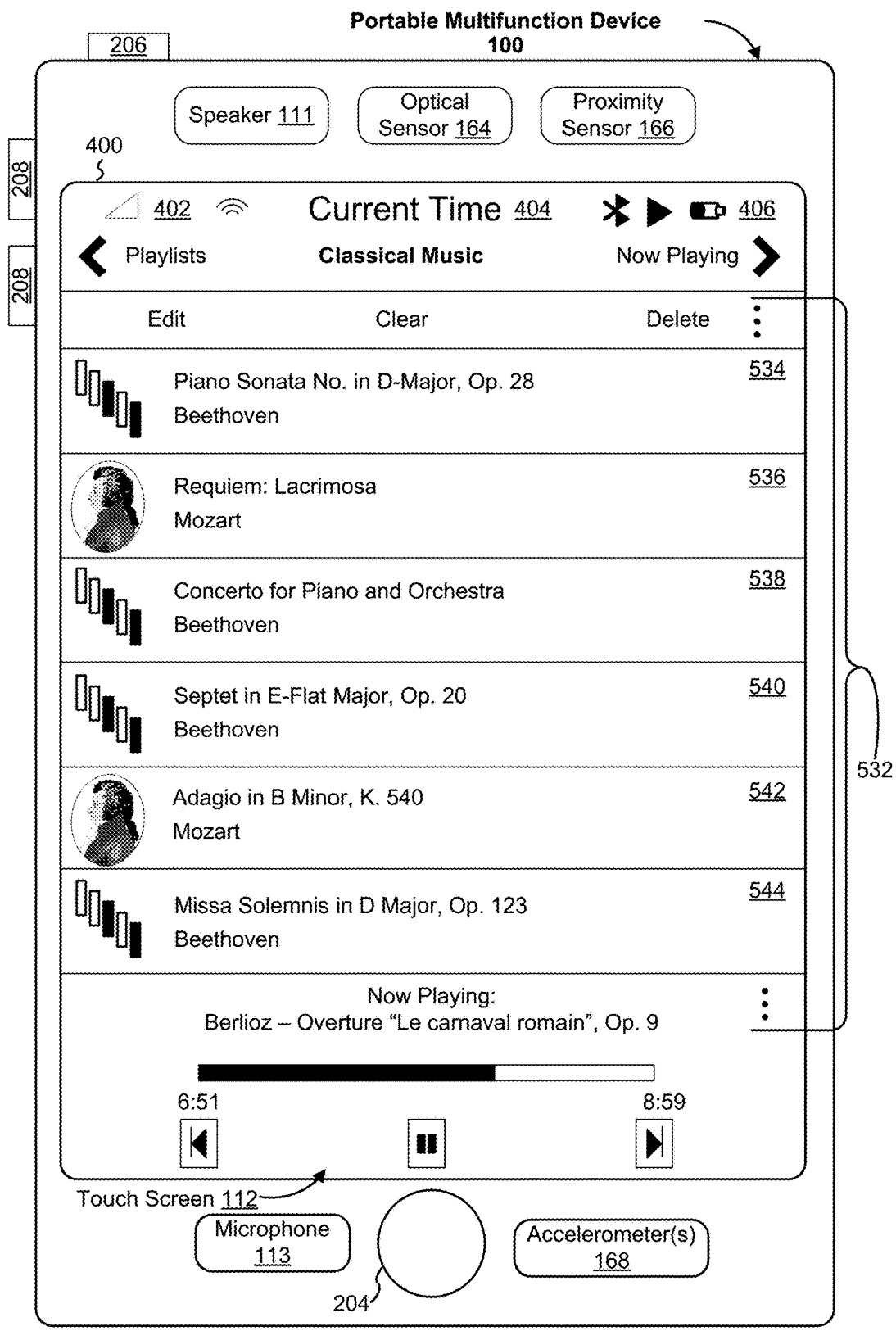
Figure 5M:
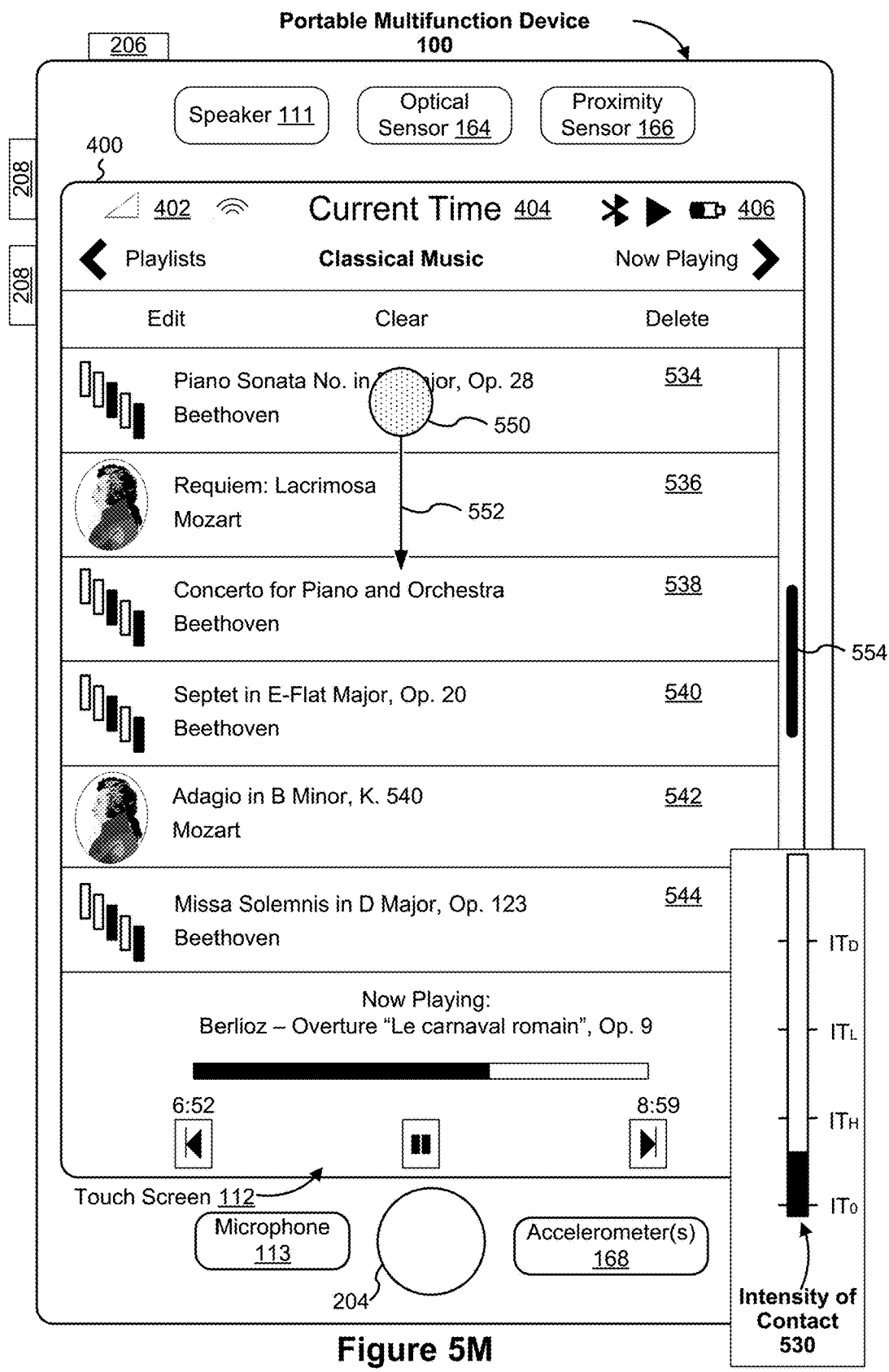
Figure 5N:
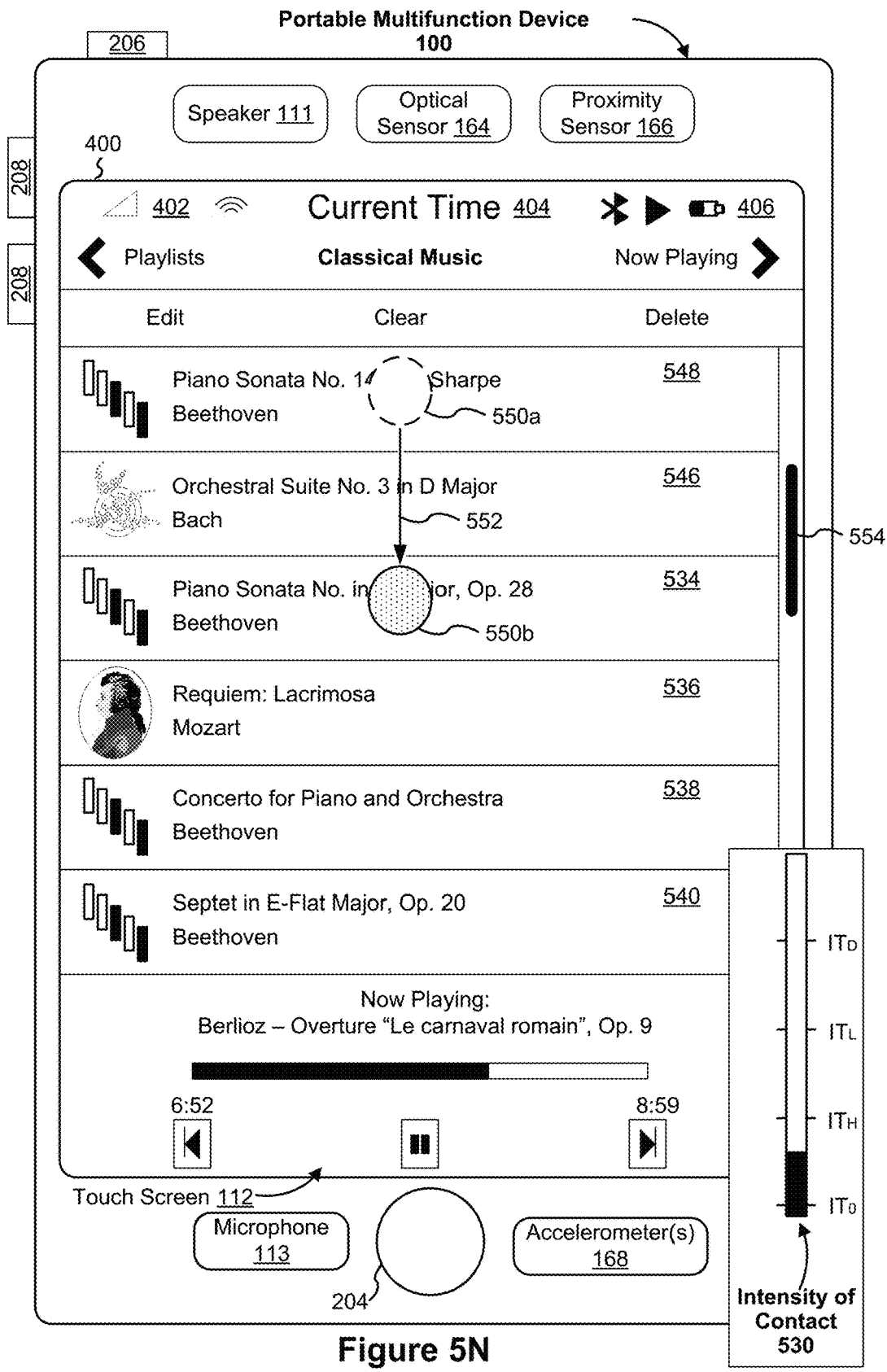
Figure 5O:
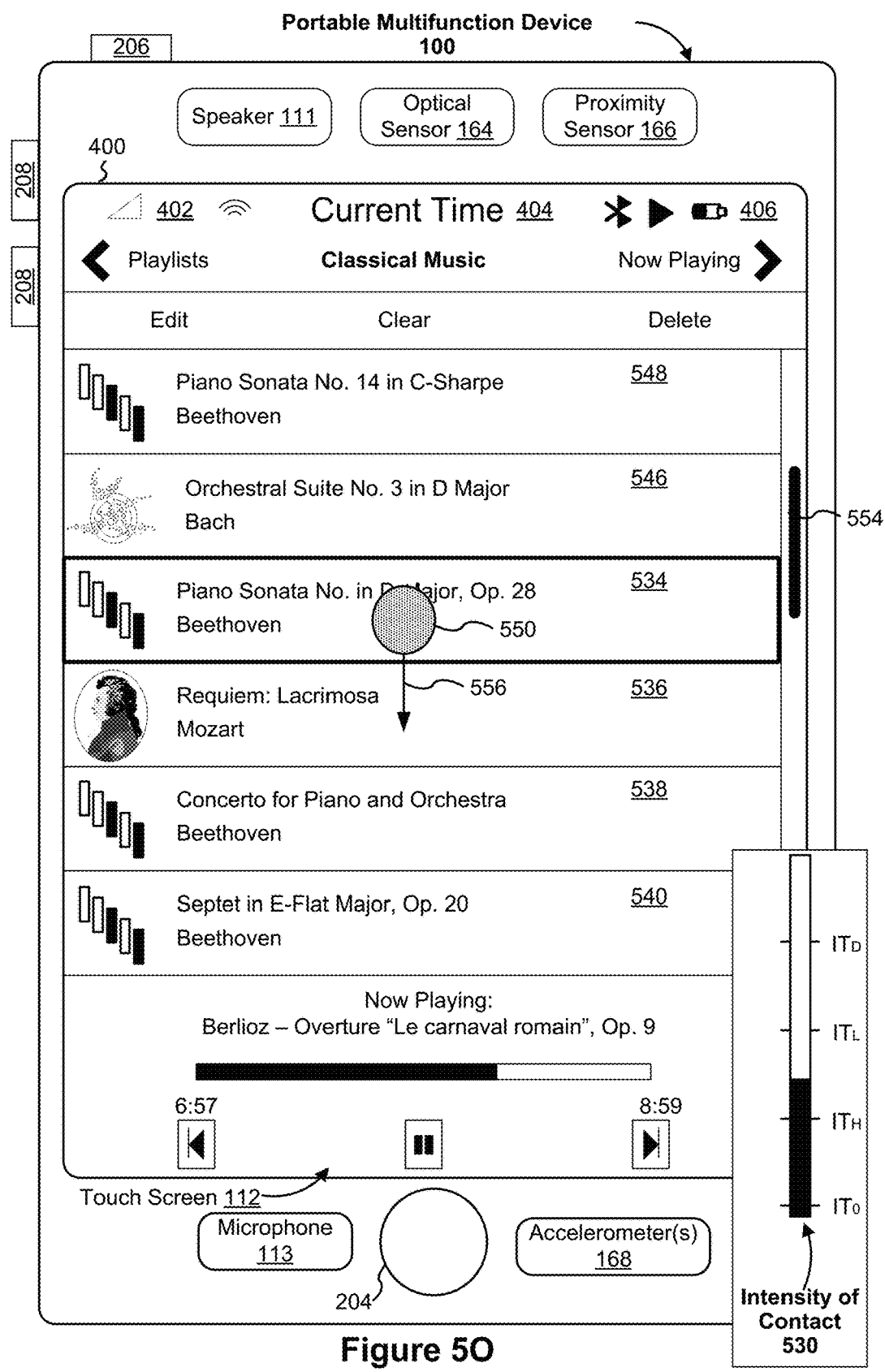
Figure 5P:
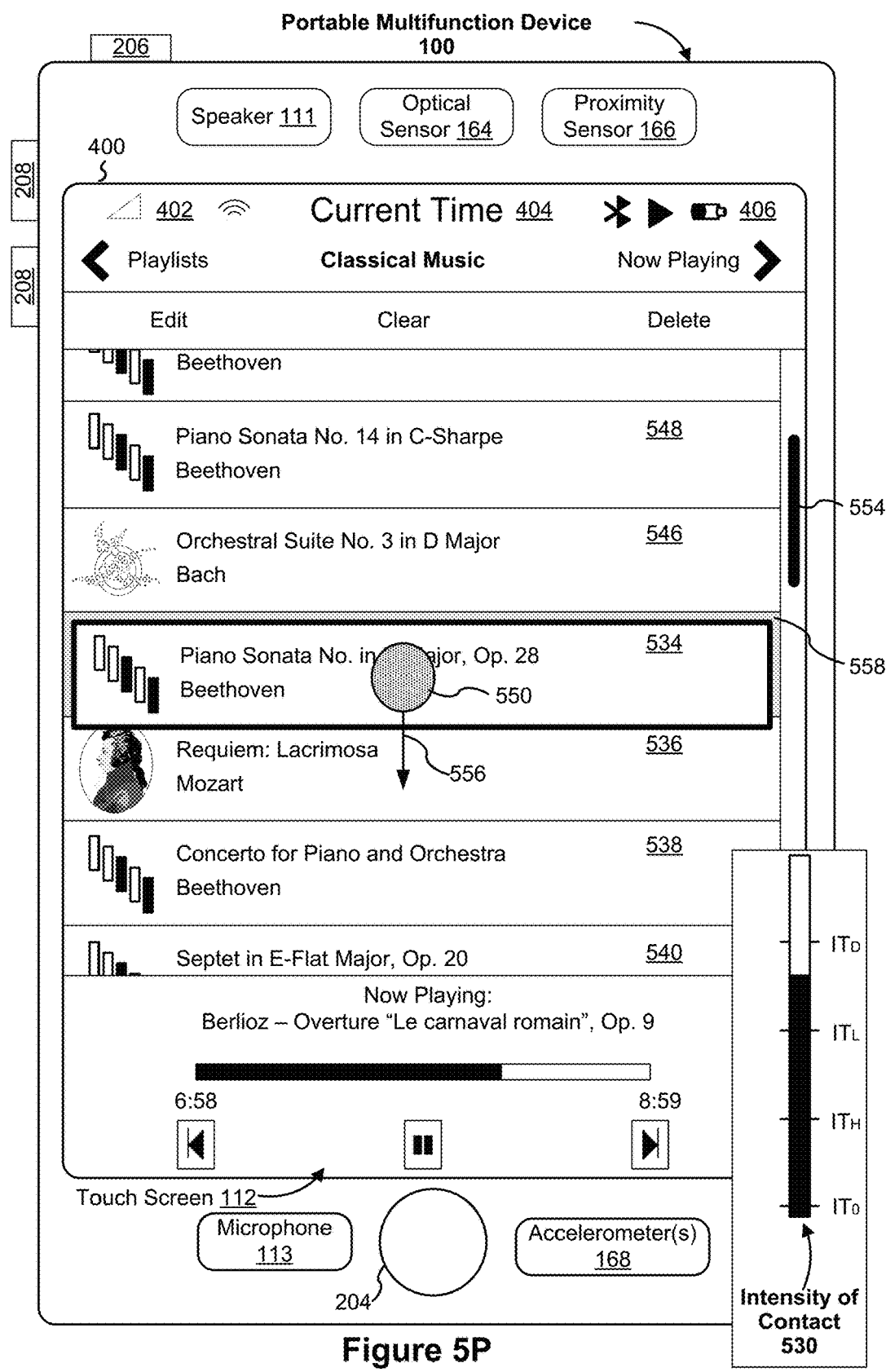
Figure 5Q:
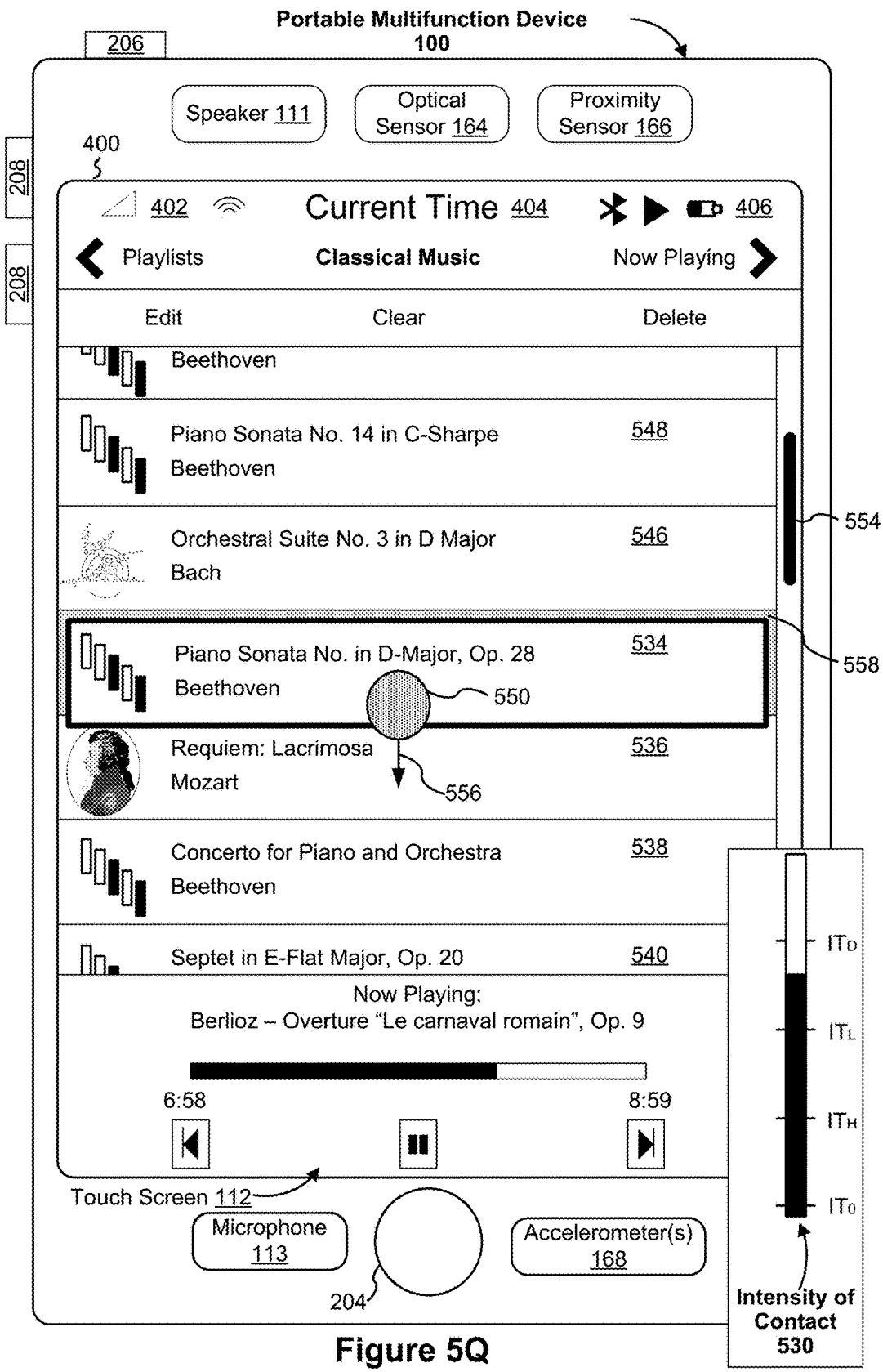
Figure 5R:
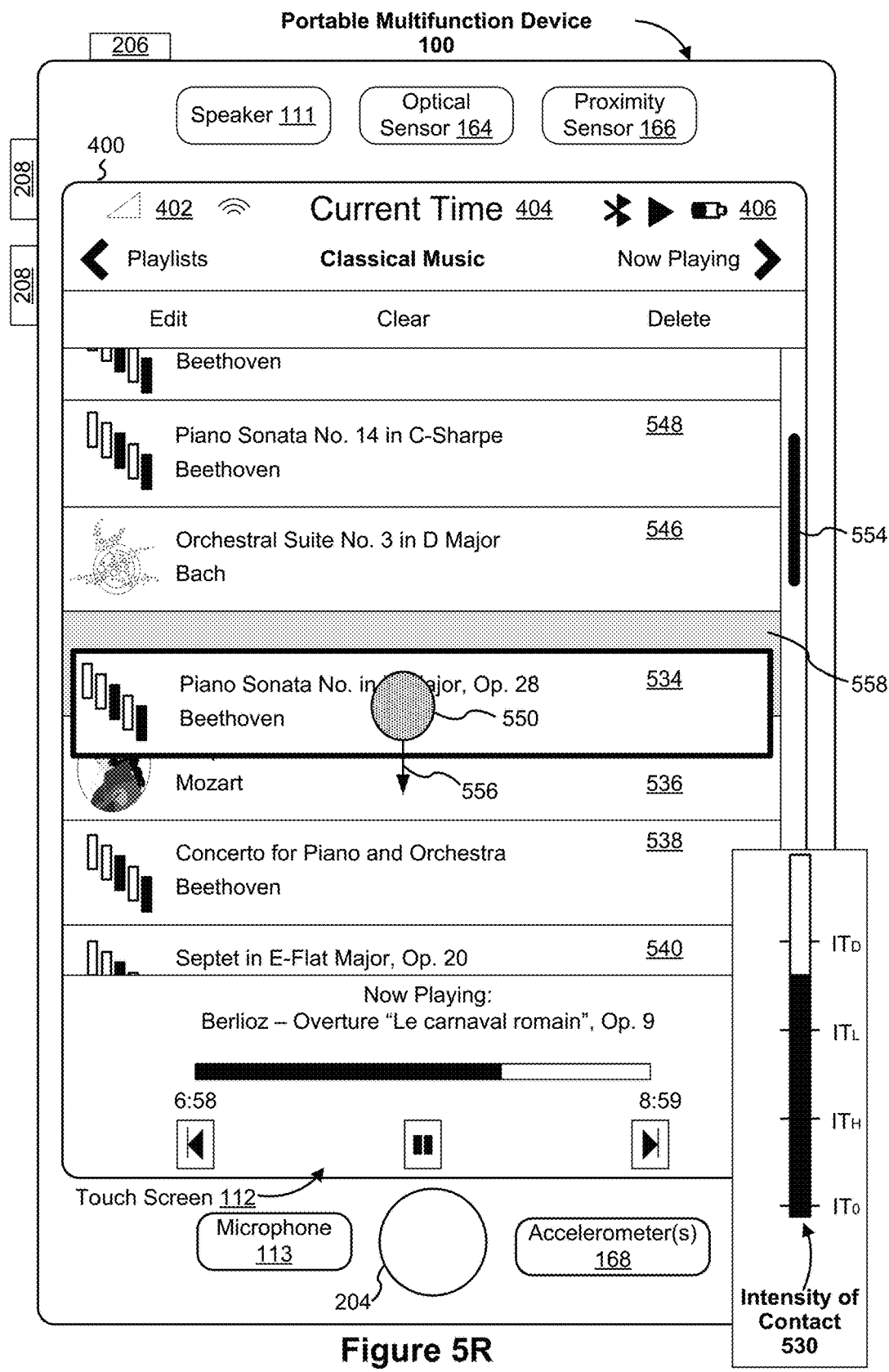
Figure 5S:
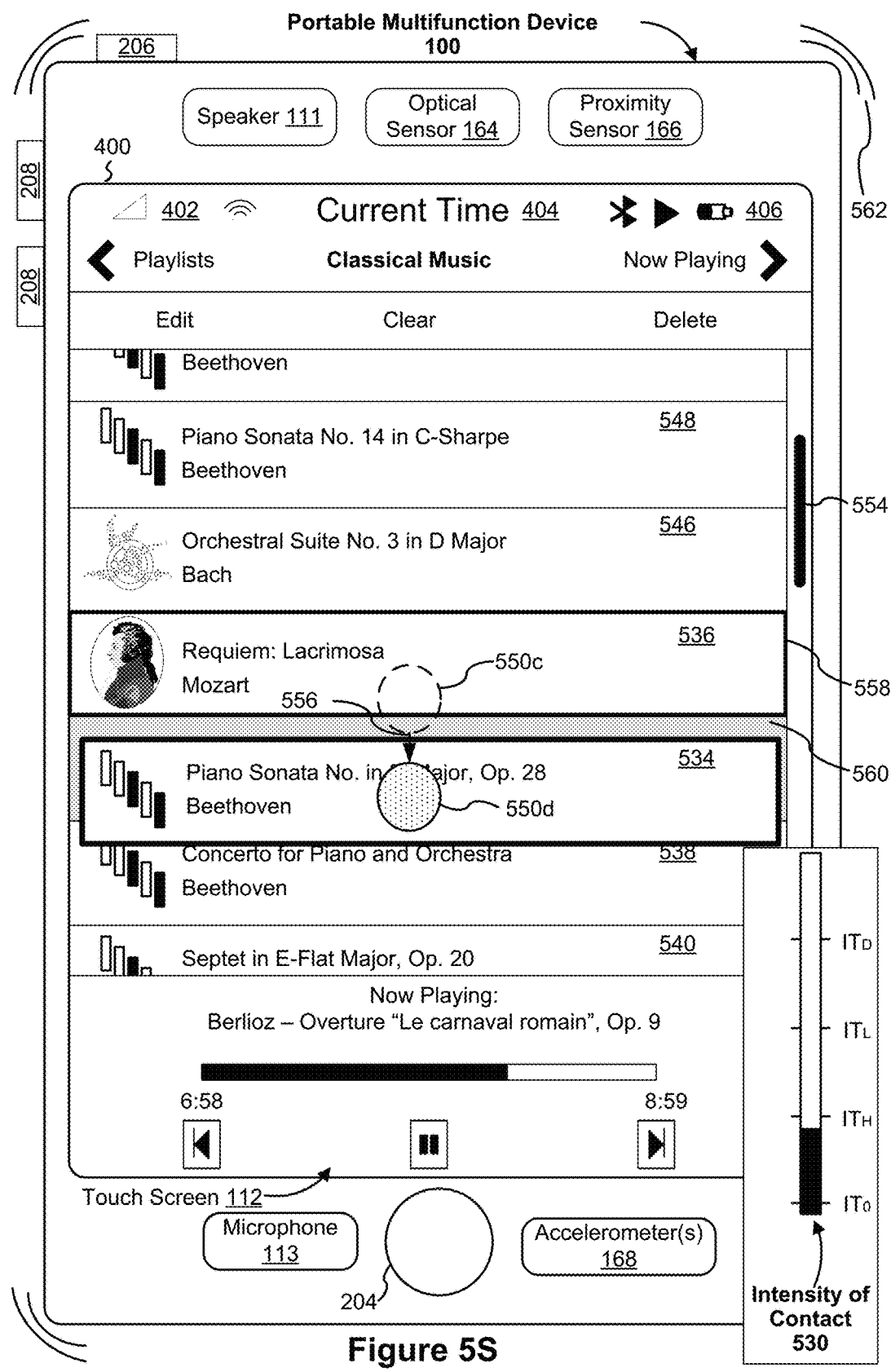
Figure 5U:
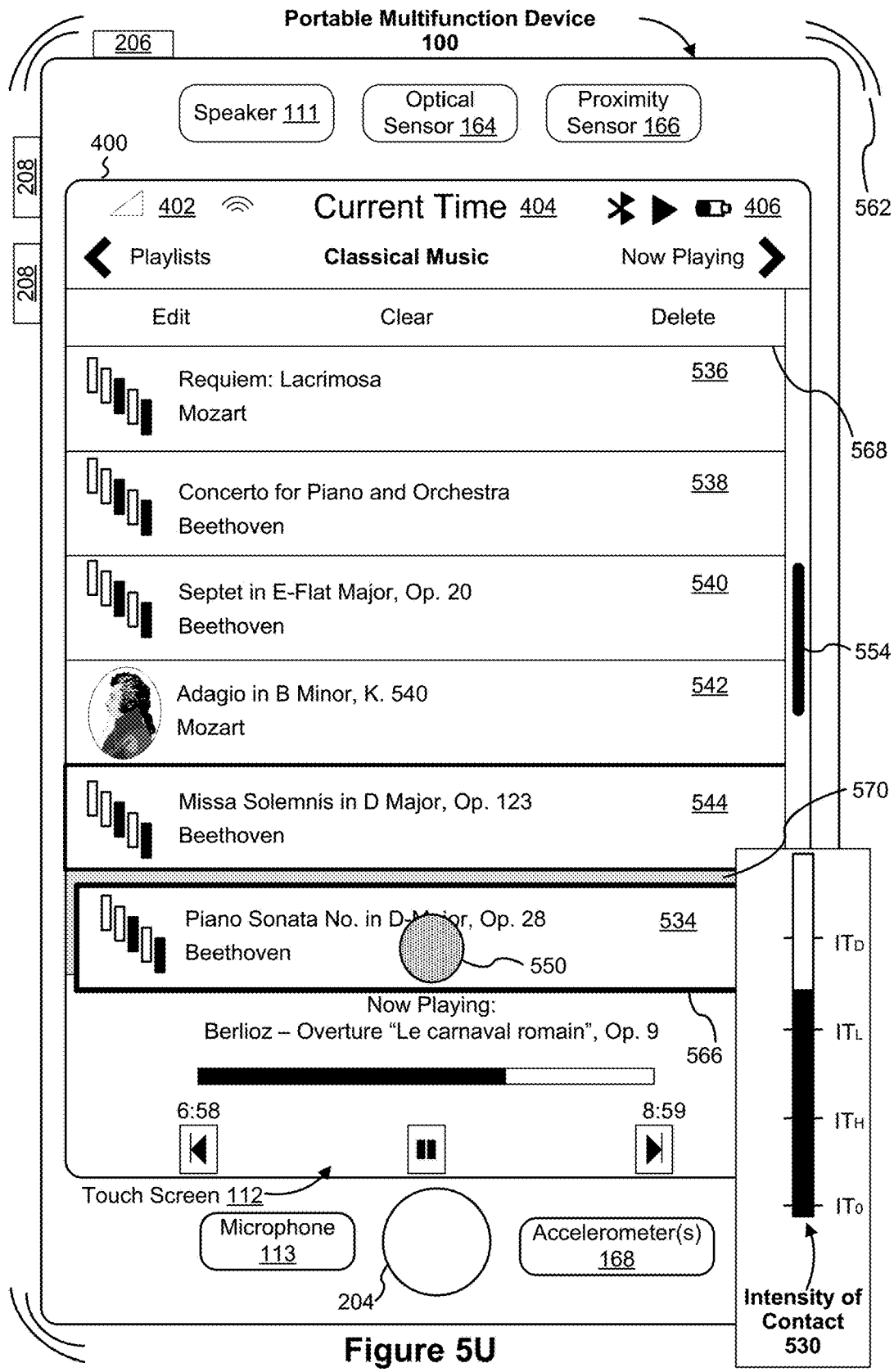
Figure 5V:
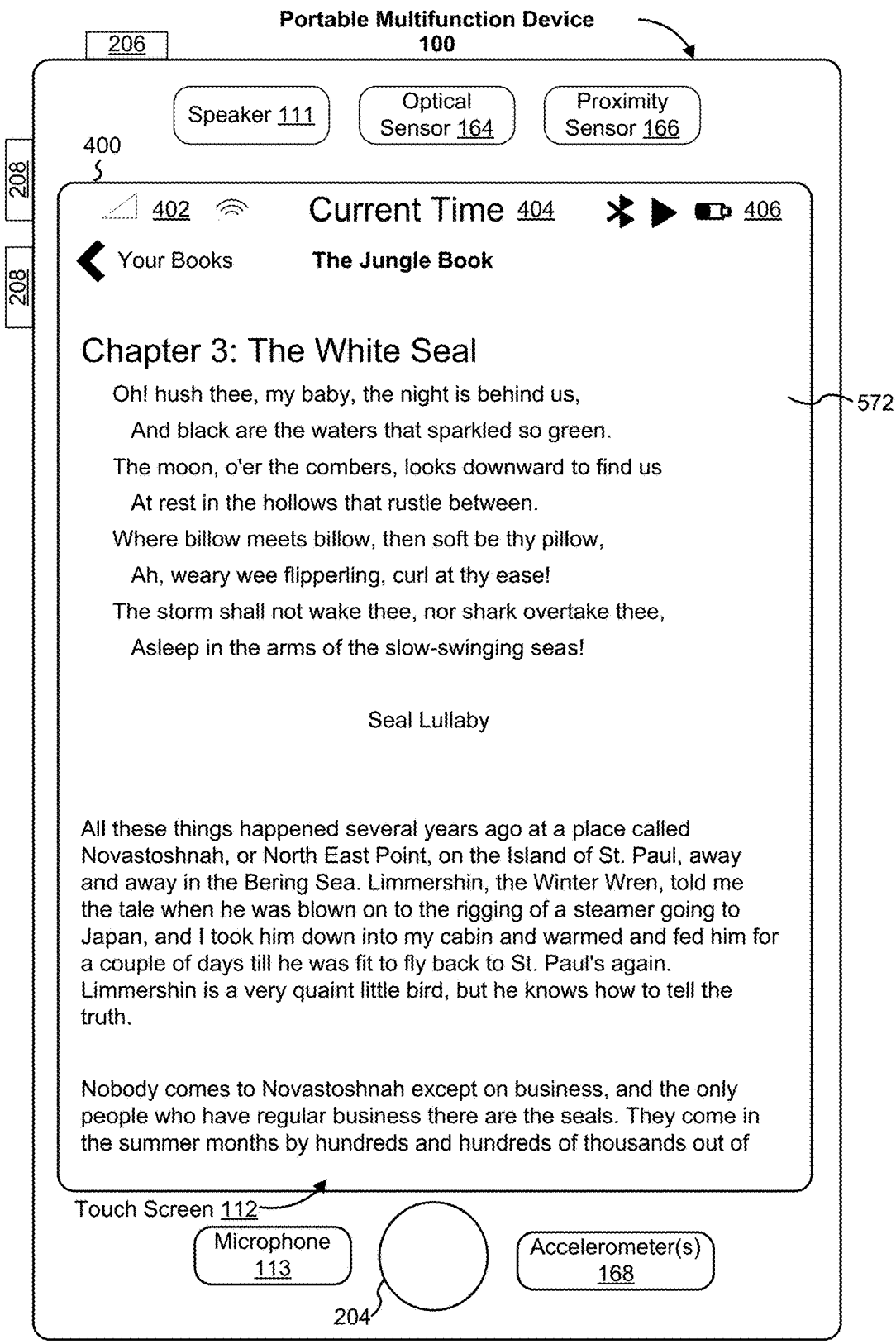
Figure 5W:
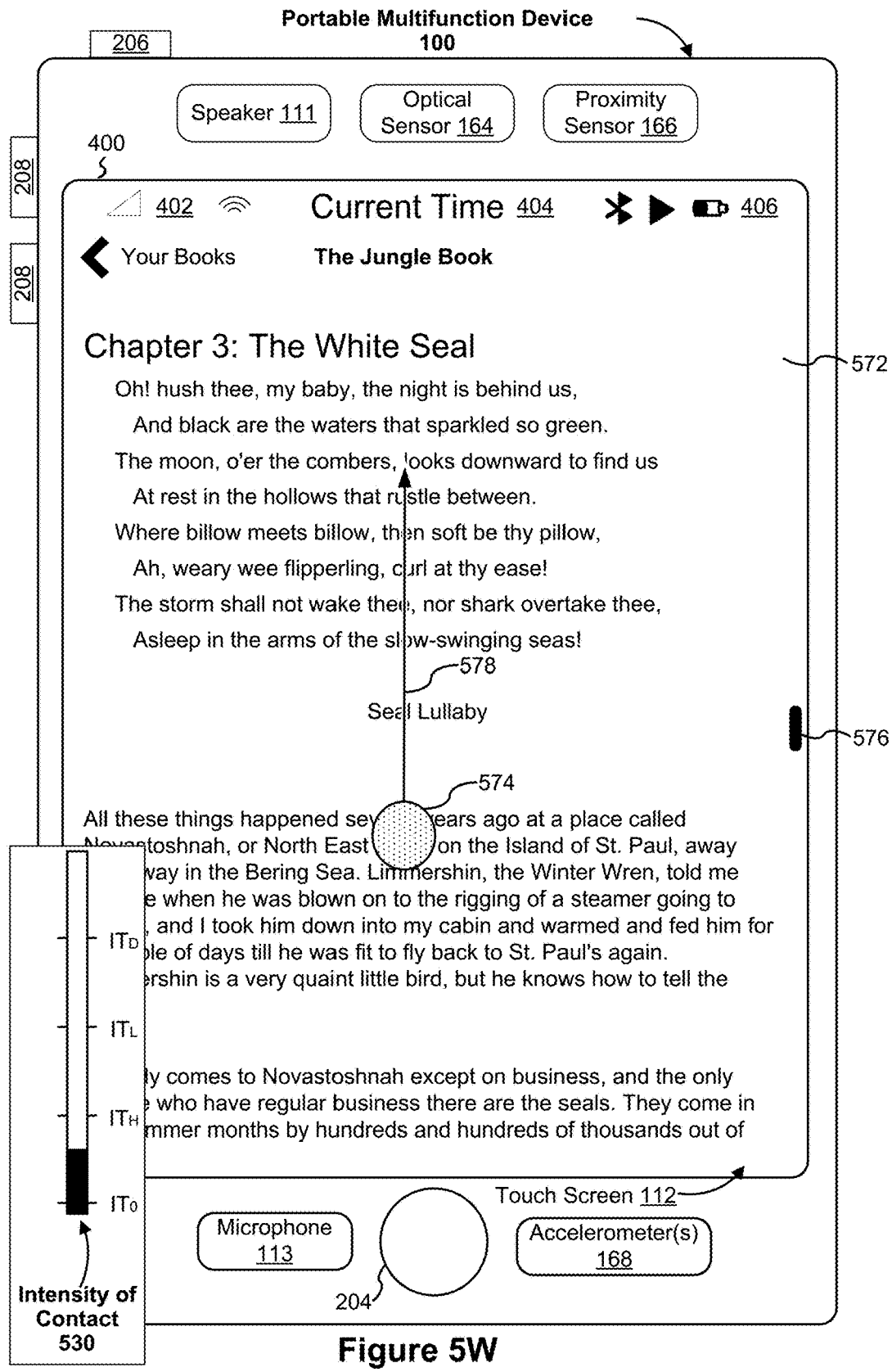
Figure 5X:
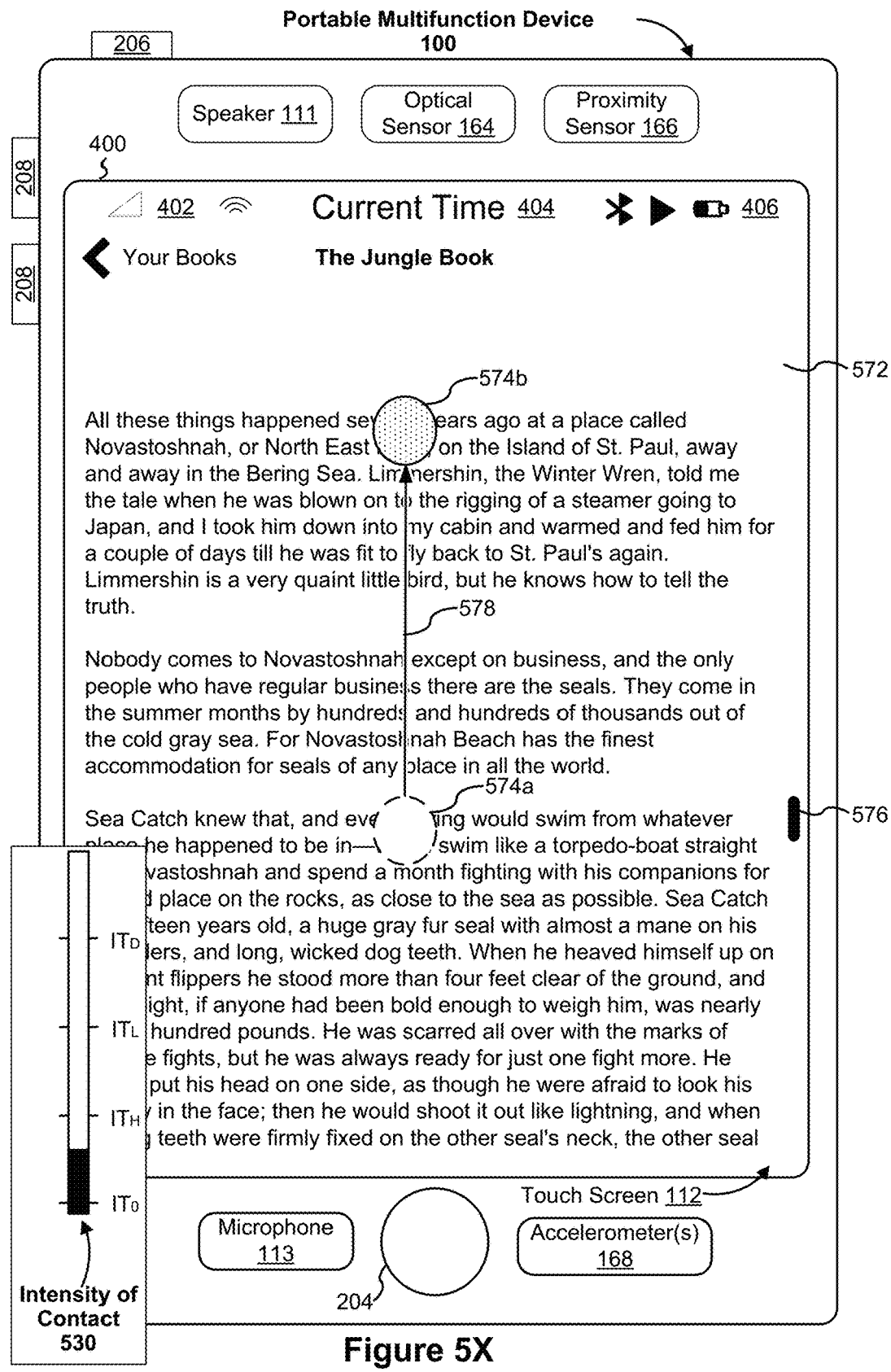
Figure 5Y:
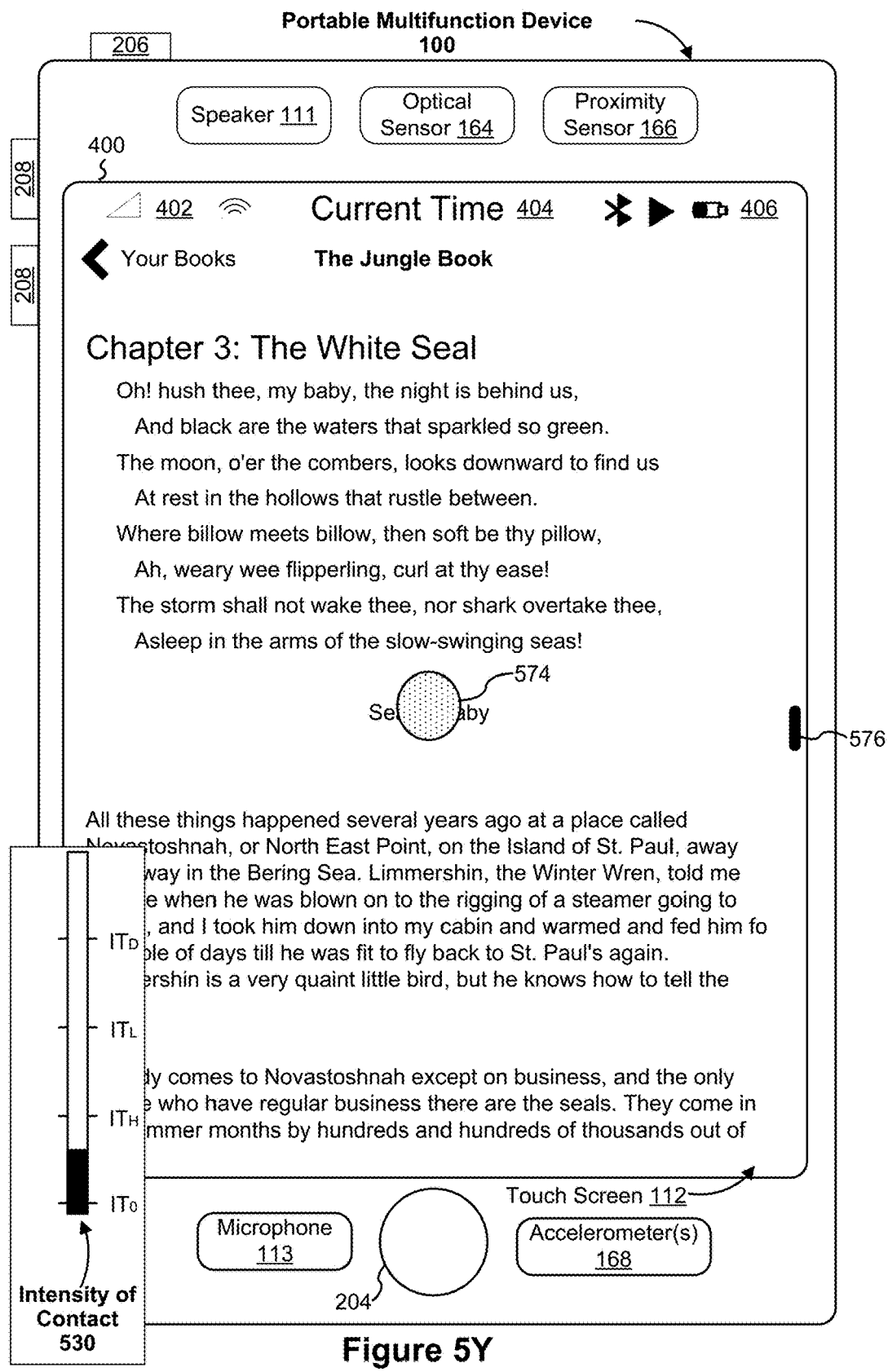
Figure 5Z:
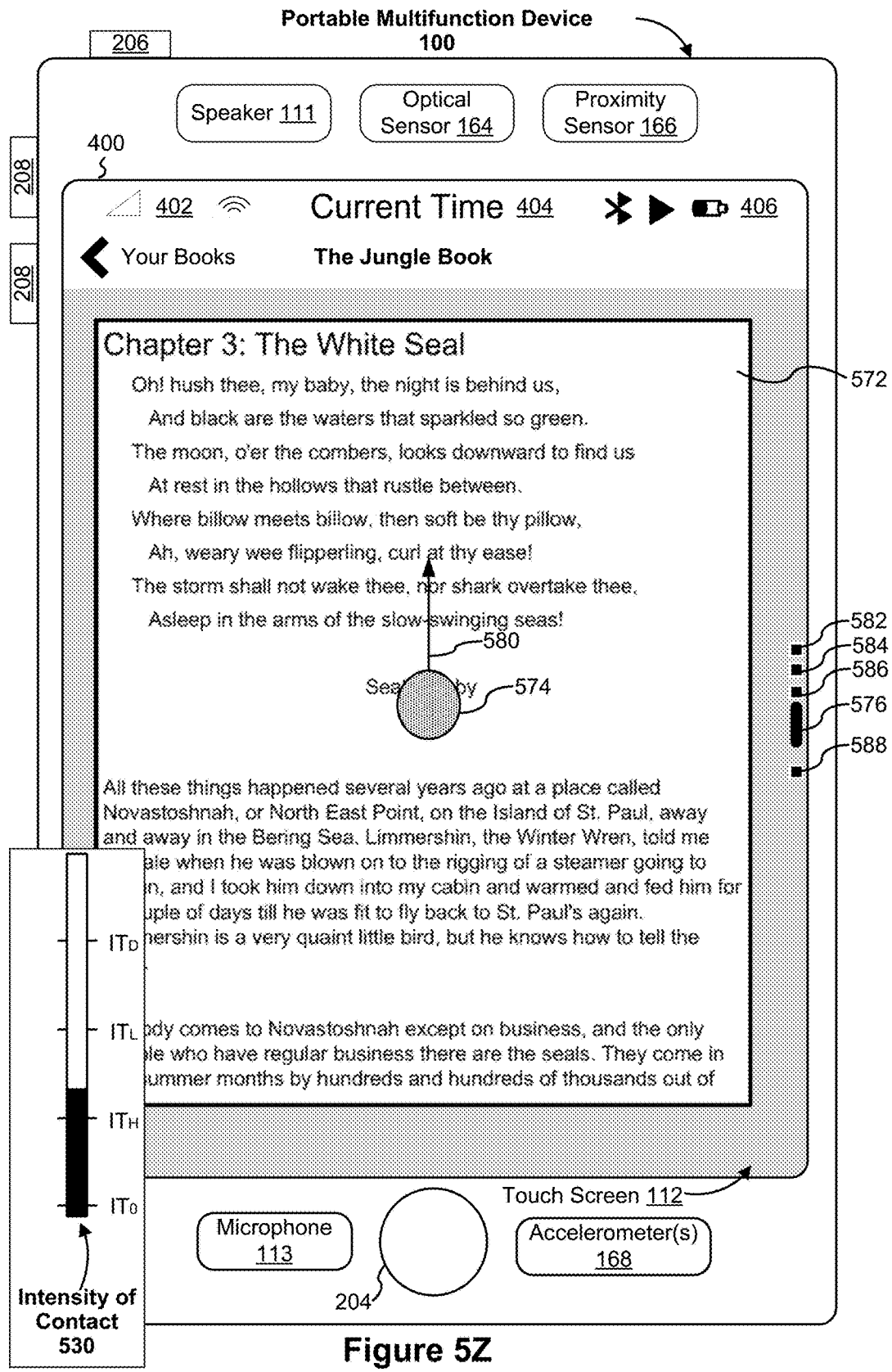
Figure 5A:
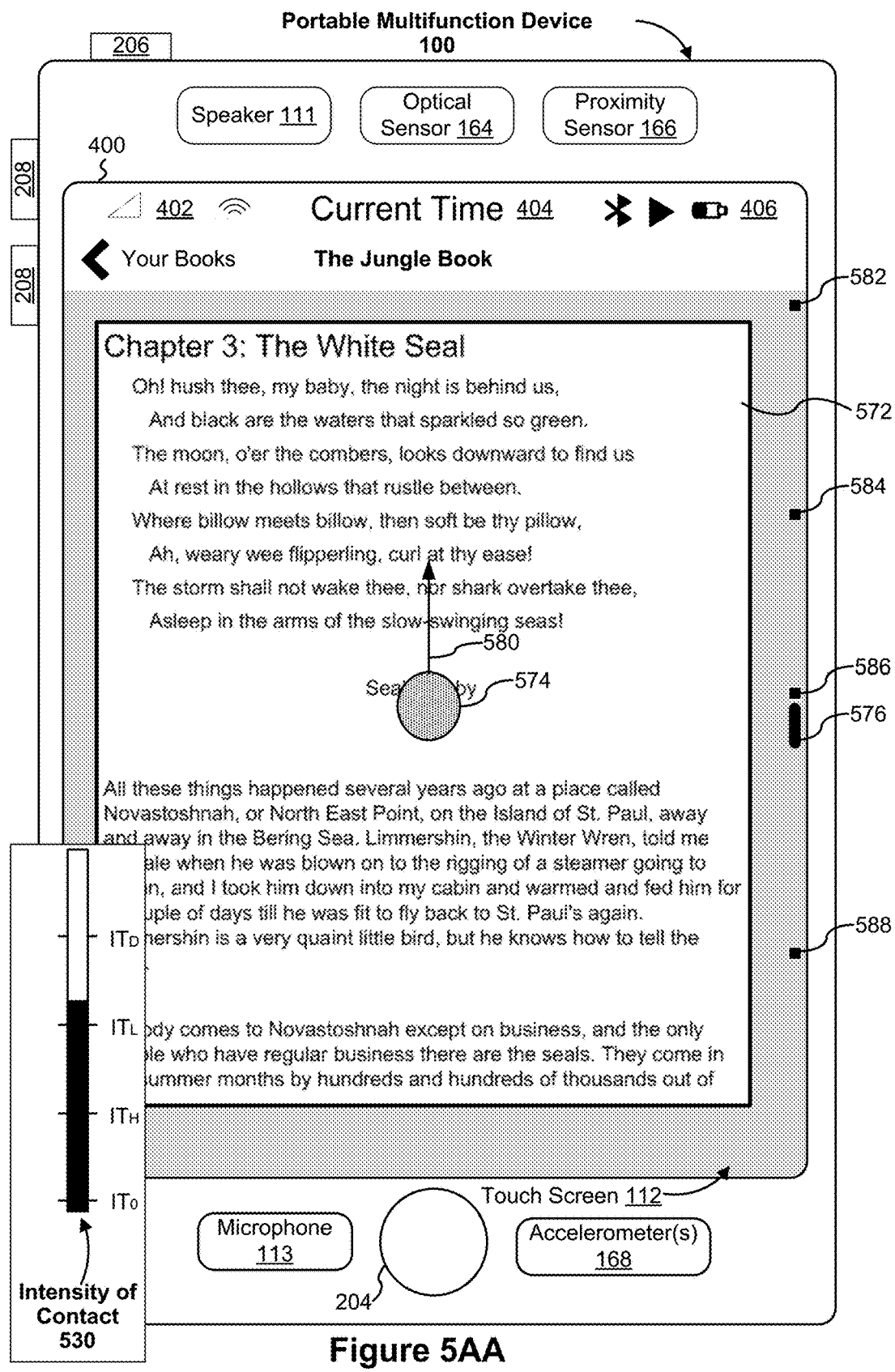
Figure 5B:
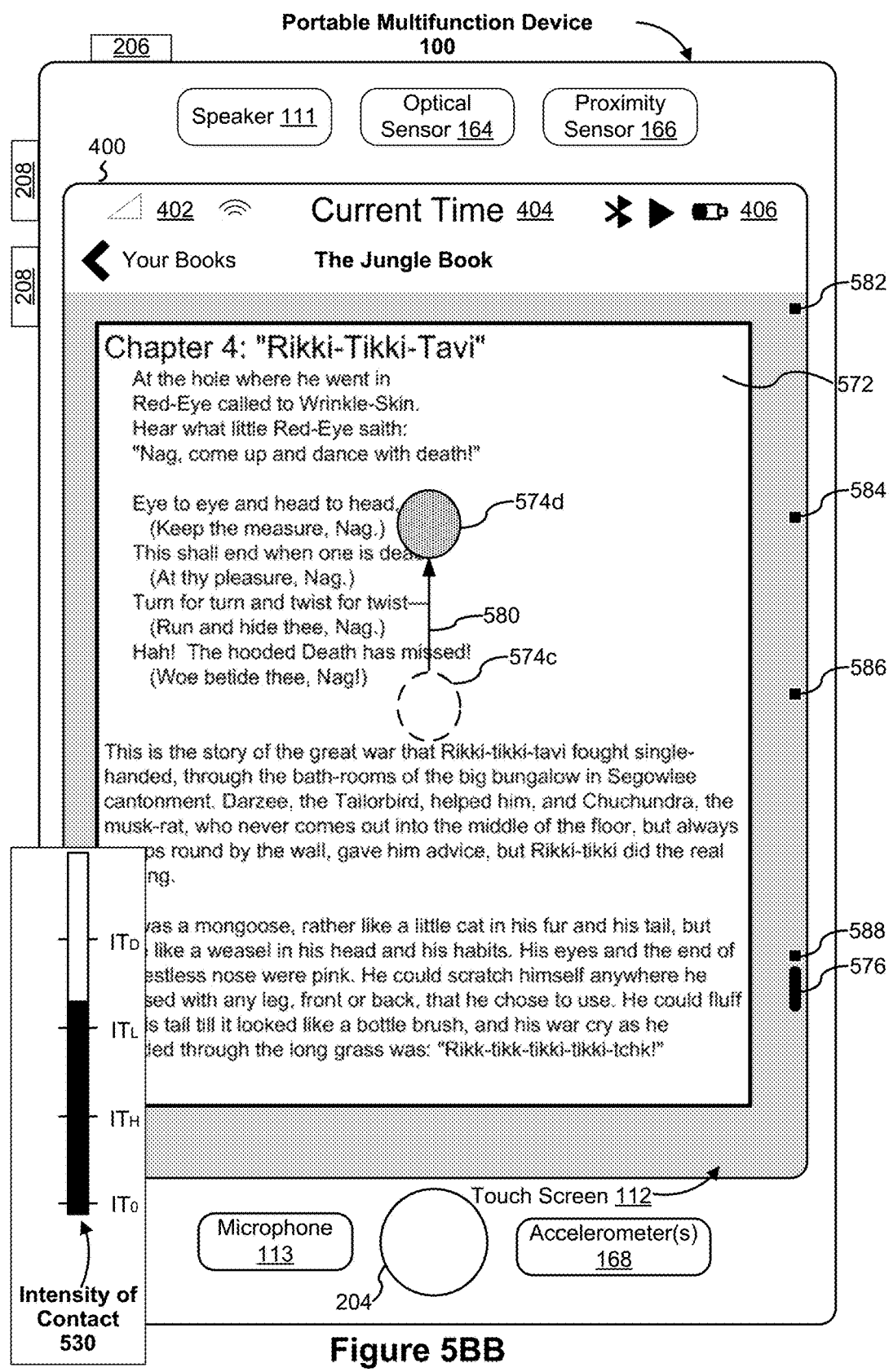
Figure 5C:
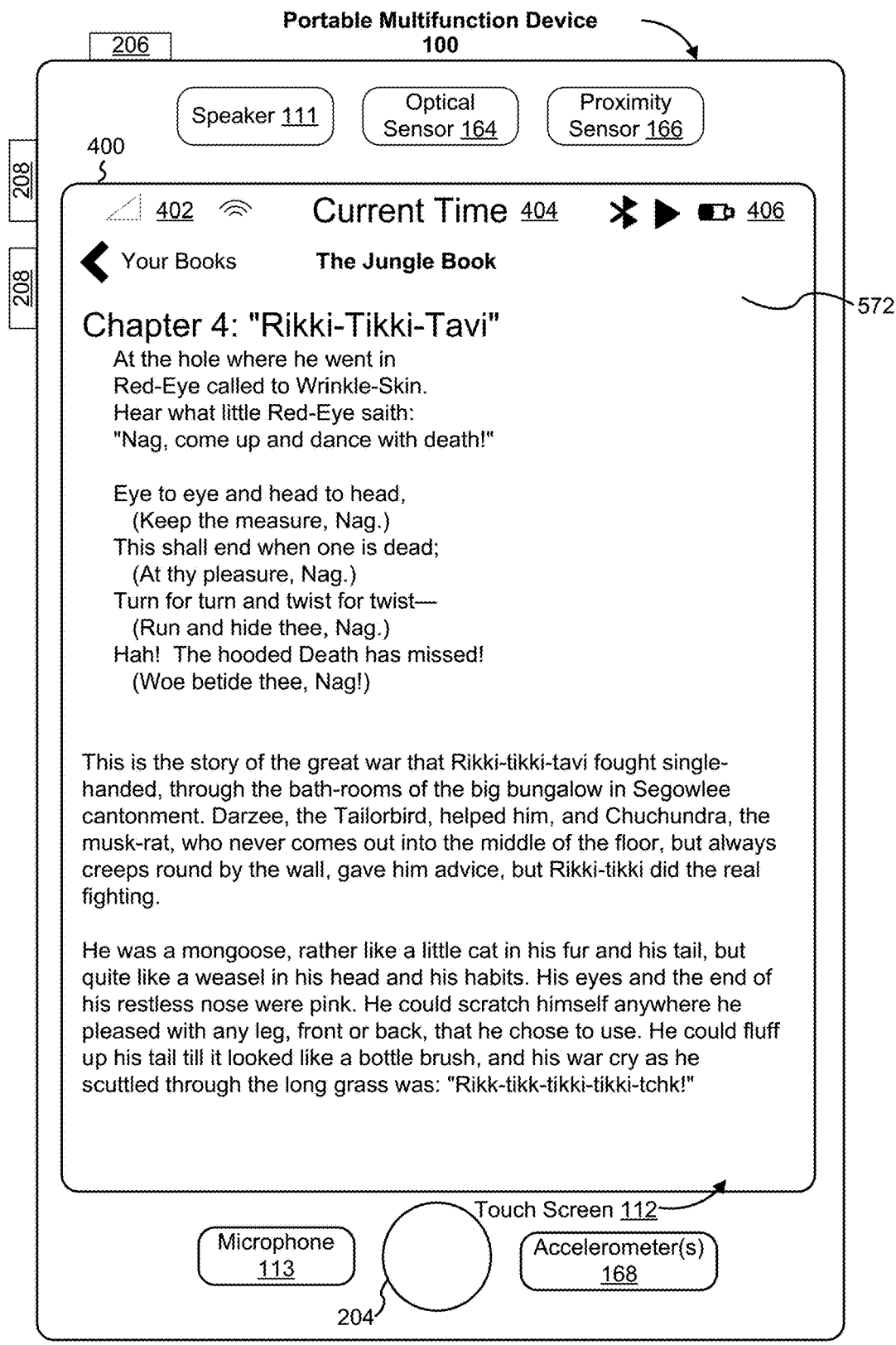
Figure 5D:
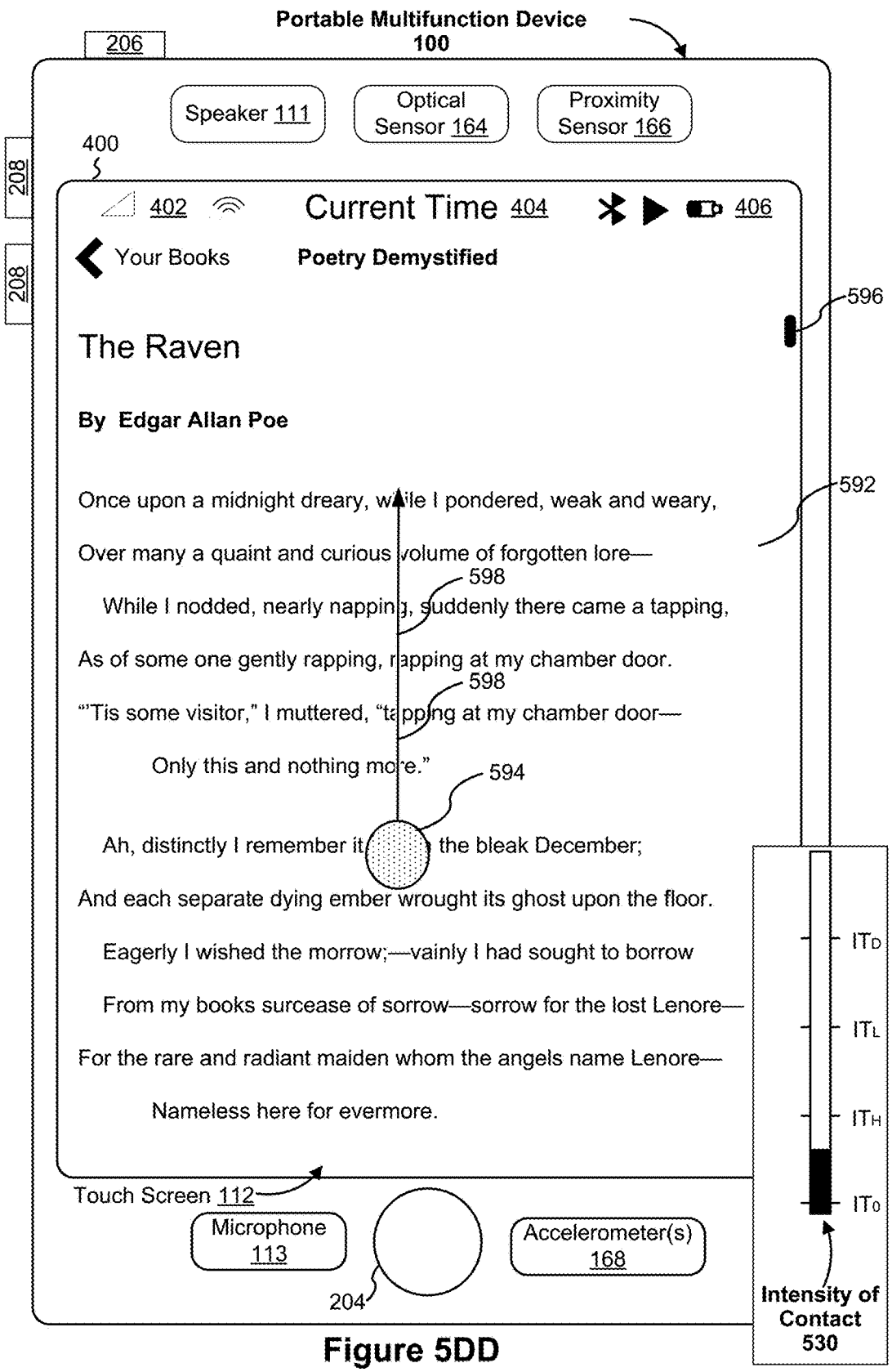
Figure 5E:
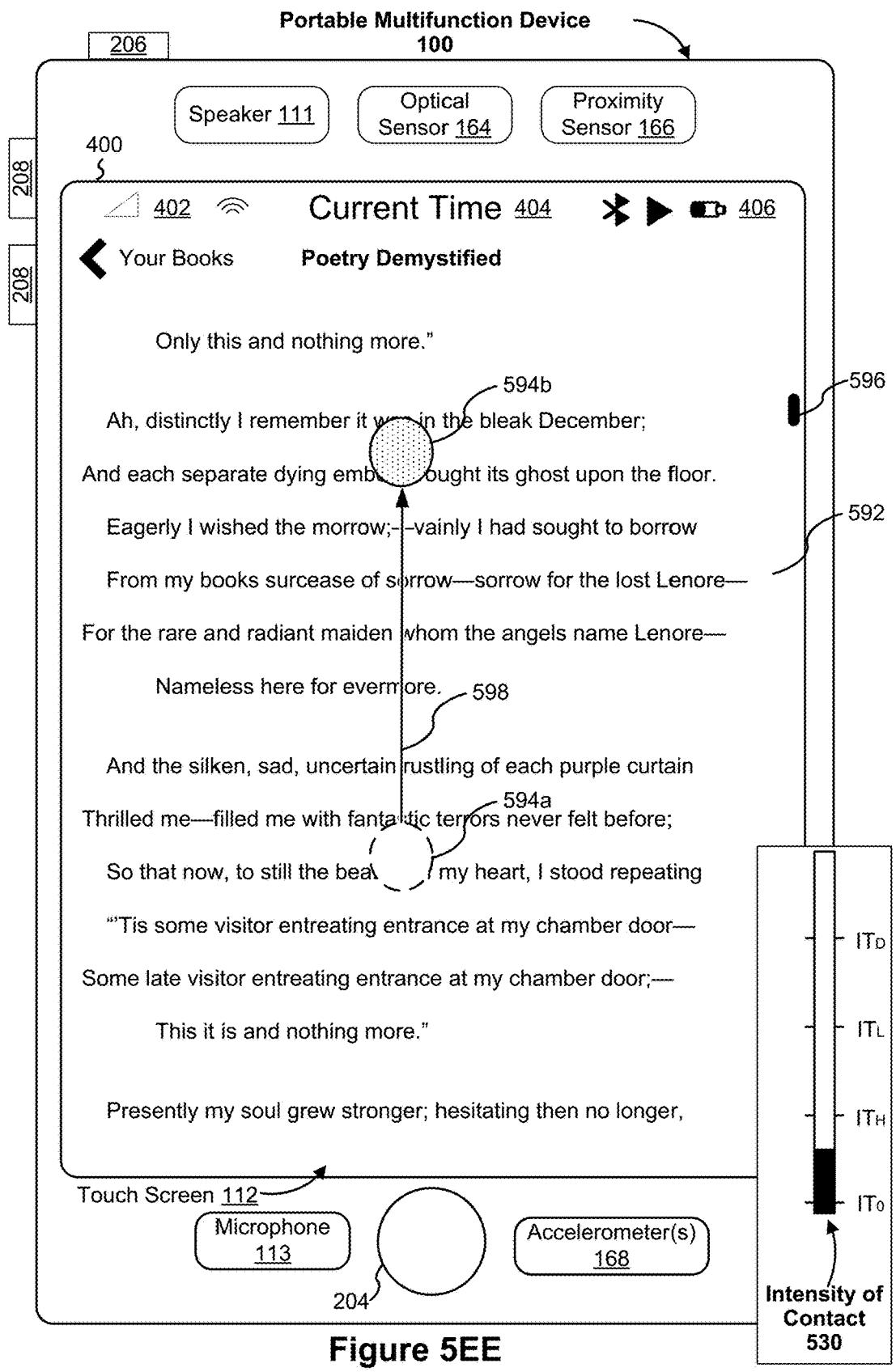
Figure 5F:
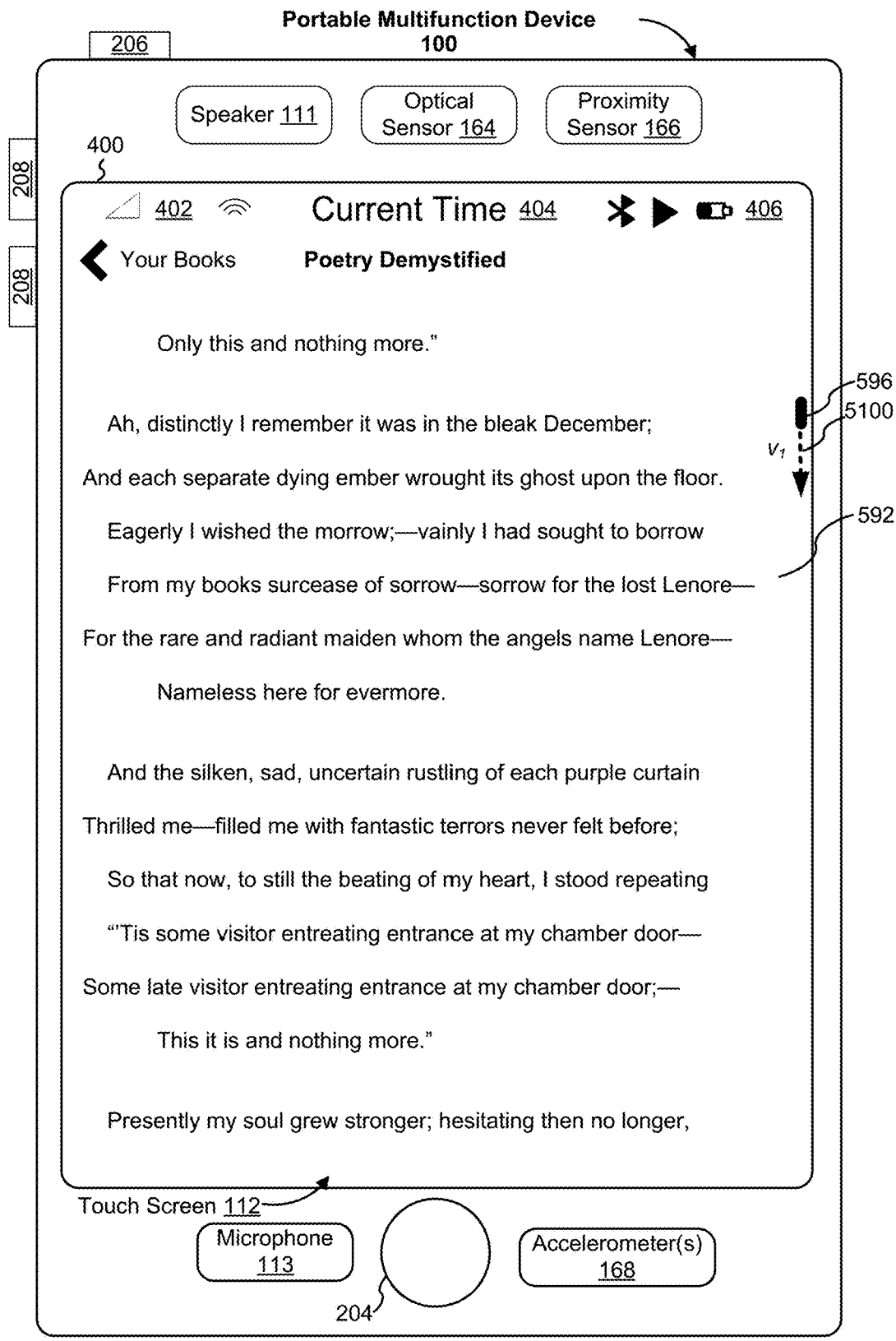
Figure 5G:
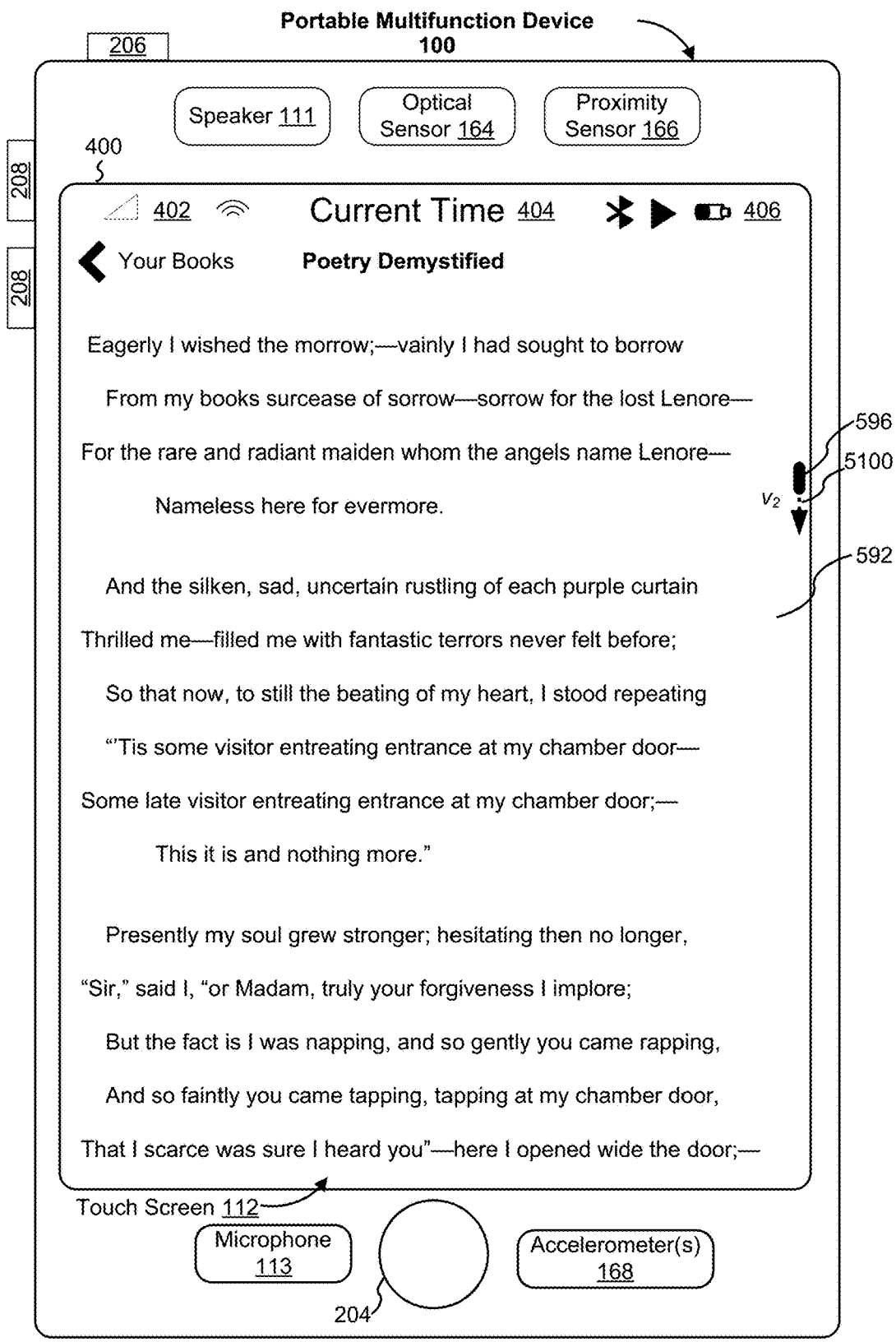
Figure 5H:
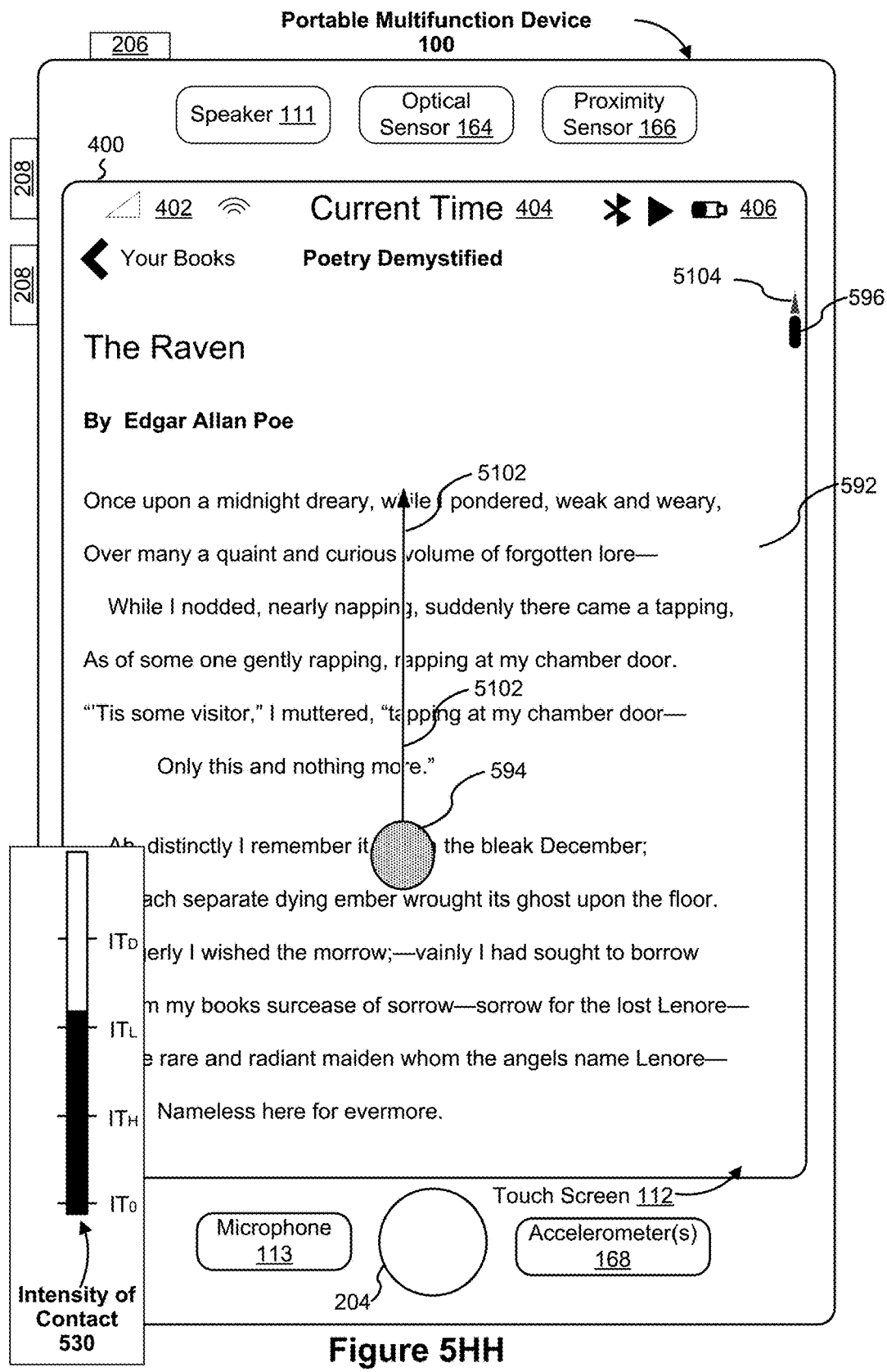
Figure 5I:
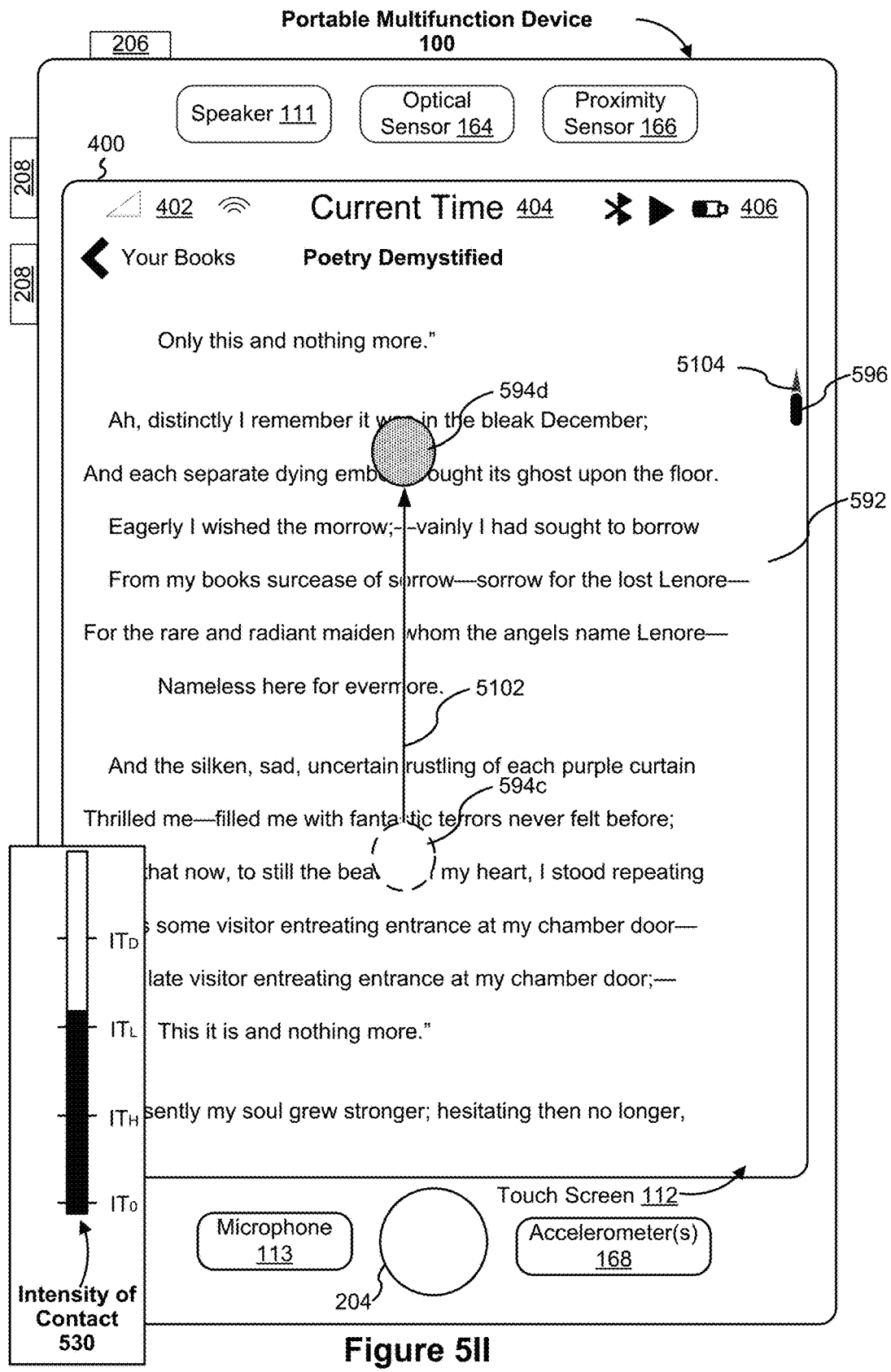
Figure 5J:
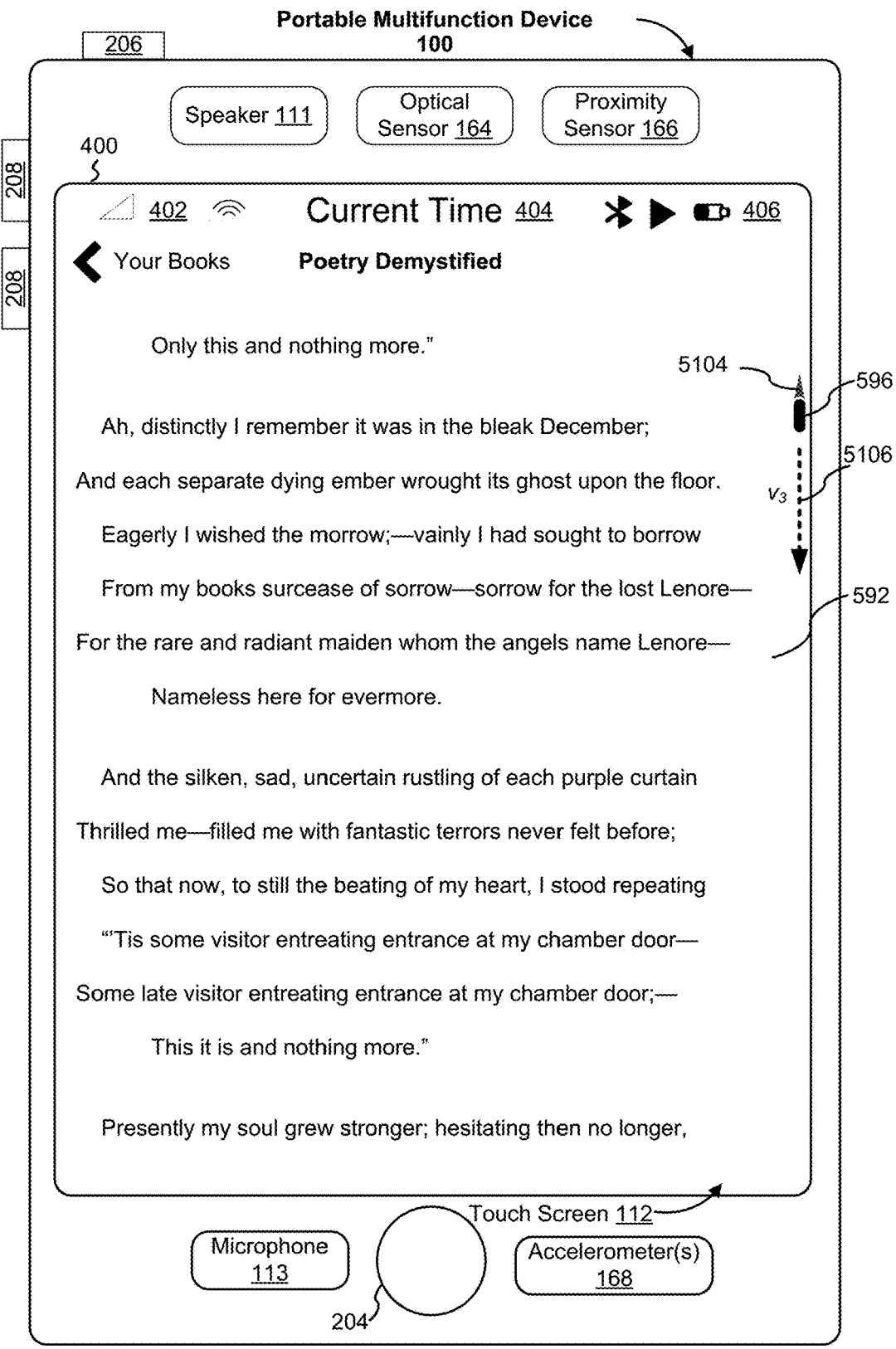
Figure 5K:
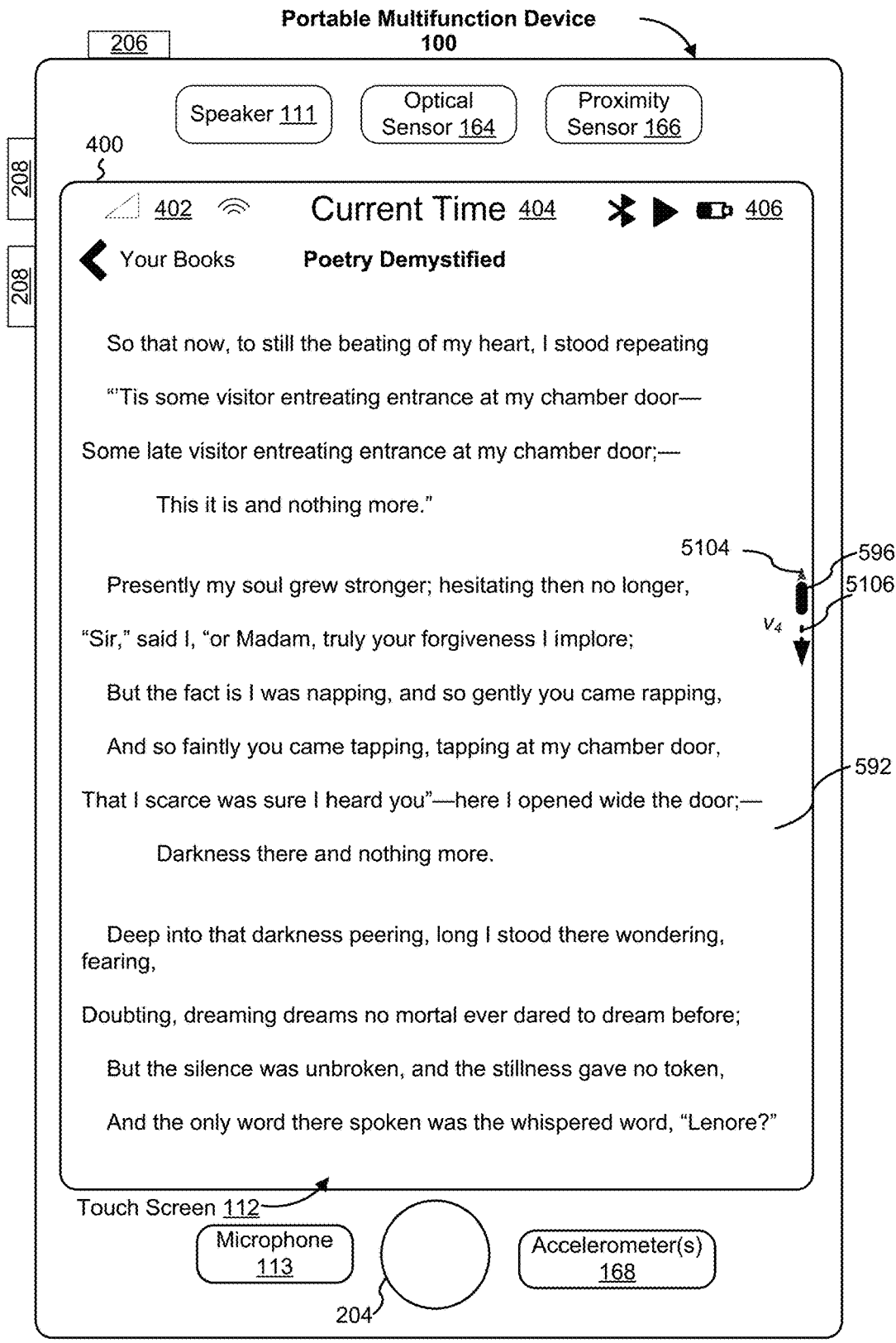
Figure 5L:
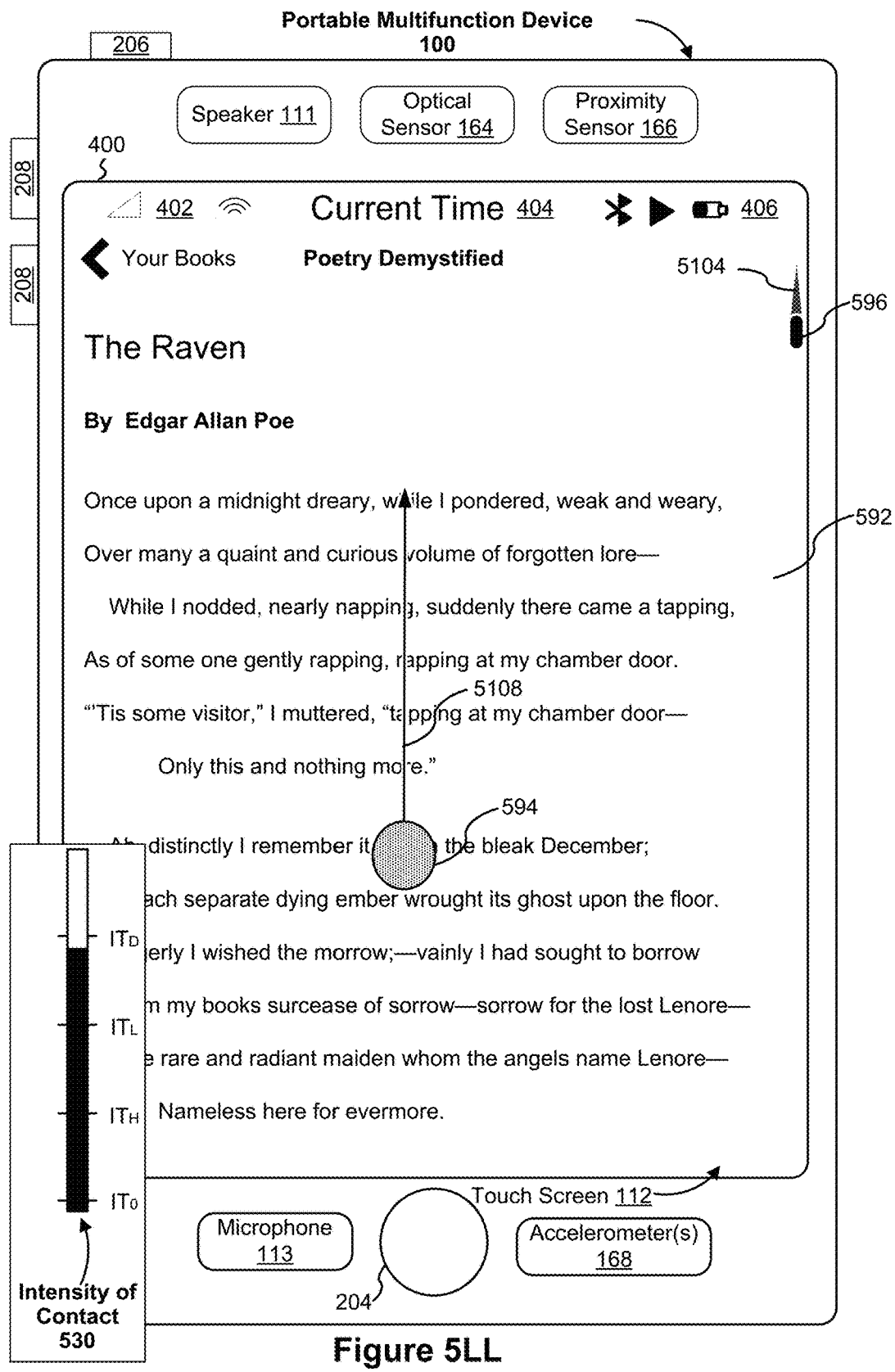
Figure 5M:
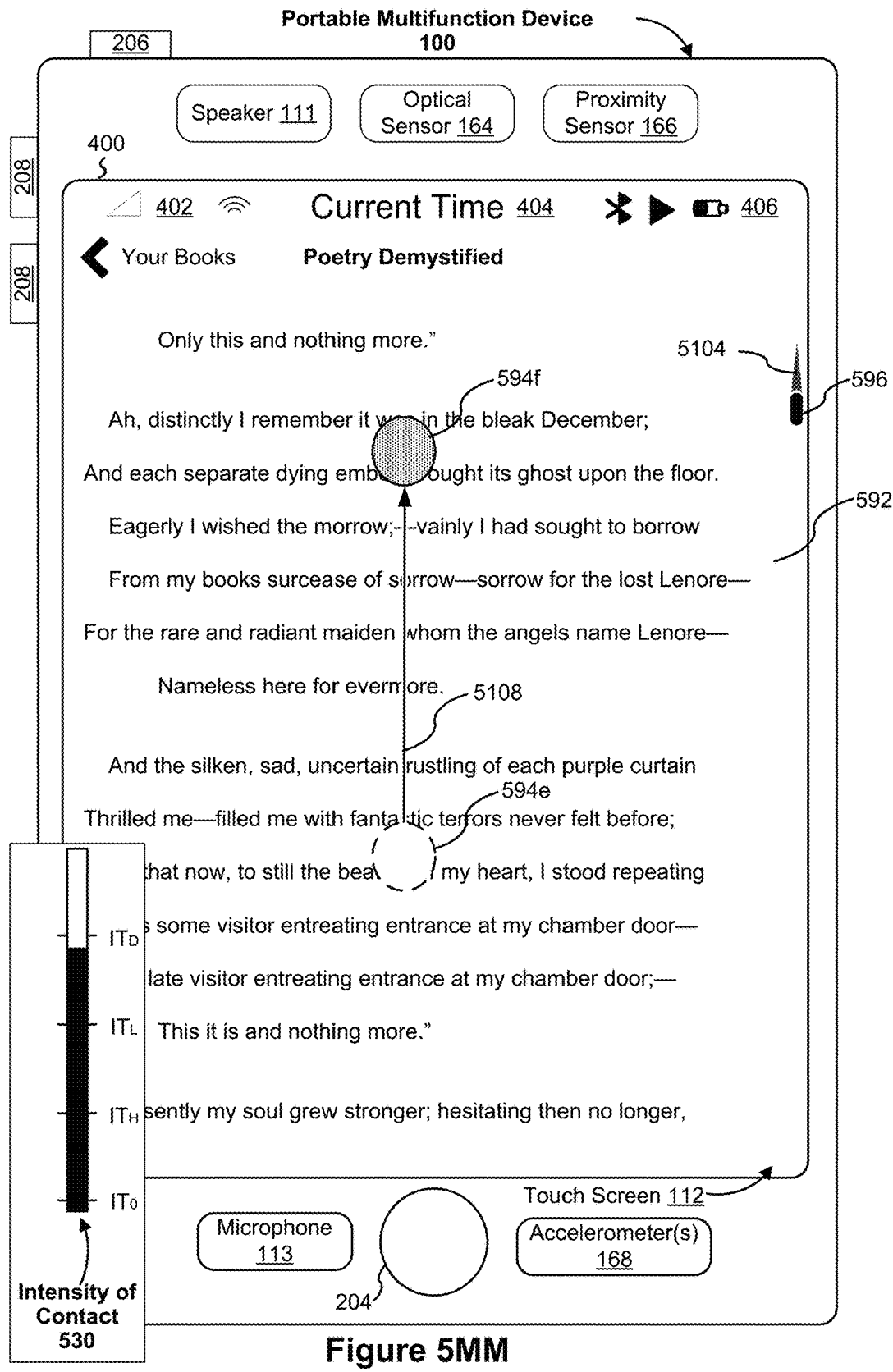
Figure 5N:
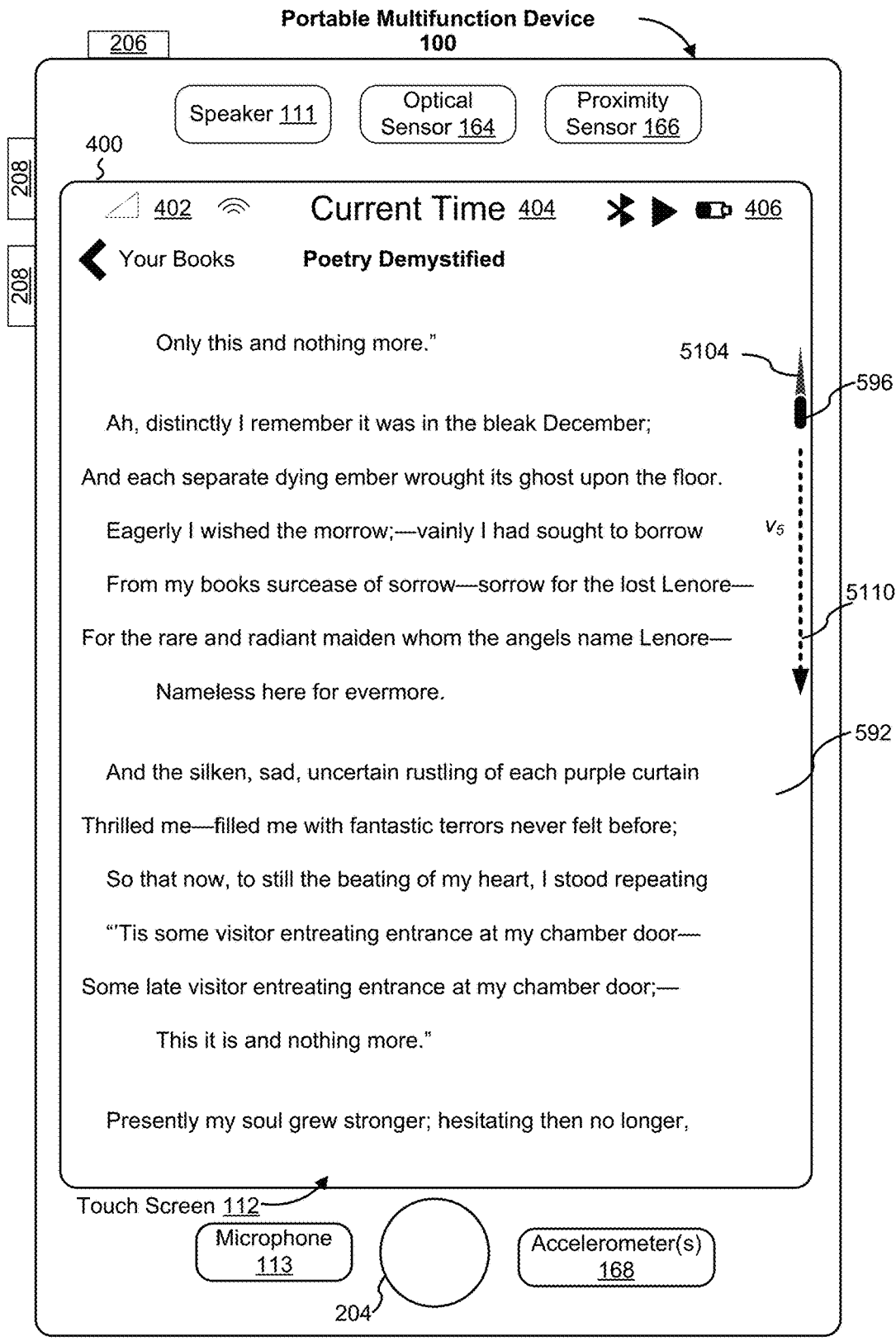
Figure 5O:
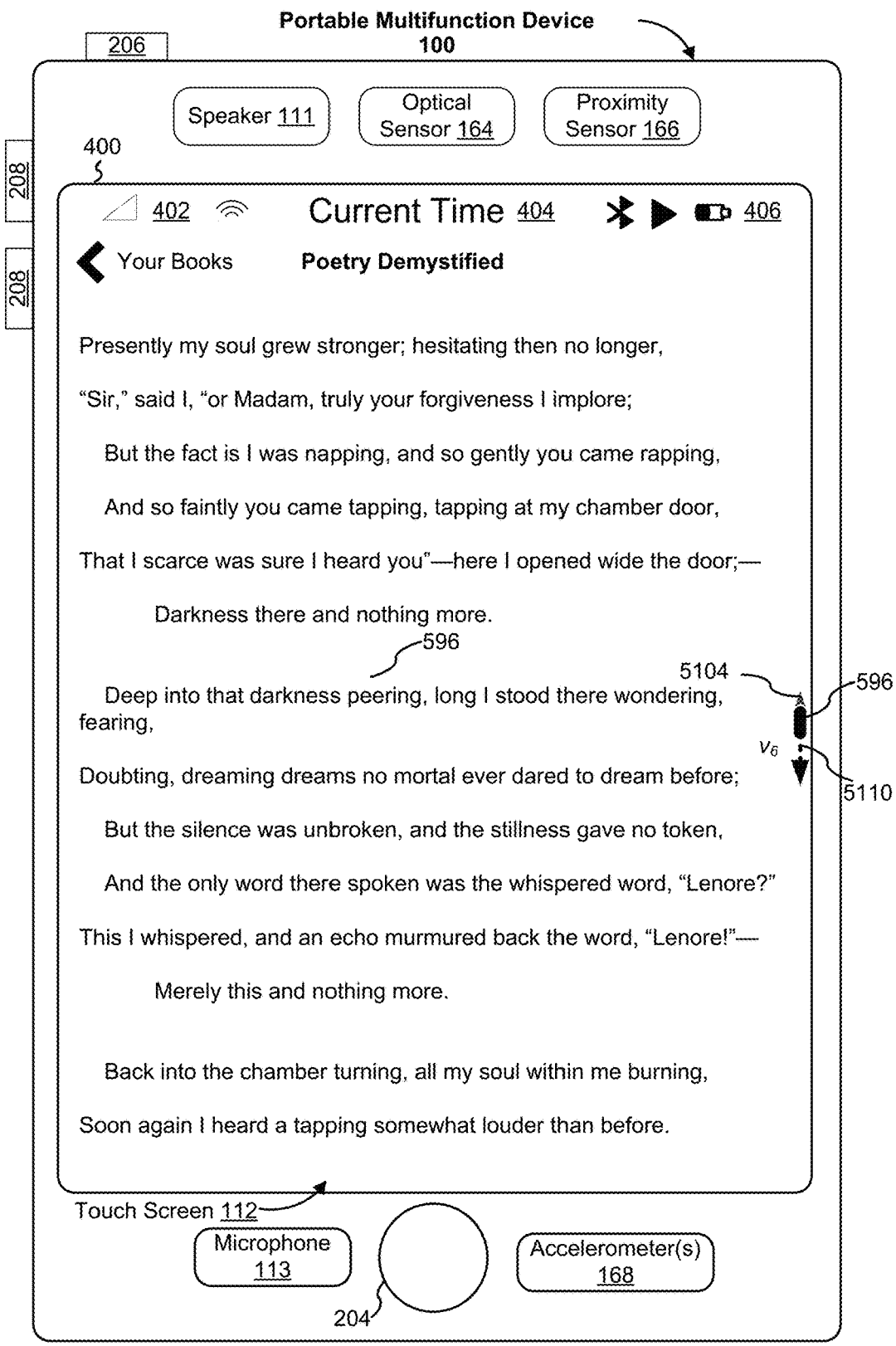
Figure 5P:
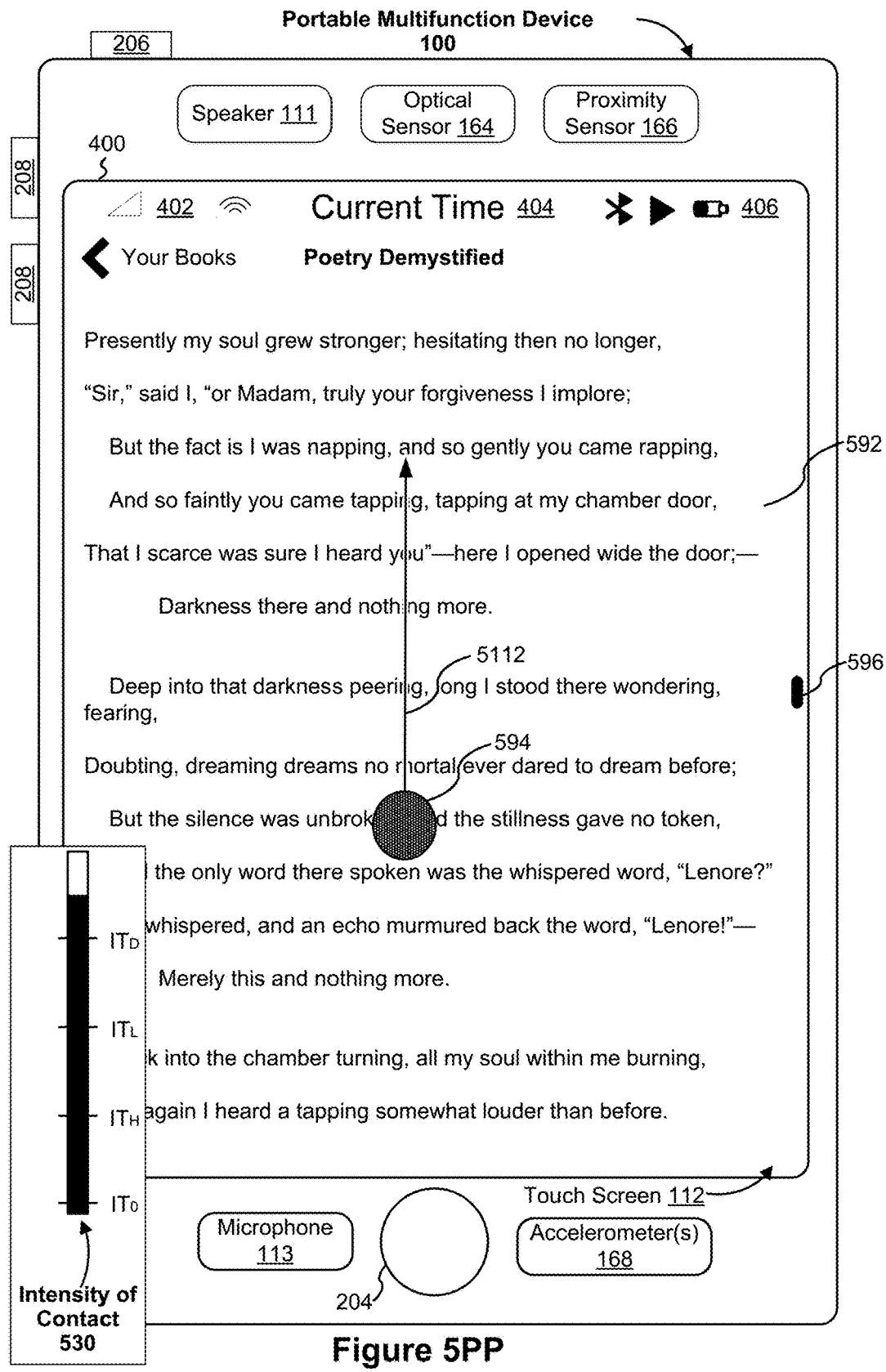
Figure 5Q:
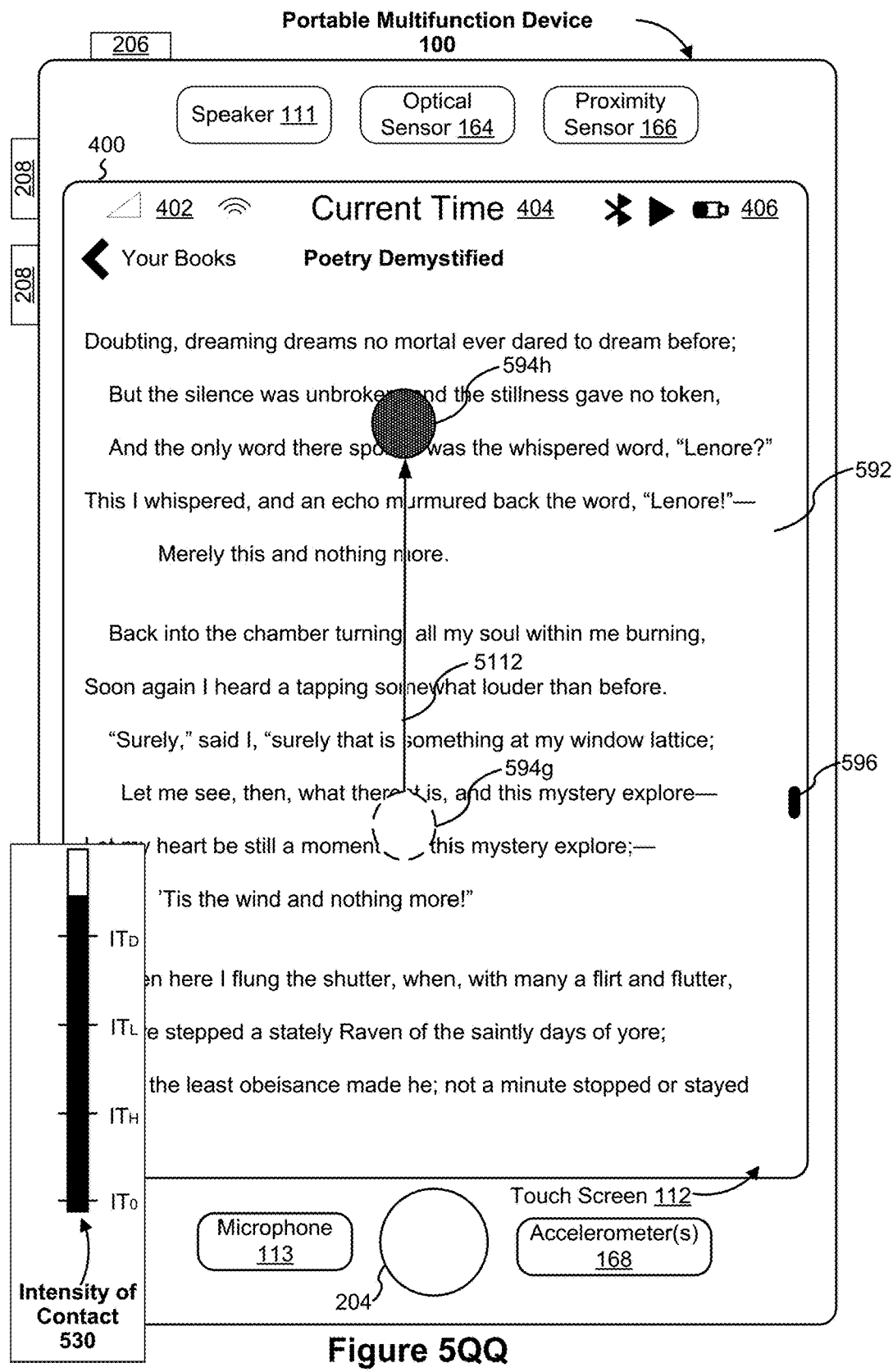
Figure 5R:
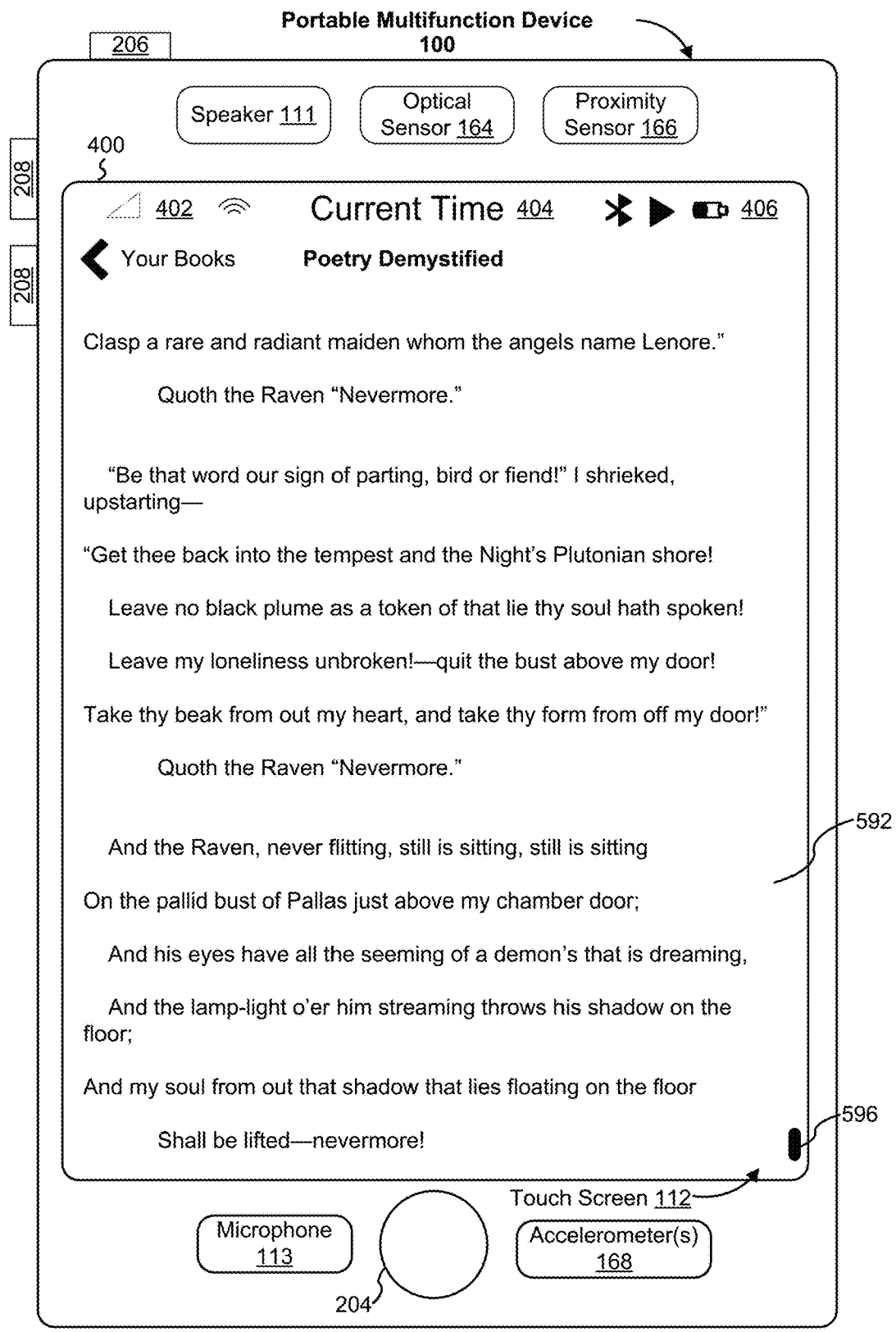
Figure 5S:
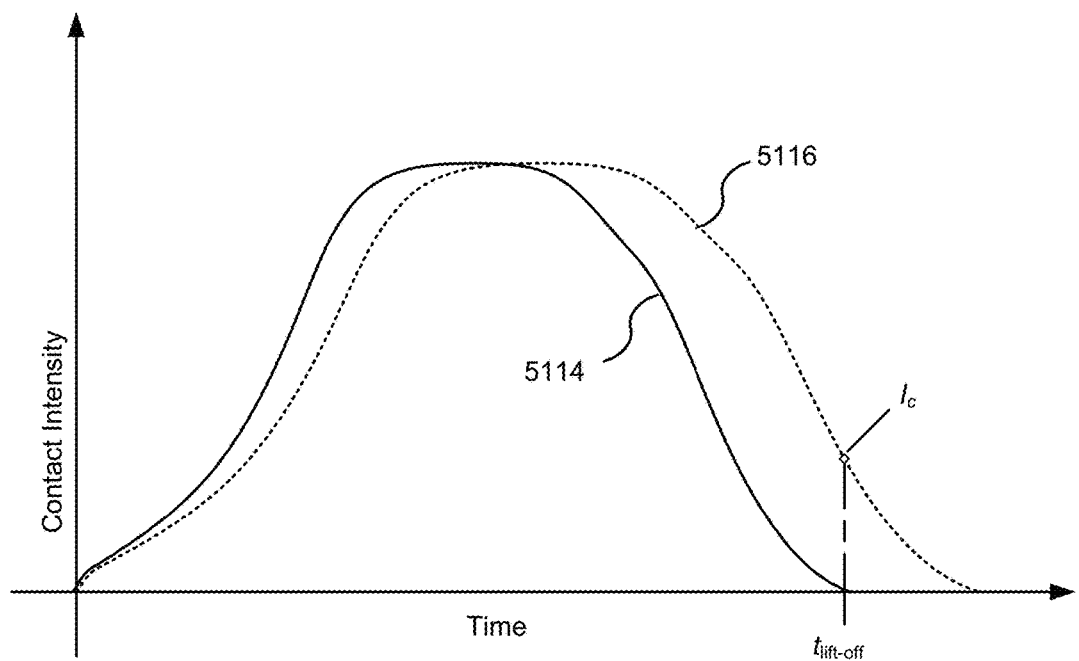
Figure 5T:
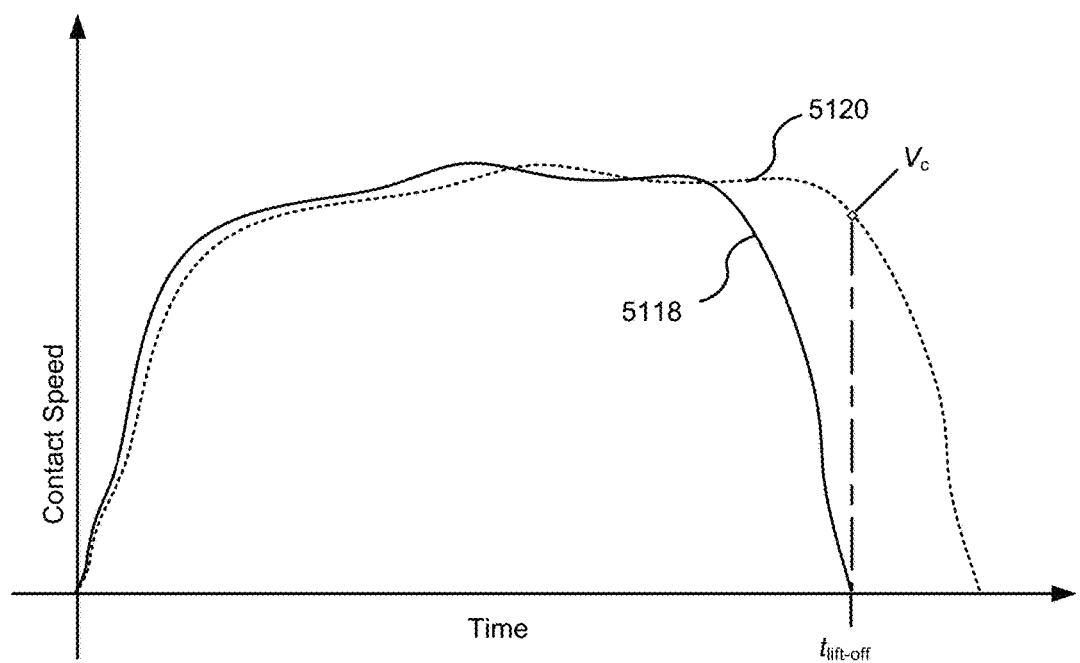

FIGS. 5A-5TT illustrate exemplary user interfaces for content navigation and manipulation in accordance with some embodiments. The user interfaces in these figures are used to illustrate the processes described below, including the processes in FIGS. 6A-6B, 7A-7C, 8A-8C, 9A-9D, and 10A-10C. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A-5TT illustrate exemplary user interfaces for manipulating content items depending on the intensity (e.g., pressure) applied by a contact during a user gesture in accordance with some embodiments. The user interfaces in these figures are used to illustrate the processes described below, including the processes described below with reference to FIGS. 6A-6B.

FIGS. 5A-5K illustrate exemplary user interfaces that perform certain actions based on intensity characteristics of a user input (e.g., contact) in accordance with some embodiments.

For example, FIGS. 5A-5C illustrate an exemplary user interface of a device 100 that performs certain actions (e.g., scrolls through a content item) when a contact intensity of a user input does not exceed a predetermined threshold, in accordance with some embodiments. Alternatively, FIGS. 5D-5H illustrate an exemplary user interface that performs alternate actions (e.g., replaces a content item with another content item) when the contact intensity exceeds a predetermined threshold, in accordance with some embodiments. Lastly, FIG. 5K illustrates an exemplary user interface that displays a preview of a selectable affordance when certain criteria of the user input are met.

Turning now to FIG. 5A, FIG. 5A illustrates a user interface of device 100 before device 100 performs certain actions (e.g., scrolls through a content item) based on characteristics of the user input. The device 100 displays a content item (e.g., content item 502) on a display. In some embodiments, content item 502 is an email message in an email application including an email content section 502a, an email title section 502b, and an email header section 502c. While the examples shown in FIGS. 5A-5K illustrate content item 502 as an email message, in some embodiments, content item 502 may be other content items, including web pages, books, images, text, among other types. In some embodiments, content item 502 is associated with a sequence of content items, such as plurality of electronic messages in an electronic messaging application, a plurality of web browser windows (or tabbed windows) in a web browser, a plurality of applications, a plurality of digital images in a set of images (e.g., a single album or collection in a photo or camera application), or a plurality of sets of digital images (e.g., a plurality of albums or collections of photos in a photo or camera application). In some embodiments, the sequence of content items corresponds to a plurality of content sections, such as a plurality of conversations in a messaging or email application, a plurality of weeks (or months or years) in a calendar application, a plurality of chapters in a book, a plurality of scenes in a video, or a plurality of events in a digital image library.

In addition to the email message, the device 100 also displays other components of the email application, including an email tool bar 503. The email tool bar 503 includes selectable affordances (e.g., a left-arrow 504, an up-arrow 506, and a down-arrow 508). A section label (e.g., "inbox") is associated with the left-arrow. In some embodiments, when a user selects a selectable affordance (e.g., the left arrow 504), as shown via user input 511 in FIG. 5I, the device 100 displays a plurality of content items (e.g., email messages 502, 518, 520a, 520b, and 520c, associated with a user's inbox) on the display (e.g., touch screen 112), as shown in FIG. 5J. When a user selects the up-arrow 506, the email application displays a content item preceding the currently-displayed content item 502 (e.g., a preceding email message in the user's inbox). When a user selects the down-arrow 508, the device 100 displays a content item following the currently-displayed content item 502 (e.g., a successive email message in the user's inbox).

FIG. 5B illustrates a user interface, subsequent to FIG. 5A, after the device 100 detects a user input 510 (e.g., a contact) on the content item 502 and before the device 100 performs certain actions (e.g., scrolls through a content item) based on characteristics of the user input, in accordance with some embodiments. In some embodiments, the device 100 detects movement (e.g., press, flick, swipe) and/or intensity (e.g., contact, light, deep) of user input 510. For illustrative purposes, and not part of the device 100, user inputs are represented as a circle on device 100, where the density of the dots speckled within the circle represents the intensity exerted by the user. In FIG. 5B, the dots speckled within the circle are low density, meaning the user is exerting low pressure. Also, for illustrative purposes, and not part of the device 100, some of FIGS. 5B-5K include an intensity diagram 501 indicating the intensity of a user input determined by the device 100. The intensity diagram 501 includes a plurality of exemplary thresholds (e.g., contact detection threshold $IT_0$, "hint" threshold $IT_H$, light press threshold $IT_L$, and deep press threshold $IT_D$). In FIG. 5B, because the user is exerting low intensity that falls between the contact detection threshold $IT_0$ and "hint" threshold $IT_H$, the intensity diagram includes shading that rises to a level between these two thresholds. In subsequent Figures, the amount of shading in the intensity diagram indicates the intensity exerted by a user at a user input. Lastly, for illustrative purposes, and not part of the device 100, user input movement (e.g., movement of the contact of the user input on the touch-sensitive surface) is represented as a vector (e.g., vector 512, FIG. 5B), where the direction of the vector represents the direction of the user input movement and the magnitude of the vector represents the amount of movement of the user input (e.g., user input 510, FIG. 5B).

The device 100 is configured to navigate a content item or replace a content item with another content item based on the received user input. In response to detecting a user input, the device 100 determines whether the user input meets item-switching criteria. The item-switching criteria includes a criterion that is met when a characteristic intensity of a contact in the user input is above a first intensity threshold (e.g., "hint" threshold $IT_H$, light press threshold $IT_L$, or deep press threshold $IT_D$). In some embodiments, if the characteristic intensity of the user input is below the first intensity threshold, the device 100 navigates or scrolls through the content of the content item 502 in accordance with the movement of the user input.

For example, in FIG. 5B, the characteristic intensity of the user input 510, as shown in the intensity diagram 501, is below a first intensity threshold associated with item-switching criteria (e.g., light press threshold $IT_L$). In some embodiments, the device 100 detects movement 512 of the user input in a respective direction on touch screen 112 and navigates or scrolls through the content of the content item 502 in accordance with the movement of the user input 510. In some embodiments, as shown in FIG. 5B, the user input 510 is a swipe/drag gesture that is made with a contact. In some embodiments, the swipe/drag gesture includes movement of the contact from a first position (e.g., position 510-1) on the touch-sensitive surface to a second position (e.g., position 510-2) on the touch-sensitive surface. In some embodiments, the swipe/drag gesture is a vertical swipe gesture (as shown in FIG. 5B). In some embodiments, the swipe gesture is a horizontal swipe gesture.

In some embodiments, when the device 100 detects the user input 510 and the characteristic intensity of the user input 510 is below the first intensity threshold (e.g., light press threshold $IT_L$), the device 100 displays a scroll bar 514 indicating the location of the portion of content displayed to the user relative to the entire content item 502. As the device 100 navigates through the content of the content item 502 and displays different content portions of the content item, the device 100 moves the scroll bar 514 to different positions relative to the content portion of the content item displayed to the user.

For example, FIG. 5C illustrates a user interface, subsequent to FIG. 5B, of a device 100 after the device 100 performs certain actions (e.g., scrolls through a content item) based on characteristics of the user input, in accordance with some embodiments. As shown, the user input 510 moved to second position 510-2 from first position 510-1. In response to the movement of the user input 510, the device 100 navigates through the content of the content item 502 and displays a second content portion of the content item 502, where the second content portion is different from the first content portion. In addition, the device 100 moves the scroll bar 514 to a second position that is different from the position of the scroll bar 514 in FIG. 5B.

In some embodiments, the device 100 scrolls the content in a direction on the display in an opposite direction relative to the movement of the user input 510. In some embodiments, the device 100 scrolls the content in a direction on the display in a same direction relative to the movement of the user input 510. In some embodiments, navigating through the content of the first content item includes directly manipulating the displayed content of the first content item in accordance with the movement of the contact. For example, the movement (e.g., speed, direction, and/or distance) of the content, when scrolled, tracks the movement of the contact.

In some embodiments, the device 100 maintains display of a first portion of the first content item in a first user interface region on the display; and navigates (e.g., scrolls) through a second portion of the first content item in a second user interface region on the display. For example, as shown in FIGS. 5B-5C, when scrolling the content within a content item 502, a portion of the content item (e.g., email tool bar 503) is fixed relative to the content (e.g., the body 502a of content item 502 and the email title section 502b of content item 502).

FIG. 5D-5I illustrate certain actions (e.g., replacing content item 502 with another content item), performed by the device 100 when the user input meets item-switching criteria, in accordance with some embodiments. In some embodiments, if the characteristic intensity of the user input is above a first intensity threshold (e.g., "hint" threshold $IT_H$, light press threshold $IT_L$, or deep press threshold $IT_D$), the device 100 replaces display of the content item 502 with display of a second content item 518 (e.g., a different content item distinct from the content item 502). In some embodiments, the device 100 replaces display of the content item 502 with display of second content item 518 in accordance with other criteria being met as well. For example, as shown in FIG. 5E, the device initiates replacing display of the first content item with a second content item when a user input is detected with an increase in contact intensity in conjunction with at least a minimum amount of movement of the contact.

FIG. 5D is analogous to FIG. 5A. FIGS. 5E-5I illustrate operations performed by device 100 in response to detecting a user input 513.

FIG. 5E shows user input 513, which is analogous to user input 510 (FIGS. 5B-5C) except that user input 513 has an intensity that exceeds a "hint" threshold $IT_H$. In response, the device 100 reduces (e.g., decreases) the size of content item 502 (e.g., zooms-out on content item 502 in a z-direction). In some embodiments, the zooming out of content item 502 provides a hint to the user that user input 513 will result in different functionality by virtue of being a deeper press (e.g., as compared to user input 510, FIGS. 5B-5C). In some embodiments, the size reduction of content item 502 is directly controllable by the user, e.g., via the intensity of the user input 513. So, for example, as the user increases the contact intensity of a user input 513 toward the light press intensity threshold $IT_L$ (as shown in intensity diagram 501), the content item 502 zooms-out (e.g., reduces in size). If the user subsequently slightly reduces the intensity of the contact of the user input 513, the content item 502 zooms back in. In some embodiments, a plurality of intensity levels within the vicinity of the light press intensity threshold $IT_L$ (e.g., a plurality of intensity levels between $IT_H$ and $IT_L$) map to a plurality of corresponding zoom levels (e.g., sizes) of content item 502. Thus, the user feels as though she is pushing the first content item back in the z-direction by pushing harder on the contact. In some embodiments, as a result of reducing the size of the first content item, a region 516 beyond an edge of the content item 502 is displayed (e.g., a background area that is a different color or pattern than a color or pattern of the background of the content item 502), illustrating to the user that the content item 502 has been pushed back in the z-direction.

In some embodiments, the device 100 transitions to replacing display of the first content item with a second content item in response to a user input (e.g., replacing content item 502 with another content item) when the characteristic intensity exceeds the light press intensity threshold $IT_L$ (e.g., an intensity threshold that is greater than the "hint" threshold $IT_H$). In some embodiments, the user can zoom-in to or zoom-out from the content item 502 if the characteristic intensity exceeds the "hint" threshold $IT_H$ and does not exceed the light press threshold $IT_L$. However, in some embodiments, the device 100 does not transition to another content item until the characteristic intensity exceeds the light press threshold $IT_L$. Thus, in some embodiments, there is a range of intensities for which device 100 provides a hint that content item replacement will be performed based on the intensity of the contact (as well as other optional criteria), but does not yet provide that functionality.

FIG. 5F illustrates a user interface, subsequent to FIG. 5E. In FIG. 5F, device 100 is replacing content item 502 with second content item 518, in accordance with some embodiments (e.g., device 100 is displaying a transition between content item 502 and second content item 518). In some embodiments, device 100 determines whether to replace content item 502 with second content item 518 based at least in part on the intensity of the user input 513. FIG. 5F illustrates movement of the user input 513 (e.g., represented by vector 515). As shown, movement of the user input 513 begins at a first position (e.g., position 513-1) on the touch-sensitive surface and ends at a second position (e.g., position 513-2) on the touch-sensitive surface.

The device 100 transitions from the content item 502 to the second content item 518 when certain item-switching criteria are met. In some embodiments, the device 100 transitions from the content item 502 to second content item 518 when the intensity of the user input 513 exceeds a predetermined threshold (e.g., a light press threshold $IT_L$). In some embodiments, the device 100 transitions from the content item 502 to second content item 518 when the movement of user input 513 also exceeds a predetermined movement threshold (e.g., when the device detects a predetermined amount or distance of movement of the contact that exceeds a predetermined movement threshold). That is, in some embodiments, there is a predetermined magnitude of intensity and movement of user input 513 that is required to be detected by device 100 in order to cause the device 100 to replace display of content item 502 with display of second content item 518 rather than, e.g., scroll content item 502.

FIG. 5G illustrates the user interface subsequent to FIG. 5F. In FIG. 5G, device 100 has progressed further in replacing content item 502 with second content item 518 (as compared to FIG. 5F). As shown, the user input 513 moved to second position 513-2 from first position 513-1. In response to the movement of the user input 513, the device 100 replaces display of the content item 502 with the display of the second content item 518.

In certain situations, device 100 either replaces display of the content item 502 or scrolls through content item 502 based on other characteristics (e.g., timing of intensity or movement) of a user input. For example, in some embodiments, if an initial intensity of the contact does not exceed an intensity threshold (e.g., "hint" threshold $IT_H$ in FIGS. 5B-5C), device 100 scrolls the content item 502 in response to the beginning of the user input (e.g., an initial portion of a swipe gesture). If later, during the user input, the contact of the user input exceeds the intensity threshold, device 100 transitions to displaying a second content item (as in FIGS. 5E-5H). In some embodiments, the item-switching criteria are met when the initial intensity of the contact exceeds the first intensity threshold. In some embodiments, the item-switching criteria are met when the initial intensity of the contact exceeds the first intensity threshold while the contact is moving (e.g., moving above a predetermined velocity threshold). In some embodiments, the item-switching criteria are not met if the contact is stationary or is moving below a predetermined velocity threshold, even if the characteristic intensity of the contact exceeds the first intensity threshold.

In some embodiments, the device 100 automatically completes replacing content item 502 with second content item 518 when the user has dragged the second content item 518 sufficiently onto touch screen 112. For example, as shown in FIG. 5G, the user input 513 has moved the midpoint 520 between content item 502 and second content item 518 past a predetermined positional threshold 517 (e.g., half-way, or a third of the way up touch screen 112). As shown in FIG. 5H, the user terminates user input 513 (e.g., lifts off of touch screen 112), but the device 100 continues to animate a transition to the second content item 518 (FIGS. 5H-5I). In some embodiments, the predetermined positional threshold may be positioned at alternative locations on touch screen 112.

Thus, as shown in FIG. 5D-5I, in some embodiments, replacing display of the content item 502 with the second content item 518 includes displaying a transition between the content item 502 and the second content item 518 (e.g., in which content item 502 zooms-out, slides upward off of touch screen 112 while second content item 518 slides upward onto touch screen 112, and second content item 518 zooms-in to complete the animated transition). The transition includes concurrently displaying at least a portion of the content item 502 and at least a portion of the second content item 518 (as shown in FIGS. 5E-5G, for example). In some embodiments, the transition is dynamically controlled by the user input 513 (e.g., the user can directly manipulate the progress of the transition via user input 513). FIG. 5I also illustrates user input 511 corresponding to selection of affordance 504.

FIG. 5J illustrates the result of user input 511, namely that the device 100 navigates back to a user interface showing a list view of the user's emails (including content item 502, content item 518, and additional emails 520a through 520c). FIG. 5J illustrates that, in some embodiments, the second content item 518 is sequentially adjacent to the content item 502 (e.g. in the sequence of content items, as shown in FIG. 5J) and is selected based on the respective direction of the movement of the user input 513. That is, in some embodiments, a deep swipe transitions to the next email or previous email depending on the swipe direction, while a normal swipe (e.g., a swipe with a characteristic intensity below a predefined threshold) scrolls the currently displayed email.

FIG. 5K illustrates an exemplary user interface that displays a preview of a selectable affordance when certain intensity criteria of the user input are met.

In some embodiment, device 100 detects a user input 519 that is stationary (e.g., includes movement of a contact that is less than a predefined threshold) and over a selectable affordance but is otherwise analogous to user input 513 (e.g., the contact intensity of user input 519 is above the first intensity threshold associated with item-switching criteria, such as light press threshold $IT_L$). In response to user input 519, the device 100 displays a preview area 521 of content that corresponds to the selectable affordance overlaid on the content item 502. Thus, in some embodiments, a press input over a selectable affordance within content item 502, where the press input has an intensity above $IT_L$, triggers different functionality than a swipe/drag over content item 502, where the swipe/drag has an intensity above $IT_L$.

FIGS. 5L-5U illustrate exemplary user interfaces for reordering list items in accordance with some embodiments. The user interfaces in these figures are used to illustrate the processes described below, including the processes described below with reference to FIGS. 7A-7C.

FIG. 5L illustrates a portion of a list of items, in accordance with some embodiments. A list of items 532 includes items 534, 536, 538, 540, 542, 544, 546, and 548, as indicated at FIGS. 5L-5U. In FIG. 5L, a portion of the list of items including items 534, 536, 538, 540, 542, and 544 is presented on touch screen 112.

FIGS. 5M-5N illustrate scrolling of list of items 532 when movement is detected while a characteristic intensity of the contact remains below a first intensity threshold.

In FIG. 5M, a contact is received at touch screen 112 at a location indicated by focus selector 550. The contact moves across touch screen 112 along a path indicated by arrow 552. A portion of list 532, including items 534, 536, 538, 540, 542, and 544, is presented on touch screen 112. As the movement of the contact occurs, list 532 is scrolled in the direction of movement of the contact. A currently viewed position within list 532 (e.g., relative to the overall length of list 532) is indicated by scroll position indicator 554. In FIG. 5M, the characteristic intensity of the contact is between a contact detecting intensity threshold $IT_0$ and a hint intensity threshold $IT_H$, as indicated by intensity meter 530.

In FIG. 5N, list 532 has been scrolled in accordance with the movement of the contact from an initial position as indicated by focus selector 550a (e.g., focus selector 550 at a first point in time) to a subsequent position as indicated by focus selector 550b (e.g., focus selector 550 at a second point in time that is later than the first point in time) along the path indicated by arrow 552. As a result of the changed currently viewed position within list 532 due to movement of the contact, a second portion of list 532, including items 546 and 548, is presented. Items 542 and 544 of list 532, are no longer visible. Scroll position indicator 554 is shown at a higher position in the user interface of 5N than the position of scroll position indicator 554 in the user interface of 5M.

FIG. 5O illustrates a changed appearance of an item, in accordance with some embodiments. The contact is at the location of item 534, as indicated by focus selector 550. The contact moves across touch screen 112 along a path indicated by arrow 556. The characteristic intensity of the contact is above a hint intensity threshold $IT_H$, as indicated by intensity meter 530. The appearance of item 534 is changed (e.g., a rectangular outline is shown around item 534 to highlight the item). In response to the increase of the characteristic intensity of the contact above intensity threshold $IT_H$ followed by the movement of the contact, the appearance of item 534 has changed (e.g., to indicate to the user that item 534 is detachable from list 532 and/or on the verge of detachment).

FIGS. 5P-5U illustrate moving an item relative to other items, in accordance with some embodiments.

In FIG. 5P, the contact moves across touch screen 112 from the location indicated by focus selector 550 along a path indicated by arrow 556. The characteristic intensity of the contact is above a hint intensity threshold $IT_L$, as indicated by intensity meter 530. In response to the increase of the characteristic intensity of the contact above intensity threshold $IT_L$ followed by the movement of the contact along the path indicated by arrow 556, item 534 has moved (from the position of item 534 as shown in FIGS. 5N-5O) relative to the other items 536, 538, 540, 546, and 548.

FIGS. 5P-5R illustrate movement of item 534 that lags movement of the contact as the focus selector 550 moves across touch screen 112 along the path indicated by arrow 556.

In FIG. 5P, item 534 has detached from list 532. The detachment of item 534 from list 532 is indicated by, e.g., changes in the appearance of item 534 (such as a reduced size of item 534 relative to the other items in list 532) and changes in the position of item 532 (such as a vertical and/or z-axis shifting of item 534 relative to the previous location of item 534 shown in FIGS. 5L-5O). A first item slot 558 is partially revealed as a result of the movement of item 534.

In FIGS. 5P-5Q, as the contact moves along a first portion of the path indicated by arrow 556 (as indicated by the movement of focus selector 550 from the location shown in FIG. 5P to the location of focus selector 550 shown in FIG. 5Q), item 534 remains static (or moves more slowly than focus selector 550). In FIG. 5Q, focus selector 550 extends below the lower edge of item 534. In FIG. 5R, as focus selector 550 has continued the movement along a second portion of the path indicated by arrow 556, item 534 has accelerated (e.g., to "catch up" with focus selector 550) and focus selector 550 is again shown in the center of item 534. The characteristic intensity of the contact is above a light press intensity threshold $IT_L$, as indicated by intensity meter 530. In response to the increase of the characteristic intensity of the contact above intensity threshold $IT_L$ followed by the movement of the contact along the path indicated by arrow 556, item 534 has moved (from the position of item 534 as shown in FIGS. 5N-5O) relative to the other items 536, 538, 540, 546, and 548.

In FIG. 5S, as focus selector 550 has moved along the path indicated by arrow 556 from a location indicated by focus selector 550c (focus selector 550c at a point in time) to a location indicated by focus selector 550d (focus selector 550 at a point in time later than the time of 550c), item 534 has continued to move relative to item 536 such that item 534 has moved "over" item 536. Item 536 has moved into first item slot 558 (that was previously occupied by item 534 prior to the detachment of item 534 from list 532). A second item slot 560 is revealed. As a result of the movement of item 536 into first item slot 558 and the revelation of second item slot 560, tactile feedback (as indicated at 562) is generated.

In FIG. 5T1, item 534 is shown inserted into second item slot 560. Item 534 is inserted into second item slot 560, e.g., as a result of lift off of the contact from touch screen 112 while second item slot 560 is revealed (e.g., as shown in FIG. 5S).

FIGS. 5T2-5U illustrate scrolling of list 532 that occurs in response to item 534 moving within a threshold distance of the end of the displayed portion of list 532.

In FIG. 5T2, the contact moves (e.g., continuing from the movement of the contact as indicated in FIG. 5S) from the location indicated by focus selector 550 along a path indicated by arrow 564 toward a lower end 566 of the displayed portion of list 532.

In FIG. 5U, as a result of movement of the contact to a location that is within a threshold distance of the lower end 566 of the displayed portion of the list 532, the list 532 is scrolled toward upper end 568 of the displayed portion of the list 532, revealing items 542 and 544 that were not visible in FIG. 5T2. Scroll position indicator 554 is shown at a lower position in the user interface of 5U than the position of scroll position indicator 554 in the user interface of 5T2. As a result of the movement of item 544 into a new item slot and the revelation of previous item slot 570 for item 544 (which previously occupied previous item slot 570), tactile feedback (as indicated at 562) is generated.

FIGS. 5V-5CC illustrate exemplary user interfaces for navigating structured content in accordance with some embodiments. The user interfaces in these figures are used to illustrate the processes described below, including the processes described below with reference to FIGS. 8A-8C.

FIG. 5V illustrates a first portion (e.g., Chapter 3) of structured content 572 (e.g., the book *The Jungle Book* by Rudyard Kipling) displayed by touch screen 112.

FIG. 5W-5X illustrate translation of structured content 572 in accordance with movement of a contact, in accordance with some embodiments.

In FIG. 5W, a contact with touch screen 112 is detected at a location indicated by focus selector 574. The contact moves across touch screen 112 along a path indicated by arrow 578. A characteristic intensity of the contact is between a contact detecting intensity threshold $IT_0$ and a hint intensity threshold $IT_H$, as indicated by intensity meter 530. A currently viewed position within structured content 572 (e.g., relative to the overall length of structured content 572) is indicated by scroll position indicator 576.

In FIG. 5X, structured content 572 has been scrolled in accordance with the movement of the contact from an initial position as indicated by focus selector 574a (e.g., focus selector 574 at a first point in time) to a subsequent position as indicated by focus selector 574b (e.g., focus selector 574 at a second point in time that is later than the first point in time) along the path indicated by arrow 578. As a result of the changed currently viewed position within structured content 572 due to movement of the contact, structured content 572 is translated. Scroll position indicator 576 is shown at a lower position in the user interface of 5X than the position of scroll position indicator 576 in the user interface of 5W (e.g., to indicate the advanced position of the currently viewed position within structured content 572 as a result of the translation).

FIGS. 5Y-5Z illustrate applying a visual effect to structured content 572 and presenting a scroll bar including a scroll position indicator 576, in accordance with some embodiments.

In FIG. 5Y, a contact is received on touch screen 112 at a location indicated by focus selector 574. The characteristic intensity of the contact is below intensity threshold $IT_H$, as indicated by intensity meter 530. Scroll position indicator 576 is shown (e.g., in response to the increase in the characteristic intensity of the contact to above $IT_0$) to indicate a position of the displayed portion of structured content 572 within structured content 572.

In FIG. 5Z, the intensity of the contact has increased from below hint intensity threshold level $IT_H$, as indicated by intensity meter 530 of FIG. 5Y, to above intensity threshold $IT_H$, as indicated by intensity meter 530 of FIG. 5Z. The contact moves across touch screen 112 along a path indicated by arrow 580. In response to the increase in the characteristic intensity of the contact (e.g., the increase above intensity level $IT_H$) and the movement of the contact, a visual effect is applied to the displayed section of structured content 572. The applied visual effect includes shrinking the displayed portion of structured content 572 and pushing the displayed portion of structured content 572 to a lower z-level on touch screen display 112.

In response to the increase in the characteristic intensity of the contact (e.g., the increase above intensity level $IT_H$), as indicated in FIG. 5Z, section indicators 582, 584, 586, and 588 are presented along with scroll position indicator 576. Section indicator 586 (which is the closest of the section indicators to scroll position indicator 576), corresponds to the displayed portion ("Chapter 3") of structured content 572. Section indicators 582 and 584 correspond to portions (e.g., Chapters 1 and 2, respectively) of structured content 573 prior to the displayed portion. Section indicator 588 corresponds to a portion (e.g., Chapter 4) of structured content 573 following the displayed portion.

FIGS. 5AA-5BB illustrate translating structured content 572 to show a start of a next section, in accordance with some embodiments.

In FIG. 5AA, a characteristic intensity of the contact has increased from below hint intensity threshold level $IT_L$, as indicated by intensity meter 530 of FIG. 5Z, to above light press intensity threshold $IT_L$, as indicated by intensity meter 530 of FIG. 5AA. In response to the increase in the characteristic intensity of the contact and the movement of the contact along the path indicated by arrow 580, and because the characteristic intensity of the contact increased above light press intensity threshold $IT_L$, structured content 572 is translated to display a start of an adjacent section. For example, as described with regard to FIG. 5BB, a next section ("Chapter 4") is displayed, e.g., in accordance with the direction of the movement of the contact indicated by arrow 580. Section indicators 582, 584, 586, and 588 are spread from initial positions, as shown in FIG. 5Z, to adjusted positions, as shown in FIG. 5AA. In FIG. 5AA, that distances between adjacent section indicators are greater than the distances between the initial positions of section indicators as shown in FIG. 5Z.

In FIG. 5BB, the contact has moved from a position indicated by focus selector 574c (focus selector 574 at a position in time) to a position indicated by focus selector 574d (focus selector 574 at a position in time that is later than the time of 574c). A next section ("Chapter 4") of structured content 572 is displayed. Scroll position indicator 576 has moved from a position adjacent to section indicator 586, as indicated in FIG. 5AA, to a position adjacent to section indicator 588 (e.g., the scroll position indicator has "hopped" over section indicator 588), as indicated in FIG. 5BB, to indicate the occurrence of the translation to the adjacent section.

FIG. 5CC illustrates a displayed next section of structured content 572 after liftoff of the contact has occurred, in accordance with some embodiments. In response to the liftoff of the contact, scroll position indicator 576 and section indicators 582, 584, 586, and 588 are no longer displayed. Structured content 572 is returned to its initial size (e.g., the adjacent section is displayed at the same size of the section of structured content 572 displayed in FIG. 5Y).

FIGS. 5DD-5TT illustrate exemplary user interfaces for moving content on a display in accordance with some embodiments. The user interfaces in these figures are used to illustrate the processes described below, including the processes in FIGS. 9A-9D and 10A-10C.

FIGS. 5DD-5GG illustrate content scrolling (FIGS. 5DD and 5EE) and movement of content occurring in response to lift-off of a contact (FIGS. 5FF and 5GG) when a detected characteristic intensity of a contact has a first intensity prior to lift-off, in accordance with some embodiments.

In FIG. 5DD, a contact is detected at touch on touch screen 112 at a location indicated by focus selector 594. The contact moves along a path indicated by arrow 598. A first portion of content 592 (the poem "The Raven" by Edgar Allan Poe) is presented on touch screen display 112. As the movement of the contact occurs, content 592 is scrolled (e.g., in the direction of movement of the contact). A currently viewed position within content 592 (e.g., relative to the overall length of content 592) is indicated by scroll position indicator 596. In FIG. 5DD, the intensity of the contact is between a contact-detection intensity threshold $IT_0$ and a hint intensity threshold $IT_H$, as indicated by intensity meter 530.

In FIG. 5EE, content 592 has been scrolled in accordance with the movement of the contact from an initial position as indicated by focus selector 594a (e.g., focus selector 594 at a first point in time) to a subsequent position as indicated by focus selector 594b (e.g., focus selector 594 at a second point in time that is later than the first point in time) along the path indicated by arrow 598. In accordance with the changed currently viewed position within content 592, scroll position indicator 596 is shown at a lower position in 5EE than the position of scroll position indicator 596 in 5DD.

In FIG. 5FF, following movement of the contact as described with regard to FIGS. 5DD-5EE, lift-off of the contact from touch screen 112 has occurred. In response to the lift-off of the contact following the movement of the contact, the content 592 moves at a velocity (also referred to herein as "speed") v1, as indicated by dotted arrow 5100.

In FIG. 5GG, the movement of content 592 continues at a reduced velocity v2, as indicated by dotted arrow 5100. The velocity of the movement is reduced from velocity v1, as indicated in FIG. 5FF, to velocity v2, as indicated in 5GG, (e.g., to indicate a friction effect). For example, the movement of the content slows due to virtual friction between content 592 and the virtual surface over which content 592 is moving.

FIGS. 5HH-5KK illustrate content scrolling (FIGS. 5HH and 5II) and movement of content occurring in response to lift-off of a contact (FIGS. 5JJ and 5KK) when a detected characteristic intensity of a contact has a second intensity prior to lift-off, in accordance with some embodiments.

In FIG. 5HH, a contact is detected at touch on touch screen 112 at a location indicated by focus selector 594. The contact moves along a path indicated by arrow 5102. A first portion of content 592 is presented on touch screen display 112. As the movement of the contact occurs, content 592 is scrolled (e.g., in the direction of movement of the contact). A currently viewed position within content 592 (e.g., relative to the overall length of content 592) is indicated by scroll position indicator 596. In FIG. 5HH, the intensity of the contact has increased above a light press intensity threshold $IT_L$, as indicated by intensity meter 530. Scroll enhancement indicator 5104 is shown (e.g., to indicate an extent to which the characteristic intensity of the contact is affecting content scrolling and/or post-lift-off content movement behavior). For example, the length of scroll enhancement indicator 5104 provides a visual indication of a simulated inertia of content 592 that occurs on lift-off (e.g., the resistance to slowing down after lift-off from the velocity with which content 592 is moving in response to the movement of the contact prior to lift-off). In some embodiments, a simulated inertia is set based on a characteristic intensity of the contact.

In FIG. 5II, content 592 has been scrolled in accordance with the movement of the contact from an initial position as indicated by focus selector 594c (e.g., focus selector 594 at a first point in time) to a subsequent position as indicated by focus selector 594d (e.g., focus selector 594 at a second point in time that is later than the first point in time) along the path indicated by arrow 5102. In accordance with the changed currently viewed position within content 592, scroll position indicator 596 is shown at a lower position in 5II than the position of scroll position indicator 596 in 5HH.

In FIG. 5JJ, following movement of the contact as described with regard to FIGS. 5HH-5II, lift-off of the contact from touch screen 112 has occurred. In response to the lift-off of the contact following the movement of the contact, the content 592 moves at a velocity v3, as indicated by dotted arrow 5106. Compared with the velocity of movement of content 592 that occurred as indicated in FIGS. 5FF-5GG, content 592 moves with a greater velocity in FIGS. 5JJ-5KK (e.g., v3 is greater than v1) in accordance with the higher characteristic intensity of the contact with touch screen 112 prior to lift-off as indicated in FIGS. 5HH-5II.

In FIG. 5KK, the movement of content 592 continues at a reduced velocity v4, as indicated by dotted arrow 5106. The velocity of the movement is reduced from velocity v3, as indicated in FIG. 5JJ, to velocity v4, as indicated in 5KK (e.g., to indicate a friction effect). Compared with the movement of content 592 that occurred in response to liftoff as indicated in FIGS. 5FF-5GG, content 592 moves by a greater distance in FIGS. 5JJ-5KK in accordance with the higher characteristic intensity of the contact with touch screen 112 prior to lift-off as indicated in FIGS. 5HH-5II.

FIGS. 5LL-5OO illustrate content scrolling (FIGS. 5LL and 5MM) and movement of content occurring in response to lift-off of a contact (FIGS. 5NN and 5OO) when a detected characteristic intensity of a contact has a third intensity prior to lift-off, in accordance with some embodiments.

In FIG. 5LL, a contact is detected on touch screen 112 at a location indicated by focus selector 594. The contact moves along a path indicated by arrow 5108. A first portion of content 592 is presented on touch screen display 112. As the movement of the contact occurs, content 592 is scrolled (e.g., in the direction of movement of the contact). A currently viewed position within content 592 (e.g., relative to the overall length of content 592) is indicated by scroll position indicator 596. In FIG. 5LL, the intensity of the contact has increased further above a light press intensity threshold $IT_L$, to just below deep press intensity threshold $IT_D$ (e.g., the characteristic intensity of the contact indicated in FIG. 5LL exceeds the characteristic intensity of the contact as indicated in FIG. 5HH), as indicated by intensity meter 530. Scroll enhancement indicator 5104 of FIG. 5LL is longer than scroll enhancement indicator 5104 of FIG. 5HH (e.g., visually indicating the speed of the content's motion).

In FIG. 5MM, content 592 has been scrolled in accordance with the movement of the contact from an initial position as indicated by focus selector 594e (e.g., focus selector 594 at a first point in time) to a subsequent position as indicated by focus selector 594f (e.g., focus selector 594 at a second point in time that is later than the first point in time) along the path indicated by arrow 5108. In accordance with the changed currently viewed position within content 592, scroll position indicator 596 is shown at a lower position in 5MM than the position of scroll position indicator 596 in 5LL.

In FIG. 5NN, following movement of the contact as described with regard to FIGS. 5LL-5MM, lift-off of the contact from touch screen 112 has occurred. In response to the lift-off of the contact following the movement of the contact, the content 592 moves at a velocity v5, as indicated by dotted arrow 5110. Compared with the velocity of movement of content 592 that occurred as indicated in FIGS. 5JJ-5KK, content 592 moves with a greater velocity in FIGS. 5NN-5OO (e.g., v5 is greater than v3) in accordance with the higher characteristic intensity of the contact with touch screen 112 prior to lift-off as indicated in FIGS. 5LL-5MM.

In FIG. 5OO, the movement of content 592 continues at a reduced velocity v6, as indicated by dotted arrow 5110. The velocity of the movement is reduced from velocity v5, as indicated in FIG. 5NN, to velocity v6, as indicated in 5OO (e.g., to indicate a friction effect). Compared with the movement of content 592 that occurred in response to liftoff as indicated in FIGS. 5JJ-5KK, content 592 moves by a greater distance in FIGS. 5NN-5OO in accordance with the higher characteristic intensity of the contact with touch screen 112 prior to lift-off as indicated in FIGS. 5LL-5MM. Scroll enhancement indicator 5104 of FIG. 5OO is shorter than scroll enhancement indicator 5104 of FIG. 5NN (e.g., visually indicating the reduced speed of the content's motion).

FIGS. 5PP-5RR illustrate scrolling through content 592 to a predefined portion of the content in response to lift-off of a contact when the contact had a characteristic intensity above an intensity threshold prior to the lift-off of the contact, in accordance with some embodiments.

In FIG. 5PP, a contact is detected at touch on touch screen 112 at a location indicated by focus selector 594. The contact moves along a path indicated by arrow 5112. A first portion of content 592 is presented on touch screen display 112. As the movement of the contact occurs, content 592 is scrolled (e.g., in the direction of movement of the contact). A currently viewed position within content 592 (e.g., relative to the overall length of content 592) is indicated by scroll position indicator 596. In FIG. 5PP, the intensity of the contact has increased above a deep press intensity threshold $IT_D$, as indicated by intensity meter 530.

In FIG. 5QQ, content 592 has been scrolled in accordance with the movement of the contact from an initial position as indicated by focus selector 594g (e.g., focus selector 594 at a first point in time) to a subsequent position as indicated by focus selector 594h (e.g., focus selector 594 at a second point in time that is later than the first point in time) along the path indicated by arrow 5112. In accordance with the changed currently viewed position within content 592, scroll position indicator 596 is shown at a lower position in 5QQ than the position of scroll position indicator 596 in 5PP.

In FIG. 5RR, following movement of the contact as described with regard to FIGS. 5PP-5QQ, lift-off of the contact from touch screen 112 has occurred. In response to the lift-off of the contact following the movement of the contact, in accordance with a determination that the contact had a characteristic intensity above an intensity threshold (e.g., deep press intensity threshold $IT_D$) content 592 is scrolled to a predefined portion (e.g., the end of content 592 as indicated by scroll position indicator 596 in 5RR).

FIG. 5SS illustrates an intensity filter, in accordance with some embodiments. Solid line 5114 indicates a detected intensity of a contact. Dotted line 5116 indicates a shifted intensity profile that indicates filtered intensity values based on the detected intensity values indicated by detected intensity 5114. The intensity filter shifts an intensity profile of a contact, e.g., by a first time shift past the lift-off of the contact. For example, lift-off of the contact occurs at a point in time indicated by $t_{lift-off}$. In some embodiments, a characteristic intensity value $I_C$ at lift-off is determined from a point on shifted intensity profile 5116 corresponding to a time $t_{lift-off}$ when lift-off of contact from touch screen 112 is detected (e.g., the time when detected intensity 5114 drops to a contact intensity value of 0). In some embodiments, an initial speed for moving content (e.g., v1, v3, v5 as indicated in FIG. 5FF, 5JJ, 5NN, respectively) and/or a steady state speed for scrolling through the content to the predefined portion (e.g., scrolling to the end of content 592 as indicated by scroll position indicator 596 in 5RR) are determined based on a selected intensity value (e.g., $I_C$) on the shifted intensity profile 5116.

FIG. 5TT illustrates a speed filter, in accordance with some embodiments. Solid line 5118 indicates a detected speed of a contact. Dotted line 5120 indicates a shifted speed profile that indicates filtered speed values based on the detected speed values indicated by detected speed 5118. The speed filter shifts a speed profile of a contact, e.g., by a first time shift past the lift-off of the contact. For example, lift-off of the contact occurs at a point in time indicated by $t_{lift-off}$. In some embodiments, a characteristic speed value $V_C$ at lift-off is determined from a point on shifted speed profile 5120 corresponding to a time $t_{lift-off}$ when lift-off of contact from touch screen 112 is detected (e.g., the time when detected speed 5118 drops to a contact speed value of 0). In some embodiments, an initial speed for moving content (e.g., v1, v3, v5 as indicated in FIG. 5FF, 5JJ, 5NN, respectively) and/or a steady state speed for scrolling through the content to the predefined portion (e.g., scrolling to the end of content 592 as indicated by scroll position indicator 596 in 5RR) are determined based on a selected speed value (e.g., $V_C$) on the shifted speed profile 5120.

FIGS. 6A-6B are flow diagrams illustrating a method 600 of navigating within and between content items in accordance with some embodiments. The method 600 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 600 are, optionally, combined and/or the order of some operations is, optionally, changed.

As described below, the method 600 provides an efficient way to navigate within and between content items based on the intensity of a user input. Such methods reduce the number, extent, and/or nature of the inputs from a user and produce a more efficient human-machine interface. For battery-operated electronic devices, enabling a user to interact with the content item faster and more efficiently conserves power and increases the time between battery charges.

In some embodiments, method 600 is performed at an electronic device with a display, a touch-sensitive surface, and one or more sensors to detect intensity of contacts with the touch-sensitive surface.

The device displays (602), on the display, content of a first content item, wherein the first content item is one of a sequence of content items (e.g., a plurality of content items). In some embodiments, the sequence of content items corresponds (604) to a plurality of electronic messages in an electronic messaging application (e.g., as shown in FIG. 5J), a plurality of web browser windows (or tabbed windows) in a web browser, a plurality of applications, a plurality of digital images in a set of images (e.g., a single album or collection in a photo or camera application), or a plurality of sets of digital images (e.g., a plurality of albums or collections of photos in a photo or camera application). In some embodiments, the sequence of content items corresponds to a plurality of content sections, such as a plurality conversations in a messaging or email application, a plurality of weeks (or months or years) in a calendar application, a plurality of chapters in a book, a plurality of scenes in a video, or a plurality of events in a digital image library.

The device detects (606) a user input that includes movement of a contact in a respective direction on the touch-sensitive surface. In some embodiments, the user input is a swipe gesture that is made with the contact (e.g., user input 510, FIGS. 5B-5C and/or user input 513, FIGS. 5E-5G). In some embodiments, the swipe gesture includes movement of the contact from a first location on the touch-sensitive surface to a second location on the touch-sensitive surface. In some embodiments, the swipe gesture is a vertical swipe gesture. In some embodiments, the swipe gesture is a horizontal swipe gesture.

In response (608) to detecting the user input: in accordance with a determination that the user input meets item-switching criteria, the device replaces display of the first content item with display of a second content item (e.g., a different content item distinct from the first content item) in the sequence of content items, wherein the item-switching criteria include a criterion that is met when a characteristic intensity (e.g., a maximum intensity) of the contact is above a first intensity threshold (e.g., user input 513, FIGS. 5E-5G results in replacing display of content item 502 with display of second content 518).

In some embodiments, the item-switching criteria also include a criterion that is met when the device detects a predetermined magnitude (e.g., amount or distance) of movement of the contact (e.g., FIG. 5E shows movement of user input 513 as a precondition to replacing display of content item 502 with display of second content 518). That is, there is a predetermined magnitude of movement that is required to be detected by the device in order to cause the device to replace display of the first content item with display of the second content item. In some embodiments, slight movement of the contact (e.g., less than the predetermined magnitude) results in display of a portion of the second content item and the device then reverts back to displaying the first content item when the contact terminates.

In some embodiments, when an initial intensity of the contact does not exceed the first intensity threshold (e.g., $IT_L$ in FIG. 5B), the device scrolls the first content item in response to the initial user input (e.g., an initial portion of a swipe gesture). If later during the user input, the contact exceeds the first intensity threshold, the device then transitions to displaying the second content item. In some embodiments, the item-switching criteria are met when the initial intensity of the contact exceeds the first intensity threshold. In some embodiments, the item-switching criteria are met when the initial intensity of the contact exceeds the first intensity threshold while the contact is moving (e.g., moving above a predetermined velocity threshold). In some embodiments, the item-switching criteria are not met if the contact is stationary or is moving below a predetermined velocity threshold, even if the characteristic intensity of the contact exceeds the first intensity threshold.

In response (608) to detecting the user input: in accordance with a determination that the user input does not meet the item-switching criteria, the device navigates through the content of the first content item in accordance with the movement of the contact (e.g., displaying a second portion of the first content that is different from the first portion of the content, as shown in FIGS. 5A-5C).

In some embodiments, the item-switching criteria includes (610) a criterion that is met when the characteristic intensity of the contact exceeds the first intensity threshold after detecting at least a predetermined threshold amount of movement of the contact. For example when an increase in intensity from below the first intensity threshold to above the first intensity threshold is detected before the user starts swiping (e.g., before the device detects movement of the contact), the device does not switch between content items. Conversely, in this example, when the increase in intensity from below the first intensity threshold to above the first intensity threshold is detected during the swipe, the device navigates to the second content item).

In some embodiments, the second content item is (612) sequentially adjacent to the first content item (e.g. in the sequence of content items) and is selected based on the respective direction of the movement of the contact. In some embodiments, replacing display of the first content item with the second content item includes displaying a transition between the first content item and the second content item. The transition includes concurrently displaying at least a portion of the first content item and at least a portion of the second content item and the transition is dynamically controlled by the user input.

In some embodiments, replacing display of the first content item with a second content item in the sequence of content items includes sliding the first content item off the display in a direction corresponding to the respective direction and sliding the second content item onto the display in the direction corresponding to the respective direction. For example, when the movement of the contact is principally vertically upwards, the first content item is slid off the display vertically upwards toward the top of the display and the second content item is slid onto the display vertically upwards from the bottom of the display. In some embodiments, a vertically upward swipe results in forward navigation in the sequence of content items (e.g. when the first content item is a photograph, forward navigation results in display of another photograph that is more recent than the first photograph) or vice versa. As another example, when the movement of the contact is principally vertically downwards, the first content item is slid off the display vertically downwards toward the bottom of the display and the second content item is slid onto the display vertically downwards from the top of the display. In some embodiments, a vertically downwards swipe results in backward navigation in the sequence of content items (e.g. when the first content item is a photograph, backward navigation results in display of another photograph that is less recent than the first photograph) or vice versa. In some embodiments, the device performs analogous functionality with respect to horizontal swipes. For example, a rightward-swipe results in backward navigation with left-to-right sliding, and a leftward swipe results in forward navigation with right-to-left sliding or vice versa.

In some embodiments, replacing display of the first content item with a second content item includes directly manipulating the first content item and the second content item in accordance with the movement of the contact. For example, the movement (e.g., speed, direction, and/or position) of the first content item and the second content item, when sliding on and off the display as described above, corresponds to (e.g. tracks) the movement of the contact so that the user feels that she is directly dragging the second content item onto the display and pushing the first content item off the display.

In some embodiments, navigating through the content of the first content item includes: in accordance with a determination that the respective direction is a first direction on the touch-sensitive surface, scrolling (614) the content in a first direction on the display; and in accordance with a determination that the respective direction is a second direction on the touch-sensitive surface, scrolling the content in a second direction on the display that is different from the first direction on the display. In some embodiments, navigating through the content of the first content item includes directly manipulating the displayed content of the first content item in accordance with the movement of the contact. For example, the movement (e.g., speed, direction, and/or distance) of the content, when scrolled, tracks the movement of the contact. In some embodiments, the scrolling occurs in the same direction as the sliding of content items on and off the display that would have occurred, as described above, had the user input met the item-switching criteria. So, for example, a vertically upwards swipe that is below the first intensity threshold results in upward scrolling of the first content item, while a vertically upward swipe that is above the first intensity threshold results in sliding the first content item upwards off the top of the display and sliding the second content item upwards from the bottom of the display.

In some embodiments, navigating through the content of the first content item in accordance with the movement of the contact includes: maintaining (616) display of a first portion of the first content item in a first user interface region on the display; and navigating (e.g., scrolling) through a second portion of the first content item in a second user interface region on the display. In some embodiments, when scrolling the content within a content item, a portion of the content item (e.g., an email header or universal resource locator (URL) bar) is fixed relative to the content (e.g., the body of the content), whereas when switching between the content items, the whole first content item (e.g., both the first portion of the first content item and the second portion of the first content item) scrolls with the content. For example, when switching between the content items, an email header and/or URL bar scroll with the corresponding content item.

In some embodiments, replacing display of the first content item with the second content item includes displaying (618) a transition between the first content item and the second content item; and the transition includes reducing a size of the first content item. For example, the transition includes zooming out from the first content item at the start of the transition to indicate to the user that the device is navigating to the second content item rather than navigating (e.g., scrolling) within the first content item. In some embodiments, the progress of the transition is directly controllable by the user, e.g., via the intensity of the contact. So, for example, as the user increases the contact intensity toward the first intensity threshold, the first content item zooms-out. If the user subsequently reduces the intensity of the contact slightly, the first content item zooms back in. In some embodiments, a plurality of intensity levels within the vicinity of the first intensity threshold map to a plurality of corresponding zoom levels (e.g., sizes) of the first content item. Thus, the user feels as though she is pushing the first content item back in the z-direction by pushing harder on the contact. In some embodiments, as a result of reducing the size of the first content item, a region beyond an edge of the first content item is displayed (e.g., a background area that is a different color or pattern than a color or pattern of the background of the first content item, illustrating to the user that the first content item has been pushed back in the z-direction, as shown in FIG. 5E).

In some embodiments, replacing display of the first content item with the second content item includes displaying (620) a transition between the first content item and the second content item; and the transition includes increasing a size of the second content item (e.g., zooming in on the second content item at the end of the transition to indicate that navigation to the second content item is complete). In some embodiments, the progress of the transition is directly controllable by the user, e.g., via the intensity of the contact. So, for example, as the user reduces the contact intensity toward the first intensity threshold, the second content item zooms-in. If the user subsequently increases the intensity of the contact slightly, the second content item zooms back out. In some embodiments, a plurality of intensity levels within the vicinity of the first intensity threshold map to a plurality of corresponding zoom levels (e.g., sizes) of the second content item. For example, the increase in intensity of the contact from below the first intensity threshold to above the first intensity threshold causes the device to push the first content item back. Movement of the contact then drags the second content item onto the display and pushes the first content item off of the display, where both the first content item and the second content item are zoomed-out during dragging (e.g., scrolling). When the second content item is scrolled onto (e.g., entirely onto the display, or past a predefined threshold for transitioning to the second content item), the second content item increases in size when the intensity is reduced from above the first intensity threshold to below the first intensity threshold, or when liftoff of the contact is detected, as shown in FIGS. 5G-5I.

In some embodiments, while displaying the first content item, the device detects (622) a second user input at a location that corresponds to a selectable affordance (e.g., a URL link, data detected text, or an icon), wherein the second user input includes a second contact that is stationary on the touch-sensitive surface. In response to detecting the second user input, in accordance with a determination that the user input occurs while a focus selector is at a location that corresponds to a selectable affordance (e.g., a URL link, data detected text, or an icon) and the movement of the contact is less than a predetermined amount (e.g., the contact is stationary or nearly so), the device displays a preview area of content that corresponds to the selectable affordance overlaid on the first content item. In some embodiments, the device determines whether the contact is moving on the touch-sensitive surface (e.g., the contact moves more than a predetermined amount in a predetermined time) or whether the contact is stationary (e.g., the contact moves less than a predetermined amount in a predetermined time) on the touch-sensitive surface. When the contact is moving, the device either navigates through the content of the first content item or replaces display of the first content item with the second content item depending on whether the user input meets item-switching criteria, as described above. However, when the contact is stationary and occurs on or over a selectable affordance, the device displays a preview (e.g., peeks at a second user interface that corresponds to the selectable affordance via a preview window).

In some embodiments, in accordance with a determination that the user input begins at a first edge of the touch-sensitive surface (e.g., the user input is a flick gesture that starts at the edge of the touch-sensitive surface, sometimes called an "edge swipe"), the device performs (624) an operation that is distinct from both replacing display of the first content item with the second content item and navigating through the content of the first content item. For example, for a web browser, the operation includes displaying a web page from the history of web pages viewed in the window/tabbed window of the web browser; for an electronic messaging program, the operation includes displaying (e.g., in sequence) a plurality of representations of electronic communications; for a social networking application, the operation includes displaying a menu with settings for the application.) In some embodiments, in accordance with a determination that the user input begins at a first edge of the touch-sensitive surface (e.g., the user input is a flick gesture that starts at the edge of the touch-sensitive surface) and has a characteristic intensity above a respective intensity threshold, the device performs a different operation that is distinct from any of replacing display of the first user interface with the second user interface, displaying the second portion of the first user interface, or an operation that is performed when the characteristic intensity is below the respective threshold. For example, in response to detecting an edge-swipe with an intensity above the respective threshold, the device displays a multitasking user interface for switching between open applications).

In some embodiments, after replacing display of the first content item with the second content item in the sequence of content items, detecting a second user input that includes movement of a second contact on the touch-sensitive surface; in response to detecting the second user input: in accordance with a determination that the second user input meets the item-switching criteria, the device replaces (626) display of the second content item with a third content item in the sequence of content items; and in accordance with a determination that the second user input does not meet the item-switching criteria, navigating through content of the second content item in accordance with the movement of the second contact.

It should be understood that the particular order in which the operations in FIGS. 6A-6B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 800, 900, and 1000) are also applicable in an analogous manner to method 600 described above with respect to FIGS. 6A-6B. For example, the contacts, gestures, user interface objects, tactile outputs, intensity thresholds, focus selectors, and animations described above with reference to method 700 optionally have one or more of the characteristics of the contacts, gestures, user interface objects, tactile outputs, intensity thresholds, focus selectors, and animations described herein with reference to other methods described herein (e.g., methods 700, 800, 900, and 1000). For brevity, these details are not repeated here.

FIGS. 7A-7C are flow diagrams illustrating a method 700 of reordering list items in accordance with some embodiments. The method 700 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 700 are, optionally, combined and/or the order of some operations is, optionally, changed.

As described below, the method 700 provides an intuitive way to reorder list items. The method reduces the number, extent, and/or nature of the inputs from a user when reordering list items, thereby creating a more efficient human-machine interface. For battery-operated electronic devices, enabling a user to reorder list items faster and more efficiently conserves power and increases the time between battery charges.

The device presents (702) a first portion of a list of items 532 on the display. For example, a list of items 532 includes items 534, 536, 538, 540, 542, 544, 546, and 548, as indicated at 5L-5U. In FIG. 5L, a portion of the list of items 532 is presented on touch screen 112. The portion of the list of items shown in FIG. 5L includes items 534, 536, 538, 540, 542, and 544.

The device detects (704) a contact on the touch-sensitive surface 112 while the first portion of the list of items 532 is presented on the display (e.g., while a focus selector is over a first item in the list of items). For example, a contact is detected on touch screen 112 at a location indicated by focus selector 550 while the first portion of the list of items 532 (including items 534-544) is presented on touch screen 112, as shown in FIG. 5M. Focus selector 550 is over item 534 of list 532.

The device detects (706) a first movement of the contact on the touch-sensitive surface 112 while a characteristic intensity of the contact remains below a first intensity threshold. The first intensity threshold is, e.g., hint intensity level $IT_H$, light press intensity level $IT_L$, or another statically or dynamically determined intensity level. For example, in FIG. 5M, the contact at the location indicated by focus selector 550 moves on touch screen 112, as indicated by arrow 552, while the characteristic intensity of the contact remains below $IT_H$, as indicated by intensity level meter 530.

In response to detecting the first movement of the contact on the touch-sensitive surface 112 while the characteristic intensity of the contact remains below the first intensity threshold (e.g., below $IT_H$), the device scrolls (708) the list of items 532 to present a second portion of the list of items 532 on the display in accordance with the first movement of the contact on the touch-sensitive surface (e.g., as in regular scrolling with a light drag). For example, in response to the movement of the contact along the path indicated by arrow 552, list 532 is scrolled to present a second portion of the list including items 546 and 548, as indicated in FIG. 5N. To indicate that scrolling has occurred, scroll position indicator 554 is shown at a higher position in the user interface of 5N than the position of scroll position indicator 554 in the user interface of 5M.

While a focus selector 550 associated with the contact is located on a first item (e.g., item 534) in the second portion of the list of items presented on the display (and while continuing to detect the contact on the touch-sensitive surface), the device detects (710) an increase in the characteristic intensity of the contact above the first intensity threshold (e.g., $IT_H$ as shown at intensity meter 530) followed by a second movement of the contact on the touch-sensitive surface. For example, while focus selector 550 is located on item 534 of the second portion of the list of items 532, as shown in FIG. 5O, a characteristic intensity of the contact increases above $IT_H$, as shown at intensity meter 530, followed by a movement of the contact along the path indicated by 556.

In response to detecting the increase in the characteristic intensity of the contact above the first intensity threshold followed by the second movement of the contact on the touch-sensitive surface, the device moves (712) the first item (e.g., item 534) relative to other items in the second portion of the list of items 532 presented on the display in accordance with the second movement of the contact (e.g., detaching an item from the list and moving it with a drag that started with a deep press). For example, as shown at FIGS. 5P-5S, in response to the increase in the characteristic intensity of the contact above the first intensity threshold (e.g., above $IT_H$, as shown by intensity meter 530 as shown in FIG. 5O, above $IT_L$, as shown by intensity meter 530 as shown in FIG. 5P, above deep press intensity level $IT_D$, or above another statically or dynamically determined intensity threshold level) followed by movement of the contact along the path indicated by arrow 556, first item 534 moves relative to other items 536, 538, 540, 546, and 548 in the second portion of the list of items 532.

In some embodiments, in response to detecting the increase in the characteristic intensity of the contact above the first intensity threshold followed by the second movement of the contact on the touch-sensitive surface, while the focus selector 550 associated with the contact is located on the first item (e.g., item 534) in the second portion of the list of items 532, the device changes (714) an appearance of the first item (e.g., enlarging the first item, highlighting a boundary of the first item, changing the color or hue of the first item, lifting the first item above the plane of the list of items, or providing a combination of two or more of the above visual effects, while maintaining the normal appearances of the other items in the list). For example, as shown in FIGS. 5O-5S, in response to the increase in the characteristic intensity of the contact above the first intensity threshold (e.g., above $IT_H$, as shown by intensity meter 530 as shown in FIG. 5O, or above $IT_L$, as shown by intensity meter 530 as shown in FIG. 5P) followed by movement of the contact along the path indicated by arrow 556, while focus selector 550 is located on item 534 in the second portion of list 532, the appearance of item 534 is changed. For example, a highlighted boundary is shown around item 534, as shown in FIGS. 5O-5S. When item 534 is detached from list 532, as shown in FIGS. 5P-5S, the size of item 534 is reduced and item 534 is shown lifted above the plane of the list of items 532. In some embodiments, the appearance of the whole list may also change in a different way, so that the appearance change of the first item is still distinguished from the appearance change applied to the other items in the list. In some embodiments, as the characteristic intensity of the contact continues to vary above the first intensity threshold, the amount of appearance change is dynamically determined and adjusted based on the actual variation in the characteristic intensity of the contact.

In some embodiments, changing the appearance of the first item (e.g., item 534) includes (716) dynamically changing a size of the first item in accordance with the characteristic intensity of the contact (e.g., dynamically increasing the size of the first item as the current intensity of the contact increases beyond the first threshold, such that the first item overlaps with an item adjacent to the first item). For example, when the characteristic intensity of the contact at the position indicated by focus selector 550 increases from a level above hint intensity threshold $IT_H$, as shown by intensity meter 530 in FIG. 5O, to a level above light press intensity threshold $IT_L$, as shown by intensity meter 530 in FIG. 5P, the size of item 534 decreases from the size of item 534 as shown in FIG. 5O to the size of item 534 as shown in FIG. 5P.

In some embodiments, in accordance with the second movement of the contact on the touch-sensitive surface, the device moves (718) the first item (e.g., item 534) by a first distance relative to a second item (e.g., item 536) that is adjacent to the first item to at least partially reveal a first item slot (e.g., item 558) associated with the first item on the display. For example, as shown in FIGS. 5P-5R, in accordance with the movement of the contact on touch screen 112 along the path indicated by arrow 556, item 534 moves relative to item 536 to partially reveal item slot 558 associated with 534.

In some embodiments, moving the first item (e.g., item 534) by the first distance relative to the second item (e.g., item 536) that is adjacent to the first item includes (720), during an initial portion of the second movement of the contact (e.g., during the first 10 mm or 5 mm of the second movement of the contact after the intensity of the contact has reached above the first intensity threshold), moving the first item at a slower speed than the focus selector 550 to create a distance lag between the first item and the focus selector (e.g., the first item is dragged behind the focus selector with some inertia); and during a subsequent portion of the second movement of the contact following the initial portion of the second movement of the contact (e.g., after the first 10 mm or 5 mm of the second movement of the contact after the intensity of the contact has reached above the first intensity threshold), accelerating the movement of the first item to eliminate the distance lag between the first item and the focus selector (e.g., during the next 2 mm or 1 mm of the second movement of the contact after the initial portion of the second movement on the contact, the first item quickly snaps to the focus selector, and moves together with the focus selector for the remainder of the second movement). For example, during an initial portion of the movement of the contact along the path indicated by arrow 556, as shown in FIGS. 5P-5Q, item 534 moves at a slower speed than focus selector 550 (e.g., the position of focus selector 550 in FIG. 5P is different from the position of focus selector 550 in FIG. 5Q and the position of item 534 in FIG. 5P is the same as the position of item 534 in FIG. 5Q). During a subsequent portion of the movement of the contact along the path indicated by arrow 556, as shown in FIGS. 5Q-5R, the movement of item 534 accelerates to eliminate the distance lag between item 534 and focus selector 550 (e.g., item 534 moves from a position as shown in FIG. 5Q with focus selector 550 at the lower edge of item 534 to a position as shown in FIG. 5R with focus selector 550 centered on item 534, such that item 534 has "caught up" with focus selector 550).

In some embodiments, the device detects (722) a lift-off of the contact upon moving the first item (e.g., item 534) by the first distance relative to the second item (e.g., item 536) that is adjacent to the first item; and, in accordance with a determination that the first distance is smaller than a first threshold distance (e.g., half of a slot height), the device restores the first item into the first item slot (e.g. item slot 558) associated with the first item on the display (e.g., and reversing visual changes applied to the first item and/or other items in the list, such as restoring the size, transparency, etc. of the first item and/or other items in the list). For example, item 534 is restored into item slot 558 (e.g. the location of item 534 before item 534 detached from list 532), resulting in a user interface that displays a list 532 that is the same as list 532 shown in FIG. 5N.

In some embodiments, in accordance with a determination that the first distance is greater than a first threshold distance (e.g., half of a slot height), the device moves (724) the second item into the first item slot associated with the first item to reveal a second item slot (e.g. item slot 560) associated with the second item (e.g., sliding the second item into a slot that was associated with the first item). For example, as shown in FIG. 5S, item 536 is moved into first item slot 558 (in which item 534 was previously located) and second item slot 560 (in which item 536 was previously located) is revealed.

In some embodiments, the device detects (726) a lift-off of the contact while the second item slot (e.g. item slot 560) associated with the second item (e.g., item 536) is revealed on the display; and in response to detecting the lift-off of the contact while the second item slot associated with the second item is revealed on the display, the device inserts the first item (e.g. 534) into the second item slot. For example, as shown in FIG. 5T1, first item 534 is inserted into item slot 560 (that was previously occupied by item 536).

In some embodiments, during the second movement of the contact, for a plurality of other items besides the first item in the list of items, the device moves (728) a respective other item to a respective new item slot and reveals a respective previous item slot for the respective other item on the display. For example, as a movement of the contact that causes item 534 to pass over multiple other items (e.g., over items 536 and 538) occurs, item 536 is moved to item slot 558 and item slot 560 for item 536 is revealed; and subsequently item 538 is moved to item slot 560 and a new item slot (not shown) is revealed.

In some embodiments, the device generates (730) a respective tactile output (e.g., thereby providing haptic feedback) as the respective other item moves to the respective new item slot and reveals the respective previous item slot (e.g., the tactile output is feedback indicating that the respective other item has snapped into a new slot). For example, as shown in FIG. 5S, when item 536 moves to item slot 558 and item slot 560 is revealed, a tactile output, as indicated at 562, occurs.

In some embodiments, a respective movement of the respective other item changes (732) in accordance with the characteristic intensity of the contact during the second movement of the contact. For example, the movement of the respective other item slows down when the contact intensity increases. As a result, the scrolling of the other items in the list during the movement of the first item slows down when the intensity of the contact increases during the second movement of the contact.

In some embodiments, the device detects (734) that the first item (e.g. item 534) has moved within a second threshold distance of a first end (e.g., top or bottom) of the displayed second portion of the list of items in accordance with the second movement of the contact; and, in response to detecting that the first item has moved within the second threshold distance of the first end of the displayed second portion of the list of items, the device scrolls the list of items toward a second end (e.g., bottom or top) of the displayed second portion of the list of items opposite the first end to display a third portion of the list of items. For example, as shown in FIG. 5T2, item 534 moves along a path indicated by arrow 564 to a location within a threshold distance of lower edge 566 of the displayed portion of list 532. The list of items 532 is scrolled toward upper edge 568, as shown in FIGS. 5T2-5U. In 5U, items 542 and 544 are revealed. To indicate that scrolling has occurred, scroll position indicator 554 is shown at a lower position in the user interface of 5U than the position of scroll position indicator 554 in the user interface of 5T2.

In some embodiments, scrolling the list of items 532 toward the second end (e.g., toward upper edge 568) of the displayed second portion of the list of items opposite the first end (e.g., lower edge 566) to display the third portion of the list of items includes (736): dynamically changing a scrolling speed of the scrolling toward the second end of the displayed second portion of the list of items in accordance with the characteristic intensity of the contact. In some embodiments, increasing the intensity of the contact causes the scrolling of the list of items to speed up, e.g., to quickly scroll to the desired location in the list for inserting the first item. In some embodiments, increasing the intensity of the contact causes the scrolling of the list of items to slow down, e.g., to allow the user to see more clearly which items are coming into view.

In some embodiments, the device applies (738) a transparency effect to the first item (e.g., making the first item semitransparent) while the first item (e.g. item 734) overlaps with another item in the list of items (e.g., item 736).

It should be understood that the particular order in which the operations in FIGS. 7A-7C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 800, 900, and 1000) are also applicable in an analogous manner to method 700 described above with respect to FIGS. 7A-7C. For example, the contacts, gestures, user interface objects, tactile outputs, intensity thresholds, focus selectors, and animations described above with reference to method 700 optionally have one or more of the characteristics of the contacts, gestures, user interface objects, tactile outputs, intensity thresholds, focus selectors, and animations described herein with reference to other methods described herein (e.g., methods 600, 800, 900, and 1000). For brevity, these details are not repeated here.

FIGS. 8A-8C are flow diagrams illustrating a method 800 of navigating structured content in accordance with some embodiments. The method 800 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 800 are, optionally, combined and/or the order of some operations is, optionally, changed.

As described below, the method 800 provides an intuitive way to navigate structured content. The method reduces the number, extent, and/or nature of the inputs from a user when navigating structured content, thereby creating a more efficient human-machine interface. For battery-operated electronic devices, enabling a user to navigate structured content faster and more efficiently conserves power and increases the time between battery charges.

The device presents (802) a first portion of structured content 572 on the display, wherein the structured content 572 includes a plurality of sections, and the first portion includes content from a first section of the plurality of sections. For example, structured content 572 (e.g., the book *The Jungle Book* by Rudyard Kipling), as illustrated in FIGS. 5V-5CC includes multiple sections (e.g., chapters). FIG. 5V shows a portion including content from Chapter 3 of structured content 572.

The device detects (804) a first contact on the touch-sensitive surface while the first portion of the structured content is presented on the display. For example, as shown at FIGS. 5W-5BB, a contact is received at a location indicated by focus selector 574.

The device detects (806) an increase in a characteristic intensity of the first contact on the touch-sensitive surface (e.g., an increase from below hint intensity threshold $IT_H$ to above $IT_H$, as indicated at FIGS. 5Y-5Z and/or an increase from below light press intensity threshold $IT_L$ to above $IT_L$, as indicated at FIGS. 5Z-5AA) and detects a first movement of the first contact on the touch-sensitive surface (e.g., a movement along a path indicated by arrow 580 in FIGS. 5Z-5BB). In some embodiments, detection of the movement of the contact is required before detection of the increase in the characteristic intensity of the contact (e.g., to differentiate from a gesture for triggering a peek and pop response of the user interface). In some embodiments, detection of an increase in the characteristic intensity of the contact is required before detection of the movement of the contact. In some embodiments there is no relative timing requirement for detecting the increase in contact intensity and detecting the movement of the contact.

In response to detecting the increase in the characteristic intensity of the first contact and detecting the first movement of the first contact (808): in accordance with a determination that the characteristic intensity of the contact increases above a first intensity threshold (e.g., above intensity light press intensity threshold $IT_L$, or another statically or dynamically determined threshold), the device translates the structured content 572 to display a start of a second section adjacent to the first section of the structured content at a predefined location on the display (e.g., the device translates the structured content to display at the beginning of the UI window or the middle of the UI window). For example, FIGS. 5AA-5BB illustrate a translation of structured content 572 from displaying a portion of a first section (Chapter 3, as shown in FIG. 5AA) to displaying a start of an adjacent section (Chapter 4, as shown in FIG. 5BB). In some embodiments, the predefined location on the display is chosen independent of the structured content and/or the movement of the contact. In accordance with a determination that the characteristic intensity of the contact does not increase above the first intensity threshold (e.g., does not exceed light press intensity threshold $IT_L$), the device translates the structured content 572 in accordance with a magnitude of the movement (e.g., speed or distance) of the contact on the touch-sensitive surface. For example, as shown in FIGS. 5W-5X, structured content 572 is translated (e.g., from showing a first portion of Chapter 3, as shown in FIG. 5W, to showing a second portion of Chapter 3, as shown in FIG. 5X) in accordance with a distance traversed by focus selector 574 as the contact moves across touch screen 112 along a path indicated by arrow 578.

In some embodiments, during the translating of the structured content to display the start of the second section adjacent to the first section on the display, a focus selector 574 associated with the first contact is on (810) the structured content 572 (and not on an index or scroll bar presented on the display). For example, as shown in FIGS. 5AA-5BB, during the translating of the structured content to display the start of the second section (e.g., Chapter 4) adjacent to the first section (Chapter 3), focus selector 574 is located on the structured content 572.

In some embodiments, in response to detecting the increase in the characteristic intensity of the first contact and the first movement of the first contact (e.g., in response to detecting an increase in the characteristic intensity of the first contact above the first intensity threshold, and the first movement of the first contact on the touch-sensitive surface), the device applies (812) a visual effect on the first portion of the structured content on the display. In some embodiments, applying the visual effect includes shrinking the first portion of the structured content, and/or pushing the first portion of the structured content to a lower z-level on the display. For example, as shown in FIGS. 5Y-5Z, the displayed portion of structured content 572 is reduced in size (e.g., from the size of the displayed portion of structured content 572 in FIG. 5Y to the size of the displayed portion of structured content 572 in FIG. 5Z) and pushed to a lower z-level on the display.

In some embodiments, the device removes (814) the applied visual effect on the first portion of the structured content on the display during the translating of the structured content.

In some embodiments, prior to the determination that the characteristic intensity of the first contact has increased above the first intensity threshold (816): the device detects an initial increase in the characteristic intensity of the first contact (e.g., an increase above the first intensity threshold); and, in response to detecting the initial increase in the characteristic intensity of the first contact, the device concurrently presents a scroll bar with the first portion of the structured content 572 on the display, wherein the scroll bar includes a scroll position indicator 576 that indicates a respective position of the first portion of the structured content 572 in the structured content 572; and, in response to the determination that the characteristic intensity of the first contact has increased above the first intensity threshold (e.g., $IT_L$), the device presents a plurality of section indicators (e.g. section indicators 582, 584, 586, and 588 as shown in FIG. 5Z) along with the scroll position indicator 576, wherein a relative ordering of the section indicators 582, 584, 586, and 588 to the scroll position indicator 576 corresponds to relative positions of the sections to the first portion of the structured content in the structured content 572.

In some embodiments, presenting the plurality of section indicators with the scroll bar includes: presenting (818) an animation that shows the plurality of section indicators 582, 584, 586, and 588 emerging from the scroll position indicator 576 and spreading out along the scroll bar. For example, as illustrated in FIGS. 5Z-5AA, section indicators 582, 584, 586, and 588 spread out from initial positions as shown in FIG. 5Z to spread positions as indicated in FIG. 5AA. In some embodiments, the animation shows the section indicators flying out from the scroll position indicator, overshooting, and then bouncing back to their respective final positions along the scroll bar.

In some embodiments, when translating of the structured content to display the start of the second section adjacent to the first section of the structured content, the device presents (820) an animation that shows the scroll position indicator 576 hopping over a respective section indicator (e.g., section indicator 588) in the plurality of section indicators (e.g., the section indicator that is adjacent to the scroll position indicator in the scroll direction). For example, as shown in FIGS. 5AA-5BB, scroll position indicator 576 hops from above section indicator 588, as shown in FIG. 5AA, to below section indicator 588, as shown in FIG. 5BB.

In some embodiments, the device detects (822) a lift-off of the first contact, and, in response to detecting the lift-off of the first contact, the device ceases to display the scroll bar, the scroll position indicator, and the plurality of section indicators. For example, as shown in FIGS. 5BB-5CC, the scroll position indicator 576 and section indicators 582, 584, 586, and 588 shown in FIG. 5BB are no longer visible when liftoff occurs as shown in FIG. 5CC. In some embodiments, the scroll bar, the scroll position indicator, and the plurality of section indicators are displayed in response to the determination that the characteristic intensity of the first contact has increased above the first intensity threshold, and if the first movement is detected after the characteristic intensity of the first contact has decreased below the first intensity threshold, the section scrolling mode is not entered, and the plurality of section indicators (and optionally, the scroll bar and the scroll position indicator) are removed from the display.

In some embodiments, in response to detecting the lift-off of the first contact, the device presents (824) an animation that shows the plurality of section indicators (e.g. section indicators 582, 584, 586, and 588, as shown in FIGS. 5AA-5BB) moving (e.g., retracting) into the scroll position indicator 576 before ceasing the display the scroll position indicator 576.

In some embodiments, the structured content 572 is translated (826) to display the start of the second section (e.g., Chapter 4) adjacent to the first section (e.g., Chapter 3) of the structured content at the predefined location on the display in accordance with a determination that the first movement of the first contact (e.g., along the path indicated by arrow 580) exceeds a first threshold distance. In some embodiments, if the first movement of the first contact does not exceed the first threshold distance, the structured content is not translated to display the start of the second section adjacent to the first section of the structured content at the predefined location on the display. Instead, the first portion of the structured content remains to be displayed at or is restored to its original location on the display after the first movement.

In some embodiments, the characteristic intensity of the first contact is below (828) the first intensity threshold (e.g., below $IT_L$ as indicated by intensity meter 530) after the first movement of the first contact (e.g., along the path indicated by arrow 580) exceeds the first threshold distance. For example, the user can release the pressure on the content (e.g., decrease the contact intensity) below the first intensity threshold after entering the section scrolling mode (e.g., entering the section scrolling mode with the increase in intensity above the first intensity threshold and moving the first contact by at least the first threshold distance). Upon reduction of the contact intensity, the device remains in the section scrolling mode, and further movement beyond the first threshold distance is used for continued section scrolling.

In some embodiments, the sections in the structured content are mapped (830) to a plurality of vertical positions on the display (e.g., the plurality of sections correspond to an equal number of positions evenly distributed on the display in the scrolling direction (e.g., the vertical direction). In some embodiments, the vertical positions are represented by respective markers, e.g., section markers (such as section indicators 582, 584, 586, and 588). In some embodiments, the positions and/or the corresponding markers are located away from the scroll bar, and on the displayed content. In some embodiments, the first movement of the first contact from a first position of the plurality of positions to a second position of the plurality of positions results in a translation of the structured content from one section of the structured document that corresponds to the first position on the display to another section of the structured content that corresponds to the second position on the display. For example, if the structured content has five sections, each section is mapped to a corresponding vertical position on the display along the vertical direction. After the conditions for section scrolling are satisfied and the section scrolling mode has been entered, a movement from the position corresponding to section 3 to the position corresponding to section 5 causes the content to be scrolled from section 3 to section 5, as opposed to causing the content to be scrolled by the amount determined in regular scrolling. In other words, regardless of how many pages are included in section 3 to section 5, a physical movement from the position corresponding to section 3 to the position corresponding to section 5 on the display (e.g., a fixed physical distance), would cause scrolling from section 3 to section 5 in the section scrolling mode. In contrast, in conventional scrolling, the physical distance of the movement of the contact is much more closely correlated with the amount of content scrolling (e.g., lines, pages, etc.) that is performed.

It should be understood that the particular order in which the operations in FIGS. 8A-8C have been described is merely exemplary and is not intended to indicate that the described order is the only order in which the operations could be performed. One of ordinary skill in the art would recognize various ways to reorder the operations described herein. Additionally, it should be noted that details of other processes described with respect to other methods described herein (e.g., methods 600, 700, 900, and 1000) are also applicable in an analogous manner to method 800 described above with respect to FIGS. 8A-8C. For example, the contacts, gestures, user interface objects, tactile outputs, intensity thresholds, focus selectors, animations described above with reference to method 800 optionally have one or more of the characteristics of the contacts, gestures, user interface objects, tactile outputs, intensity thresholds, focus selectors, animations described herein with reference to other methods described herein (e.g., methods 600, 700, 900, and 1000). For brevity, these details are not repeated here.

FIGS. 9A-9D are flow diagrams illustrating a method 900 of moving content on a display in accordance with some embodiments. The method 900 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

As described below, the method 900 provides an intuitive way to move content on a display. The method reduces the number, extent, and/or nature of the inputs from a user when moving content on a display, thereby creating a more efficient human-machine interface. For battery-operated electronic devices, enabling a user to move content on a display faster and more efficiently conserves power and increases the time between battery charges.

The device presents (902) a first portion of content 592 (e.g., "The Raven" by Edgar Allan Poe) on a display (e.g., touch screen 112).

While presenting the first portion of the content 592 on the display, the device (904) detects a first contact on a touch-sensitive surface (e.g., touch screen 112) and detects a first movement of the first contact on the touch-sensitive surface (e.g., a movement of focus selector 594, such as a movement along a path indicated by arrow 598 of FIGS. 5DD-5EE, a movement along a path indicated by arrow 5102 of FIGS. 5HH-5II, or a movement along a path indicated by arrow 5108 of FIGS. 5LL-5MM).

In response to detecting the first movement of the first contact, the device scrolls (906) the content 592 to present a second portion of the content on the display in accordance with the first movement of the first contact. For example, content 592 is scrolled from the first portion of the content displayed in FIG. 5DD to present a second portion of the content in FIG. 5EE. Scrolling to present a second portion of the content 592 is also described with regard to FIGS. 5II, and 5MM.

The device detects (908) an increase in intensity of the first contact on the touch-sensitive surface during the first movement of the first contact on the touch-sensitive surface. For example, as shown in FIGS. 5DD-5EE, the intensity of the contact increases above contact detection intensity threshold $IT_0$, as indicated by intensity meter 530, during movement of the contact along a path indicated by arrow 598. In FIGS. 5HH-5II, the intensity of the contact increases above light press intensity threshold $IT_L$, as indicated by intensity meter 530, during movement of the contact along a path indicated by arrow 5102. In FIGS. 5LL-5MM, the intensity of the contact increases above light press intensity threshold $IT_L$, as indicated by intensity meter 530, during movement of the contact along a path indicated by arrow 5108.

After detecting the increase in intensity of the first contact on the touch-sensitive surface during the first movement of the first contact on the touch-sensitive surface, the device detects (910) a lift-off of the first contact following the first movement of the first contact on the touch-sensitive surface. For example, lift-off of the contact is detected, as indicated at FIG. 5FF, following the movement of the contact indicated in FIGS. 5DD-5EE. Lift-off of the contact is also detected, as indicated at FIG. 5JJ, following the movement of the contact indicated in FIGS. 5HH-5II. Lift-off of the contact is also detected, as indicated at FIG. 5NN, following the movement of the contact indicated in FIGS. 5LL-5MM.

In response to detecting the lift-off of the first contact following the first movement of the first contact on the touch-sensitive surface, the device moves (912) the content 592 on the display by an amount that is determined based on a characteristic intensity of the first contact and a characteristic speed of the first movement detected prior to the lift-off of the first contact. For example, content 592 moves in response to lift-off of the contact from a position as indicated at FIG. 5FF to a different position as indicated 5GG. Movement of content 592 in response to lift-off is additionally illustrated at FIGS. 5JJ-5KK and 5NN-5OO.

In some embodiments, the characteristic speed of the first movement is a first speed and moving the content 592 on the display by an amount that is determined based on the characteristic intensity of the first contact and the characteristic speed of the first movement detected prior to the lift-off of the first contact includes (914): in accordance with a determination that the characteristic intensity is a first intensity (e.g., a characteristic intensity of the contact below light press intensity threshold $IT_L$, as indicated in FIGS. 5DD-5EE), moving the content 592 by a first amount (e.g. movement of content 592 from a position at lift-off as shown in FIG. 5FF to a moved position as shown in FIG. 5GG); and in accordance with a determination that the characteristic intensity is a second intensity that is different from the first intensity (e.g., an characteristic intensity of the contact above light press intensity threshold $IT_L$, as indicated in FIGS. 5HH-5II), moving the content by a second amount that is different from the first amount (e.g. movement of content 592 from a position at lift-off as shown in FIG. 5JJ to a moved position as shown in FIG. 5KK). The amount of movement of content 592 as shown in FIGS. 5FF-5GG is less than the amount of movement of content 592 as shown in FIGS. 5JJ-5KK.

In some embodiments, the first intensity is greater than the second intensity and the first amount of movement is greater than the second amount of movement (916). For example, the first intensity has a characteristic intensity of the contact above a light press intensity threshold $IT_L$ (e.g., as indicated in FIGS. 5HH-5II), the second intensity characteristic intensity of the contact above hint intensity threshold $IT_H$ and below light press intensity threshold $IT_L$ (e.g., as indicated in FIGS. 5DD-5EE), and the first amount of movement of content 592 (e.g., as indicated in FIGS. 5JJ-5KK) is greater than the second amount of movement of content 593 (e.g., as indicated in FIGS. 5FF-5GG).

In some embodiments, the first intensity is less than the second intensity and the first amount of movement is greater than the second amount of movement (918).

In some embodiments, moving the content 592 on the display by an amount that is determined based on the characteristic intensity of the first contact and the characteristic speed of the first movement detected prior to the lift-off of the first contact includes (920) setting a simulated friction based on the characteristic intensity of the first contact (e.g., decreasing the simulated friction for larger characteristic intensity values). For example, in accordance with a contact that has a characteristic intensity above light press intensity threshold $IT_L$ prior to lift-off (e.g., as indicated in FIGS. 5HH-5II), a first simulated friction effect is set, causing a reduction in the velocity of the movement of content 592 from velocity v3 (as indicated in FIG. 5JJ) to velocity v1 (as indicated in FIG. 5KK). In accordance with a contact that has a characteristic intensity above hint intensity threshold $IT_H$ and below light press intensity threshold $IT_L$ (e.g., as indicated in FIGS. 5DD-5EE), a second simulated friction effect is set, causing a reduction in the velocity of the movement of content 592 from velocity v1 (as indicated in FIG. 5FF) to velocity v2 (as indicated in FIG. 5GG). In some embodiments, the first simulated friction set when the larger characteristic intensity value of FIG. 5HH-5II is detected is decreased in comparison with the second simulated friction set when the smaller characteristic intensity value of 5DD-5EE is detected.

In some embodiments, moving the content 592 on the display by an amount that is determined based on the characteristic intensity of the first contact and the characteristic speed of the first movement detected prior to the lift-off of the first contact includes (922) setting a simulated inertia based on the characteristic intensity of the first contact (e.g., decreasing the simulated inertia for larger characteristic intensity values).

In some embodiments, moving the content on the display by an amount that is determined based on the characteristic intensity of the first contact and the characteristic speed of the first movement detected prior to the lift-off of the first contact includes (924) setting an initial speed of movement for moving the content based on the characteristic intensity of the first contact (e.g., increasing the initial speed for larger characteristic intensity values). For example, in accordance with a contact that has a characteristic intensity above light press intensity threshold $IT_L$ prior to lift-off (e.g., as indicated in FIGS. 5HH-5II), an initial speed is v3 (as indicated in FIG. 5JJ). In accordance with a contact that has a characteristic intensity above hint intensity threshold $IT_H$ and below light press intensity threshold $IT_L$ prior to lift-off (e.g., as indicated in FIGS. 5DD-5EE), an initial speed is v1 (as indicated in FIG. 5FF). In some embodiments, in accordance with the larger characteristic intensity value of FIGS. 5HH-5II compared with the characteristic intensity value of FIGS. 5DD-5EE, v3 is greater than v1.

In some embodiments, moving the content 592 on the display by an amount that is determined based on the characteristic intensity of the first contact and the characteristic speed of the first movement detected prior to the lift-off of the first contact includes (926): determining an initial speed (e.g., v1, v3, or v5 as indicated in FIGS. 5FF, 5JJ, and 5NN, respectively) for continued scrolling after the lift-off of the first contact based on the characteristic intensity of the first contact (e.g., as indicated by intensity meter 530) and the characteristic speed of the first movement detected prior to the lift-off of the first contact and continuing the scrolling of the content 592 after the lift-off of the first contact with the initial speed determined based on the characteristic intensity of the first contact and the characteristic speed of the first movement detected prior to the lift-off of the first contact. In some embodiments, the characteristic intensity and the characteristic speed are intensity and speed detected a predefined time period before the lift-off In some embodiments, the characteristic intensity is determined based on a filtered intensity profile (e.g., 5SS) and/or the characteristic speed is determined based on a filtered speed profile (e.g., 5TT). For example, the characteristic values are values on the profiles 5116 and/or 5120 at $t_{lift-off}$.

In some embodiments, in response to detecting the increase in intensity of the first contact on the touch-sensitive surface, the device dynamically applies (928) a visual effect on the first portion of content 592 on the display in accordance with a current intensity of the first contact on the touch-sensitive surface. For example, dynamically applying the visual effect includes dynamically resizing (e.g., shrinking) the content or changing a z-height (e.g., pushing the content away from the screen) of the content on the display in accordance the current intensity of the first contact. In some embodiments, the visual effect is applied only temporarily when the scroll speed is below a threshold speed (e.g., before the scrolling is started and when the scrolling is just started), and the visual effect is removed when the scrolling speed reaches the threshold speed.

In some embodiments, the device presents (930) a scroll bar on the display, wherein the scroll bar includes a scroll position indicator 596 that indicates a respective position of a currently displayed portion of the content 592 in the content 592; and the device presents (932) a scroll enhancement indicator 5104 concurrently with the scroll position indicator 596, wherein an appearance of the scroll enhancement indicator 5104 varies dynamically with a current intensity of the first contact on the touch-sensitive surface (e.g., scroll enhancement indicator 5104 is shown with a first length in FIG. 5HH, when a characteristic intensity of the contact is at above light press intensity threshold $IT_L$, and scroll enhancement indicator 5104 is shown with a second length, greater than the first length in FIG. 5LL, when a characteristic intensity of the contact is further above light press intensity threshold $IT_L$). For example, the scroll enhancement indicator is a shadow displayed on a side of the scroll position indicator that is opposite to the scrolling direction, and a length of the shadow dynamically changes in accordance with the intensity of the first contact, e.g., higher intensity leads to a longer shadow. In some embodiments, the length of the shadow also indirectly indicates the amount of deviation (e.g., how much greater an initial scrolling speed after lift-off of contact) as compared to the case in a regular scroll action. In some embodiments, the scroll bar is displayed with a normal touch intensity, and anything beyond the normal touch intensity causes the scroll enhancement indicator to appear as well.

In some embodiments, while moving the content 592 on the display by the amount that is determined based on the characteristic intensity of the first contact and the characteristic speed of the first movement detected prior to the lift-off of the first contact, the device dynamically changes (934) the appearance of the scroll enhancement indicator 596 in accordance with a current scrolling speed. For example, scroll enhancement indicator 5104 is shown with a first length in FIG. 5NN, when a scrolling speed is v5, and scroll enhancement indicator 5104 is shown with a second length (shorter than the first length) in FIG. 5OO, when a scrolling speed is v6 (v6 is slower than v5, as indicated by the length of arrow 5110 associated with v6 and with v5). For example, the length of the shadow also indirectly indicates the amount of deviation (e.g., how much greater the current scrolling speed is as compared to the case in a regular scroll action).

In some embodiments, the moving the content 592 on the display by an amount that is determined based on a characteristic intensity of the first contact and a characteristic speed of the first movement detected prior to the lift-off of the first contact includes (936): applying an intensity filter to an intensity profile (e.g., 5114 of FIG. 5SS) of the first contact, wherein the intensity filter shifts the intensity profile (e.g., as shown at 5116 of FIG. 5SS) by a first time shift past the lift-off of the first contact (e.g., the intensity filter is a function that skews and shifts the intensity profile to the right on a time-intensity profile) and determining an initial speed (e.g., e.g., v1, v3, or v5 as indicated in FIGS. 5FF, 5JJ, and 5NN, respectively) for moving the content on the display after the lift-off of the first contact based on a selected intensity value on the filtered intensity profile 5116. For example, the selected intensity value is the intensity value at the time of lift-off on the shifted intensity profile (e.g., $I_C$ on 5116 of FIG. 5SS).

In some embodiments, moving the content on the display by an amount that is determined based on a characteristic intensity of the first contact and a characteristic speed of the first movement detected prior to the lift-off of the first contact includes (938): applying a speed filter to a speed profile (e.g., 5118 of FIG. 5TT) of the first contact, wherein the speed filter shifts the speed profile (e.g., as shown at 5120 of FIG. 5TT) by a second time shift past the lift-off of the first contact; determining an initial speed (e.g., v1, v3, or v5 as indicated in FIGS. 5FF, 5JJ, and 5NN, respectively) for moving the content on the display after the lift-off of the first contact based on a selected speed value on the shifted speed profile 5120; and moving the content on the display with the determined initial speed after the lift-off of the first contact. For example, the selected speed value is the speed value at the time of lift-off on the shifted speed profile (e.g., $V_C$ on 5120 of FIG. 5TT). In some embodiments, the selected speed value is greater than the maximum speed of the first contact during the first movement.

In some embodiments, prior to detecting the first movement of the first contact, the device detects (940) an earlier increase in intensity of the first contact while the first contact remains stationary on the touch-sensitive surface. In an example scenario, the device detects the first contact, and then detects an increase in intensity of the first contact while the first contact is stationary on the touch sensitive surface. In this example scenario, even if the device subsequently detects a movement of the first contact (e.g., the first movement of the first contact), as long as the earlier increase in intensity was not detected during the movement, the scrolling is performed in accordance with the first movement, without consideration of the earlier increase in intensity of the first contact while the first contact was stationary. When another increase in intensity is detected while the first contact is moving, then the increase in intensity detected during the movement of the first contact is taken into consideration for the inertia scrolling performed after the lift-off of the first contact, e.g., through the use of the characteristic intensity and characteristic speed of the first contact that were detected during the first movement.

In some embodiments, detecting the earlier increase in intensity of the first contact includes (942) detecting the earlier increase in intensity of the first contact above a first intensity threshold (e.g., a preview intensity threshold, such as hint intensity threshold $IT_H$) while a focus selector 594 is located on a first user interface element on the display, and the device performs a predefined operation associated with the first user interface element (e.g., presents a preview or a quick action menu associated with the first user interface element) in response to detecting the earlier increase in intensity of the first contact above the first intensity threshold (e.g., a preview intensity threshold) while the focus selector is located on the first user interface element on the display. In an example scenario, the device detects the first contact, and then detects an increase in intensity of the first contact above a first intensity threshold (e.g., a hint intensity threshold $IT_H$ or a preview intensity threshold) while the first contact is stationary on the touch sensitive surface 112 (and correspondingly, and while a focus selector 594 is located on a first user interface element (e.g., a user interface element that is configured to respond to different changes in contact intensity with different user interface responses (e.g., a web link or a representation of a contact, or an application icon) on the display), the device performs a predefined operation associated with the user interface element (e.g., presenting a preview of the webpage referred to in the web link, presenting a quick action menu associated with the contact, or presenting a quick action menu associated with the application icon). After the intensity of the first contact has decreased sufficiently (e.g., decreased below the hint intensity threshold or preview intensity threshold) and before the first contact starts to move, the preview or quick action menus are optionally removed and the user interface is restored to the same state as it was before the increase in contact intensity of the first contact was detected. At this point, the device will resume normal scrolling behavior in accordance with subsequent movement of the first contact (e.g., the first movement of the first contact) without consideration of the earlier increase in intensity of the first contact) detected while the first contact was stationary. When another increase in intensity is detected while the first contact is moving, then the increase in intensity detected during the movement of the first contact is taken into consideration of the inertia scrolling performed after the lift-off of the first contact, e.g., through the use of the characteristic intensity and characteristic speed of the first contact that were detected during the first movement.

It should be understood that the particular order in which the operations in FIGS. 9A-9D have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, and 1000) are also applicable in an analogous manner to method 900 described above with respect to FIGS. 9A-9D. For example, the contacts, gestures, user interface objects, tactile outputs, intensity thresholds, focus selectors, and animations described above with reference to method 900 optionally have one or more of the characteristics of the contacts, gestures, user interface objects, tactile outputs, intensity thresholds, focus selectors, and animations described herein with reference to other methods described herein (e.g., methods 600, 700, 800, and 1000). For brevity, these details are not repeated here.

FIGS. 10A-10C are flow diagrams illustrating a method 1000 of moving content on a display in accordance with some embodiments. The method 1000 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

As described below, the method 1000 provides an intuitive way to move content on a display. The method reduces the number, extent, and/or nature of the inputs from a user when moving content on a display, thereby creating a more efficient human-machine interface. For battery-operated electronic devices, enabling a user to move content on a display faster and more efficiently conserves power and increases the time between battery charges.

The device presents (1002) a first portion of content 592 (e.g., "The Raven" by Edgar Allan Poe) on a display (e.g., touch screen 112).

While presenting the first portion of the content, the device (1004): detects a first contact (e.g., a contact at a location indicated by focus selector 594) on the touch-sensitive surface (e.g., touch screen 112); and detects a first movement of the first contact on the touch-sensitive surface (e.g., a movement of focus selector 594, such as a movement along a path indicated by arrow 5112 of FIGS. 5PP-5QQ).

The device detects (1006) a lift-off of the first contact following the first movement of the first contact on the touch-sensitive surface. For example, after the movement of the contact indicated by FIGS. 5PP-5QQ, lift-off of the contact occurs as indicated in 5RR.

In response to detecting the lift-off of the first contact following the first movement of the first contact on the touch-sensitive surface (1008): in accordance with a determination that the first contact had a characteristic intensity above a respective intensity threshold (e.g., a characteristic intensity above deep press intensity threshold $IT_D$, or another statically or dynamically determined threshold) prior to the lift-off of the first contact, the device scrolls through the content to a predefined portion of the content (e.g., a beginning or an end of the content, or a next section or previous section of the content, depending on the direction of first movement). For example, as indicated in FIGS. 5PP-5QQ, a characteristic intensity of the contact increased above deep press intensity threshold $IT_D$, as indicated by intensity meter 530. Accordingly, in FIG. 5RR, in response to detection of lift-off of the contact, content 592 is scrolled to the end of the content (e.g., as indicated by scroll position indicator 596). In accordance with a determination that the first contact had a characteristic intensity below the respective intensity threshold prior to the lift-off of the first contact (e.g., an intensity of the first contact remains below the respective intensity threshold for an entire duration of the first contact), the device scrolls through the content by an amount that is determined based on a characteristic speed of the first contact during the first movement (e.g., scrolling by an amount that is determined based on an initial speed of the content on lift-off of the first contact and simulated inertia and friction). For example, as shown in FIGS. 5LL-5MM, a characteristic intensity of the contact does not increase above a deep press intensity threshold $IT_D$, as indicated by intensity meter 530. At FIGS. 5NN-5OO, in response to detection of lift-off of the contact, content 592 is scrolled (e.g., by an amount that is determined based on a characteristic speed of the contact during the movement along the path indicated by arrow 5108 in FIGS. 5LL-5MM). In some embodiments, the initial speed of the content is optionally determined based on a speed of the contact at a predetermined time relative to the lift-off time of the contact.

In some embodiments, scrolling through the content to a predefined portion of the content includes (1010) accelerating scrolling of the content to display an end portion of the content on the display. In some embodiments, the accelerated scrolling to display the end portion of the content is independent of a movement speed of the first movement and/or the length of content that needs to be scrolled to reach the end portion.

In some embodiments, the first movement corresponds (1012) to movement toward a top portion of the display (e.g., as shown in FIG. 5QQ, the contact moves upward along a path indicated by arrow 5112 toward a top portion of display 112).

In some embodiments, scrolling through the content to a predefined portion of the content includes (1014) accelerating scrolling of the content to display a beginning portion of the content on the display. In some embodiments, the accelerated scrolling to display the beginning portion of the content is independent of a movement speed of the first movement and/or the length of content that needs to be scrolled to reach the beginning portion.

In some embodiments, the first movement corresponds (1016) to movement toward a bottom portion of the display.

In some embodiments, scrolling through the content by an amount that is determined based on a characteristic speed of the first contact during the first movement includes (1018): scrolling through the content 592 by a first amount before the lift-off of the first contact (e.g., scrolling from a first position in content 592, as shown in FIG. 5PP, to a second position in content 592, as shown in FIG. 5QQ); and continuing to scroll through the content by a second amount after the lift-off of the first contact (e.g., scrolling from the second position in content 592, as shown in FIG. 5QQ, to a third position in content 592, as shown in FIG. 5RR), wherein the scrolling of the content after the lift-off of the first contact is continued at an initial speed that is determined based on the characteristic speed of the first contact during the first movement. For example, during the regular scrolling, how much scrolling actually happens depends on factors such as the amount of content that can be scrolled, and the movement speed of the first contact, and does not deterministically scroll to the end or the beginning of the content.

In some embodiments, the device detects (1020) the increase in intensity of the first contact on the touch-sensitive surface above the respective intensity threshold during the first movement of the first contact on the touch-sensitive surface (e.g., the device detects the increase in intensity above deep press intensity threshold $IT_D$, as indicated at intensity meter 530 in FIGS. 5PP-5QQ); and in response to detecting the increase in intensity above the respective intensity threshold, the device applies a visual effect on the first portion of content on the display. In some embodiments, the visual effect is an enlargement of the content, or a change in z-height of the content relative to the display plane.

In some embodiments, the device removes (1022) the applied visual effect on the first portion of content on the display during the scrolling through the content to the predefined portion of the content (e.g., during the accelerated scrolling of the content on the display). For example, the visual effect is applied when the intensity is above the first intensity threshold, and during the period of time that the scrolling speed is accelerated to a steady state accelerated scrolling speed, and once the scrolling speed has reached the steady state accelerated scrolling speed, the previously applied visual effect is removed.

In some embodiments, the device applies (1024) an intensity filter to an intensity profile (e.g., 5114 of FIG. 5SS) of the first contact, wherein the intensity filter shifts the intensity profile (e.g., as shown at 5116 of FIG. 5SS) by a first time shift past the lift-off of the first contact; and the device determines a steady state speed for the scrolling through the content to the predefined portion of the content based on a selected intensity value on the shifted intensity profile 5116. For example, the selected intensity value is the intensity value at the time of lift-off on the shifted intensity profile (e.g., $I_C$ on 5116 of FIG. 5SS).

In some embodiments, the device scrolls (1026) through the content by an amount that is determined based on a characteristic speed of the first contact during the first movement includes scrolling through the content to display a second portion of the content, and the method includes: while displaying the second portion of the content, detecting a predefined input (e.g., a tap input on the touch-sensitive surface) while a focus selector is within a predefined region (e.g., a predefined top or bottom region of the user interface that is displaying the second portion of the content) on the display; and in response to detecting the predefined input while the focus selector is within the predefined region on the display, scrolling through the content to the predefined portion of the content (e.g., a beginning or an end of the content or a next section or previous section of the content depending on whether the predefined region invoked by the predefined input (e.g., a tap input) is at the top or the bottom of the user interface displaying the second portion of the content). In other words, in some embodiments, the user can quickly scroll to the predefined portion of the content either by a forced press and flick gesture anywhere in the displayed content, or by a tap gesture within the predefined region in the user interface, regardless of how long the content is, and where the displayed portion of the content is within the content.

In some embodiments, prior to detecting the first movement of the first contact, the device detects (1028) an earlier increase in intensity of the first contact above the respective intensity threshold while the first contact remains stationary on the touch-sensitive surface; and the device determines that the first contact had a characteristic intensity below the respective intensity threshold prior to the lift-off of the first contact in accordance with a determination that the intensity of the first contact remained below the respective intensity threshold during the first movement of the first contact on the touch-sensitive surface. In an example scenario, the device detects the first contact, and before detecting the first movement of the first contact, the device detects an increase in intensity of the first contact above the first intensity threshold while the first contact is stationary on the touch sensitive surface. This earlier increase in intensity of the first contact does not affect the user interface responses that occur during or after subsequent movement of the first contact (e.g., the first movement) if the contact intensity had dropped below the first intensity threshold before the start of the movement. In other words, when the device detects a movement of the first contact (e.g., the first movement of the first contact), as long as any increase in intensity above the first intensity threshold was not detected during the movement, the scrolling is performed without consideration of any earlier increase(s) in intensity of the first contact while the first contact was stationary. When an increase in intensity above the first threshold is detected while the first contact is moving, then the device scrolls the content to the predefined portion (e.g., an end or beginning portion).

In some embodiments, detecting the earlier increase in intensity of the first contact includes (1030) detecting the earlier increase in intensity of the first contact above a first intensity threshold (e.g., a preview intensity threshold) while a focus selector is located on a first user interface element on the display, and the device performs a predefined operation associated with the first user interface element (e.g., presenting a preview or a quick action menu associated with the first user interface element) in response to detecting the earlier increase in intensity of the first contact above the first intensity threshold (e.g., a preview intensity threshold) while the focus selector is located on a first user interface element on the display. In an example scenario, the device detects the first contact, and then detects an increase in intensity of the first contact above a first intensity threshold (e.g., a hint intensity threshold or a preview intensity threshold) while the first contact is stationary on the touch sensitive surface (and correspondingly, and while a focus selector is located on a first user interface element (e.g., a user interface element that is configured to respond to different changes in contact intensity with different user interface responses (e.g., a web link or a representation of a contact, or an application icon) on the display). In response to this increase in intensity of the first contact above the first intensity threshold, the device performs a predefined operation associated with the user interface element (e.g., presenting a preview of the webpage referred to in the web link, presenting a quick action menu associated with the contact, or presenting a quick action menu associated with the application icon). Then, after the intensity of the first contact has decreased to below the first intensity threshold (e.g., decreased below the hint intensity threshold or preview intensity threshold) and before the first contact starts to move, the preview or quick action menus are optionally removed and the user interface is restored to the same state as it was before the increase in contact intensity of the first contact was detected. At this point, the device resumes its scrolling behavior in accordance with subsequent movement of the first contact (e.g., the first movement of the first contact) without consideration of the earlier increase in intensity of the first contact detected while the first contact was stationary. When an increase in intensity above the first threshold is detected while the first contact is moving, then the device scrolls the content to the predefined portion (e.g., an end or beginning portion).

It should be understood that the particular order in which the operations in FIGS. 10A-10C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 600, 700, 800, and 900) are also applicable in an analogous manner to method 1000 described above with respect to FIGS. 10A-10C. For example, the contacts, gestures, user interface objects, tactile outputs, intensity thresholds, focus selectors, animations described above with reference to method 1000 optionally have one or more of the characteristics of the contacts, gestures, user interface objects, tactile outputs, intensity thresholds, focus selectors, animations described herein with reference to other methods described herein (e.g., methods 600, 700, 800, and 900). For brevity, these details are not repeated here.

Figure 11:
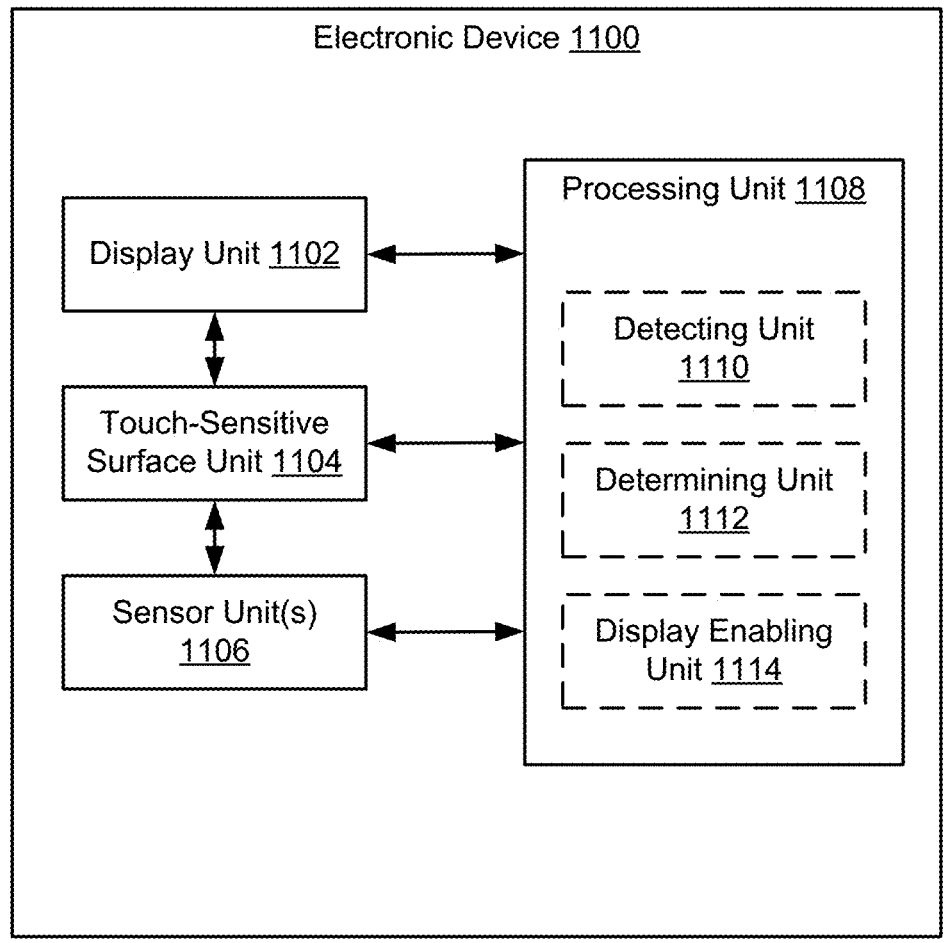
FIGS. 11-15 are functional block diagrams of an electronic device in accordance with some embodiments.

In accordance with some embodiments, FIG. 11 shows a functional block diagram of an electronic device 1100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 11 are, optionally, combined or separated into sub-blocks to implement the principles of the various described embodiments. Therefore, the description herein optionally supports any possible combination or separation or further definition of the functional blocks described herein.

As shown in FIG. 11, an electronic device includes a display unit 1102 configured to display content items; a touch-sensitive surface unit 1104 configured to receive user inputs; one or more sensor units 1106 configured to detect intensity of contacts with the touch-sensitive surface unit 1104; and a processing unit 1108 coupled to the display unit 1102, the touch-sensitive surface unit 1104 and the one or more sensor units 1106. In some embodiments, the processing unit 1108 includes a detecting unit 1110, a determining unit 1112, and a display enabling unit 1114. In some embodiments, the processing unit 1108 is configured to: enable display, on the display unit 1102, of content of a first content item, wherein the first content item is one of a sequence of content items (e.g., with display enabling unit 1114); detect a user input that includes movement of a contact in a respective direction on the touch-sensitive surface unit 1104 (e.g., with detecting unit 1110); in response to detecting the user input: in accordance with a determination that the user input meets item-switching criteria (e.g., with the determining unit 1112), enable the display unit 1102 to replace display of the first content item with display of a second content item in the sequence of content items (e.g., with the display enabling unit 1114), wherein the item-switching criteria include a criterion that is met when a characteristic intensity of the contact is above a first intensity threshold; and, in accordance with a determination that the user input does not meet the item-switching criteria (e.g., with the determining unit 1112), enable the display unit 1102 to navigate through the content of the first content item in accordance with the movement of the contact (e.g., with the display enabling unit 1114).

In some embodiments, the item-switching criteria includes a criterion that is met when the characteristic intensity of the contact exceeds the first intensity threshold after detecting at least a predetermined threshold amount of movement of the contact (e.g., with the detecting unit 1110).

In some embodiments, the processing unit 1108 is configured to: while enabling display of the first content item (e.g., with the display enabling unit 1114), detect a second user input at a location that corresponds to a selectable affordance (e.g., with the detecting unit 1110), wherein the second user input includes a second contact that is stationary on the touch-sensitive surface unit 1104; in response to detecting the second user input: in accordance with a determination that the user input occurs while a focus selector is at a location that corresponds to a selectable affordance and the movement of the contact is less than a predetermined amount (e.g., with the determining unit 1112), enable display of a preview area of content that corresponds to the selectable affordance overlaid on the first content item (e.g., with a display enabling unit 1114).

In some embodiments, the second content item is sequentially adjacent to the first content item and is selected based on the respective direction of the movement of the contact.

In some embodiments, navigating through the content of the first content item includes: in accordance with a determination that the respective direction is a first direction on the touch-sensitive surface unit 1104 (e.g., with the determining unit 1112), scrolling the content in a first direction on the display unit 1102 (e.g., with the display enabling unit 1114); and in accordance with a determination that the respective direction is a second direction on the touch-sensitive surface unit 1104 (e.g., with the determining unit 1112), scrolling the content in a second direction on the display unit 1102 that is different from the first direction on the display unit 1102 (e.g., with the display enabling unit 1114).

In some embodiments, navigating through the content of the first content item in accordance with the movement of the contact includes: maintaining display of a first portion of the first content item in a first user interface region on the display unit 1102; and navigating through a second portion of the first content item in a second user interface region on the display unit 1102 (e.g., with the display enabling unit 1114).

In some embodiments, replacing display of the first content item with the second content item includes displaying a transition between the first content item and the second content item (e.g., with the display enabling unit 1114); and the transition includes reducing a size of the first content item.

In some embodiments, replacing display of the first content item with the second content item includes displaying a transition between the first content item and the second content item (e.g., with the display enabling unit 1114); and the transition includes increasing a size of the second content item.

In some embodiments, the sequence of content items corresponds to a plurality of electronic messages in an electronic messaging application, a plurality of web browser windows in a web browser, a plurality of applications, a plurality of digital images in a set of images, or a plurality of sets of digital images.

In some embodiments, the processing unit 1108 is configured to: in accordance with a determination that the user input begins at a first edge of the touch-sensitive surface unit 1104 (e.g., with the determining unit 1112), perform an operation that is distinct from both replacing display of the first content item with the second content item and navigating through the content of the first content item (e.g., with the display enabling unit 1114).

In some embodiments, the processing unit 1108 is configured to: after replacing display of the first content item with the second content item in the sequence of content items, detect a second user input that includes movement of a second contact on the touch-sensitive surface unit 1104 (e.g., with the detecting unit 1110); enable the display unit 1102 to, in response to detecting the second user input: in accordance with a determination that the second user input meets the item-switching criteria, replace display of the second content item with a third content item in the sequence of content items (e.g., with the display enabling unit 1114); and in accordance with a determination that the second user input does not meet the item-switching criteria, navigate through content of the second content item in accordance with the movement of the second contact (e.g., with the display enabling unit 1114).

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6B are, optionally, implemented by components depicted in FIGS. 1A-1B or FIG. 11. For example, detection operation 606, and replace and navigation operations of operation 608 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 12:
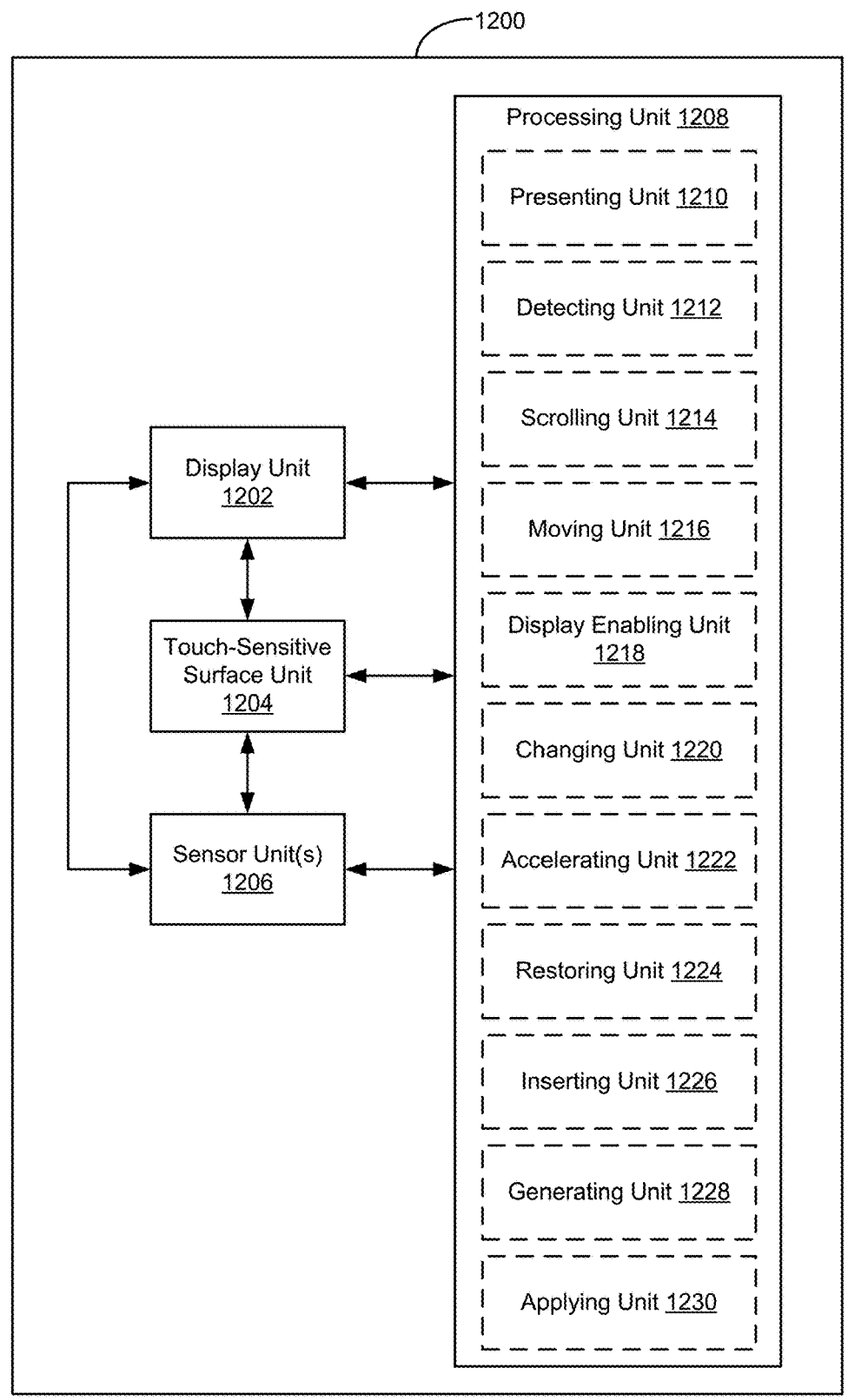

In accordance with some embodiments, FIG. 12 shows a functional block diagram of an electronic device 700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 12 are, optionally, combined or separated into sub-blocks to implement the principles of the various described embodiments. Therefore, the description herein optionally supports any possible combination or separation or further definition of the functional blocks described herein.

As shown in FIG. 12, an electronic device 1200 includes a display unit 1202 configured to display a user interface, a touch-sensitive surface unit 1204 configured to receive contacts, one or more sensor units 1206 configured to detect intensity of contacts with the touch-sensitive surface unit 1204; and a processing unit 1208 coupled with the display unit 1202, the touch-sensitive surface unit 1204 and the one or more sensor units 1206. In some embodiments, the processing unit 1208 includes: a presenting unit 1210, a detecting unit 1212, a scrolling unit 1214, a moving unit 1216, a display enabling unit 1218, a changing unit 1220, an accelerating unit 1222, a restoring unit 1224, an inserting unit 1226, a generating unit 1228, and an applying unit 1230.

The processing unit 1208 is configured to: present (e.g., with the presenting unit 1210) a first portion of a list of items on the display unit; detect (e.g., with the detecting unit 1212) a contact on the touch-sensitive surface unit while the first portion of the list of items is presented on the display unit; detect (e.g., with the detecting unit 1212) a first movement of the contact on the touch-sensitive surface unit while a characteristic intensity of the contact remains below a first intensity threshold; in response to detecting the first movement of the contact on the touch-sensitive surface unit while the characteristic intensity of the contact remains below the first intensity threshold, scroll (e.g., with the scrolling unit 1214) the list of items to present a second portion of the list of items on the display unit in accordance with the first movement of the contact on the touch-sensitive surface unit; while a focus selector associated with the contact is located on a first item in the second portion of the list of items presented on the display unit, detect (e.g., with the detecting unit 1212) an increase in the characteristic intensity of the contact above the first intensity threshold followed by a second movement of the contact on the touch-sensitive surface unit; and, in response to detecting the increase in the characteristic intensity of the contact above the first intensity threshold followed by the second movement of the contact on the touch-sensitive surface unit, move (e.g., with the moving unit 1216) the first item relative to other items in the second portion of the list of items presented on the display unit in accordance with the second movement of the contact.

In some embodiments, the processing unit is configured to: in response to detecting the increase in the characteristic intensity of the contact above the first intensity threshold followed by the second movement of the contact on the touch-sensitive surface unit, while the focus selector associated with the contact is located on the first item in the second portion of the list of items, change (e.g., with the changing unit 1220) an appearance of the first item.

In some embodiments, changing the appearance of the first item includes dynamically changing a size of the first item in accordance with the characteristic intensity of the contact.

In some embodiments, the processing unit is configured to: in accordance with the second movement of the contact on the touch-sensitive surface unit, move (e.g., with the moving unit 1216) the first item by a first distance relative to a second item that is adjacent to the first item to at least partially reveal a first item slot associated with the first item on the display unit.

In some embodiments, moving the first item by the first distance relative to the second item that is adjacent to the first item includes: during an initial portion of the second movement of the contact, move (e.g., with the moving unit 1216) the first item at a slower speed than the focus selector to create a distance lag between the first item and the focus selector; and during a subsequent portion of the second movement of the contact following the initial portion of the second movement of the contact, accelerate (e.g., with the accelerating unit 1222) the movement of the first item to eliminate the distance lag between the first item and the focus selector.

In some embodiments, the processing unit is configured to: detect (e.g., with the detecting unit 1212) a lift-off of the contact upon moving the first item by the first distance relative to the second item that is adjacent to the first item; and, in accordance with a determination that the first distance is smaller than a first threshold distance, restore (e.g., with the restoring unit 1224) the first item into the first item slot associated with the first item on the display unit.

In some embodiments, the processing unit is configured to: in accordance with a determination that the first distance is greater than a first threshold distance, move (e.g., with the moving unit 1216) the second item into the first item slot associated with the first item to reveal a second item slot associated with the second item.

In some embodiments, the processing unit is configured to: detect (e.g., with the detecting unit 1212) a lift-off of the contact while the second item slot associated with the second item is revealed on the display unit; and in response to detecting the lift-off of the contact while the second item slot associated with the second item is revealed on the display unit, insert (e.g., with the inserting unit 1226) the first item into the second item slot.

In some embodiments, the processing unit is configured to: during the second movement of the contact, for a plurality of other items besides the first item in the list of items, move (e.g., with the moving unit 1216) a respective other item to a respective new item slot and revealing a respective previous item slot for the respective other item on the display unit.

In some embodiments, the processing unit is configured to: generate (e.g., with the generating unit 1228) a respective tactile output as the respective other item moves to the respective new item slot and reveals the respective previous item slot.

In some embodiments, a respective movement of the respective other item changes in accordance with the characteristic intensity of the contact during the second movement of the contact.

In some embodiments, the processing unit is configured to: detect (e.g., with the detecting unit 1212) that the first item has moved within a second threshold distance of a first end of the displayed second portion of the list of items in accordance with the second movement of the contact; and, in response to detecting that the first item has moved within the second threshold distance of the first end of the displayed second portion of the list of items, scroll (e.g., with the scrolling unit 1214) the list of items toward a second end of the displayed second portion of the list of items opposite the first end to enable display (e.g., with the display enabling unit 1218) a third portion of the list of items.

In some embodiments, scrolling the list of items toward the second end of the displayed second portion of the list of items opposite the first end to enable display the third portion of the list of items includes: dynamically changing (e.g., with the changing unit 1220) a scrolling speed of the scrolling toward the second end of the displayed second portion of the list of items in accordance with the characteristic intensity of the contact.

In some embodiments, the processing unit is configured to: apply (e.g., with the applying unit 1230) a transparency effect to the first item while the first item overlaps with another item in the list of items.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 7A-7C are, optionally, implemented by components depicted in FIGS. 1A-1B or FIG. 12. For example, detection operations 704, 706, and 710; scrolling operation 708; and moving operation 712 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 13:
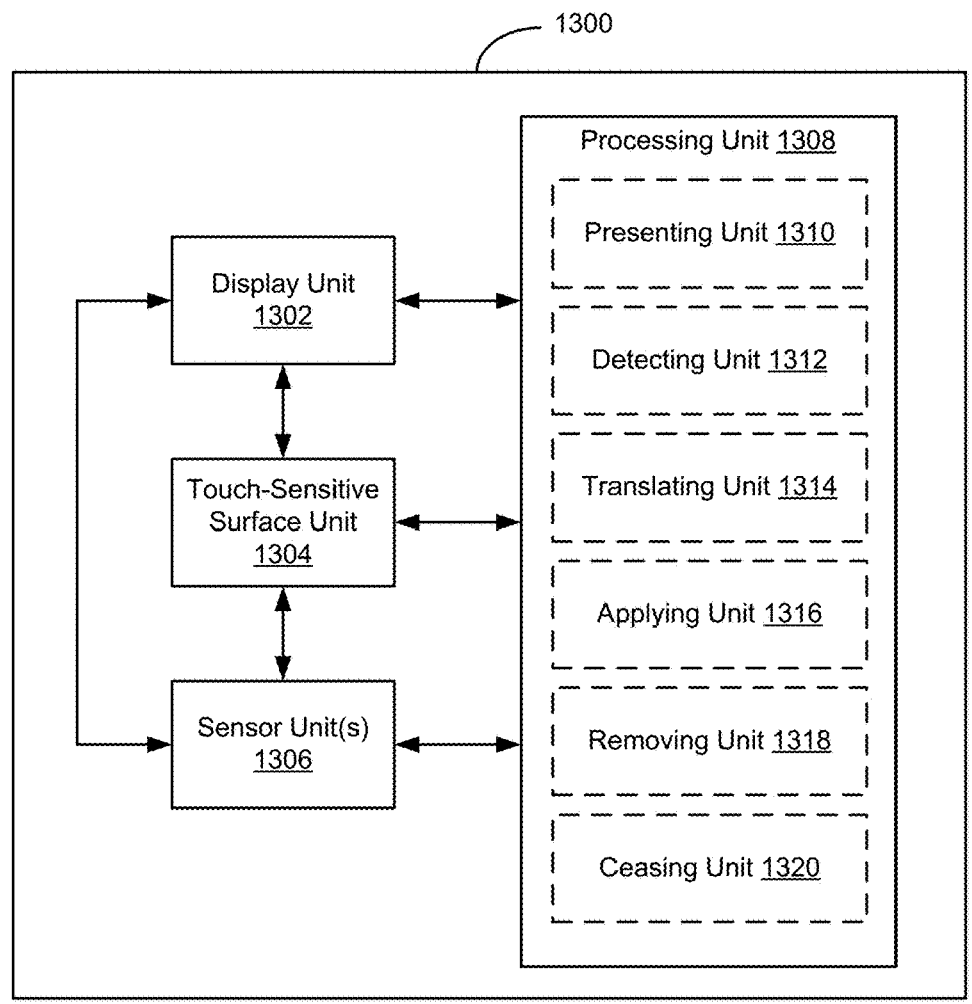

In accordance with some embodiments, FIG. 13 shows a functional block diagram of an electronic device 1300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a display unit 1302 configured to display a user interface, a touch-sensitive surface unit 1304 configured to receive contacts, one or more sensor units 1306 configured to detect intensity of contacts with the touch-sensitive surface unit 1304; and a processing unit 1308 coupled with the display unit 1302, the touch-sensitive surface unit 1304 and the one or more sensor units 1306. In some embodiments, the processing unit 1308 includes: a presenting unit 1310, a detecting unit 1312, a translating unit 1314, an applying unit 1316, a removing unit 1318, and a ceasing unit 1320.

The processing unit 1308 is configured to: present (e.g., with the presenting unit 1310) a first portion of structured content on the display unit, wherein the structured content includes a plurality of sections, and the first portion includes content from a first section of the plurality of sections; detect (e.g., with the detecting unit 1312) a first contact on the touch-sensitive surface unit while the first portion of the structured content is presented on the display unit; detect (e.g., with the detecting unit 1312) an increase in a characteristic intensity of the first contact on the touch-sensitive surface unit and detect (e.g., with the detecting unit 1312) a first movement of the first contact on the touch-sensitive surface unit; and, in response to detecting the increase in the characteristic intensity of the first contact and detecting the first movement of the first contact: in accordance with a determination that the characteristic intensity of the contact increases above a first intensity threshold, translate (e.g., with the translating unit 1314) the structured content to enable display of a start of a second section adjacent to the first section of the structured content at a predefined location on the display unit; and in accordance with a determination that the characteristic intensity of the contact does not increase above the first intensity threshold, translate (e.g., with the translating unit 1314) the structured content in accordance with a magnitude of the movement of the contact on the touch-sensitive surface unit.

In some embodiments, during the translating of the structured content to enable display of the start of the second section adjacent to the first section on the display unit, a focus selector associated with the first contact is on the structured content.

In some embodiments, in response to detecting the increase in the characteristic intensity of the first contact and the first movement of the first contact, the processing unit is configured to apply (e.g., with the applying unit 1316) a visual effect on the first portion of the structured content on the display unit.

In some embodiments, the processing unit is configured to: remove (e.g., with the removing unit 1318) the applied visual effect on the first portion of the structured content on the display unit during the translating of the structured content.

In some embodiments, the processing unit is configured to: prior to the determination that the characteristic intensity of the first contact has increased above the first intensity threshold: detect (e.g., with the detecting unit 1312) an initial increase in the characteristic intensity of the first contact; and, in response to detecting the initial increase in the characteristic intensity of the first contact, concurrently present (e.g., with the presenting unit 1310) a scroll bar with the first portion of the structured content on the display unit, wherein the scroll bar includes a scroll position indicator that indicates a respective position of the first portion of the structured content in the structured content; and, in response to the determination that the characteristic intensity of the first contact has increased above the first intensity threshold, present (e.g., with the presenting unit 1310) a plurality of section indicators along with the scroll position indicator, wherein a relative ordering of the section indicators to the scroll position indicator corresponds to relative positions of the sections to the first portion of the structured content in the structured content.

In some embodiments, presenting the plurality of section indicators with the scroll bar includes: presenting an animation that shows the plurality of section indicators emerging from the scroll position indicator and spreading out along the scroll bar.

In some embodiments, the processing unit is configured to: when translating of the structured content to enable display of the start of the second section adjacent to the first section of the structured content, present (e.g., with the presenting unit 1310) an animation that shows the scroll position indicator hopping over a respective section indicator in the plurality of section indicators.

In some embodiments, the processing unit is configured to: detect (e.g., with the detecting unit 1312) a lift-off of the first contact, and, in response to detecting the lift-off of the first contact, cease (e.g., with the ceasing unit 1320) to display the scroll bar, the scroll position indicator, and the plurality of section indicators.

In some embodiments, the processing unit is configured to: in response to detecting the lift-off of the first contact, present (e.g., with the presenting unit 1310) an animation that shows the plurality of section indicators moving into the scroll position indicator before ceasing the display of the scroll position indicator.

In some embodiments, the structured content is translated to enable display of the start of the second section adjacent to the first section of the structured content at the predefined location on the display unit in accordance with a determination that the first movement of the first contact exceeds a first threshold distance.

In some embodiments, the characteristic intensity of the first contact is below the first intensity threshold after the first movement of the first contact exceeds the first threshold distance.

In some embodiments, the sections in the structured content are mapped to a plurality of vertical positions on the display unit, and the first movement of the first contact from a first position of the plurality of positions to a second position of the plurality of positions results in a translation of the structured content from one section of the structured document that corresponds to the first position on the display unit to another section of the structured content that corresponds to the second position on the display unit.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8C are, optionally, implemented by components depicted in FIGS. 1A-1B or FIG. 13. For example, detection operations 804 and 806 and translation operations 808 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 14:
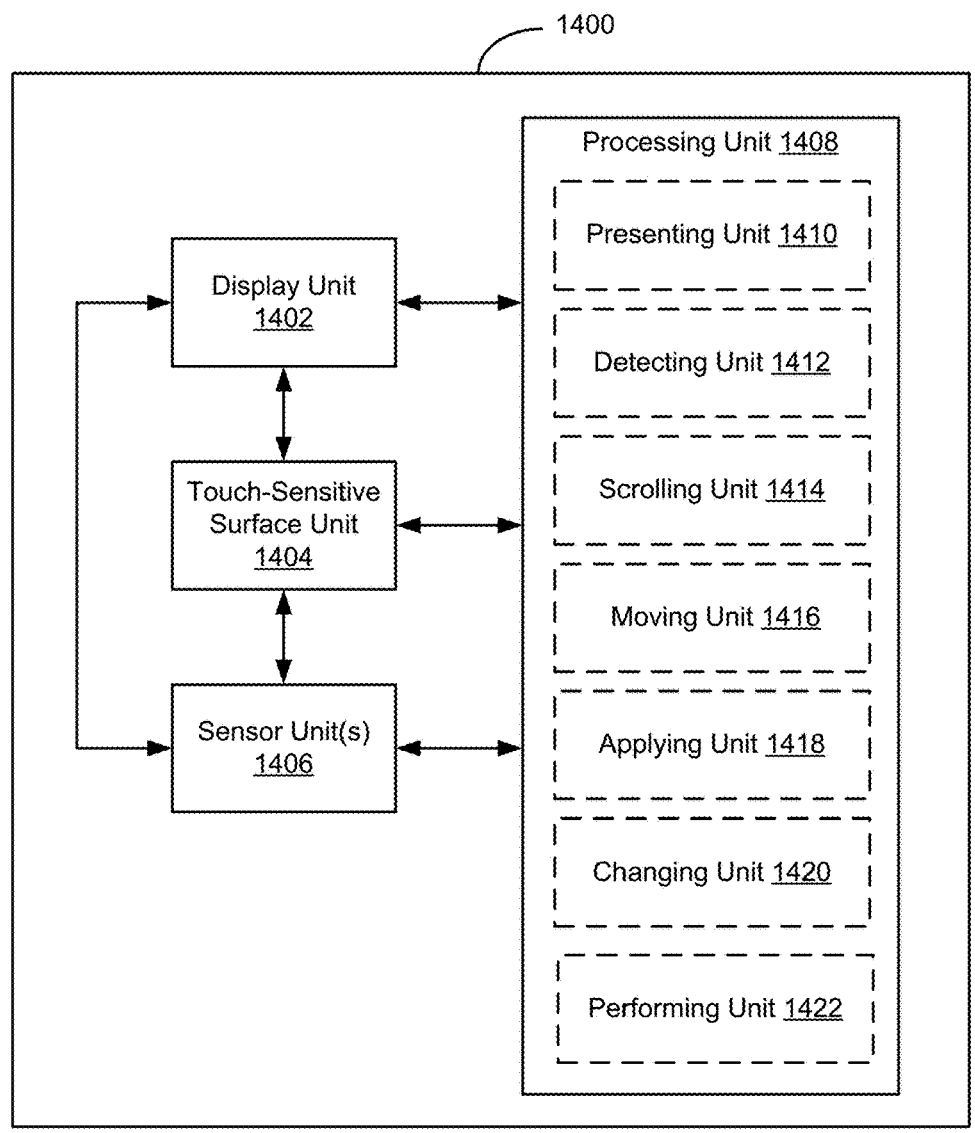

In accordance with some embodiments, FIG. 14 shows a functional block diagram of an electronic device 1400 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 14 are, optionally, combined or separated into sub-blocks to implement the principles of the various described embodiments. Therefore, the description herein optionally supports any possible combination or separation or further definition of the functional blocks described herein.

As shown in FIG. 14, an electronic device 1400 includes a display unit 1402 configured to display a user interface, a touch-sensitive surface unit 1404 configured to receive contacts, one or more sensor units 1406 configured to detect intensity of contacts with the touch-sensitive surface unit 1404; and a processing unit 1408 coupled with the display unit 1402, the touch-sensitive surface unit 1404 and the one or more sensor units 1406. In some embodiments, the processing unit 1408 includes: a presenting unit 1410, a detecting unit 1412, a scrolling unit 1414, a moving unit 1416, an applying unit 1418, a changing unit 1420, and a performing unit 1422.

The processing unit 1408 is configured to: present (e.g., with the presenting unit 1410) a first portion of content on the display unit; while presenting the first portion of the content on the display unit: detect (e.g., with the detecting unit 1412) a first contact on the touch-sensitive surface unit; and detect (e.g., with the detecting unit 1412) a first movement of the first contact on the touch-sensitive surface unit; in response to detecting the first movement of the first contact, scroll (e.g., with the scrolling unit 1414) the content to present a second portion of the content on the display unit in accordance with the first movement of the first contact; detect (e.g., with the detecting unit 1412) an increase in intensity of the first contact on the touch-sensitive surface unit during the first movement of the first contact on the touch-sensitive surface unit; after detecting the increase in intensity of the first contact on the touch-sensitive surface unit during the first movement of the first contact on the touch-sensitive surface unit, detect (e.g., with the detecting unit 1412) a lift-off of the first contact following the first movement of the first contact on the touch-sensitive surface unit; and, in response to detecting the lift-off of the first contact following the first movement of the first contact on the touch-sensitive surface unit, move (e.g., with the moving unit 1416) the content on the display unit by an amount that is determined based on a characteristic intensity of the first contact and a characteristic speed of the first movement detected prior to the lift-off of the first contact.

In some embodiments, the characteristic speed of the first movement is a first speed and moving the content on the display unit by an amount that is determined based on the characteristic intensity of the first contact and the characteristic speed of the first movement detected prior to the lift-off of the first contact includes: in accordance with a determination that the characteristic intensity is a first intensity, moving (e.g., with the moving unit 1416) the content by a first amount; and, in accordance with a determination that the characteristic intensity is a second intensity that is different from the first intensity, moving (e.g., with the moving unit 1416) the content by a second amount that is different from the first amount.

In some embodiments, the first intensity is greater than the second intensity and the first amount of movement is greater than the second amount of movement.

In some embodiments, the first intensity is less than the second intensity and the first amount of movement is greater than the second amount of movement.

In some embodiments, moving the content on the display unit by an amount that is determined based on the characteristic intensity of the first contact and the characteristic speed of the first movement detected prior to the lift-off of the first contact includes setting a simulated friction based on the characteristic intensity of the first contact.

In some embodiments, moving the content on the display unit by an amount that is determined based on the characteristic intensity of the first contact and the characteristic speed of the first movement detected prior to the lift-off of the first contact includes setting a simulated inertia based on the characteristic intensity of the first contact.

In some embodiments, moving the content on the display unit by an amount that is determined based on the characteristic intensity of the first contact and the characteristic speed of the first movement detected prior to the lift-off of the first contact includes setting an initial speed of movement for moving the content based on the characteristic intensity of the first contact.

In some embodiments, moving the content on the display unit by an amount that is determined based on the characteristic intensity of the first contact and the characteristic speed of the first movement detected prior to the lift-off of the first contact includes: determining an initial speed for continued scrolling after the lift-off of the first contact based on the characteristic intensity of the first contact and the characteristic speed of the first movement detected prior to the lift-off of the first contact; and continuing the scrolling of the content after the lift-off of the first contact with the initial speed determined based on the characteristic intensity of the first contact and the characteristic speed of the first movement detected prior to the lift-off of the first contact.

In some embodiments, the processing unit is configured to in response to detecting the increase in intensity of the first contact on the touch-sensitive surface unit, dynamically apply (e.g., with the applying unit 1418) a visual effect on the first portion of content on the display unit in accordance with a current intensity of the first contact on the touch-sensitive surface unit.

In some embodiments, the processing unit is configured to: present (e.g., with the presenting unit 1418) a scroll bar on the display unit, wherein the scroll bar includes a scroll position indicator that indicates a respective position of a currently displayed portion of the content in the content; and present (e.g., with the presenting unit 1418) a scroll enhancement indicator concurrently with the scroll position indicator, wherein an appearance of the scroll enhancement indicator varies dynamically with a current intensity of the first contact on the touch-sensitive surface unit.

In some embodiments, the processing unit is configured to: while moving the content on the display unit by the amount that is determined based on the characteristic intensity of the first contact and the characteristic speed of the first movement detected prior to the lift-off of the first contact, dynamically change (e.g., with the changing unit 1420) the appearance of the scroll enhancement indicator in accordance with a current scrolling speed.

In some embodiments, moving the content on the display unit by an amount that is determined based on a characteristic intensity of the first contact and a characteristic speed of the first movement detected prior to the lift-off of the first contact includes: applying an intensity filter to an intensity profile of the first contact, wherein the intensity filter shifts the intensity profile by a first time shift past the lift-off of the first contact; and determining an initial speed for moving the content on the display unit after the lift-off of the first contact based on a selected intensity value on the filtered intensity profile.

In some embodiments, moving the content on the display unit by an amount that is determined based on a characteristic intensity of the first contact and a characteristic speed of the first movement detected prior to the lift-off of the first contact includes: applying a speed filter to a speed profile of the first contact, wherein the speed filter shifts the speed profile by a second time shift past the lift-off of the first contact; determining an initial speed for moving the content on the display unit after the lift-off of the first contact based on a selected speed value on the shifted speed profile; and moving the content on the display unit with the determined initial speed after the lift-off of the first contact.

In some embodiments, the processing unit is configured to: prior to detecting the first movement of the first contact, detect (e.g., with the detecting unit 1412) an earlier increase in intensity of the first contact while the first contact remains stationary on the touch-sensitive surface unit.

In some embodiments, detecting the earlier increase in intensity of the first contact includes detecting the earlier increase in intensity of the first contact above a first intensity threshold while a focus selector is located on a first user interface element on the display unit, and the processing unit is configured to perform (e.g., with the performing unit 1422) a predefined operation associated with the first user interface element in response to detecting the earlier increase in intensity of the first contact above the first intensity threshold while the focus selector is located on the first user interface element on the display unit.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 9A-9D are, optionally, implemented by components depicted in FIGS. 1A-1B or FIG. 14. For example, detection operations 904, 908, and 910, scrolling operation 906, and moving operation 912 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Figure 15:
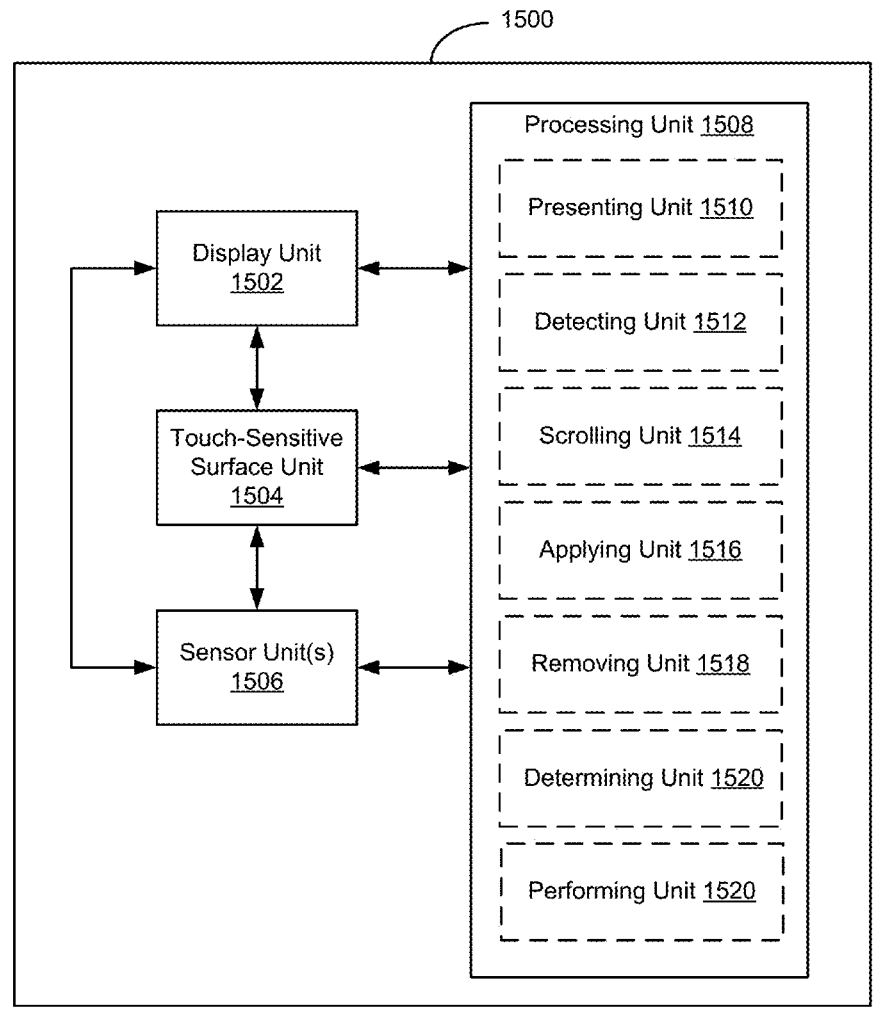

In accordance with some embodiments, FIG. 15 shows a functional block diagram of an electronic device 1500 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 15 are, optionally, combined or separated into sub-blocks to implement the principles of the various described embodiments. Therefore, the description herein optionally supports any possible combination or separation or further definition of the functional blocks described herein.

As shown in FIG. 15, an electronic device 1500 includes a display unit 1402 configured to display a user interface, a touch-sensitive surface unit 1504 configured to receive contacts, one or more sensor units 1506 configured to detect intensity of contacts with the touch-sensitive surface unit 1504; and a processing unit 1508 coupled with the display unit 1502, the touch-sensitive surface unit 1504 and the one or more sensor units 1506. In some embodiments, the processing unit 1508 includes: a presenting unit 1510, a detecting unit 1512, scrolling unit 1514, an applying unit 1516, a removing unit 1518, a determining unit 1520, and a performing unit 1522.

The processing unit 1508 is configured to: present (e.g., with the presenting unit 1510); a first portion of content on the display unit; while presenting the first portion of the content: detect (e.g., with the detecting unit 1512) a first contact on the touch-sensitive surface unit; and detect (e.g., with the detecting unit 1512) a first movement of the first contact on the touch-sensitive surface unit; detect (e.g., with the detecting unit 1512) a lift-off of the first contact following the first movement of the first contact on the touch-sensitive surface unit; and, in response to detecting the lift-off of the first contact following the first movement of the first contact on the touch-sensitive surface unit: in accordance with a determination that the first contact had a characteristic intensity above a respective intensity threshold prior to the lift-off of the first contact, scroll (e.g., with the scrolling unit 1514) through the content to a predefined portion of the content; and in accordance with a determination that the first contact had a characteristic intensity below the respective intensity threshold prior to the lift-off of the first contact, scroll (e.g., with the scrolling unit 1514) through the content by an amount that is determined based on a characteristic speed of the first contact during the first movement.

In some embodiments, scrolling through the content to a predefined portion of the content includes accelerating scrolling of the content to enable display of an end portion of the content on the display unit.

In some embodiments, the first movement corresponds to movement toward a top portion of the display unit.

In some embodiments, scrolling through the content to a predefined portion of the content includes accelerating scrolling of the content to enable display of a beginning portion of the content on the display unit.

In some embodiments, the first movement corresponds to movement toward a bottom portion of the display unit.

In some embodiments, scrolling through the content by an amount that is determined based on a characteristic speed of the first contact during the first movement includes: scrolling through the content by a first amount before the lift-off of the first contact; and continuing to scroll through the content by a second amount after the lift-off of the first contact, wherein the scrolling of the content after the lift-off of the first contact is continued at an initial speed that is determined based on the characteristic speed of the first contact during the first movement.

In some embodiments, the processing unit is configured to: detect (e.g., with the detecting unit 1512) the increase in intensity of the first contact on the touch-sensitive surface unit above the respective intensity threshold during the first movement of the first contact on the touch-sensitive surface unit; and in response to detecting the increase in intensity above the respective intensity threshold, apply (e.g., with the applying unit 1516) a visual effect on the first portion of content on the display unit.

In some embodiments, the processing unit is configured to remove (e.g., with the removing unit 1518) the applied visual effect on the first portion of content on the display unit during the scrolling through the content to the predefined portion of the content.

In some embodiments, the processing unit is configured to: apply (e.g., with the applying unit 1516) an intensity filter to an intensity profile of the first contact, wherein the intensity filter shifts the intensity profile by a first time shift past the lift-off of the first contact; and determine (e.g., with the determining unit 1520) a steady state speed for the scrolling through the content to the predefined portion of the content based on a selected intensity value on the shifted intensity profile.

In some embodiments, scrolling through the content by an amount that is determined based on a characteristic speed of the first contact during the first movement includes scrolling through the content to enable display of a second portion of the content, and the processing unit is configured to: while displaying the second portion of the content, detect (e.g., with the detecting unit 1512) a predefined input while a focus selector is within a predefined region on the display unit; and in response to detecting the predefined input while the focus selector is within the predefined region on the display unit, scroll (e.g., with the scrolling unit 1514) through the content to the predefined portion of the content.

In some embodiments, the processing unit is configured to: prior to detecting the first movement of the first contact, detect (e.g., with the detecting unit 1512) an earlier increase in intensity of the first contact above the respective intensity threshold while the first contact remains stationary on the touch-sensitive surface unit; and determine (e.g., with the determining unit 1520) that the first contact had a characteristic intensity below the respective intensity threshold prior to the lift-off of the first contact in accordance with a determination that the intensity of the first contact remained below the respective intensity threshold during the first movement of the first contact on the touch-sensitive surface unit.

In some embodiments, detecting the earlier increase in intensity of the first contact includes detecting the earlier increase in intensity of the first contact above a first intensity threshold while a focus selector is located on a first user interface element on the display unit, and the processing unit is configured to perform (e.g., with the performing unit 1522) a predefined operation associated with the first user interface element in response to detecting the earlier increase in intensity of the first contact above the first intensity threshold while the focus selector is located on a first user interface element on the display unit.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 10A-10C are, optionally, implemented by components depicted in FIGS. 1A-1B or FIG. 15. For example, detection operations 1004, 1006 and scrolling operations 1008 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A non-transitory computer readable storage medium storing one or more programs, the one or more programs comprising instructions, which when executed by an electronic device with a display, a touch-sensitive surface, and one or more sensors to detect intensities of contacts with the touch-sensitive surface, cause the device to:
   present a first portion of structured content on the display, wherein the structured content includes a plurality of sections, and the first portion includes content from a first section of the plurality of sections;
   detect a first contact on the touch-sensitive surface while the first portion of the structured content is presented on the display;
   detect an increase in a characteristic intensity of the first contact on the touch-sensitive surface and detecting a first movement of the first contact on the touch-sensitive surface; and,
   in response to detecting the increase in the characteristic intensity of the first contact and detecting the first movement of the first contact:
      in accordance with a determination that the characteristic intensity of the contact increases above a first intensity threshold, translate the structured content to display a start of a second section adjacent to the first section of the structured content at a predefined location on the display; and,
      in accordance with a determination that the characteristic intensity of the contact does not increase above the first intensity threshold, translate the structured content in accordance with a magnitude of the movement of the contact on the touch-sensitive surface.

2. The computer readable storage medium of claim 1, wherein, during the translating of the structured content to display the start of the second section adjacent to the first section on the display, a focus selector associated with the first contact is on the structured content.

3. The computer readable storage medium of claim 1, including instructions which, when executed by the electronic device, cause the electronic device to:
   in response to detecting the increase in the characteristic intensity of the first contact and the first movement of the first contact, apply a visual effect on the first portion of the structured content on the display.

4. The computer readable storage medium of claim 3, including instructions which, when executed by the electronic device, cause the electronic device to:
   remove the applied visual effect on the first portion of the structured content on the display during the translating of the structured content.

5. The computer readable storage medium of claim 1, including instructions which, when executed by the electronic device, cause the electronic device to, prior to the determination that the characteristic intensity of the first contact has increased above the first intensity threshold:
   detect an initial increase in the characteristic intensity of the first contact; and,
   in response to detecting the initial increase in the characteristic intensity of the first contact, concurrently present a scroll bar with the first portion of the structured content on the display, wherein the scroll bar includes a scroll position indicator that indicates a respective position of the first portion of the structured content in the structured content; and,
   in response to the determination that the characteristic intensity of the first contact has increased above the first intensity threshold, present a plurality of section indicators along with the scroll position indicator, wherein a relative ordering of the section indicators to the scroll position indicator corresponds to relative positions of the sections to the first portion of the structured content in the structured content.

6. The computer readable storage medium of claim 5, wherein presenting the plurality of section indicators with the scroll bar includes:
   presenting an animation that shows the plurality of section indicators emerging from the scroll position indicator and spreading out along the scroll bar.

7. The computer readable storage medium of claim 5, including instructions which, when executed by the electronic device, cause the electronic device to:
   when translating of the structured content to display the start of the second section adjacent to the first section of the structured content, present an animation that shows the scroll position indicator hopping over a respective section indicator in the plurality of section indicators.

8. The computer readable storage medium of claim 5, including instructions which, when executed by the electronic device, cause the electronic device to:
   detect a lift-off of the first contact, and,
   in response to detecting the lift-off of the first contact, cease to display the scroll bar, the scroll position indicator, and the plurality of section indicators.

9. The computer readable storage medium of claim 8, including instructions which, when executed by the electronic device, cause the electronic device to:
in response to detecting the lift-off of the first contact, present an animation that shows the plurality of section indicators moving into the scroll position indicator before ceasing the display of the scroll position indicator.

10. The computer readable storage medium of claim 1, wherein the structured content is translated to display the start of the second section adjacent to the first section of the structured content at the predefined location on the display in accordance with a determination that the first movement of the first contact exceeds a first threshold distance.

11. The computer readable storage medium of claim 10, wherein the characteristic intensity of the first contact is below the first intensity threshold after the first movement of the first contact exceeds the first threshold distance.

12. The computer readable storage medium of claim 1, wherein the sections in the structured content are mapped to a plurality of vertical positions on the display, and wherein the first movement of the first contact from a first position of the plurality of positions to a second position of the plurality of positions results in a translation of the structured content from one section of the structured document that corresponds to the first position on the display to another section of the structured content that corresponds to the second position on the display.

13. An electronic device, comprising:
a display;
a touch-sensitive surface;
one or more sensors to detect an intensities of a contact on the touch-sensitive surface;
one or more processors;
memory; and
one or more programs, wherein the one or more programs are stored in the memory and configured to be executed by the one or more processors, the one or more programs including instructions for:
presenting a first portion of structured content on the display, wherein the structured content includes a plurality of sections, and the first portion includes content from a first section of the plurality of sections;
detecting a first contact on the touch-sensitive surface while the first portion of the structured content is presented on the display;
detecting an increase in a characteristic intensity of the first contact on the touch-sensitive surface and detecting a first movement of the first contact on the touch-sensitive surface; and,
in response to detecting the increase in the characteristic intensity of the first contact and detecting the first movement of the first contact:
in accordance with a determination that the characteristic intensity of the contact increases above a first intensity threshold, translating the structured content to display a start of a second section adjacent to the first section of the structured content at a predefined location on the display; and,
in accordance with a determination that the characteristic intensity of the contact does not increase above the first intensity threshold, translating the structured content in accordance with a magnitude of the movement of the contact on the touch-sensitive surface.

14. The device of claim 13, wherein, during the translating of the structured content to display the start of the second section adjacent to the first section on the display, a focus selector associated with the first contact is on the structured content.

15. The device of claim 13, including instructions for:
in response to detecting the increase in the characteristic intensity of the first contact and the first movement of the first contact, applying a visual effect on the first portion of the structured content on the display.

16. The device of claim 15, including instructions for:
removing the applied visual effect on the first portion of the structured content on the display during the translating of the structured content.

17. The device of claim 13, including instructions for, prior to the determination that the characteristic intensity of the first contact has increased above the first intensity threshold:
detecting an initial increase in the characteristic intensity of the first contact; and,
in response to detecting the initial increase in the characteristic intensity of the first contact, concurrently presenting a scroll bar with the first portion of the structured content on the display, wherein the scroll bar includes a scroll position indicator that indicates a respective position of the first portion of the structured content in the structured content; and,
in response to the determination that the characteristic intensity of the first contact has increased above the first intensity threshold, presenting a plurality of section indicators along with the scroll position indicator, wherein a relative ordering of the section indicators to the scroll position indicator corresponds to relative positions of the sections to the first portion of the structured content in the structured content.

18. The device of claim 17, wherein presenting the plurality of section indicators with the scroll bar includes:
presenting an animation that shows the plurality of section indicators emerging from the scroll position indicator and spreading out along the scroll bar.

19. The device of claim 17, including instructions for:
when translating of the structured content to display the start of the second section adjacent to the first section of the structured content, presenting an animation that shows the scroll position indicator hopping over a respective section indicator in the plurality of section indicators.

20. The device of claim 17, including instructions for:
detecting a lift-off of the first contact, and,
in response to detecting the lift-off of the first contact, ceasing to display the scroll bar, the scroll position indicator, and the plurality of section indicators.

21. The device of claim 20, including instructions for:
in response to detecting the lift-off of the first contact, presenting an animation that shows the plurality of section indicators moving into the scroll position indicator before ceasing the display of the scroll position indicator.

22. The device of claim 13, wherein the structured content is translated to display the start of the second section adjacent to the first section of the structured content at the predefined location on the display in accordance with a determination that the first movement of the first contact exceeds a first threshold distance.

23. The device of claim 22, wherein the characteristic intensity of the first contact is below the first intensity threshold after the first movement of the first contact exceeds the first threshold distance.

24. The device of claim 13, wherein the sections in the structured content are mapped to a plurality of vertical positions on the display, and wherein the first movement of the first contact from a first position of the plurality of positions to a second position of the plurality of positions results in a translation of the structured content from one section of the structured document that corresponds to the first position on the display to another section of the structured content that corresponds to the second position on the display.

25. A method, comprising:
at an electronic device with a touch-sensitive surface, a display, and one or more sensors to detect intensities of contacts on the touch-sensitive surface:
presenting a first portion of structured content on the display, wherein the structured content includes a plurality of sections, and the first portion includes content from a first section of the plurality of sections;
detecting a first contact on the touch-sensitive surface while the first portion of the structured content is presented on the display;
detecting an increase in a characteristic intensity of the first contact on the touch-sensitive surface and detecting a first movement of the first contact on the touch-sensitive surface; and,
in response to detecting the increase in the characteristic intensity of the first contact and detecting the first movement of the first contact:
in accordance with a determination that the characteristic intensity of the contact increases above a first intensity threshold, translating the structured content to display a start of a second section adjacent to the first section of the structured content at a predefined location on the display; and,
in accordance with a determination that the characteristic intensity of the contact does not increase above the first intensity threshold, translating the structured content in accordance with a magnitude of the movement of the contact on the touch-sensitive surface.

26. The method of claim 25, wherein, during the translating of the structured content to display the start of the second section adjacent to the first section on the display, a focus selector associated with the first contact is on the structured content.

27. The method of claim 25, including:
in response to detecting the increase in the characteristic intensity of the first contact and the first movement of the first contact, applying a visual effect on the first portion of the structured content on the display.

28. The method of claim 27, including:
removing the applied visual effect on the first portion of the structured content on the display during the translating of the structured content.

29. The method of claim 25, including, prior to the determination that the characteristic intensity of the first contact has increased above the first intensity threshold:
detecting an initial increase in the characteristic intensity of the first contact; and,
in response to detecting the initial increase in the characteristic intensity of the first contact, concurrently presenting a scroll bar with the first portion of the structured content on the display, wherein the scroll bar includes a scroll position indicator that indicates a respective position of the first portion of the structured content in the structured content; and,
in response to the determination that the characteristic intensity of the first contact has increased above the first intensity threshold, presenting a plurality of section indicators along with the scroll position indicator, wherein a relative ordering of the section indicators to the scroll position indicator corresponds to relative positions of the sections to the first portion of the structured content in the structured content.

30. The method of claim 29, wherein presenting the plurality of section indicators with the scroll bar includes:
presenting an animation that shows the plurality of section indicators emerging from the scroll position indicator and spreading out along the scroll bar.

31. The method of claim 29, including:
when translating of the structured content to display the start of the second section adjacent to the first section of the structured content, presenting an animation that shows the scroll position indicator hopping over a respective section indicator in the plurality of section indicators.

32. The method of claim 29, including:
detecting a lift-off of the first contact, and,
in response to detecting the lift-off of the first contact, ceasing to display the scroll bar, the scroll position indicator, and the plurality of section indicators.

33. The method of claim 32, including:
in response to detecting the lift-off of the first contact, presenting an animation that shows the plurality of section indicators moving into the scroll position indicator before ceasing the display of the scroll position indicator.

34. The method of claim 25, wherein the structured content is translated to display the start of the second section adjacent to the first section of the structured content at the predefined location on the display in accordance with a determination that the first movement of the first contact exceeds a first threshold distance.

35. The method of claim 23, wherein the characteristic intensity of the first contact is below the first intensity threshold after the first movement of the first contact exceeds the first threshold distance.

36. The method of claim 25, wherein the sections in the structured content are mapped to a plurality of vertical positions on the display, and wherein the first movement of the first contact from a first position of the plurality of positions to a second position of the plurality of positions results in a translation of the structured content from one section of the structured document that corresponds to the first position on the display to another section of the structured content that corresponds to the second position on the display.

* * * * *

UNITED STATES PATENT AND TRADEMARK OFFICE
CERTIFICATE OF CORRECTION

PATENT NO. : 10,235,035 B2
APPLICATION NO. : 15/009688
DATED : March 19, 2019
INVENTOR(S) : Karunamuni et al.

Page 1 of 1

It is certified that error appears in the above-identified patent and that said Letters Patent is hereby corrected as shown below:

In the Claims

Claim 13, Column 85, Line 32, please delete "detect an intensities" and insert --detect intensities--.

Signed and Sealed this
Fourth Day of June, 2019

Andrei Iancu
*Director of the United States Patent and Trademark Office*